(12) United States Patent
Avila et al.

(10) Patent No.: US 12,460,201 B2
(45) Date of Patent: Nov. 4, 2025

(54) METHODS OF MULTIPLEXING CRISPR

(71) Applicant: Massachusetts Institute of Technology, Cambridge, MA (US)

(72) Inventors: Mariah Avila, Cambridge, MA (US); Kevin Michael Esvelt, Cambridge, MA (US); Elizabeth Ashton Strait, Cambridge, MA (US); Emma Chory, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 590 days.

(21) Appl. No.: 16/931,389

(22) Filed: Jul. 16, 2020

(65) Prior Publication Data
US 2021/0017516 A1    Jan. 21, 2021

Related U.S. Application Data

(60) Provisional application No. 62/874,719, filed on Jul. 16, 2019.

(51) Int. Cl.
  *C12N 15/10* (2006.01)
  *C12N 9/22* (2006.01)
  *C12N 15/11* (2006.01)

(52) U.S. Cl.
  CPC .......... *C12N 15/1086* (2013.01); *C12N 9/22* (2013.01); *C12N 15/11* (2013.01); *C12N 2310/20* (2017.05); *C12N 2800/80* (2013.01)

(58) Field of Classification Search
  CPC ...... C12N 15/1086; C12N 9/22; C12N 15/11; C12N 2310/20; C12N 2800/80
  USPC .......................................................... 506/2
  See application file for complete search history.

(56) References Cited

FOREIGN PATENT DOCUMENTS

| WO | 2017/049129 A3 | 3/2017 |
| WO | 2019/023291 A3 | 1/2019 |

OTHER PUBLICATIONS

Liao, C. et al. One-step assembly of large CRISPR arrays enables multi-functional targeting and reveals constraints on array design. bioRxiv: The preprint server for biology. 2018. p. 1-45. [retrieved on Jan. 24, 2023]. Retrieved from Internet: <URL: https://www.biorxiv.org/content/10.1101/31242> (Year: 2018).*

Shijin, Chen et al., "Cloning and functional verification of U6 and 7SK promoter of small RNA from Barna mini-pig in Guangxi." 34 (4): 445-53 (2012). Chinese reference with English abstract and Google machine translation.

East-Seletsky, Alexandra et al., "RNA Targeting by Functionally Orthogonal Type I-A CRISPR-Cas Enzymes." Molecular Cell, vol. 66, No. 3, (May 4, 2017), p. 373-383.

Fonfara, Ines, et al., "The CRISPR-associated DNA-cleaving enzyme Cpf1 also processes precursor CRISPR RNA 11." Nature, vol. 532, (Apr. 20, 2016), pp. 517-521.

Freitas, Ferdinando B., et al., "African Swine Fever Virus Encodes for an E2-Ubiquitin Conjugating Enzyme That Is Mono- and Di-Ubiquitinated and Required for Viral Replication Cycle." Scientific Reports 8 (1): 3471 (2018).

(Continued)

*Primary Examiner* — Aaron A Priest
*Assistant Examiner* — Randi Lynn Beil
(74) *Attorney, Agent, or Firm* — Pierce Atwood LLP

(57) ABSTRACT

The invention relates, in part, to methods and systems with which to identify guide RNAs (gRNAs) and methods and systems with which to prepare, design, and generate gRNAs and minimally repetitive arrays of gRNAs.

14 Claims, 26 Drawing Sheets

Specification includes a Sequence Listing.

(56) References Cited

OTHER PUBLICATIONS

Freitas, Ferdinando B., et al., "In Vitro Inhibition of African Swine Fever Virus-Topoisomerase II Disrupts Viral Replication." Antiviral Research 134 (Oct.): 34-41 (2016).

Gao, Linyi, et al. "Engineered Cpf1 variants with altered PAM specificities." Nature Biotechnology 35.8 (2017): p. 789-792.

International Search Report and The Written Opinion of the International Searching Authority from corresponding International patent application No. PCT/US2020/042423 dated Oct. 23, 2020.

Katoh, Kazutaka, et al., "MAFFT Multiple Sequence Alignment Software Version 7: Improvements in Performance and Usability." Molecular Biology and Evolution 30(4): 772-80 (2013).

Keita, Djeneba, et al., "Control of African Swine Fever Virus Replication by Small Interfering RNA Targeting the AI 5 IR and VP72 Genes." Anhviral Therapy 15 (5): 727-736 (2010).

Kiani, Samira, et al., "Cas9 gRNA engineering for genome editing, activation and repression." Nature Methods, vol. 12, No. 11, Sep. 7, 2015, pp. 1051-1054.

Kong, Qingran, et al. "Rosa26 Locus Supports Tissue-Specific Promoter Driving Transgene Expression Specifically in Pig." PloS One 9 (9): el 07945 (2014).

Li, Ping, et al., "Identification and Cloning of the Porcine ROSA26 Promoter and Its Role in Transgenesis." Transplantation Technology 2 (1): 1 (2014) p. 1-8.

Liao, Chunyu, et al., "Modular one-pot assembly of CRISPR arrays enables library generation and reveals factors influencing crRNA biogenesis." Nature Communications, vol. 10, No. 1, (Jul. 3, 2019).

Desinghaus, Lukas, et al., "Switching the activity of Cas12a using guide RNA strand displacement circuits." Nature Communications, vol. 10, No. 1, (May 7, 2019) p. 1-11.

Petkov, Stoyan, et al., "The Choice of Expression Vector Promoter Is an Important Factor in the Reprogramming of Porcine Fibroblasts into Induced Pluripotent Cells." Cellular Reprogramming 15 (1): 1-8 (2013).

Sanchez, Elena G., et al., "Phenotyping and Susceptibility of Established Porcine Cells Lines to African Swine Fever Virus Infection and Viral Production." Scientific Reports 7 (1): 10369 (2017) p. 1-13.

Swarts, Daan C., et al., "Structural Basis for Guide RNA Processing and Seed-Dependent DNA Targeting by CRISPR-Cas12a." Molecular Cell, vol. 66, No. 2, (Apr. 1, 2017), pp. 221-233.

Teng, Fei, et al., "Enhanced mammalian genome editing by new Cas12a orthologs with optimized crRNA scaffolds." Genome Biology, vol. 20, No. 1, (Feb. 5, 2019).

\* cited by examiner

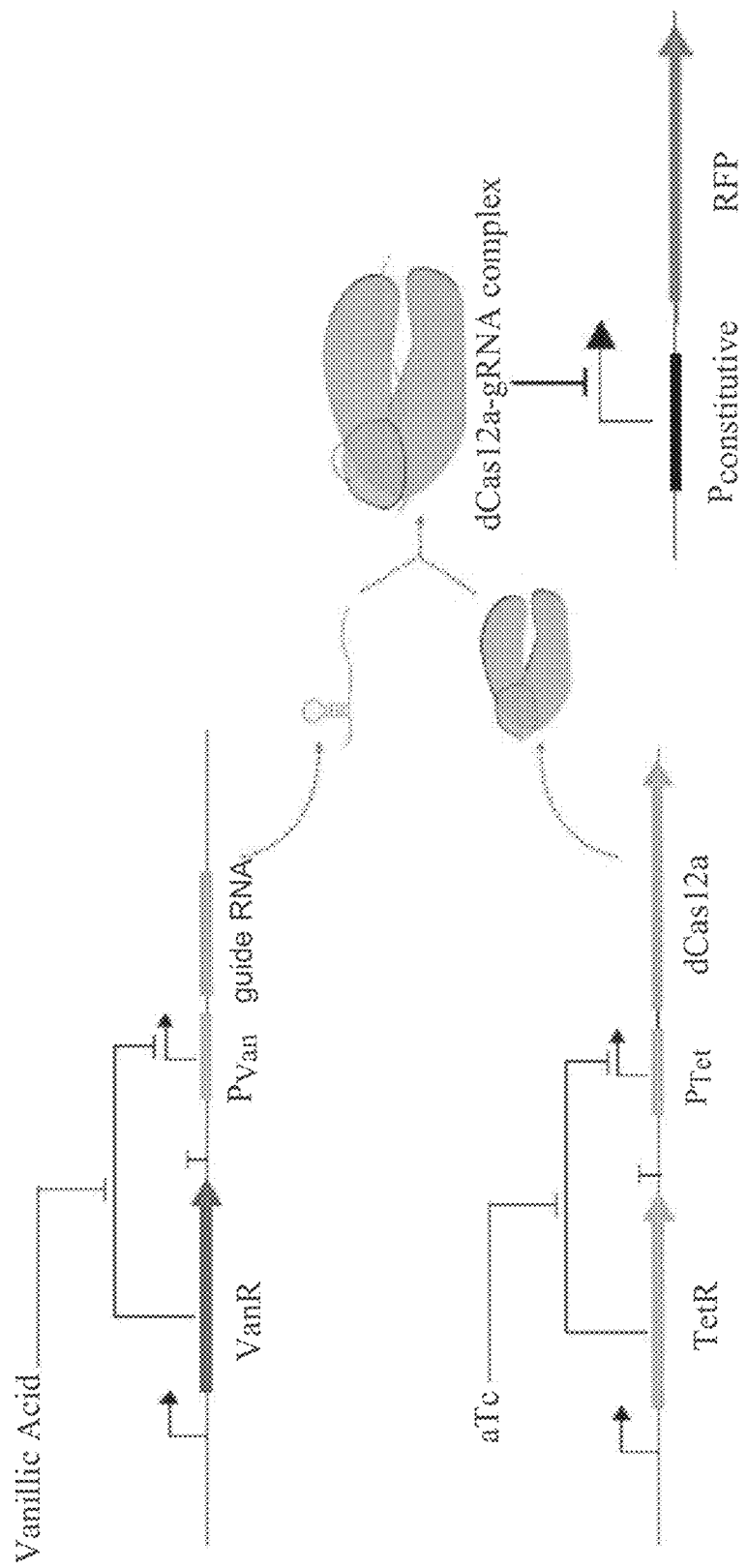

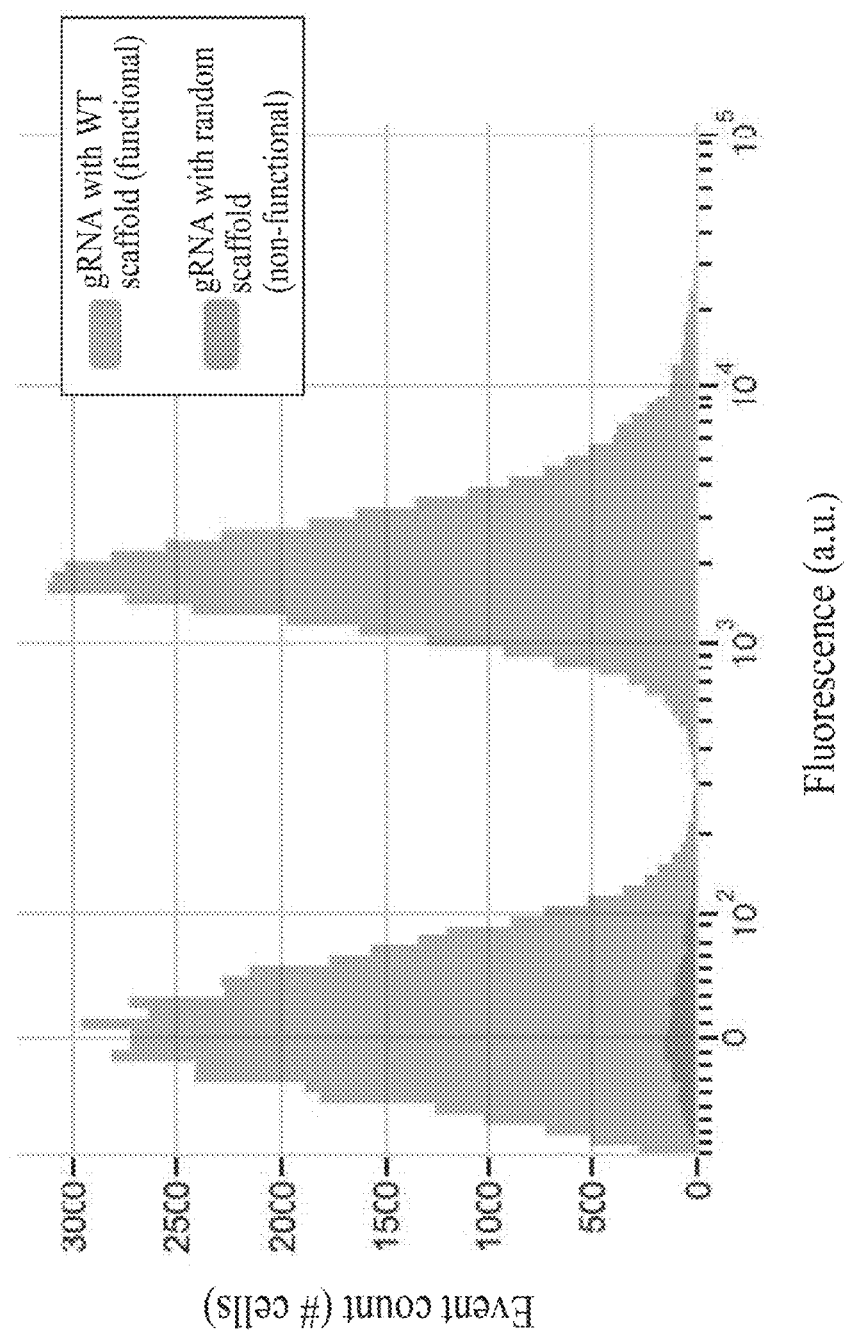

Fig. 4B

| | | A | C | G | T |
|---|---|---|---|---|---|
| Prestem | Naatttctactaagtgtagat | 11.57 | 8.25 | 6.55 | 7.89 |
| | tNatttctactaagtgtagat | 7.89 | 0.00 | 0.00 | 0.00 |
| | taNttctactaagtgtagat | 7.89 | 1.66 | 0.00 | 1.30 |
| | taaNtctactaagtgtagat | 0.92 | 2.38 | 0.99 | 7.89 |
| | taatNctactaagtgtagat | 0.00 | 0.00 | 0.00 | 7.89 |
| Left Stem | taattNtactaagtgtagat | 0.00 | 0.00 | 0.00 | 7.89 |
| | taatttNactaagtgtagat | 0.06 | 7.89 | 0.05 | 0.00 |
| | taatttcNctaagtgtagat | 0.04 | 0.00 | 0.00 | 7.89 |
| | taatttctNtaagtgtagat | 7.89 | 0.00 | 0.00 | 0.00 |
| | taatttctaNaagtgtagat | 0.03 | 7.89 | 0.00 | 0.44 |
| Loop | taatttctacNagtgtagat | 0.17 | 0.72 | 0.29 | 7.89 | ◀
| | taatttctactNgtgtagat | 7.89 | 7.78 | 9.10 | 7.17 |
| | taatttctactaNgtgtagat | 7.89 | 6.37 | 8.85 | 7.86 |
| | taatttctactaaNtgtagat | 9.32 | 4.94 | 7.89 | 8.77 |
| | taatttctactaagNtagat | 7.48 | 8.41 | 8.13 | 7.89 |
| Right Stem | taatttctactaagtNagat | 0.00 | 0.00 | 7.89 | 0.07 |
| | taatttctactaagtgNagat | 0.00 | 0.75 | 0.00 | 7.89 |
| | taatttctactaagtgtNat | 7.89 | 0.39 | 5.79 | 0.12 |
| | taatttctactaagtgtaNat | 0.00 | 0.07 | 7.89 | 0.00 |
| | taatttctactaagtgtagNt | 7.89 | 0.00 | 3.24 | 0.00 |
| | taatttctactaagtgtagaN | 0.00 | 0.00 | 0.00 | 7.89 |

Fig. 4C

| | AA | AC | AG | AT | CA | CC | CG | CT |
|---|---|---|---|---|---|---|---|---|
| taattNctactaagtgtagNt | 0.00 | 0.00 | 0.00 | 0.00 | 0.00 | 0.00 | 0.00 | 0.00 |
| taatttNtactaagtgtaNat | 0.00 | 0.00 | 0.06 | 1.22 | 0.00 | 0.07 | 7.89 | 0.00 |
| taatttcNactaagtgtaNgat | 0.04 | 0.00 | 0.00 | 0.00 | 0.00 | 0.00 | 0.00 | 0.00 |
| taatttctNcaagtgtaNagat | 0.00 | 0.75 | 0.00 | 7.89 | 0.00 | 0.00 | 9.26 | 0.00 |
| taatttctaNtaagtNtagat | 0.00 | 0.00 | 0.03 | 0.00 | 0.00 | 0.00 | 7.89 | 0.07 |

| | GA | GC | GG | GT | TA | TC | TG | TT |
|---|---|---|---|---|---|---|---|---|
| taattNctactaagtgtagNt | 0.00 | 0.00 | 0.00 | 0.00 | 7.89 | 0.00 | 3.24 | 0.00 |
| taatttNtactaagtgtaNat | 0.00 | 0.00 | 0.05 | 0.00 | 0.00 | 0.00 | 0.00 | 0.00 |
| taatttcNactaagtgtaNgat | 0.00 | 1.68 | 0.00 | 0.00 | 7.89 | 0.39 | 5.79 | 0.12 |
| taatttctNcaagtgtaNagat | 0.00 | 8.25 | 0.00 | 0.00 | 0.00 | 0.00 | 0.00 | 0.00 |
| taatttctaNtaagtNtagat | 0.00 | 0.00 | 0.00 | 0.00 | 0.00 | 0.00 | 0.44 | 0.00 |

| SEQ ID NO | Position in gRNA scaffold | | | | | | NOTES |
|---|---|---|---|---|---|---|---|
| | first | prestem | left stem | loop | right stem | final | |
| 32 | N | aatt | tctac | taagt | gtaga | t | prestem mutations |
| 33 | N | catt | tctac | taagt | gtaga | t | |
| 34 | N | actt | tctac | taagt | gtaga | t | |
| 35 | N | cctt | tctac | taagt | gtaga | t | |
| 36 | N | aatt | tctac | caagt | gtaga | t | first base loop is C |
| 37 | N | aatt | tctac | tNagt | gtaga | t | 2nd base loop is anything |
| 38 | N | aatt | tctac | taNgt | gtaga | t | 3rd base loop is anything |
| 39 | N | aatt | tctac | taaNt | gtaga | t | 4th base loop is anything |
| 40 | N | aatt | tctac | taagN | gtaga | t | 5th base loop is anything |
| 41 | N | aatt | tctac | taagt | gtagG | t | 1st pair is wobble |
| 42 | N | aatt | tctac | taagt | gtGga | t | 3rd pair is wobble |
| 43 | N | aatt | tAtac | taagt | gtaTa | t | 2nd pair is A-T |
| 44 | N | aatt | tctCc | taagt | gtaGg | t | 4th pair is C-G |
| 45 | N | aatt | tctGc | taagt | gtagG | t | 4th pair is G-C |
| 46 | N | aatt | tcGac | taagt | gtCga | t | 3rd pair is G-C |
| 47 | N | aatt | tctac | taagt | gCaga | t | 4th pair is A-C |
| 48 | N | aatt | tctaT | taagt | gtaga | t | 5th pair is wobble |
| 49 | N | aatt | tAtac | TACG | gtaTa | t | tAtac stem mutation with different 4-loops |
| 50 | N | aatt | tAtac | TATC | gtaTa | t | |
| 51 | N | aatt | tAtac | TTTG | gtaTa | t | |
| 52 | N | aatt | tctGc | TACA | gCaga | t | tctGc stem mutation with different 4-loops |
| 53 | N | aatt | tctGc | TACC | gCaga | t | |
| 54 | N | aatt | tctGc | TACG | gCaga | t | |
| 55 | N | aatt | tctGc | TACT | gCaga | t | |
| 56 | N | aatt | tctGc | TAGC | gCaga | t | |

Fig. 4E continued

| 57 | N | aatt | tctGc | TATN | gCaga | t | |
|---|---|---|---|---|---|---|---|
| 58 | N | aatt | tctGc | TCTA | gCaga | t | |
| 59 | N | aatt | tctCc | TAAA | gGaga | t | tctCc stem mutation with different 4-loops |
| 60 | N | aatt | tctCc | TAAT | gGaga | t | |
| 61 | N | aatt | tctCc | TACN | gGaga | t | |
| 62 | N | aatt | tctCc | TAGA | gGaga | t | |
| 63 | N | aatt | tctCc | TAGT | gGaga | t | |
| 64 | N | aatt | tctCc | TATN | gGaga | t | |
| 65 | N | aatt | tctCc | TCAT | gGaga | t | |
| 66 | N | aatt | tctCc | TCCA | gGaga | t | |
| 67 | N | aatt | tctCc | TCCT | gGaga | t | |
| 68 | N | aatt | tctCc | TCTN | gGaga | t | |
| 69 | N | aatt | tctCc | TGTT | gGaga | t | |
| 70 | N | aatt | tctCc | TTCA | gGaga | t | |
| 71 | N | aatt | tctCc | TTCT | gGaga | t | |
| 72 | N | aatt | tctCc | TTGT | gGaga | t | |
| 73 | N | aatt | tctCc | TTTT | gGaga | t | |
| 31 | N | aatt | tctac | TNNN | gtaga | t | wild-type stem with different 4-loops |
| 74 | N | aatt | tctac | CNNN | gtaga | t | |

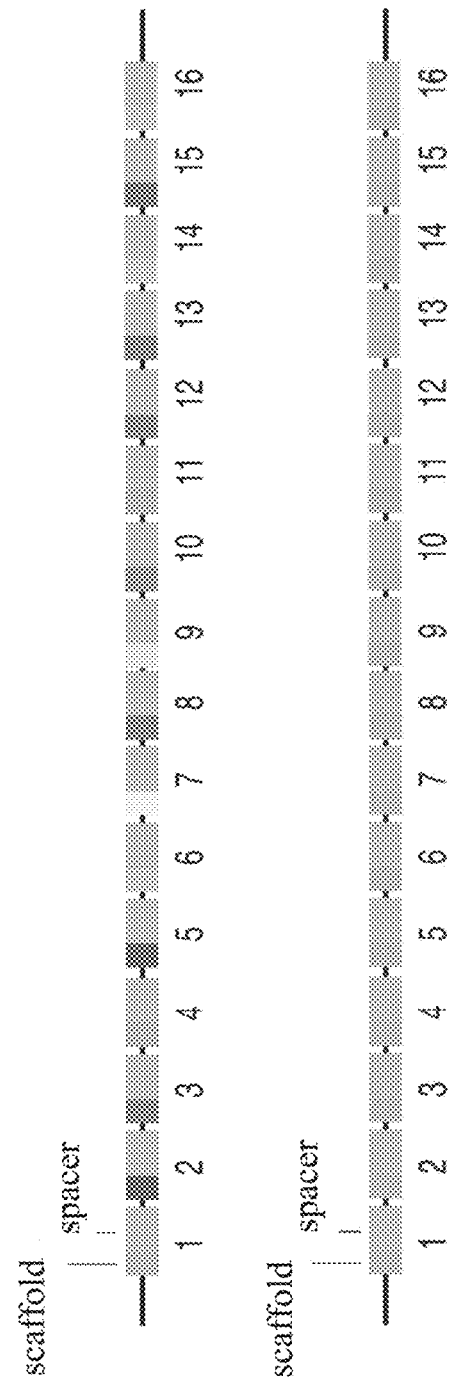

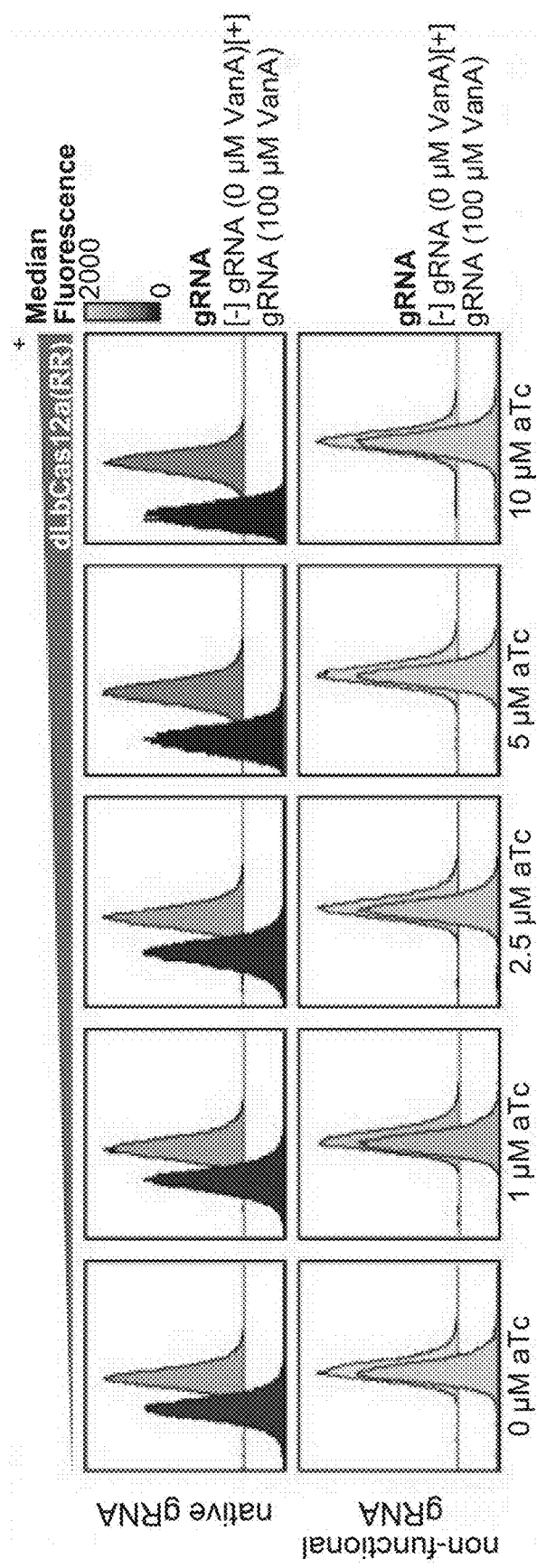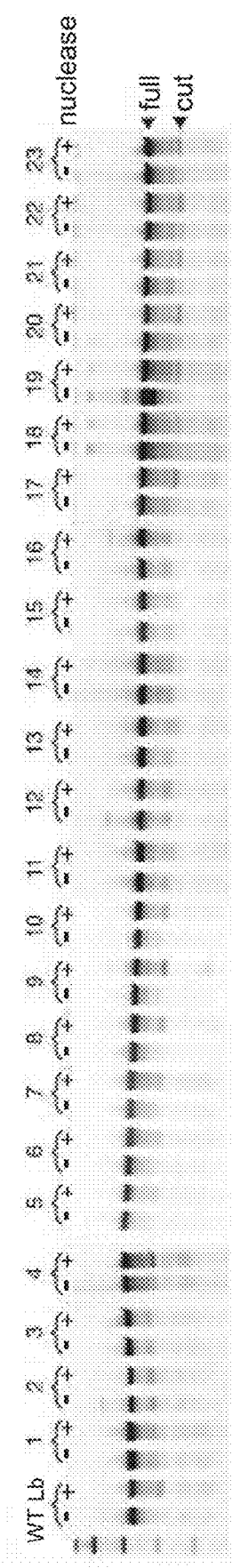
Fig. 8A
Fig. 8B

METHODS OF MULTIPLEXING CRISPR

RELATED APPLICATIONS

This application claims the benefit under 35 U.S.C. § 119(e) of U.S. Provisional application Ser. No. 62/874,719 filed Jul. 16, 2019, the disclosure of which is incorporated by reference herein in its entirety.

SEQUENCE LISTING

The instant application incorporates by reference the Sequence Listing in the ASCII text file entitled "MIT-033US (02) sequence listing_ST25.txt", which was created on Aug. 13, 2020, the size of which file is 670,207 bytes.

FIELD OF THE INVENTION

The invention relates, in part, to methods of designing and constructing gene drive systems and their inclusion and use in cell lines and organisms.

BACKGROUND OF THE INVENTION

The discovery of CRISPR RNA-guided endonucleases have catalyzed huge technological advancements in the field of synthetic biology, such as providing methods of gene editing. These systems have two components: a CRISPR-associated (Cas) protein and a guide RNA consisting of a conserved "scaffold" sequence recognized by the protein and a variable "spacer" complementary to the DNA target of interest. CRISPR-based gene drives can be greatly improved by targeting many sites simultaneously using arrays of guides with different spacers; but previously available arrays have introduced significant stretches of homologous repeats that can affect the generational stability of the drive system

SUMMARY OF THE INVENTION

According to an aspect of the invention, a function-screening system for identifying one or a plurality of guide RNA (gRNA) scaffold molecules is provided, the system including: (a) a Cas protein capable of binding a promoter sequence that is capable of driving expression of a reporter protein; (b) a nucleic acid molecule including the promoter sequence and the sequence encoding the reporter protein; and (c) one or a plurality of nucleic acid molecule fragments, wherein the binding of one the nucleic acid molecule fragments to the Cas protein produces a riboprotein complex capable of binding the promoter sequence, wherein the binding of the riboprotein complex to the promoter reduces transcription of the sequence encoding the reporter protein and reduces the expression of the reporter protein; wherein a reduced level of expression of the reporter protein compared to a control level of expression of the reporter protein identifies the nucleic acid molecule fragment in the riboprotein produced in (c) as a gRNA scaffold molecule. In some embodiments, the promoter is a constitutive promoter. In certain embodiments, the reporter protein comprises a fluorescent protein. In some embodiments, the Cas protein is a Cas12a protein. In some embodiments, the Cas protein is one of: AsCas12a (wild type), LbCas12a, LbCas12a(RR), and enAsCas12a. In certain embodiments, the nucleic acid molecule comprising the promoter sequence and the sequence encoding the reporter protein, and the one or a plurality of nucleic acid molecule fragments are components of the system. In some embodiments, the components are in a cell. In some embodiments, the cell is a bacterial cell. In some embodiments, the cell is a eukaryotic cell. In certain embodiments, the Cas protein is expressed in the cell. In some embodiments, the nucleic acid sequence encoding the Cas protein is delivered to the cell in a vector.

According to another aspect of the invention, a method of identifying one or a plurality of guide RNA scaffold molecules is provided, the method including: (a) screening one or a plurality of nucleic acid molecule fragments using the function-screening system of embodiment of any aforementioned aspect of the invention, and (b) determining a level of expression of the reporter protein, wherein a level of expression of the reporter protein that is lower than a control level of expression of the reporter protein identifies one or more of the plurality of nucleic acid molecule fragments as guide RNA scaffold molecules. In certain embodiments, the control level of expression is a level of expression of the reporter protein in the function-screening system in the absence of a guide RNA scaffold molecule. In some embodiments, the method also includes producing a minimally repetitive array comprising one or more of the identified guide RNA (gRNA) scaffold molecules. In some embodiments, the minimally repetitive array of the gRNA scaffold molecules comprises one or more of a unit comprising: one of the identified gRNAs and an independently selected spacer sequence. In certain embodiments, the spacer sequences comprises a sequence that binds an independently selected nucleic acid sequence. In some embodiments, the minimally repetitive nucleic acid molecule array comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more of the units, wherein the gRNAs of the units are independently selected and the spacer sequences of the units are independently selected.

According to another aspect of the invention, a processing screening system for identifying one or a plurality of functional sequences corresponding to protein-assisted RNA cleavage/processing is provided the system including: (a) an mRNA molecule including an RNA polymerase (RNAP) mRNA sequence and a sequence corresponding to protein-assisted RNA cleavage/processing at the RNAP 3' end; (b) a nucleic acid molecule encoding a reporter protein; and (c) a Cas protein capable of processing a functional sequence corresponding to protein-assisted RNA cleavage/processing at the RNAP3' end; wherein: (i) translation of the RNAP mRNA sequence after Cas protein processing of the sequence corresponding to protein-assisted RNA cleavage/processing produces a functional RNAP capable of driving expression of the reporter protein; and (ii) translation of the RNAP mRNA sequence without Cas protein processing of the sequence corresponding to protein-assisted RNA cleavage/processing molecule produces an RNAP protein that comprises a C-terminal extension sequence and is not capable of driving expression of the reporter protein; wherein an increased level of expression of the reporter protein compared to a control level of expression of the reporter protein identifies the processed sequence corresponding to protein-assisted RNA cleavage/processing as functional. In some embodiments, the reporter protein comprises a fluorescent protein. In certain embodiments, the Cas protein is a Cas12a protein. In some embodiments, the Cas protein is AsCas12a (wild type), LbCas12a, LbCas12a(RR), and enAsCas12a. In some embodiments, a higher level of expression of the reporter protein produced in the system compared to a control level of expression of the reporter protein indicates processing of the sequence corresponding to protein-assisted RNA cleavage/processing by the Cas protein and identifies the processed sequence as a functional sequence corresponding to protein-assisted RNA cleavage/processing. In some embodiments, the mRNA molecule comprising the RNA polymerase (RNAP) mRNA sequence and sequence corresponding to protein-assisted RNA cleavage/processing molecule at the RNAP 3' end, the nucleic acid molecule encoding the reporter protein, and the Cas protein are components of the system. In certain embodiments, the components are in a cell. In some embodiments, the cell is a bacterial cell. In certain embodiments, the cell is a eukaryotic cell. In some embodiments, the Cas protein is expressed in the cell. In some embodiments, the nucleic acid sequence encoding the Cas protein is delivered to the cell in a vector. In some embodiments, the sequence corresponding to protein-assisted RNA cleavage/processing is a guide RNA (gRNA) scaffold molecule. In certain embodiments, an increased level of expression of the reporter protein compared to a control level of expression of the reporter protein identifies the gRNA scaffold molecule as a functional gRNA scaffold molecule.

According to another aspect of the invention, a method of identifying one or a plurality of functional sequence corresponding to protein-assisted RNA cleavage/processing molecules is provided, the method including: (a) processing one or a plurality of sequence corresponding to protein-assisted RNA cleavage/processing molecules using a processing screening system of any embodiment of any aforementioned aspect of the invention, and (b) determining a level of expression of the reporter protein, wherein a determined level of expression that is higher than a control level of expression of the reporter protein identifies the one or more of the plurality of sequence corresponding to protein-assisted RNA cleavage/processing molecules as functional sequence corresponding to protein-assisted RNA cleavage/processing molecules. In some embodiments, the control level of expression is a level of expression of the reporter protein in the processing screening system in the absence of a functional sequence corresponding to protein-assisted RNA cleavage/processing molecule. In some embodiments, the method also includes including the identified functional sequence corresponding to protein-assisted RNA cleavage/processing in a minimally repetitive array comprising functional sequences corresponding to protein-assisted RNA cleavage/processing molecules. In certain embodiments, the minimally repetitive array of functional sequence corresponding to protein-assisted RNA cleavage/processing molecules comprises one or more of a unit comprising: one of the identified functional sequence corresponding to protein-assisted RNA cleavage/processing molecule and an independently selected spacer sequence. In some embodiments, the spacer sequences comprises a sequence that binds an independently selected nucleic acid sequence. In some embodiments, the minimally repetitive nucleic acid molecule array comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more of the units, wherein the sequences corresponding to protein-assisted RNA cleavage/processing molecules of the units are independently selected and the spacer sequences of the units are independently selected. In certain embodiments, the sequence corresponding to protein-assisted RNA cleavage/processing is a guide RNA (gRNA) scaffold molecule. In some embodiments, an increased level of expression of the reporter protein compared to a control level of expression of the reporter protein identifies the gRNA scaffold molecule as a functional gRNA scaffold molecule. In some embodiments, the method also includes including the identified functional gRNA scaffold molecule in a minimally repetitive array comprising functional gRNA scaffold sequences. In certain embodiments, the minimally repetitive array of functional gRNA scaffold molecules comprises one or more of a unit comprising: one of the identified functional gRNA scaffold molecules and an independently selected spacer sequence. In some embodiments, the spacer sequences comprises a sequence that binds an independently selected nucleic acid sequence. In certain embodiments, the minimally repetitive nucleic acid molecule array includes 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more of the units, wherein the sequences corresponding to gRNA scaffold molecules of the units are independently selected and the spacer sequences of the units are independently selected.

According to yet another aspect of the invention, a method of identifying a plurality of variant nucleic acid molecules, wherein each of the variant nucleic acid molecules is capable of being processed by an RNA-processing protein to produce a plurality of functional nucleic acid molecule fragments capable of targeting one or more RNA-guided nucleic acid binding proteins to bind an independently preselected nucleic acid sequence, is provided. In some embodiments, each of the independently preselected nucleic acid sequences is positioned in a target genetic element. In some embodiments, the RNA-processing protein is the same protein as the RNA-guided nucleic acid binding protein. In certain embodiments, the binding of the one or more RNA-guided nucleic acid binding proteins to the independently preselected nucleic acid sequence detectably modifies expression of a reporter gene. In some embodiments, the RNA-processing protein processes the variant nucleic acid molecules in a cell. In some embodiments, the cell is a bacterial cell. In certain embodiments, the cell is a eukaryotic cell. In some embodiments, the RNA processing modifies expression of a reporter gene. In some embodiments, the RNA-guided nucleic acid binding protein is a nuclease capable of cutting the independently preselected nucleic acid sequences. In some embodiments, the RNA-guided nucleic acid binding protein is a Cas protein. In certain embodiments, the RNA-guided nucleic acid binding protein is a Cas12a protein. In some embodiments, the Cas protein is a AsCas12a (wild type), LbCas12a, LbCas12a (RR), or enAsCas12a protein. In some embodiments, the plurality of variant nucleic acid molecules includes one or more guide RNA (gRNA) molecules. In certain embodiments, the plurality of variant nucleic acid molecules includes one or more one functional gRNA molecules. In some embodiments, the independently preselected nucleic acid sequence includes all or a portion of a promoter sequence. In some embodiments, the promoter modulates transcription of the sequence encoding the reporter protein. In certain embodiments, the promoter is a constitutive promoter. In some embodiments, the reporter protein includes a fluorescent protein.

According to yet another aspect of the invention, a method of generating a minimally repetitive array of variant nucleic acid molecule fragments is provided, the method including: (a) identifying a plurality of variant nucleic acid molecules, wherein each of the variant nucleic acid molecules is capable of being processed by an RNA-processing protein to produce a plurality of functional nucleic acid molecule fragments each capable of targeting one or more RNA-guided nucleic acid binding proteins to bind an independently preselected nucleic acid sequence; (b) generating the plurality of functional nucleic acid molecule fragments by processing the plurality of variant nucleic acid molecules with the RNA-processing protein; and (c) combining the generated plurality of functional nucleic acid molecule fragments to generate a minimally repetitive array capable of directing the one or more RNA-guided nucleic acid binding proteins to bind a plurality of the independently preselected nucleic acid sequences. In some embodiments, each of the independently preselected nucleic acid sequences is positioned in a target genetic element. In certain embodiments, the RNA-guided nucleic acid binding protein is a nuclease capable of cutting the independently preselected nucleic acid sequences. In some embodiments, the RNA-processing protein is the same protein as the RNA-guided nucleic acid binding protein. In some embodiments, the RNA-guided nucleic acid binding protein is a Cas protein. In certain embodiments, the RNA-guided nucleic acid binding protein is a Cas12a protein. In some embodiments, the Cas protein is: AsCas12a (wild type), LbCas12a, LbCas12a(RR), or enAsCas12a protein. In certain embodiments, the binding of the one or more RNA-guided nucleic acid binding proteins to the independently preselected nucleic acid sequence detectably modifies expression of a reporter gene. In some embodiments, the RNA-processing protein processes the variant nucleic acid molecules in a cell. In some embodiments, the cell is a bacterial cell. In certain embodiments, the cell is a eukaryotic cell. In some embodiments, the RNA processing modifies expression of a reporter gene. In some embodiments, the plurality of variant nucleic acid molecule fragments includes guide RNA (gRNA) molecules. In some embodiments, the plurality of variant nucleic acid molecule fragments includes functional gRNA molecules. In certain embodiments, the minimally repetitive nucleic acid molecule array comprises one or more of a unit comprising: gRNA and a spacer sequence. In some embodiments, the spacer sequences include a sequence that binds one of the independently preselected nucleic acid sequences. In some embodiments, the minimally repetitive nucleic acid molecule array comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more of the units, wherein the gRNAs of the units are independently selected and the spacer sequences of the units are independently selected.

According to another aspect of the invention, a multiplex nucleic acid targeting system in provided, the system including one or more minimally repetitive nucleic acid molecule arrays capable of directing one or more RNA-guided nucleic acid binding proteins to bind a plurality of independently preselected nucleic acid sequences, wherein the minimally repetitive nucleic acid molecule array includes a plurality of variant nucleic acid molecules, wherein each of the variant nucleic acid molecules is capable of being processed by an RNA-processing protein to produce a plurality of nucleic acid molecule fragments each capable of directing one or more RNA-guided nucleic acid binding proteins to bind an independently preselected target nucleic acid sequence. In certain embodiments, the plurality of variant nucleic acid molecules is identified using an embodiment of any of the aforementioned methods and/or systems. In some embodiments, each of the independently preselected nucleic acid sequences is positioned in a target genetic element. In some embodiments, the one or more RNA-guided nucleic acid binding proteins include one or more RNA-guided nucleases. In certain embodiments, the system includes a minimally repetitive array of sequence variants capable of directing one or more of the RNA-guided nucleases to cut one or more sequences present within one or more target genetic elements. In some embodiments, the minimally repetitive nucleic acid molecule array includes one or more of a unit comprising: a gRNA scaffold molecule and a spacer sequence. In certain embodiments, the spacer sequence includes a sequence that binds one of the independently preselected nucleic acid sequences. In some embodiments, the minimally repetitive nucleic acid molecule array includes 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more of the units, wherein the gRNAs of the units are independently selected and the spacer sequences of the units are independently selected.

According to another aspect of the invention, a method of reliably cutting one or more target genetic elements is provided, the method including constructing a minimally repetitive array of sequence variants capable of directing one or more RNA-guided nucleases to cut the one or more sequences present within each genetic element, wherein a means of constructing comprises one or more of an embodiment of any aforementioned methods of systems. In some embodiments, the one or more target genetic elements correspond to one or more genes of a target organism. In some embodiments, the minimally repetitive array is encoded within the genome of an organism. In certain embodiments, the cutting of the one or more genes at more than one sequence per gene reduces the likelihood that a mutant gene in the population is not cut. In some embodiments, the cutting of the one or more genes at the one or more target sequences increases a frequency of an occurrence of an engineered construct within a population of the relevant organism. In some embodiments, the one or more target sequences correspond to one or more viruses. In certain embodiments, cutting the one or more target sequences corresponding to one or more viruses confers resistance to the one or more viruses. In some embodiments, integrating the array into the genome of the target organism confers resistance in the target organism to the one or more viruses. In some embodiments, targeting each targeted virus at more than one sequence reduces the likelihood that a mutant virus is not cut.

According to yet another aspect of the invention, a composition that includes one or more nucleic acid molecules comprising a nucleic acid molecule comprising a sequence set forth as one of SEQ NOs: 31-3280 is provided. In certain embodiments, the composition also includes a vector.

According to yet another aspect of the invention, a composition that includes one or more nucleic acid molecules having a sequence set forth as one of SEQ NOs: 31-3280 is provided. In some embodiments, the composition also includes a vector.

According to another aspect of the invention, a cell comprising an embodiment of any of the aforementioned systems is provided.

According to another aspect of the invention, a cell comprising an embodiment of any of the aforementioned minimally repetitive gRNA arrays is provided. In some embodiments one of more gRNAs in the repetitive arrays is selected from SEQ ID NO: 31-3280.

According to another aspect of the invention, a cell comprising an embodiment of any of the aforementioned gRNA scaffolds is provided.

According to another aspect of the invention, a cell comprising one or more nucleic acid molecules comprising a sequence set forth as SEQ NOs: 31-3280 is provided.

According to yet another aspect of the invention, a composition that includes one or more nucleic acid molecules having a sequence set forth in one of Tables 1-13 is provided. In some embodiments, the composition also includes a vector.

According to another aspect of the invention, a cell comprising an embodiment of any of the aforementioned systems is provided.

According to another aspect of the invention, a cell comprising an embodiment of any of the aforementioned minimally repetitive gRNA arrays is provided.

According to another aspect of the invention, a cell comprising an embodiment of any of the aforementioned gRNA scaffolds is provided.

According to another aspect of the invention, a cell comprising one or more nucleic acid molecules comprising a sequence set forth in one of Tables 1-13 is provided.

BRIEF DESCRIPTION OF THE DRAWINGS

FIG. 1A illustrates that this system constitutively expresses RFP mRNA in the absence of dLbCas12a and a functional gRNA scaffold. FIG. 1B-C illustrate that fluorescence suppression requires both dLbCas12a and a functional gRNA scaffold (FIG. 1C). Fluorescence is not suppressed in the absence of a gRNA scaffold that can bind both the dLbCas12a nuclease and the DNA target sequence (FIG. 1B). FIG. 1D illustrates a screening workflow for a CRISPR-based DNA binding gene circuit system. A nuclease dead enzyme may be identified herein by "d" preceding the enzyme name, for example, a nuclease-dead Cas12a may also be written: "dCas12a".

FIG. 2A-C shows a schematic diagram of an inducible CRISPR-based DNA binding circuit (FIG. 2A) and graphs and a table of data from DNA binding circuit experiments (FIG. 2B-C). The FIG. 2A schematic illustrates that gRNA scaffold variants and a nuclease-dead Cas12a are produced from inducible plasmids and form a riboprotein complex to suppress a constitutive promoter for RFP. The graph in FIG. 2B shows results from induced circuits expressing dCas12a and gRNA. Induction of a functional guide RNA (gRNA) and dCas12a results in a substantial decrease in RFP signal. The graphs and table in FIG. 2C show results from two repetitions of screening a variant scaffold library.

FIG. 4A-E shows a schematic diagram, a photomicrograph, and tables presenting results for a DNA binding screen with dLbCas12a (RR variant). FIG. 4A (left panel) shows a schematic of a wild-type LbCas12a gRNA scaffold (SEQ ID NO: 1). It consists of 21 nucleotides (nt), with a pre-stem, a characteristic hairpin with a 5-basepair (bp) stem and a 5-nt loop, and a spacer sequence. FIG. 4A (right panel) shows a photomicrograph of results from in vitro DNA cleavage assays confirming that DNA binding screens enrich for highly active scaffolds. In FIG. 4B-D, cells in the tables shown with black borders (black boxes) indicate the wild-type sequence. FIG. 4B shows enrichment scores for single-site degenerate gRNA scaffolds screened (from top to bottom of the left-hand column, SEQ ID NOs: 2-22). FIG. 4C shows enrichment scores for screened variants with pairwise degeneracy in the gRNA scaffold stem region (top set and lower set include the same sequences, which are from top to bottom of the left-hand column in each set: SEQ ID NOs: 23-27). The FIG. 4D shows enrichments scores for fully degenerate 4, 5, and 6-nt loops paired with 3 mutant stems proven to be active for DNA cleavage in vitro (all four sets include the same sequences, with are from top to bottom of the left-hand column of each set: SEQ ID NOs: 28-31). For all four sets shown, top row Stem 1=UAUAC - - - AUAUG; second row down Stem 2=UCUGC - - - GCAGA; third row down: Stem 3=UCUCC - - - GGAGA. Fourth row down: Wildtype (WT)=UCUAC - - - GUAGA. The FIG. 4E sequence table lists SEQ ID NOs: 31-74, the DNA sequences encoding the functional gRNA sequences shown in FIG. 4B-D. For SEQ ID NOs: 2-74, N=A, C, G, or T.

FIG. 5C provides a graph showing results of induced circuits expressing T7-tgRNA+RNAse-active vs. inactive Cas12a. In gRNA processing circuit experiments, the result was a distinct increase in fluorescence when gRNA processing occurred. GFP is green fluorescent protein; Pol is polymerase.

FIG. 7A-B shows graphs of the pairing probabilities and secondary structure of LbCas12a guide sequence with the repeat sequence TAATTTCTACTAAGTGTAGAT [SEQ ID NO: 75] and spacer sequence TATCAGTGATAGAGAACGTATGT [SEQ ID NO: 76] (FIG. 7A) and presents a schematic diagram of a commercially synthesizable large guide array (FIG. 7B). The calculations shown in FIG. 7A were performed using Nupack software (Nadeh et al, 2011). The schematic shown in FIG. 7B illustrates that large guide arrays for synthesis comprising highly active Cas12a scaffolds (enriched far above WT in a DNA binding screen) with diverse sequences (upper array, diversity shown by varying colors/shades) can be commercially synthesized, whereas the same array using only WT scaffolds (lower array, lack of diversity shown by single color/shade) cannot be commercially synthesized.

FIG. 8A-D presents graphs and photomicrographs from bacterial library screens for DNA binding, RNA processing, and in vitro cleavage. FIG. 8A shows histograms from fluorescence cytometry analysis of cells containing a dLbCas12a(RR) DNA binding circuit with either a gRNA native scaffold (top row) or a gRNA with a scaffold region consisting of a random 21-nucleotide sequence that was predicted to be non-functional (bottom row). FIG. 8B shows photomicrographs of in vitro RNA processing gels in which an RNA transcript containing a wild-type or mutant scaffold sequence was incubated with (+) or without (−) LbCas12a protein. (Images were collated from several gels, marker in first lane not exact replica of marker for each gel used). FIG. 8C shows histograms from fluorescence cytometry analysis of wild-type *E. coli* cells containing an RNA processing circuit with either an RNase-active or RNase-inactive dLbCas12a(RR). Cells were induced with aTc and VanA. FIG. 8D shows histograms from fluorescence cytometry analysis of ArfA-overexpressing *E. coli* cells containing an RNA processing circuit with either a RNase-active or RNase-inactive dLbCas12a(RR). Cells were induced with aTc and VanA.

FIG. 9A shows a schematic diagram of a circuit design for a mammalian scaffold-spacer pairing assay. FIG. 9B shows photomicrographs of fluorescent microscopy analysis of HEK293T cells transfected with dLbCas12a-VPR and a reporter-gRNA construct. The positive control utilized a single wild-type scaffold and a TetO VPR reporter construct containing 7 target binding sites. The negative control utilized a single random 21-nucleotide sequence and a TetO VPR reporter construct containing 7 target binding sites. Non-control cells were transfected with the reporter-gRNA construct containing different spacings and number of binding sites.

FIG. 11A shows a schematic of a "broken" array circuit design. FIG. 11B shows an example histogram of fluorescent cytometry analysis of a broken array containing either a wild-type scaffold flanking the TetO spacer or a broken (non-RNA-processing) scaffold variant. FIG. 11C shows photomicrographs of fluorescent microscopy analysis of HEK293T cells co-transfected with a TetO VPR Reporter construct, a broken array construct containing the wild-type scaffold flanking the TetO spacer, and either an RNase-active or RNase-inactive dLbCas12a-VPR.

DETAILED DESCRIPTION

Figure 1A:
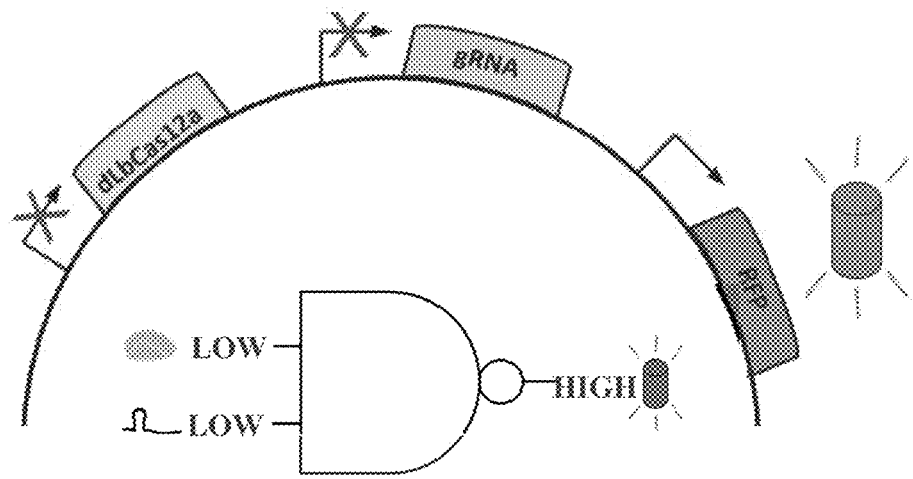
FIG. 1A-D shows schematic diagrams of a CRISPR-based DNA binding gene circuit system for functional screening of gRNA scaffold efficiency and efficacy based on a measurable output. In this system, functional gRNA scaffolds complex with dLbCas12a, a nuclease-dead Cas12a, creating a riboprotein complex that binds a constitutive promoter driving a red fluorescent protein (RFP). Successful binding of the riboprotein complex represses RFP transcription, thereby lowering the fluorescent signal that is the measurable output of the circuit. Successful binding of DNA targets is used as a proxy for target cleavage.

Genetic circuits have now been prepared and used to perform functional screens of guide RNA (gRNA) scaffold molecules, thus permitting effective and efficient multiplexing of nucleic acid targeting methods and systems. Methods and systems have now been identified that permit selection of divergent yet functional scaffold sequences for gRNAs that minimize secondary structure with the targeting sequence, thereby maximizing the resulting activity of the gRNA scaffold molecules. In some embodiments, systems and methods of the invention include identifying functional sequences corresponding to protein-assisted RNA cleavage/processing. Methods and systems of the invention can also be used for efficient synthesis of pre-CRISPR RNA (crRNA) arrays of guide RNAs capable of multiplexed nucleic acid targeting through the identification and use of divergent yet functional scaffold guide RNA sequences as detailed herein. Additional aspects of the invention include methods and systems for selecting a divergent yet functional scaffold sequence for a guide RNA that minimizes secondary structure with the targeting sequence, thereby maximizing the resulting activity. Another aspect of the invention includes methods and systems that can be used for efficient synthesis of pre-crRNA arrays of guide RNAs capable of multiplexed targeting through the identification and use of divergent yet functional scaffold guide RNA sequences as detailed above. Another aspect of the invention includes guide RNA (gRNA) scaffold molecules. gRNA scaffold molecules are capable of both RNA-processing and Cas12a-directed DNA-binding (e.g. enabling multiplexing) for each of the four enzymes Aspects of the invention provide the ability to readily synthesize functional arrays of many guide RNAs permitting the targeting of CRISPR systems to any different sequences. The ability to synthesize and use such arrays is also broadly useful in other areas of biotechnology that benefit from multiplexing, including but not limited to nucleic acid editing, gene regulation, labeling, and cellular defense.

Screening Systems and Methods

Methods and systems of the invention, such as certain embodiments of function-screening systems of the invention and processing screening systems of the invention permit identification of diverse guide RNA scaffolds capable of constructing minimally repetitive arrays that can be used to target many sequences in the same cell. A number of features of function-screening and processing-screening methods and systems of the invention substantially improve the ability to identify and use gRNA scaffolds. One feature is the ability to use the systems and methods to identify diverse gRNA scaffolds that can be included in minimally repetitive arrays. Such arrays are readily synthesized and, when encoded into an organism, are more evolutionarily stable than previously known gRNA scaffolds and arrays. Another feature is that the systems and methods of the invention can be used in a manner that permits preparing diverse gRNA scaffolds and arrays such that a target sequence can be matched with a gRNA scaffold, thus permitting generation and use of diverse gRNA scaffold arrays that minimize secondary structure and therefor maximize activity of gRNA arrays of the invention. Certain aspects of the invention included systems that can be used to identify components such as gRNA scaffolds and gRNA scaffold arrays that can be used in nucleic acid targeting systems and methods.

Function-Screening

Figure 1B:
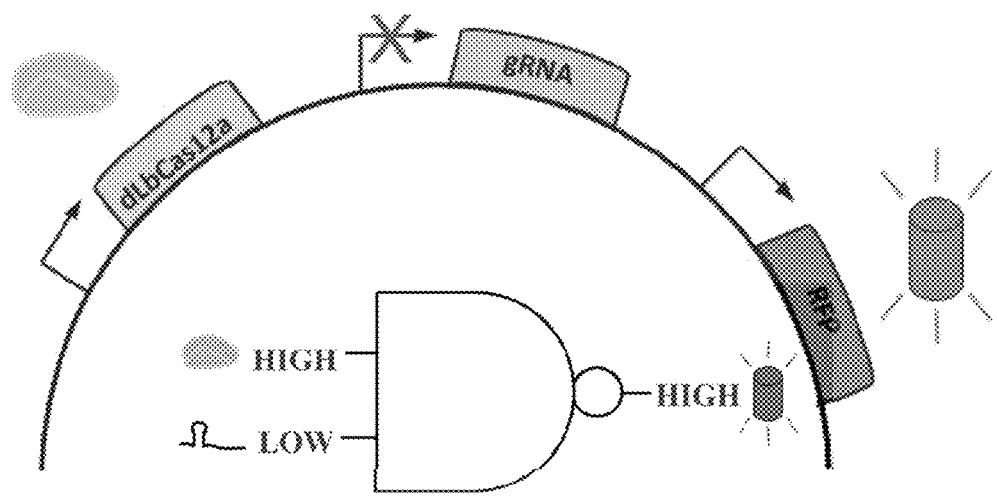
Figure 1C:
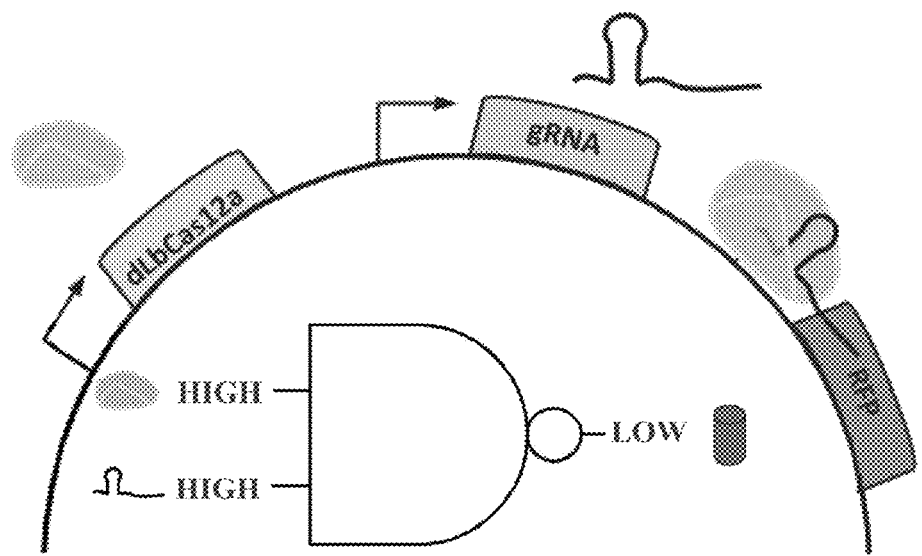
Figure 1D:
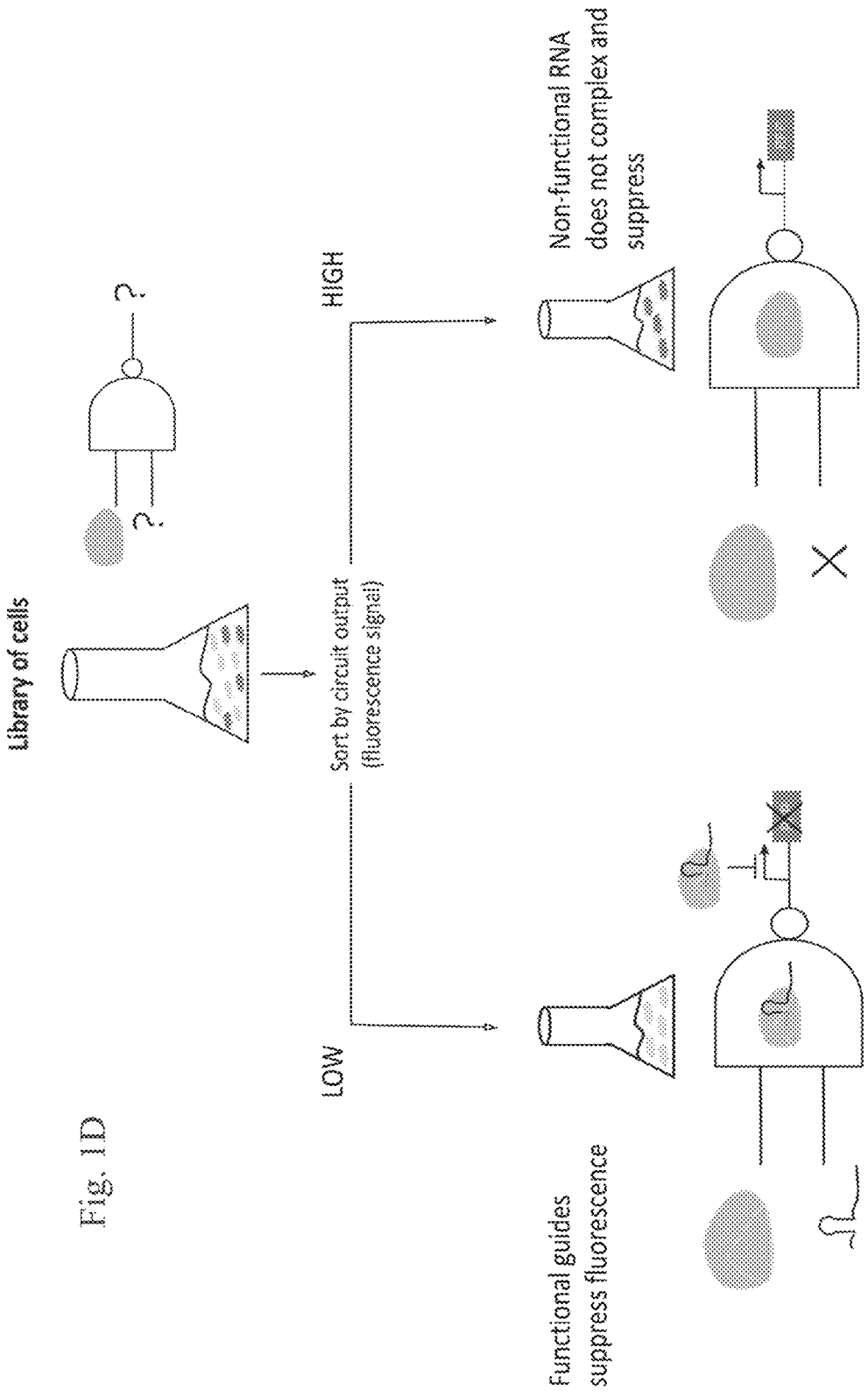

One system of the invention that can used in methods to identify and screen for gRNA scaffold molecules is referred to herein as a "function-screening system" and/or a "DNA binding circuit system". A schematic of an embodiment of a function-screening system is provided in FIG. 1A-C. A function-screening system of the invention can be used to identify one or a plurality of guide RNA (gRNA) scaffold molecules and is a reporter-based screening system. An embodiment of the system includes a binding protein, a non-limiting example of which is a Cas protein, and the binding protein is capable of binding a promoter sequence, which is capable of driving expression of a reporter protein. This embodiment of the system also includes one or a plurality of nucleic acid molecule fragments and the binding of one of the fragments with one of the binding proteins results in a riboprotein complex, which is capable of binding the promoter sequence. When a riboprotein complex binds the promoter it suppresses transcription of the sequence encoding the reporter protein, thereby reducing expression of the reporter protein and the reporter protein's detectable signal. Thus, in a function screening system of the invention, a reduction in the detectable signal of the reporter protein indicates the binding of one or more of the nucleic acid molecule fragments to one or more of the reporter protein, which identifies the nucleic acid molecule fragment as a guide RNA molecule. The system can be in a cell and may also include DNA molecule comprising the promoter sequence and the sequence encoding the reporter protein. In a function-screening system of the invention, the level of expression in a test cell can be compared to a control level of expression and the reduced level in the test cell versus the control identifies the nucleic acid molecule fragment in the riboprotein produced in as a gRNA scaffold molecule. A non-limiting example of a control level is a level obtained in the system that lacks formation of a riboprotein complex, therefore lacking the suppression of expression of the reporter protein. Some embodiments of function-screening systems and methods of the invention can be performed in eukaryotic cells, for example systems and methods of the invention may comprise transcriptional activation using a CRISPR-based transcriptional activator targeted to a reporter gene with a minimal promoter sequence.

Processing-Screening

Figure 2C:
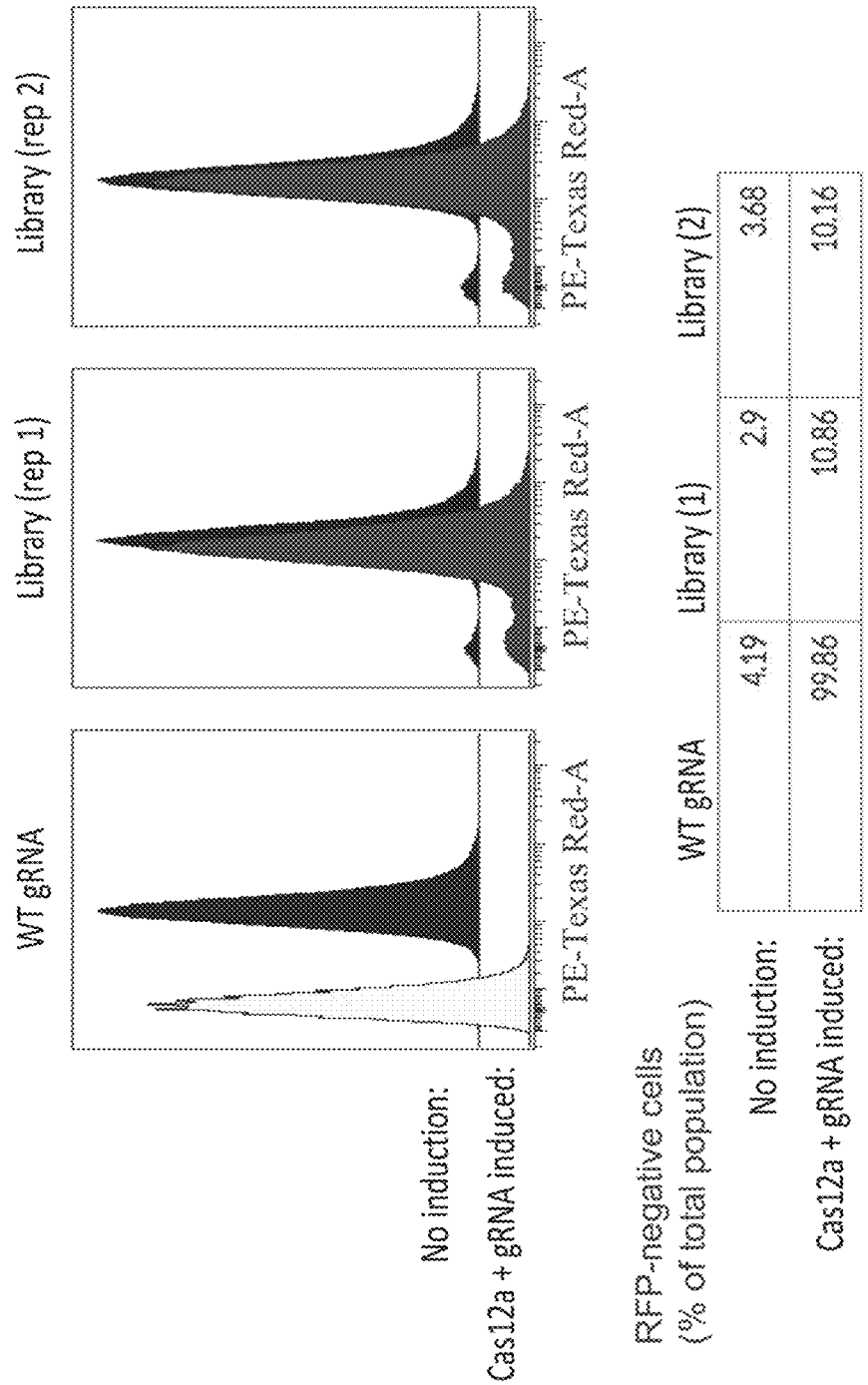

Another system that can be used in methods to identify and screen for gRNA scaffold molecules is referred to herein as a "processing-screening system" and a "gRNA processing circuit" system. A schematic diagram illustrating an embodiment of a processing-screening system of the invention is provided in FIG. 2A-C. A processing-screening system of the invention can be used to identify one or a plurality of functional sequences corresponding to protein-assisted RNA cleavage/processing and is a reporter-based screening system. An embodiment of the system includes an mRNA molecule comprising an RNA polymerase (RNAP) mRNA sequence and a sequence corresponding to protein-assisted RNA cleavage/processing at the RNAP 3' end. The system also includes a nucleic acid molecule encoding a reporter protein; and the system also includes a protein, a non-limiting example of which is a Cas protein, and the protein is capable of processing a functional sequence corresponding to protein-assisted RNA cleavage/processing at the RNAP3' end. If the protein is able to process the functional sequence, translation of the RNAP mRNA sequence produces a functional RNAP that is capable of driving expression of the reporter protein; but if the protein is unable to process the functional sequence, translation of the RNAP mRNA sequence produces an RNAP protein that comprises a C-terminal extension sequence and this is incapable of driving expression of the reporter protein. In this situation, the reporter protein is produced only if the processing is successful, thus, only if the processing is successful is there an increased level of expression of the reporter protein versus a control level of expression of the reporter protein, and the increased expression identifies the processed sequence corresponding to protein-assisted RNA cleavage/processing as functional. A non-limiting example of a control level is a level obtained in the system in which processing does not occur, therefore lacking the expression of a functional reporter protein. In some embodiments of the invention, a sequence corresponding to protein-assisted RNA cleavage/processing is a gRNA scaffold sequence. In some embodiments of the system and/or method of the invention, the system is located in a cell. Some embodiments of processing-screening systems and methods of the invention can be performed in eukaryotic cells, for example though not intended to be limiting: systems and methods of the invention may comprise mRNA cutting to separate 5' cap or polyA tail and reduce translation of a reporter protein.

General Screening and Multiplex Information

As described herein, methods and systems of the invention can be used to identify gRNA scaffold molecules, and to identify sequences such as but not limited to: functional sequences corresponding to protein-assisted RNA cleavage/processing and guide RNA (gRNA) molecules. Certain aspects of the invention include one or more of design, preparation, and use of gRNA molecules that are part of minimally repetitive arrays, which can be used in multiplex nucleic acid targeting methods and systems. As used herein the terms: "nucleic acid targeting methods" and "nucleic acid target systems" include methods and systems that may be included in systems such as, but not limited to: CRISPR methods and systems. Some aspects of the invention include one or more of design, preparation, and use of minimally repetitive arrays in nucleic acid targeting methods and systems. Certain aspects of the invention include one or a plurality of functional sequences that correspond to protein-assisted RNA cleavage/processing, which can be used in multiplex nucleic acid target methods and systems. As used herein the term: "plurality" means more than one. In some embodiments of the invention, plurality means: 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40 or more.

Certain embodiments of systems and methods of the invention can be used to identify sequences capable of one or both of directing nucleic acid binding and directing nucleic acid processing. Thus, some identified gRNA sequences are capable of directing nucleic acid binding but not processing; other identified gRNA sequences are capable of processing but not directing nucleic acid binding; and certain identified gRNA sequence are capable of directing nucleic acid binding and processing. In a non-limiting example, one or a plurality of diverse gRNA scaffold molecules are identified using methods of the invention, and the identified molecules are also gRNA scaffolds for processing. Using methods and systems of the invention, diverse sequences may be identified that don't do both, for example, methods of the invention can be used to identify variant Cas9 sgRNA scaffolds for direction and methods of the invention can be used to identify divergent Csy4 scaffolds for processing. Some embodiments of the invention may include combining the two identified scaffolds to generate stable gRNA scaffold arrays with divergent sequences capable of massive multiplexing.

Certain aspects of the invention include functional screens and screening methods with which gRNA scaffolds can be identified and tested. Some functional screens of the invention may comprise prokaryotic transcriptional logic gates and other circuit designs to produce reporter outputs corresponding to DNA target binding and gRNA processing, a crucial function for efficient multiplexing. Methods of the invention may be used in conjunction with FACS sorting for screening large libraries of gRNA permutations for selection of desired characteristics. Certain embodiments of methods and/or systems of the invention may also include subsequent deep-sequencing methods, which reveal enrichment for novel functional scaffold sequences. These orthogonal gRNA scaffolds of the invention, which have limited homology to the conserved wild-type sequence, can be used to expand the usefulness of nucleic acid targeting methods and systems, a non-limiting examples of which are CRISPR methods, for synthetic biologists as well as others interested in more effective multiplex nucleic acid targeting methods. In addition to providing novel methods for multiplex CRISPR, methods of the invention may be used to assess and determine the sequence space of gRNA scaffolds, which provides insight into mechanisms of guide RNA recognition and processing systems, such as, but not limited to Cas systems.

Arrays

Embodiments of the invention may also include methods and systems for preparing a high efficiency array of nucleic acid molecule, also referred to herein as guide RNAs (gRNAs), that direct RNA-guided DNA binding proteins in nucleic acid targeting methods. Systems such as CRISPR systems may be included in a cell and a component of the system, for example, an enzyme that is part of the CRISPR system may be expressed in a cell, the expressed enzyme may bind with a guide RNA, and the complex (or riboprotein) may act at a preselected target DNA site. Methods and systems of the invention may be used to design and generate highly efficient arrays of gRNAs, which unlike previous gRNA arrays can be designed in a manner that includes minimal repetitive sequence regions. Previous attempts to prepare arrays comprising multiple gRNAs have been limited by the inability to reduce or eliminate inclusion of repetitive sequences, which inhibited DNA synthesis of large arrays that were intended for multiplexing nucleic acid targeting and may render arrays prone to internal deletions common for sequences with repetitive regions. Unlike previous arrays, methods of the invention permit the design and generation of gRNA arrays with minimal if any repetitive sequences, thus permitting inclusion of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or more independently selected gRNAs in a minimal repetitive array of the invention.

Minimally repetitive arrays of the invention can be used in multiplex nucleic acid targeting methods and systems, including but not limited to multiplex CRISPR methods and systems. Some embodiments of the invention include methods to design and generate one or more repetitive arrays of gRNAs. Other embodiments of the invention include the use of one or more minimally repetitive gRNA arrays in nucleic acid targeting, for example, nucleic acid targeting in a host (target) cell or organism.

gRNA Array Structure

A general view of a minimally repetitive array of gRNA scaffolds of the invention is provided herein. In certain embodiments of the invention, a minimally repetitive array of gRNA scaffold molecules comprises one or more "units" each comprising: an independently selected gRNA scaffold molecule and an independently selected spacer sequence. Thus, a gRNA scaffold array of the invention comprises one or more units in a linear configuration, for example though not intended to be limiting, the following is a general illustration of a partial gRNA array:

UNIT ONE                 UNIT TWO
- gRNA scaffold 1 -- spacer 1 -- gRNA scaffold 2 -- spacer 2 -

-continued

UNIT THREE
-gRNA scaffold 3 -- spacer 3-

As shown illustrated in the diagram above, "Unit One" comprises gRNA scaffold 1 and spacer 1; "Unit Two" comprises gRNA scaffold 2 and spacer 2; and "Unit Three" comprises gRNA scaffold 3 and spacer 3. Because each gRNA scaffold and each spacer are independently selected, each gRNA scaffold in a gRNA array of the invention may be preselected to be different than every other gRNA in the array, or may be preselected to be the same as one or more of the other gRNA scaffold molecules in the array. Similarly, each spacer sequence in a gRNA array of the invention may preselected to be different than every other spacer sequence in the array of the invention or may be preselected to be the same as one or more of the other spacer sequences in the array. It will be understood that in some embodiments of the invention each spacer sequence comprises a sequence that binds an independently selected nucleic acid sequence. Thus, if each spacer sequence is different than all others in the gRNA array of the invention, each spacer binds a different nucleic acid sequence.

As described herein, methods of the invention to identify diverse gRNAs and screen for function and processing, permit inclusion of one or more gRNA scaffold molecules in an array. Such arrays can be included and used in multiplex nucleic acid targeting systems and methods, including but not limited to CRISPR-based genome editing systems and methods. A gRNA array of the invention may be referred to herein as a minimally repetitive gRNA scaffold array or a minimally repetitive gRNA array. It has now been identified that embodiments of methods and screening systems of the invention can be used to identify functional and diverse gRNA scaffold sequences, and that such sequences can be used to prepare one or more minimally repetitive gRNA arrays that may comprise: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more "units", wherein the gRNA in each unit is independently selected and the spacer sequence in each unit is independently selected.

One feature resulting from the ability to identify and generate diverse gRNA scaffolds as set forth herein, is the ability to prepare large and effective gRNA arrays. Methods and systems of the invention can be used to identify diverse gRNA scaffolds capable of use in minimally repetitive arrays that can be synthesized to include more units than had been possible using previous gRNA identification methods. Activity and functionality of identified gRNA sequences can be assessed using methods and systems of the invention, or other suitable art-known methods. Screening methods and systems of the invention permit identification of gRNAs and also permit selection of functional gRNAs that permit processing. Activity of a gRNA scaffold molecule may also be referred to herein as "function" of the gRNA. Thus, a gRNA that has a desired activity is one that functions in a desired manner. In some embodiments of the invention a functional gRNA scaffold is a gRNA that is capable of (1) directing nucleic acid binding and (2) processing. Systems and methods of the invention can be used to identify gRNA scaffold sequences that are capable of one or both of directing nucleic acid binding and processing.

DNA Binding Proteins

Components of used in screening assays of the invention and in multiplex nucleic acid target systems and methods of the invention include one or more DNA-binding proteins. In screening assays described herein a DNA binding protein may be used in systems and methods with which to test whether a nucleic acid is a gRNA scaffold and/or to assess the ability to process a gRNA.

A multiplex nucleic acid targeting system and method of the invention may include a gRNA scaffold array of the invention that comprises a one or more nucleic acid binding proteins, or functional variants thereof. In certain aspects of the invention, a nucleic acid binding protein is a DNA-binding protein and in certain aspects of the invention a nucleic acid binding protein is an RNA-binding protein. Non-limiting examples of types of nucleic acid DNA-binding proteins that may be used in some embodiments of systems and methods of the invention include: RNA-guided DNA-binding proteins and DNA-guided DNA-binding proteins. DNA binding proteins are known in the art, and include, but are not limited to: naturally occurring DNA binding proteins, a non-limiting example of which is a Cas9 protein, which has nuclease activity and cuts double stranded DNA. Cas9 proteins and Type II CRISPR systems are well documented in the art. (See for example, Makarova et al., Nature Reviews, Microbiology, Vol. 9, June 2011, pp. 467-477, the content of which is incorporated by reference herein in its entirety.) As used herein, the term "DNA binding protein having nuclease activity" refers to DNA binding proteins having nuclease activity and also functional variants thereof. A functional variant of a protein sequence differs in amino acid sequence from that sequence, referred to as the variant's "parent" sequence, while retaining from a least a portion to all of the nuclease activity of its parent protein.

In some embodiments, a method or system of the invention may comprise a DNA-guided DNA-binding nuclease. Information on identification and use of DNA-guided binding proteins, is available in the art (Gao, F., et al., Nature Biotech online publication, May 2, 2016: doi:10.1038/nbt.3547, the content of which is incorporated herein by reference in its entirety).

A DNA binding protein having nuclease activity function to cut double stranded DNA that may be used in aspects of methods of the invention can include DNA binding proteins that have one or more polypeptide sequences exhibiting nuclease activity. A DNA binding protein with multiple regions that have nuclease activity may comprise two separate nuclease domains, each of which functions to cut a particular strand of a double-stranded DNA. Polypeptide sequences that have nuclease activity are known in the art, and non-limiting examples include: a McrA-HNH nuclease related domain and a RuvC-like nuclease domain, or functional variants thereof. In *S. pyogenes*, a Cas9 DNA binding protein creates a blunt-ended double-stranded break that is mediated by two catalytic domains in the Cas9 binding protein: an HNH domain that cleaves the complementary strand of the DNA and a RuvC-like domain that cleaves the non-complementary strand. [See Jinke et al., Science 337, 816-821 (2012), the content of which is incorporated by reference herein in its entirety]. Cas9 proteins are known to exist in many Type II CRISPR systems, see for example, Makarova et al., Nature Reviews, Microbiology, Vol. 9, June 2011, pp. 467-477, supplemental information, the content of which is incorporated herein by reference in its entirety. The Cas9 protein may be referred by one of skill in the art in the literature as Csn1. Alternatives to Cas9 include but are not limited to Cpf1 proteins from Type V CRISPR systems (See for example Zetsche et al., Cpf1 Is a Single RNA-Guided Endonuclease of a Class 2 CRISPR-Cas System, Cell (2015), //dx.doi.org/10.1016/j.cell.2015.09.038). In certain aspects of the invention, a method or system of the invention includes a DNA binding protein that does not have nuclease activity.

In some embodiments of methods and systems of the invention an RNA-guided nucleic acid binding protein comprises a Cas protein. In some embodiments of the invention an RNA-guided nucleic acid binding protein comprises a Cas12a protein. Non-limiting examples of some art-known Cas12a proteins that may be used in embodiments of methods and systems of the invention are: AsCas12A (wild type), LbCas12a, LbCas12a(RR), or enAsCas12a.

Additional Components

Methods of the invention, in part, include identification, generation, and use of additional sequences that may be included in a vector delivered to a cell as part of a method or system of the invention. Sequences such as: promoter sequences, enhancer sequences, 3' untranslated region (3'UTR) sequences are non-limiting examples of additional sequences that may be included. One of skill in the art will understand how to include art-known components and conditions along with components detailed herein to prepare and use a screening method and/or system of the invention. Those skilled in the art will understand how to use identified gRNAs of the invention in gRNA scaffold arrays for use in multiplex nucleic acid targeting systems and methods in cells and organisms.

Target Genes

A target gene, also referred to herein as a target nucleic acid molecule, may be a preselected gene or preselected nucleic acid sequence, the expression of which is of interest to modify. Methods and systems of the invention can be used to modify expression of a target gene that encodes a protein of interest. In some embodiments of the invention, a target gene of interest is preselected because of a desire to alter expression of protein it encodes. In some embodiments, a plurality of preselected target genes may be independently identified, a minimally repetitive gRNA array prepared and used in a multiplex nucleic acid targeting system of the invention to modulate expression of the plurality of target genes. In such instances, each gRNA and spacer sequence in a unit may be preselected to target a preselected gene sequence. Thus, a plurality of units in a minimally repetitive gRNA array prepared using methods of the invention can be used in a multiplex nucleic acid targeting method of the invention to alter expression of a plurality of target genes. In some aspects of the invention a target gene or nucleic acid molecule is a double-stranded DNA molecule and in some embodiments of the invention a target nucleic acid is a single-stranded DNA molecule. A gene selected as target gene may be a nucleic acid sequence in the genome of a host cell.

In a multiplex nucleic acid targeting method or system of the invention, sequences encoding the gRNA array and one or more RNA-guided nucleic acid binding proteins may be expressed in a host cell, thereby modifying expression of the plurality of target genes and or target nucleic acid molecules. In certain instances, an expressed RNA-guided nucleic acid binding protein binds with a gRNA sequence of the minimally repetitive gRNA array and is directed to the selected target gene. Non-limiting examples of additional components that may be delivered into a host cell as part of a multiplex nucleic acid targeting method or system of the invention are one or more of: a promoter sequence, an enhancer sequence, a 3'UTR sequence, a reporter sequence, etc. Those of skill in the art will be able to select and include these and other additional components without based on art-known procedures and components used in CRISPER and other gene-editing systems. One or more design methods of the invention can be used to identify and select a target gene, and to design functional gRNAs capable of being cleaved/processed and that can be included in a multiplex nucleic acid targeting system or method of the invention in which they are capable of binding with, guiding, and positioning a DNA binding protein to a nucleic acid sequence adjacent to, or in close proximity to, a preselected target gene sequence.

Assays and screens described herein can be used to identify and assess guide RNA scaffolds and to determine whether the gRNA functions in a nucleic acid targeting system, and results in a desired effect on a preselected nucleic acid sequence (e.g., preselected target gene sequence). For example, though not intended to be limiting, if a desired effect on a preselected target gene is to reduce or eliminate expression of a preselected target gene, assays, screening methods, and systems of the invention can be used to determine whether one or more identified gRNA scaffold is capable of interacting with a binding protein in a manner effective to be processed, and capable of functioning to alter expression of the preselected target gene.

Guide Nucleic Acids

Methods of the invention, in part, include identifying, generating, and using gRNA scaffold molecules and minimally repetitive gRNA arrays in multiplex methods. Numerous gRNA molecules and methods of using the gRNA molecules in CRISPR-type systems are known in the art. In addition to gRNAs, some embodiments of the invention may include identifying and using guide DNA (gDNA) molecules. Information relating to guide DNAs can be found in Gao, F., et al., Nature Biotech online publication, May 2, 2016: doi:10.1038/nbt.3547, the content of which is incorporated herein by reference in its entirety. Guide RNAs may also be referred to herein and in the literature as short guide RNAs (sgRNAs), and as crRNAs for certain nucleases such as Cpf1. In general, a gRNA is designed and selected such that it is complementary to a DNA sequence of a selected target gene in the genome of a cell, wherein when the gRNA is present in the cell it is capable of binding a nucleic acid directed nucleic acid binding protein, or variant thereof and can direct modulation of a preselected target gene by the binding protein.

In some aspects of the invention methods of the invention may be used for one or more of identifying, screening, and determining functionality of, a component for use in a multiplex nucleic acid targeting method or system, which in some embodiments may be a multiplex CRISPR-based method or system. Components for use in a multiplex nucleic acid targeting system of the invention can be delivered into a host cell and expressed in the cell to produce a nucleic acid-guided nucleic acid binding protein and one or more functional sequences corresponding to protein-assisted RNA cleavage/processing, which in some embodiments of the invention are gRNA scaffold molecules. In a non-limiting example: a vector comprising a sequence encoding one or a plurality of gRNA scaffold molecules and an RNA-guided nucleic acid binding protein may be designed and delivered into a cell. Expression of the vector sequences in the host cell results in binding of the gRNA scaffold molecule to the RNA-guided nucleic acid binding protein, forming what is also referred to herein as a "riboprotein complex". The complex is directed by the gRNA to an independently preselected nucleic acid target sequence, where the complex co-localizes to, (also referred to herein as "binds") the target gene and the expression of the target gene is modified in a site-specific manner by the activity of the RNA guided nucleic acid binding protein.

In some embodiments the RNA-guided nucleic acid binding protein is an RNA-guided DNA binding protein. In some embodiments the RNA guided nucleic acid binding protein is a nuclease capable of cutting the independently preselected nucleic acid sequences. In a non-limiting example, in some embodiments of the invention an RNA-guided nucleic acid binding protein may be a Cas protein, which in some embodiments may be a Cas12a protein. Non-limiting examples of Cas12a proteins that may be included in embodiments of the invention are: AsCas12A (wild type), LbCas12a, LbCas12a(RR), and enAsCas12a, each of which is known in the art.

Methods of designing guide RNAs to direct an RNA-guided nucleic acid binding protein to a selected target gene are provided herein. Guide RNAs can be designed, prepared, tested, and selected for use in nucleic acid targeting systems and methods using one or more screening methods provided herein in conjunction with knowledge in the art relating to DNA binding, vector preparation and use, RNA-guided DNA binding proteins, CRISPR system components, and implementation, etc. In some embodiments, gRNAs of the invention can be used in arrays in multiplex nucleic acid targeting methods and systems. It has not previously been possible to produce highly divergent and diverse gRNAs for use in multiplex nucleic acid targeting methods and systems but methods and systems provided herein permit identification and implementation of functional divergent gRNAs that can be used in multiplexing methods. For example, though not intended to be limiting, methods of the invention can be used to design, construct, and implement a plurality of diverse/divergent gRNA that will bind an RNA-guided DNA nuclease. Methods of the invention also can be used to determine activity of the divergent/diverse gRNAs, for example, using a function-screening method or system of the invention to identify one or a plurality of gRNA scaffold molecules suitable for use in multiplex methods and systems of the invention.

It has previously been difficult or impossible to synthesize minimally repetitive gRNA sequences for use in multiplexing arrays. The presence of the number/extent of repetitive sequences in previous efforts in the art to prepare gRNA arrays, precluded efficient or rapid preparation of DNA sequences capable of expressing multiple gRNA sequences. The inability to avoid inclusion of repetitive sequences disrupted structure and utility of the gRNAs. Methods disclosed herein obviate this difficulty and permit rapid preparation of DNA sequences capable of expressing arrays comprising multiple gRNAs. Methods of the invention permit rapid identification and preparation of minimally repetitive sequences that encode gRNAs and functional gRNA arrays that can be used in multiplex systems. In some embodiments, components of a gRNA scaffold array of the invention are designed to minimize the length of sequences that are shared between different two or more different gRNAs in the array. Thus, identified gRNAs included in an array of the invention may be preselected in order to minimize the length of any sequences common to two or more of the selected gRNA scaffolds.

Non-limiting examples of guide RNAs designed using methods of the invention are set forth herein as SEQ ID NOs: 31-74. The length of a gRNA designed using methods of the invention may be at least 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or more base pairs. It will be understood that a maximum or minimum permissible length of a gRNA is limited to a length at which the gRNA functions as a gRNA in a multiplex nucleic acid targeting method or system of the invention.

Design and Use of Divergent/Diverse RNA Sequences

The invention, in part, also relates to methods of preparing a readily synthesized double-stranded (ds) DNA sequence that can be used to produce multiple gRNAs, for example gRNA arrays. Multiple (or a plurality of) gRNAs can prepared such that they are able to direct a CRISPR-type protein (complex) to multiple target sites within a cell. Methods of the invention can be used to prepare divergent gRNA sequences that can be used in multiplex nucleic acid targeting methods and systems, to direct a plurality of RNA-guided nucleic acid binding proteins to a plurality of independently selected targets sequences within the same cell. The terms "divergent" and "diverse" are used interchangeably herein with respect to gRNA sequences/scaffolds and functional sequences corresponding to protein-assisted RNA cleavage/processing.

Certain embodiments of function-screening systems of the invention and processing screening systems of the invention can be used to identify diverse functional sequences corresponding to protein-assisted RNA cleavage/processing, such as but not limited to gRNA scaffolds, that can be used to generate minimally repetitive arrays of functional sequences corresponding to protein-assisted RNA cleavage/processing, for example, minimally repetitive gRNA scaffold arrays that can be used to target many sequences in the same cell. Minimally repetitive arrays prepared using methods of the invention are more easily synthesized and are more evolutionarily stable when encoded into cells and organisms compared to other previously known gRNA scaffolds and arrays. Certain embodiments of methods of the invention can be used to identify diverse gRNA scaffolds capable of constructing minimally repetitive arrays in a manner that permits matching a target sequence with a gRNA scaffold, thus permitting generation and use of diverse gRNA scaffold arrays that minimize secondary structure and maximize activity of the gRNA arrays in multiplex nucleic acid targeting methods and systems.

Divergent sequences may be prepared using methods of the invention for use in multiplex nucleic acid targeting systems and methods as disclosed herein, and also for other uses in cells and organisms. For example, methods of the invention to identify and generate divergent gRNA sequences can be used to prepare a plurality of sequences that have minimal sequence homology/identity between themselves and such gRNA scaffold arrays can be used for multi-targeting. As used herein, the term "multi-targeting" when used in the context of an array of divergent sequences means that the sequences are designed such that they target multiple different sequence sites, for example in a cell in which they are expressed. Effective multi-targeting can permit use of gRNA scaffolds and arrays of the invention in multiplex nucleic acid targeting methods and systems.

Multiplex Systems and Methods

An additional aspect of the invention comprises preparation and use of massively multiplex nucleic acid targeting systems and methods, for example massively multiplex virus targeting systems and methods. Methods of identifying gRNA scaffolds and minimally repetitive gRNA scaffold arrays as set forth herein, can be used to prepare effective multiplex nucleic acid targeting systems. For example, gRNA scaffolds can be identified and used to generate minimally repetitive gRNA scaffold arrays. These arrays can be used in conjunction with systems of the invention that are capable of multiplex nucleic acid targeting and gene editing. A non-limiting example of a method of using multiplexing nucleic acid targeting system comprising one or more gRNAs of the invention, is multiplex nucleic acid targeting that confers viral immunity in a cell and/or organism. In this example, methods and systems of the invention are used to identify gRNA scaffolds and gRNA scaffold arrays that, in a cell and or subject are capable of (1) targeting one or more specific sequences important for viral infection in the subject and (2) altering an activity of the targeted sequence, thereby conferring to the cell and/or subject, immunity to the virus. Certain embodiments of methods and systems of the invention can be used to design, prepare, and implement massively multiplexed nucleic acid targeting systems capable of conferring immunity one, two, or a plurality of different viruses.

The invention, in part also includes guide RNA (gRNA) scaffold molecules capable of both RNA-processing and Cas12a-directed DNA-binding (e.g. enabling multiplexing) for different enzymes. Non-limiting examples of enzymes with this gRNA scaffold molecules of the invention can be used are: ASCas12 (wildtype), LBCas12a; LbCas12a(RR); and enAsCas12a. Certain embodiments of the invention include compositions that include one or more of the gRNA scaffold molecules of the invention. Sequences of gRNA scaffold molecules of the invention are set forth herein as SEQ ID NO: 31-74 in Table 1. Tables 2-5 provide sequences of identified gRNA scaffold molecules of the invention that bind Cas proteins: AsCas12a (wild type), LbCas12a, LbCas12a(RR), and/or enAsCas12a. Table 2 provides gRNa scaffold molecules that bind enAsCas12a protein. Table 3 provides sequences of gRNA scaffold molecules that bind LbCas12a(RR) protein. Table 4 provides sequences of gRNA scaffold molecules that bind AsCas12a (wild type) protein. Table 5 provides sequences of gRNA scaffold molecules that bind LbCas12a protein.

Tables 6-9 provide consensus sequences for identified gRNA scaffold molecules that bind indicated Cas proteins: AsCas12a (wild type), LbCas12a, LbCas12a(RR), and enAsCas12a protein. Table 6 provides consensus sequences for identified gRNA scaffold molecules that bind enAsCas12a protein. Table 7 provides consensus sequences for identified gRNA scaffold molecules that bind LbCas12a (RR) protein. Table 8 provides consensus sequences for identified gRNA scaffold molecules that bind AsCas12a (wild type) protein. Table 9 provides consensus sequences for identified gRNA scaffold molecules that bind LbCas12a protein. Tables 10-13 provide additional consensus sequences for identified gRNA scaffold molecules that bind indicated Cas proteins. Table 10 provides consensus sequences for identified gRNA scaffold molecules that bind enAsCas12a protein. Table 11 provides consensus sequences for identified gRNA scaffold molecules that bind AsCas12a (wild type) protein. Table 12 provides consensus sequences for identified gRNA scaffold molecules that bind LbCas12a protein. Table 13 provides consensus sequences for identified gRNA scaffold molecules that bind LbCas12a(RR) protein. In Tables 6-13 IUPAC nucleotide codes are used in the sequences. According to IUPAC codes: A is Adenine; C is Cytosine; G is Guanine, T (or U) Thymine (or Uracil), R is A or G; Y is C or T; S is G or C; W is A or T; K is G or T; M is A or C; B is C or G or T; D is A or G or T; H is A or C or T; V is A or C or G; and N is any base.

It will be understood that the sequences identified herein as gRNA scaffold sequences are isolated nucleic acid sequences that are not part of a longer natural sequence. The gRNA sequences set forth herein as SEQ ID Nos: 2-3280 may be in a vector and still be considered isolated, as they are not part of a natural longer molecule. A gRNA molecule of the invention such as one set forth in Tables 1-13, may be in a composition. The composition may also include a vector and the gRNA molecule may be included in the vector.

In some embodiments a composition comprising a gRNA scaffold molecule of the invention further comprises a vector sequence. In some embodiments of the invention one or more gRNA scaffold molecules of the invention are in a vector. gRNA scaffold molecules of the invention have been identified and shown to result in fold enrichment for RNA-processing and Cas12a-directed DNA-binding (e.g. enabling multiplexing). Both RNA-processing and Cas12a-directed DNA-binding are required for multiplexing per the "Broken Array" assay (see Example 5).

Table 1 provides identified gRNA sequences. N=A, T, G, or C

```
SEQ ID NO: 31    NAATTTCTACTNNNGTAGAT
SEQ ID NO: 32    NAATTTCTACTAAGTGTAGAT
SEQ ID NO: 33    NCATTTCTACTAAGTGTAGAT
SEQ ID NO: 34    NACTTTCTACTAAGTGTAGAT
SEQ ID NO: 35    NCCTTTCTACTAAGTGTAGAT
SEQ ID NO: 36    NAATTTCTACCAAGTGTAGAT
SEQ ID NO: 37    NAATTTCTACTNAGTGTAGAT
SEQ ID NO: 38    NAATTTCTACTANGTGTAGAT
SEQ ID NO: 39    NAATTTCTACTAANTGTAGAT
SEQ ID NO: 40    NAATTTCTACTAANGGTAGAT
SEQ ID NO: 41    NAATTTCTACTAAGTGTAGGT
SEQ ID NO: 42    NAATTTCTACTAAGTGTGGAT
SEQ ID NO: 43    NAATTTATACTAAGTGTATAT
SEQ ID NO: 44    NAATTTCTCCTAAGTGTAGGT
SEQ ID NO: 45    NAATTTCTGCTAAGTGTAGGT
SEQ ID NO: 46    NAATTTCGACTAAGTGTCGAT
SEQ ID NO: 47    NAATTTCTACTAAGTGCAGAT
SEQ ID NO: 48    NAATTTCTATTAAGTGTAGAT
SEQ ID NO: 49    NAATTTATACTACGGTATAT
SEQ ID NO: 50    NAATTTATACTATCGTATAT
SEQ ID NO: 51    NAATTTATACTTTGTGATAT
SEQ ID NO: 52    NAATTTCTGCTACAGCAGAT
SEQ ID NO: 53    NAATTTCTGCTACCGCAGAT
SEQ ID NO: 54    NAATTTCTGCTACGGCAGAT
SEQ ID NO: 55    NAATTTCTGCTACTGCAGAT
SEQ ID NO: 56    NAATTTCTGCTAGCGCAGAT
SEQ ID NO: 57    NAATTTCTGCTATNGCAGAT
SEQ ID NO: 58    NAATTTCTGCTCTAGCAGAT
SEQ ID NO: 59    NAATTTCTCCTAAAGGAGAT
SEQ ID NO: 60    NAATTTCTCCTAATGGAGAT
SEQ ID NO: 61    NAATTTCTCCTACNGGAGAT
SEQ ID NO: 62    NAATTTCTCCTAGAGGAGAT
SEQ ID NO: 63    NAATTTCTCCTAGTGGAGAT
SEQ ID NO: 64    NAATTTCTCCTATNGGAGAT
SEQ ID NO: 65    NAATTTCTCCTCATGGAGAT
SEQ ID NO: 66    NAATTTCTCCTCCAGGAGAT
SEQ ID NO: 67    NAATTTCTCCTCCTGGAGAT
SEQ ID NO: 68    NAATTTCTCCTCTNGGAGAT
SEQ ID NO: 69    NAATTTCTCCTGTTGGAGAT
SEQ ID NO: 70    NAATTTCTCCTTCAGGAGAT
SEQ ID NO: 71    NAATTTCTCCTTCTGGAGAT
SEQ ID NO: 72    NAATTTCTCCTTGTGGAGAT
SEQ ID NO: 73    NAATTTCTCCTTTTGGAGAT
SEQ ID NO: 74    NAATTTCTACCNNNGTAGAT
```

Table 2 provides identified en_as gRNA sequences that bind enAsCas12a protein.

| SEQ ID NO | gRNA Sequence |
| --- | --- |
| 77 | CAATTTCTACTCTTGTAGAT |
| 78 | AAATTGTTGTTCTTACAGCT |
| 79 | CAATTATTTGTAAGTTGAATT |
| 80 | CAATTTCTCCTCTTGGAGAT |
| 81 | CAATTGTGTTTAAGTAGTATT |
| 82 | AAATTATGCCTCTTGGTATT |
| 83 | AAATTAGCATTCTTGTGCTT |
| 84 | GAATTACCGTTAAGTATGGTT |
| 85 | CAATTCCTACTCTTGTAGGT |
| 86 | AAATTCCTACTCTTGTAGGT |
| 87 | CAATTGGTGCTCTTGTGCTT |
| 88 | AAATTATCGCTCTTGTGGTT |
| 89 | AAATTGATGCTAAGTGTGTCT |
| 90 | GAATTAAGTGTAAGTTGTTTT |
| 91 | CAATTGGGGTTCTTGCCCTT |
| 92 | GAATTTCGGTTAAGTGTCGGT |
| 93 | AAATTCGATCTAAGTGATCGT |
| 94 | CAATTATGTGTAAGTTGTATT |
| 95 | GAATTATCCGTCTTCGGGTT |
| 96 | GAATTGCTGTTAAGTACAGCT |
| 97 | GAATTCGGCTTAAGTAGCTGT |
| 98 | GAATTCTTCCTCTTGGAAGT |

-continued

| SEQ ID NO | gRNA Sequence |
|---|---|
| 99 | CAATTAGACGTAAGTCGTCTT |
| 100 | AAATTGGCGCTCTTGTGTCT |
| 101 | AAATTTGTCATAAGTTGGCGT |
| 102 | CAATTCAATCTAAGTGGTTGT |
| 103 | AAATTCGGTGTCTTCGTCGT |
| 104 | AAATTGGACGTCTTCGTTCT |
| 105 | GAATTGGATGTCTTTGTCTT |
| 106 | CAATTGTTGGTCTTCTAGTT |
| 107 | GAATTCGGCATCTTTGCTGT |
| 108 | GAATTTGTTGTAAGTTAACAT |
| 109 | CAATTGGTGGTAAGTCCGCCT |
| 110 | GAATTGTATGTCTTCATGCT |
| 111 | CAATTGAGTGTAAGTTATTTT |
| 112 | CAATTGGGGCTCTTGCTCTT |
| 113 | CAATTCGTCTTAAGTAGACGT |
| 114 | AAATTTGCGTTCTTGCGTAT |
| 115 | AAATTGGTAGTAAGTCTATTT |
| 116 | CAATTGACGATAAGTTCGTTT |
| 117 | GAATTCGTCTTAAGTAGGCGT |
| 118 | AAATTGCTGCTCTTGTGGCT |
| 119 | GAATTCATGGTCTTTTGTGT |
| 120 | CAATTGGTGGTCTTTTGCCT |
| 121 | AAATTGTGTGTAAGTCATGTT |
| 122 | CAATTGGTGCTCTTGCACTT |
| 123 | GAATTGGCTATCTTTGGTCT |
| 124 | CAATTGACGGTCTTCCGTTT |
| 125 | CAATTTTTGGTAAGTTCGGGT |
| 126 | AAATTGCTGTTCTTACAGTT |
| 127 | GAATTGTTAGTAAGTTTGGCT |
| 128 | GAATTGTGGCTCTTGTTGCT |
| 129 | CAATTACTTTTCTTAAGGTT |
| 130 | CAATTGGGACTAAGTGTCCTT |
| 131 | GAATTCCTGTTAAGTGCAGGT |
| 132 | AAATTTGGTGTCTTTGTTAT |
| 133 | CAATTGTTTGTAAGTTGGGCT |
| 134 | CAATTGGTTGTCTTCAACCT |
| 135 | CAATTAACCCTAAGTGGGTTT |
| 136 | CAATTGATGGTCTTTCGTCT |
| 137 | GAATTGCGTCTCTTGGTGCT |
| 138 | AAATTTCGCGTAAGTCGTGGT |
| 139 | CAATTTTGATTAAGTATTAAT |
| 140 | CAATTTCTGGTCTTCTGGAT |
| 141 | CAATTGGCACTAAGTGTGCCT |
| 142 | GAATTCGGGTAAGTCTCGGT |
| 143 | CAATTGTCCTTAAGTAGGGTT |
| 144 | CAATTAAACGTAAGTCGTTTT |
| 145 | AAATTCGGTCTAAGTGGCCGT |
| 146 | CAATTCCCGTCTTTGGGGT |
| 147 | CAATTCGTCTTCTTAGATGT |
| 148 | CAATTACTGATCTTTTAGTT |
| 149 | CAATTTTCGGTAAGTTCGAAT |
| 150 | CAATTGGGTGTCTTCATTCT |
| 151 | CAATTACGGGTCTTTCTGTT |
| 152 | CAATTAGGGATAAGTTCCCTT |
| 153 | CAATTAGGACTAAGTGTTCTT |
| 154 | AAATTACCTGTCTTTAGGTT |
| 155 | AAATTGGCCGTCTTCGGTCT |
| 156 | CAATTATGGGTCTTTCTGTT |
| 157 | CAATTAGACGTCTTCGTCTT |
| 158 | GAATTATGCATCTTTGCGTT |
| 159 | CAATTCCTGTTCTTGCGGGT |
| 160 | CAATTCGGCTTCTTGGCTGT |
| 161 | AAATTGTGTCTCTTGATGCT |
| 162 | CAATTCTGTGTCTTTGCGGT |
| 163 | CAATTGGTTCTCTTGGATCT |
| 164 | GAATTGCACGTCTTTGTGCT |
| 165 | CAATTGTGTCTCTTGGTACT |
| 166 | CAATTTGCGCTCTTGTGTGT |
| 167 | CAATTGTGTATAAGTTGTGCT |
| 168 | CAATTATTGCTCTTGTGGTT |
| 169 | CAATTTCCCGTCTTCGGGAT |
| 170 | GAATTTTCGTTAAGTGTGGGT |
| 171 | GAATTACGGCTCTTGTCGTT |
| 172 | CAATTGGCGTTCTTATGCCT |
| 173 | CAATTGTTGGTAAGTCCAACT |
| 174 | CAATTTCAGGTAAGTCCTGGT |

-continued

| SEQ ID NO | gRNA Sequence |
|---|---|
| 175 | CAATTAGGATTCTTGTTTTT |
| 176 | CAATTGTGCGTAAGTTGCGCT |
| 177 | CAATTGGTCCTCTTGGACCT |
| 178 | CAATTGCGAGTAAGTTTTGCT |
| 179 | CAATTGTGCGTCTTTGTGTT |
| 180 | CAATTGTTGTTCTTGCAACT |
| 181 | GAATTGCCCTTCTTGGGGTT |
| 182 | CAATTCCTTCTAAGTGAAGGT |
| 183 | CAATTGTCGGTAAGTCTGGTT |
| 184 | CAATTAGGGATAAGTTCCTTT |
| 185 | GAATTGCATGTCTTCATGTT |
| 186 | CAATTAGGTTTCTTGACCTT |
| 187 | CAATTATGCTTCTTAGTATT |
| 188 | CAATTTCGTGTCTTTGTGGT |
| 189 | CAATTTTCGCTCTTGCGGGT |
| 190 | CAATTATCGTTAAGTGCGGTT |
| 191 | CAATTAGTGATCTTTTACTT |
| 192 | CAATTGTTCGTCTTCGAGCT |
| 193 | CAATTAGTGGTAAGTCCGTTT |
| 194 | CAATTCTGGCTAAGTGCCGGT |
| 195 | CAATTGTTGCTCTTGTGGCT |
| 196 | CAATTTCATGTAAGTCATGGT |
| 197 | CAATTATTTGTAAGTCAGGTT |
| 198 | CAATTGTTGCTAAGTGCAATT |
| 199 | CAATTGGTTTCTTAGTTCT |
| 200 | CAATTAGCTCTAAGTGGGTTT |
| 201 | CAATTGCTTATCTTTAAGCT |
| 202 | CAATTTACATTCTTGTGTGT |
| 203 | CAATTTCAGTTCTTGCTGAT |
| 204 | CAATTGGCGTTCTTGTGCTT |
| 205 | GAATTGTGCGTAAGTTGCGTT |
| 206 | CAATTTTATTTCTTGATGAT |
| 207 | CAATTATAATTAAGTGTTATT |
| 208 | CAATTGCGCATAAGTTGTGTT |
| 209 | CAATTGGTGATCTTTCGCCT |
| 210 | CAATTGTGTGTCTTCGTGCT |
| 211 | CAATTATTGCTAAGTGCAATT |
| 212 | CAATTTGCTGTCTTCAGTGT |

-continued

| SEQ ID NO | gRNA Sequence |
|---|---|
| 213 | CAATTGATGTTCTTGCGTCT |
| 214 | CAATTGTTGATAAGTTCGACT |
| 215 | GAATTCGTTCTCTTGAGCGT |
| 216 | CAATTCGTTGTCTTTGACGT |
| 217 | CAATTTCTTGTCTTCGGGGT |
| 218 | CAATTTGGTATAAGTTGTTGT |
| 219 | CAATTGAGCGTCTTCGCTCT |
| 220 | CAATTAGGTCTAAGTGACCTT |
| 221 | CAATTGTGCTTCTTGGTGTT |
| 222 | CAATTCGGGTTAAGTGTTCGT |
| 223 | CAATTTTGGGTCTTCCTGGT |
| 224 | GAATTTGTGGTAAGTTCGCGT |
| 225 | CAATTAGATCTAAGTGATCTT |
| 226 | CAATTGCGGTTAAGTACTGCT |
| 227 | CAATTGCGCGTAAGTTGTGTT |
| 228 | CAATTGTAGTTCTTGCTACT |
| 229 | GAATTGGCGTTCTTACGTCT |
| 230 | CAATTATTCTTAAGTGGGGTT |
| 231 | CAATTCGCTGTAAGTCAGTGT |
| 232 | CAATTTGTGCTAAGTGCGCAT |
| 233 | GAATTCCGTTTCTTGACGGT |
| 234 | CAATTGCGACTAAGTGTCGTT |
| 235 | CAATTGGGGTTCTTATCCCT |
| 236 | CAATTCGGGCTCTTGCTCGT |
| 237 | CAATTCATCCTCTTGGGTGT |
| 238 | CAATTGGCTCTAAGTGAGTCT |
| 239 | AAATTTCGGGTAAGTCTCGGT |
| 240 | CAATTGCGACTCTTGTTGTT |
| 241 | CAATTGGTCGTCTTTGATTT |
| 242 | CAATTCCTGATAAGTTTGGGT |
| 243 | CAATTGTGCATAAGTTGTGTT |
| 244 | CAATTGTGCGTAAGTCGCGTT |
| 245 | CAATTGGCGTTCTTATGTCT |
| 246 | CAATTAAGCATCTTTGCTTT |
| 247 | CAATTATGGTTCTTGCCGTT |
| 248 | GAATTGTGCCTAAGTGGCGTT |
| 249 | CAATTCTCTGTAAGTCAGAGT |
| 250 | CAATTCGTGTTAAGTGTGTGT |

| SEQ ID NO | gRNA Sequence |
|---|---|
| 251 | CAATTCGCTTTAAGTGAGTGT |
| 252 | CAATTCTACCTAAGTGGTGGT |
| 253 | CAATTATTCTTCTTAGAGTT |
| 254 | CAATTAGTATTCTTATGCTT |
| 255 | CAATTGCGTTTAAGTGATGCT |
| 256 | CAATTGGACGTAAGTCGTCCT |
| 257 | CAATTGAGAGTCTTTTCTTT |
| 258 | CAATTCGTGTTCTTGTGTGT |
| 259 | CAATTACTTTTAAGTGGAGTT |
| 260 | CAATTATCGCTCTTGCGGTT |
| 261 | CAATTGGTACTCTTGTGTTT |
| 262 | CAATTACGTGTAAGTCACGTT |
| 263 | CAATTTGTGATCTTTCGTAT |
| 264 | CAATTGTGCCTCTTGGTACT |
| 265 | CAATTTATGCTCTTGCGTAT |
| 266 | AAATTCGGTCTAAGTGATCGT |
| 267 | CAATTTGGGATAAGTTCCCAT |
| 268 | CAATTTTGGCTCTTGTCGAT |
| 269 | CAATTTCGAGTAAGTCTCGGT |
| 270 | CAATTCAACGTCTTCGTTGT |
| 271 | CAATTGGCTGTCTTTAGCCT |
| 272 | CAATTGGTGCTAAGTGTGCCT |
| 273 | CAATTACGTGTAAGTCGTGTT |
| 274 | CAATTGGTTGTCTTCAGCCT |
| 275 | CAATTTGGGTTCTTGCTCGT |
| 276 | CAATTGGGGGTAAGTCTTCTT |
| 277 | CAATTTCGTCTCTTGACGGT |
| 278 | CAATTGTGCTTAAGTAGCGTT |
| 279 | CAATTTACCTTCTTGGGTGT |
| 280 | CAATTCGGCATAAGTTGTCGT |
| 281 | CAATTTATGGTAAGTTTATGT |
| 282 | CAATTGATTGTCTTTGATCT |
| 283 | GAATTGCGACTAAGTGTCGCT |
| 284 | CAATTAGTTTTCTTGGATTT |
| 285 | CAATTGCGTCTAAGTGACGTT |
| 286 | CAATTAAGTTTCTTGGTTTT |
| 287 | CAATTGGTGTTAAGTGCATTT |
| 288 | CAATTACTGATAAGTTTGGTT |

| SEQ ID NO | gRNA Sequence |
|---|---|
| 289 | CAATTGGACATCTTTGTCCT |
| 290 | CAATTTGTTTTCTTAAACGT |
| 291 | CAATTTGACCTCTTGGTCAT |
| 292 | CAATTCCACGTCTTCGTGGT |
| 293 | AAATTCATGTTAAGTACGTGT |
| 294 | CAATTTTACGTCTTCGTGAT |
| 295 | CAATTGACGCTAAGTGCGTCT |
| 296 | CAATTCGATGTCTTTGTCGT |
| 297 | CAATTCCGTGTCTTTGCGGT |
| 298 | CAATTGCGGTTAAGTGCCGCT |
| 299 | CAATTGGTGTTCTTGCGCTT |
| 300 | CAATTCATCGTCTTTGATGT |
| 301 | CAATTTTTGTTAAGTGCGAGT |
| 302 | CAATTAGGCTTAAGTGGCCTT |
| 303 | CAATTGGGGCTAAGTGTCTCT |
| 304 | CAATTGGCTTTCTTAGGCCT |
| 305 | CAATTACGCGTCTTCGTGTT |
| 306 | GAATTGCGGGTCTTCTCGCT |
| 307 | CAATTCTGCGTCTTCGTAGT |
| 308 | CAATTCGCGGTAAGTCCGTGT |
| 309 | CAATTACGCGTAAGTTGCGTT |
| 310 | CAATTAAGTGTAAGTCATTTT |
| 311 | CAATTTGGTTTAAGTGATCGT |
| 312 | CAATTTGAGTTCTTGTTCGT |
| 313 | CAATTGTCGTTAAGTGCGACT |
| 314 | CAATTGTTTTTAAGTGGGGCT |
| 315 | CAATTTCACGTAAGTTGTGAT |
| 316 | CAATTTGTGATAAGTTCACGT |
| 317 | CAATTTCGTTTAAGTGATGGT |
| 318 | CAATTTTTCGTCTTTGGGAT |
| 319 | CAATTATCCTTCTTAGGGTT |
| 320 | CAATTCGCGATCTTTTGTGT |
| 321 | CAATTAAGTTTCTTGGCTTT |
| 322 | CAATTTTGGTCTTCCAAAT |
| 323 | CAATTCACGTTAAGTATGTGT |
| 324 | CAATTGCTTGTCTTCGAGCT |
| 325 | AAATTGTGCGTAAGTCGTGCT |
| 326 | CAATTGTGGGTCTTCCTATT |

| SEQ ID NO | gRNA Sequence |
|---|---|
| 327 | CAATTTGACGTCTTCGTCAT |
| 328 | CAATTTGGTGTAAGTCATCGT |
| 329 | CAATTGTCGTTAAGTACGGTT |
| 330 | CAATTGCTGGTAAGTCTAGTT |
| 331 | CAATTGGTCCTCTTGGGTCT |
| 332 | CAATTCTGCGTCTTCGTGGT |
| 333 | CAATTCTTGTTCTTGTGAGT |
| 334 | CAATTTGCCCTCTTGGGCGT |
| 335 | CAATTGGGGGTCTTTTCCCT |
| 336 | CAATTGACGCTCTTGCGTCT |
| 337 | CAATTTGCGTTAAGTACGCAT |
| 338 | CAATTTCAAGTCTTTTTGAT |
| 339 | CAATTGCAGTTCTTGTTGCT |
| 340 | CAATTGTATGTAAGTCGTGCT |
| 341 | CAATTGGGGGTAAGTCCTTCT |
| 342 | CAATTATGGTTCTTACCGTT |
| 343 | CAATTTTGTGTCTTCACGAT |
| 344 | CAATTACTTATCTTTGAGTT |
| 345 | CAATTATGGGTAAGTCTCATT |
| 346 | AAATTCGTGCTAAGTGTGCGT |
| 347 | CAATTGTGCCTCTTGGTGCT |
| 348 | CAATTGTGTGTAAGTCGCGCT |
| 349 | CAATTTTGGCTAAGTGCTAAT |
| 350 | CAATTAGCCTTCTTGGGTTT |
| 351 | CAATTACGTGTCTTCGTGTT |
| 352 | CAATTGTTGCTCTTGCGATT |
| 353 | CAATTCGTGTTCTTACGCGT |
| 354 | CAATTGGTTCTCTTGGGCCT |
| 355 | CAATTAACGTTCTTGCGTTT |
| 356 | CAATTAGATTTCTTGGTCTT |
| 357 | CAATTGCCGCTAAGTGCGGTT |
| 358 | CAATTCGGTATCTTTGTCGT |
| 359 | CAATTTGCAGTCTTCTG CAT |
| 360 | CAATTTAAGTTCTTGTTTGT |
| 361 | CAATTGTTTTAAGTGAGGCT |
| 362 | CAATTGGTTGTCTTCAGTCT |
| 363 | CAATTTGCGTTAAGTGCGCAT |
| 364 | CAATTTCGGTTAAGTGTCGGT |
| 365 | CAATTGGTCATCTTTGACTT |
| 366 | CAATTGCGTCTCTTGGTGCT |
| 367 | CAATTTTTGTTAAGTGTAGGT |
| 368 | CAATTGTGTGTAAGTTATGTT |
| 369 | GAATTGTGTATCTTTGCGCT |
| 370 | CAATTGGACGTCTTTGTTTT |
| 371 | GAATTCGCGCTAAGTGTGCGT |
| 372 | CAATTACTTTTCTTGAGGTT |
| 373 | CAATTCCGGGTAAGTCTTGGT |
| 374 | CAATTGAACCTAAGTGGTTCT |
| 375 | AAATTGGTGCTAAGTGCGCCT |
| 376 | CAATTGTGGTTCTTACTATT |
| 377 | CAATTTCTGATCTTTTGGGT |
| 378 | CAATTATTGCTAAGTGCGATT |
| 379 | CAATTTTGCCTCTTGGCAAT |
| 380 | CAATTGTGGTTAAGTGCTGTT |
| 381 | CAATTGCGTCTCTTGATGCT |
| 382 | CAATTTGGTGTCTTTATCGT |
| 383 | CAATTGTTGGTCTTCCAGTT |
| 384 | CAATTGGCTGTCTTTGGCCT |
| 385 | CAATTGGCTCTCTTGAGTCT |
| 386 | CAATTACGGGTCTTCCTGTT |
| 387 | GAATTAGTGTTCTTGCGCTT |
| 388 | CAATTTGTCGTCTTCGGCAT |
| 389 | CAATTGCGTTTAAGTGACGCT |
| 390 | CAATTCCTGATCTTTTAGGT |
| 391 | GAATTTCGGTTAAGTGCTGGT |
| 392 | CAATTGGGTATCTTTGCTCT |
| 393 | CAATTGGCTCTAAGTGAGTTT |
| 394 | CAATTTGTGTTAAGTATACAT |
| 395 | CAATTGCGTGTCTTTATGTT |
| 396 | CAATTGTTGTTCTTACGG CT |
| 397 | CAATTGGGGTTAAGTGCCCTT |
| 398 | CAATTGCGTTTAAGTGACGTT |
| 399 | CAATTGCATGTAAGTCGTGTT |
| 400 | CAATTGGCGGTCTTTCGCCT |
| 401 | CAATTCAGGCTCTTGTCTGT |
| 402 | GAATTCCTGCTCTTGTAGGT |

| SEQ ID NO | gRNA Sequence |
|---|---|
| 403 | CAATTCGCATTAAGTGTGCGT |
| 404 | CAATTACTGGTCTTCTAGTT |
| 405 | CAATTGGCTTTAAGTGAGTTT |
| 406 | AAATTTGTCATCTTTGGTGT |
| 407 | CAATTGGTGTTCTTATGCTT |
| 408 | CAATTTGTTGTAAGTCGACAT |
| 409 | CAATTGTATCTCTTGATACT |
| 410 | CAATTTTGGTTAAGTGCCGGT |
| 411 | CAATTGGTTTTCTTGGACTT |
| 412 | CAATTGTGTGTCTTCGTGTT |
| 413 | CAATTATGCGTAAGTCGTGTT |
| 414 | CAATTTGGCGTCTTTGTCGT |
| 415 | CAATTGCTCGTAAGTCGAGTT |
| 416 | CAATTCGCAATCTTTTGCGT |
| 417 | CAATTCGGCTTAAGTAGTTGT |
| 418 | CAATTCATGTTCTTACGTGT |
| 419 | CAATTGTATCTAAGTGATACT |
| 420 | GAATTTGCGTTCTTGCGTAT |
| 421 | CAATTTGCAATCTTTTGCGT |
| 422 | AAATTGTCGTTAAGTGCGGTT |
| 423 | CAATTAGCGCTCTTGCGCTT |
| 424 | CAATTTAAGGTCTTCCTTAT |
| 425 | CAATTGCGGTTAAGTGTCGTT |
| 426 | CAATTATGTGTAAGTCATGTT |
| 427 | GAATTCCGACTAAGTGTTGGT |
| 428 | CAATTCGTGATCTTTTGCGT |
| 429 | CAATTCTTCGTAAGTCGAAGT |
| 430 | CAATTCGTGTTCTTATGCGT |
| 431 | CAATTGCGCCTAAGTGGTGCT |
| 432 | CAATTGCGTATCTTTGCGTT |
| 433 | CAATTGTGTCTCTTGACGTT |
| 434 | CAATTATGTCTCTTGGTGTT |
| 435 | CAATTCCGCGTCTTTGTGGT |
| 436 | CAATTGTTTATCTTTGGACT |
| 437 | CAATTTTGCGTCTTCGTAGT |
| 438 | CAATTCACCGTAAGTTGGTGT |
| 439 | CAATTGCTTGTAAGTCAGGCT |
| 440 | CAATTGCTTTTCTTAGGGCT |
| 441 | AAATTGTGCTTCTTGGCGCT |
| 442 | AAATTGTTGCTCTTGCGACT |
| 443 | CAATTGCGTATCTTTGCGCT |
| 444 | CAATTGGTGTTAAGTGCGTTT |
| 445 | CAATTGCGCATCTTTGCGTT |
| 446 | CAATTATGTGTCTTCGCGTT |
| 447 | CAATTACGTATCTTTGCGTT |
| 448 | CAATTTGGTGTAAGTCGTCGT |
| 449 | CAATTTGTTGTAAGTCGGCGT |
| 450 | GAATTAGCGTTAAGTACGTTT |
| 451 | CAATTTCCGGTAAGTTCGGGT |
| 452 | CAATTCGTTCTCTTGAACGT |
| 453 | CAATTATGCATCTTTGTGTT |
| 454 | CAATTGCGCCTAAGTGGCGTT |
| 455 | CAATTCGCTATCTTTGGCGT |
| 456 | CAATTCCGTGTAAGTCGCGGT |
| 457 | CAATTGTGGGTCTTTCCGTT |
| 458 | CAATTTGTGGTCTTTTATAT |
| 459 | CAATTCATCGTCTTCGGTGT |
| 460 | GAATTCCATGTAAGTTGTGGT |
| 461 | CAATTAGACCTAAGTGGTCTT |
| 462 | CAATTGTTTGTCTTTGAGCT |
| 463 | CAATTCCGTCTCTTGACGGT |
| 464 | CAATTCGCCGTCTTCGGTGT |
| 465 | CAATTTGCTATAAGTTGGTAT |
| 466 | CAATTGTGGGTCTTTTCACT |
| 467 | CAATTGCACTTCTTGGTGCT |
| 468 | CAATTCAGAGTCTTCTTTGT |
| 469 | CAATTTTTGCTAAGTGTGGGT |
| 470 | GAATTGTTCGTCTTCGAGCT |
| 471 | CAATTCGCTATCTTTAGCGT |
| 472 | CAATTGGGTCTAAGTGATCCT |
| 473 | CAATTGTTGTTCTTGTGGCT |
| 474 | CAATTTTGTGTCTTCACGGT |
| 475 | CAATTCGTTGTAAGTCGGTGT |
| 476 | CAATTCGCCTTAAGTAGGCGT |
| 477 | CAATTTTTACTCTTGTGAGT |
| 478 | CAATTTGGGGTCTTTCCCAT |

-continued

| SEQ ID NO | gRNA Sequence |
|---|---|
| 479 | CAATTCAGTGTAAGTCACTGT |
| 480 | CAATTGGCGTTCTTACGCTT |
| 481 | CAATTAAGATTCTTGTTTTT |
| 482 | CAATTGACGTTCTTACGTTT |
| 483 | CAATTAGATGTAAGTCGTCTT |
| 484 | CAATTTCGACTAAGTGTCGGT |
| 485 | CAATTTTGATTAAGTGTTGAT |
| 486 | CAATTCGACGTCTTCGTCGT |
| 487 | CAATTGAACGTAAGTCGTTCT |
| 488 | CAATTGGCACTAAGTGTGTCT |
| 489 | GAATTCGCCGTAAGTCGGTGT |
| 490 | CAATTCGATGTCTTCATTGT |
| 491 | CAATTCTGTGTAAGTCGCAGT |
| 492 | AAATTCCGCGTCTTCGTGGT |
| 493 | GAATTGAGCCTAAGTGGTTCT |
| 494 | AAATTGCGTCTCTTGACGTT |
| 495 | CAATTGGTTTAAGTGGATCT |
| 496 | AAATTCGCTCTCTTGGGTGT |
| 497 | CAATTTACGTTCTTGCGTAT |
| 498 | CAATTTACGTTCTTACGTAT |
| 499 | CAATTGCCTCTCTTGGGGCT |
| 500 | CAATTGTGGGTAAGTCCCGCT |
| 501 | CAATTGTCGGTAAGTTCGGCT |
| 502 | CAATTGGGGTTAAGTGCCCCT |
| 503 | CAATTAGAGTTCTTGTTCTT |
| 504 | CAATTGTACGTCTTCGTGCT |
| 505 | CAATTTACGTTAAGTACGTAT |
| 506 | CAATTCGGCATAAGTTGTTGT |
| 507 | CAATTTGGTATAAGTTGCTGT |
| 508 | CAATTACTTGTCTTCGAGTT |
| 509 | CAATTGCCGCTCTTGTGGCT |
| 510 | CAATTGTGTGTCTTTACGCT |
| 511 | CAATTTGTGCTCTTGCACGT |
| 512 | GAATTGTTTGTCTTCGAACT |
| 513 | CAATTGTGGTTAAGTGCCGTT |
| 514 | GAATTGAAGGTAAGTCCTTTT |
| 515 | CAATTGTGTGTCTTCACGCT |
| 516 | CAATTGCCTGTCTTTAGGCT |

| SEQ ID NO | gRNA Sequence |
|---|---|
| 517 | CAATTTTTGGTCTTCTGGAT |
| 518 | CAATTATTAGTCTTCTAGTT |
| 519 | AAATTGGTCGTCTTCGACCT |
| 520 | CAATTATTAGTCTTTTAGTT |
| 521 | CAATTCATGCTCTTGTGTGT |
| 522 | CAATTGCGTGTAAGTTGCGTT |
| 523 | CAATTGAGGTTCTTACTTTT |
| 524 | CAATTACCAATCTTTTGGTT |
| 525 | AAATTGTCCATAAGTTGGACT |
| 526 | CAATTTGTGTTAAGTACATGT |
| 527 | CAATTGCCTGTAAGTCAGGTT |
| 528 | CAATTGTTGTCTTCGATAT |
| 529 | CAATTCTCGTTCTTGTGGGT |
| 530 | CAATTGCGCCTCTTGGCGTT |
| 531 | CAATTGGTGTTAAGTGTACTT |
| 532 | CAATTACGTGTCTTTATGTT |
| 533 | CAATTGCCATTCTTGTGGCT |
| 534 | CAATTTGTAGTAAGTCTGTAT |
| 535 | CAATTGCGCGTAAGTTGCGCT |
| 536 | CAATTTGACGTCTTCGTCGT |
| 537 | CAATTTGACCTCTTGGTCGT |
| 538 | CAATTGCGTGTCTTTGCGTT |
| 539 | GAATTGTCCGTCTTCGGGCT |
| 540 | CAATTGGTTGTCTTCGGCCT |
| 541 | CAATTTCGTGTCTTCACGAT |
| 542 | CAATTTCGTGTCTTCATGGT |
| 543 | CAATTCAGTGTCTTCGTTGT |
| 544 | CAATTGTAGTTAAGTGTTACT |
| 545 | GAATTGTGTTAAGTATGCGT |
| 546 | CAATTTGGGTTCTTGCCCAT |
| 547 | CAATTGTTGCTAAGTGCGGTT |
| 548 | CAATTGCGCGTCTTCGTGCT |
| 549 | CAATTTGCACTAAGTGTGCAT |
| 550 | CAATTTATGTTAAGTATGTGT |
| 551 | GAATTGCGTTTCTTGACGCT |
| 552 | CAATTCGGTCTAAGTGGTTGT |
| 553 | CAATTCGCGTTAAGTGCGCGT |
| 554 | CAATTTGGCCTAAGTGGTTGT |

| SEQ ID NO | gRNA Sequence |
|---|---|
| 555 | CAATTCGGGTTCTTATTTGT |
| 556 | CAATTGCCTCTAAGTGGGGTT |
| 557 | GAATTTACGTTCTTACGTAT |
| 558 | CAATTTGTGATCTTTTGTGT |
| 559 | CAATTCGCGCTCTTGTGCGT |
| 560 | CAATTTGTAGTAAGTCTACAT |
| 561 | CAATTCGTTGTCTTCAGTGT |
| 562 | CAATTTGTCGTAAGTCGGCGT |
| 563 | GAATTTAGCTTCTTGGCTGT |
| 564 | CAATTGTACGTCTTTGTGCT |
| 565 | CAATTTCTTGTAAGTTGGGAT |
| 566 | CAATTCGGTTTAAGTAGCCGT |
| 567 | CAATTCGCAGTAAGTTTGCGT |
| 568 | CAATTTTGGTTAAGTGTTAAT |

Table 3 provides identified RR_lb gRNA sequences that bind LbCas12a(RR) protein.

| SEQ ID NO | gRNA Sequence |
|---|---|
| 569 | GAATTTCTTCTAAGTGAAGAT |
| 570 | AAATTTCTACTAGAGTGTAGAT |
| 571 | GAATTTCTACTTGCTTGTAGAT |
| 572 | AAATTTCTACTATTCAGTAGAT |
| 573 | AAATTTCTACTTGCTGTAGAT |
| 574 | CAATTTCTACTTTGCGTAGAT |
| 575 | CAATTTCTACTAAGTGTAGAT |
| 576 | AAATTTCTACTCCGCCGTAGAT |
| 577 | CAATTTCTACTTCAATGTAGAT |
| 578 | CAATTTCTACTAGATTGTAGAT |
| 579 | GAATTTCTACTTAGAGTAGAT |
| 580 | GAATTTCTCCTATCGTGGAGAT |
| 581 | GAATTTCTACTCGGCGTAGAT |
| 582 | GAATTTCTACTTTAGTAGAT |
| 583 | AAATTTCTACTACAAGTAGAT |
| 584 | GAATTTCTACTTAGGTAGAT |
| 585 | AAATTTCTACTGCTTGTAGAT |
| 586 | GAATTTCTACTAGTGTGTAGAT |
| 587 | AAATTTCTACTGTGGTGTAGAT |
| 588 | AAATTCCTTCTAAGTGAAGGT |
| 589 | CAATTTCTACTACCGAGTAGAT |
| 590 | GAATTTCTACTGTCGGGTAGAT |
| 591 | GAATTTCTACTGTTGTGTAGAT |
| 592 | GAATTTCTACTATGATGTAGAT |
| 593 | GAATTTCTACTTCAACGTAGAT |
| 594 | GAATTTCTACTGCGATGTAGAT |
| 595 | CAATTCCTCGTAAGTCGAGGT |
| 596 | GAATTTCTACTATCATGTAGAT |
| 597 | GAATTTCTACTAACGTGTAGAT |
| 598 | AAATTTCTACTAGGCGTAGAT |
| 599 | GAATTTCTACTATAAGGTAGAT |
| 600 | AAATTTCTACTACAGCGTAGAT |
| 601 | AAATTTCTCCTAGTCGGAGAT |
| 602 | CAATTTCTACTATGGGGTAGAT |
| 603 | GAATTTCTACTACAGTGTAGAT |
| 604 | GAATTTCTACTGGCCAGTAGAT |
| 605 | GAATTTCTACTATACTGTAGAT |
| 606 | CAATTCTCCTAGGGCGGAGAT |
| 607 | GAATTTCTACTTCTCCGTAGAT |
| 608 | CAATTTCTACTAGGCGTAGAT |
| 609 | CAATTTCTACTGTTTGGTAGAT |
| 610 | CAATTCTACTTCACGTAGAT |
| 611 | AAATTTCTACTACTGTGTAGAT |
| 612 | CAATTTCTACTGTTTAGTAGAT |
| 613 | AAATTTCTACTTCGCCGTAGAT |
| 614 | AAATTTCTACTGCTGTGTAGAT |
| 615 | CAATTTCTACTTCTATGTAGAT |
| 616 | CAATTTCTACTAGGGCGTAGAT |
| 617 | GAATTTCTACTAGGCGTAGAT |
| 618 | GAATTTCTACTTGGAGTAGAT |
| 619 | GAATTTCTACTAGCGAGTAGAT |
| 620 | AAATTTCTACTAATGGGTAGAT |
| 621 | GAATTTCTACTGAAGGGTAGAT |
| 622 | CAATTTCTACTCGGGTAGAT |
| 623 | AAATTTCTACTCCTGTAGAT |
| 624 | GAATTTCTACTAATCTGTAGAT |
| 625 | GAATTTCTACTGGCGAGTAGAT |
| 626 | GAATTTCTCCTTCGTGGAGAT |
| 627 | GAATTTCTACTGGTTGTAGAT |
| 628 | GAATTTCTACTCATCGGTAGAT |
| 629 | GAATTTCTACTCGATCGTAGAT |

-continued

| | |
|---|---|
| 630 | AAATTTCTACTTTCAGGTAGAT |
| 631 | CAATTTCTACTACGGGTAGAT |
| 632 | AAATTCCTGCTAAGTGCAGGT |
| 633 | GAATTTCTACTTGATAGTAGAT |
| 634 | CAATTTCTACTG GAG CGTAGAT |
| 635 | CAATTTCTACTCTAGGGTAGAT |
| 636 | GAATTTCTACTCCGGTGTAGAT |
| 637 | CAATTTCTACTATTTGTAGAT |
| 638 | AAATTTCTACTTGCCTGTAGAT |
| 639 | CAATTTCTCCTAAGATGGAGAT |
| 640 | GAATTTCTACTTACTGGTAGAT |
| 641 | GAATTTCTACTACGCGTAGAT |
| 642 | GAATTTCTCCTATAGTGGAGAT |
| 643 | CAATTTCTACTTTTCTGTAGAT |
| 644 | CAATTTCTCCTACAGTGGAGAT |
| 645 | CAATTTCTACTGGTGCGTAGAT |
| 646 | GAATTTCTACTGTAGAGTAGAT |
| 647 | GAATTTCTACTTCTGCGTAGAT |
| 648 | CAATTTCTACTATGCGTAGAT |
| 649 | AAATTTCTACTTAACTGTAGAT |
| 650 | GAATTTCTACTAAGTGTAGAT |
| 651 | GAATTTCTACTGGCCCGTAGAT |
| 652 | GAATTTCTCCTATGTTGGAGAT |
| 653 | GAATTGACTCTCTTGGGTTT |
| 654 | GAATTTCTACTCAGTCGTAGAT |
| 655 | CAATTTCTACTAGCTTGTAGAT |
| 656 | CAATTTCTACTGACAGTAGAT |
| 657 | GAATTTCTACTATCTGTAGAT |
| 658 | AAATTTCTACTACGCGGTAGAT |
| 659 | CAATTTCTACTAGGGGTAGAT |
| 660 | AAATTTCTACTAGTACGTAGAT |
| 661 | AAATTTCTACTGGATTGTAGAT |
| 662 | CAATTTCTACTACGTGTAGAT |
| 663 | CAATTTCTACTATAGTGTAGAT |
| 664 | CAATTTCTACTATGGGTAGAT |
| 665 | GAATTATGTGTAAGTCACGTT |
| 666 | GAATTTCTACTCTCGTAGAT |
| 667 | GAATTTCTACTTCTTTGTAGAT |
| 668 | CAATTTCTACTTTAGTGTAGAT |
| 669 | GAATTTCTACTAGTAGTAGAT |
| 670 | AAATTTCTACTGCACTGTAGAT |
| 671 | CAATTTCTACTATAGCGTAGAT |
| 672 | AAATTTCTACTAGGATGTAGAT |
| 673 | CAATTTCTACTATGAGTAGAT |
| 674 | CAATTTCTACTGTGGTAGAT |
| 675 | AAATTTCTACTATAGGGTAGAT |
| 676 | GAATTTCTACTGAGTGGTAGAT |
| 677 | CAATTTCTACTCTAGTAGAT |
| 678 | CAATTTCTACTACCAAGTAGAT |
| 679 | AAATTTCTACTGGCAGTAGAT |
| 680 | GAATTTCTCCTATCCGGAGAT |
| 681 | CAATTTCTACTGAAAGTAGAT |
| 682 | GAATTTCTCCTATCGCGGAGAT |
| 683 | CAATTTCTACTCCTAAGTAGAT |
| 684 | GAATTTCTACTACTGAGTAGAT |
| 685 | GAATTTCTACTAGTCTGTAGAT |
| 686 | CAATTTCTACTTCTCTGTAGAT |
| 687 | AAATTTCTACCACTTGTAGAT |
| 688 | CAATTTCTACTTGTTCGTAGAT |
| 689 | GAATTTCTACTCACACGTAGAT |
| 690 | CAATTTCTCCTATAGAGGAGAT |
| 691 | GAATTTCTACTACCCCGTAGAT |
| 692 | GAATTTCTACTGCCGAGTAGAT |
| 693 | GAATTTCTACTCACTAGTAGAT |
| 694 | GAATTTCTACTCAAACGTAGAT |
| 695 | GAATTTCTACTCTCTTGTAGAT |
| 696 | AAATTTCTACTCTTCGGTAGAT |
| 697 | GAATTTCTACTCGGTAGTAGAT |
| 698 | GAATTTCTACTCCGGCGTAGAT |
| 699 | CAATTTCTCCTAGATGGAGAT |
| 700 | GAATTTCTACTGCCGTGTAGAT |
| 701 | AAATTTCTCCTATGGGAGAT |
| 702 | GAATTTCTACTATACCGTAGAT |
| 703 | AAATTTCTCCTAACTTGGAGAT |
| 704 | CAATTTCTACTATGTGTAGAT |
| 705 | GAATTTCTACTAGGTGTAGAT |
| 706 | GAATTTCTACTGACAAGTAGAT |
| 707 | GAATTTCTACACCAAAGTAGAT |
| 708 | CAATTTCTACTAATTTGTAGAT |
| 709 | CAATTTCTACTAAACCGTAGAT |
| 710 | CAATTTCTACTTCAGGTAGAT |

| | |
|---|---|
| 711 | GAATTTCTCCTCAAACGGAGAT |
| 712 | GAATTTCTACTGTTGAGTAGAT |
| 713 | CAATTTCTCCTATTTGGAGAT |
| 714 | AAATTTCTACTCCGTGGTAGAT |
| 715 | AAATTTCTACTTCAGTGTAGAT |
| 716 | AAATTTCTCCTAGGTTGGAGAT |
| 717 | GAATTTCTACCAACTTGTAGAT |
| 718 | CAATTTCTACTACGCGTAGAT |
| 719 | GAATTTCTACTTGAGTGTAGAT |
| 720 | GAATTTCTACTGATTGGTAGAT |
| 721 | AAATTTCTACTGCGAGTAGAT |
| 722 | AAATTTGTCTTCTTAGGTGT |
| 723 | CAATTTCTACTTGAGAGTAGAT |
| 724 | CAATTTCTACTATACGGTAGAT |
| 725 | GAATTTCTACTGAGATGTAGAT |
| 726 | CAATTTCTACTTGTGGTAGAT |
| 727 | CAATTTCTACTGGCACGTAGAT |
| 728 | AAATTTCTCCTAAAGCGGAGAT |
| 729 | GAATTTCTACTCGCTGTAGAT |
| 730 | CAATTTCTACTCTTTCGTAGAT |
| 731 | GAATTTCTACTACGAGTAGAT |
| 732 | AAATTTCTACTGCGCCGTAGAT |
| 733 | CAATTTCTACCAAATGTAGAT |
| 734 | GAATTTCTACTAGTGGTAGAT |
| 735 | GAATTTCTACTTTAACGTAGAT |
| 736 | GAATTTCTACTTCGCAGTAGAT |
| 737 | CAATTTCTACTCCGTCGTAGAT |
| 738 | GAATTTCTACTCCGTTGTAGAT |
| 739 | GAATTTCTCCTGTGCGGAGAT |
| 740 | CAATTTCTACTATTGAGTAGAT |
| 741 | GAATTTCTACTCTTACGTAGAT |
| 742 | CAATTTCTACTGAGACGTAGAT |
| 743 | CAATTTCTACTAAGGAGTAGAT |
| 744 | AAATTTCTACTAAGCGTAGAT |
| 745 | GAATTTCTACTCTGGGTAGAT |
| 746 | CAATTTCTACTGTGGTGTAGAT |
| 747 | AAATTTCTACTCTTCAGTAGAT |
| 748 | CAATTTCTACTGTTGGGTAGAT |
| 749 | AAATTTCTCCTACCAGGAGAT |
| 750 | CAATTTCTCCTAAGGGGAGAT |
| 751 | GAATTTCTACTTCATAGTAGAT |
| 752 | CAATTTCTACTCGACCGTAGAT |
| 753 | CAATTTCTACTTATGGTAGAT |
| 754 | AAATTTCTACTGAATCGTAGAT |
| 755 | AAATTTCTACTAAGGGTAGAT |
| 756 | GAATTTCTACTTGTAGTAGAT |
| 757 | CAATTTCTACTTCCGTGTAGAT |
| 758 | CAATTTCTACTCACCGTAGAT |
| 759 | CAATTTACAATCTTTTGTGT |
| 760 | CAATTTCTACTCGATAGTAGAT |
| 761 | CAATTTCTACTAAGAGTAGAT |
| 762 | CAATTTCTACTTTTGTAGAT |
| 763 | CAATTTCTACTATGGTAGAT |
| 764 | AAATTTCTACTCCCACGTAGAT |
| 765 | CAATTTCTACTCAGGCGTAGAT |
| 766 | GAATTTCTCCTAGTGTGGAGAT |
| 767 | CAATTCTCCTTCTTGGGGT |
| 768 | GAATTTCTACTGGAGCGTAGAT |
| 769 | GAATTTCTCCTAACGCGGAGAT |
| 770 | CAATTTCTACTAGATCGTAGAT |
| 771 | AAATTTCTACTCTGGGTAGAT |
| 772 | CAATTTCTACTACGGGTAGAT |
| 773 | GAATTTCTACTTGTAAGTAGAT |
| 774 | CAATTTCTACTTGAGGGTAGAT |
| 775 | GAATTTCTACTAAGCGTAGAT |
| 776 | CAATTTCTACTAGAGGGTAGAT |
| 777 | GAATTTCTACTCCTGCGTAGAT |
| 778 | CAATTTCTACTAGGTGGTAGAT |
| 779 | CAATTTCTCCTACATGGAGAT |
| 780 | CAATTTCTACTTCAGGGTAGAT |
| 781 | CAATTTCTACTCGGTGTAGAT |
| 782 | GAATTTCTACTAAGAGGTAGAT |
| 783 | CAATTTCTACTCCGGCGTAGAT |
| 784 | CAATTTCTACTCTATCGTAGAT |
| 785 | CAATTTCTACTGCCAGTAGAT |
| 786 | CAATTTCTACTAGTGTGTAGAT |
| 787 | CAATTTCTACTTCTCGTAGAT |
| 788 | CAATTTCTCCTCTGAGGAGAT |
| 789 | CAATTTCTACTAATGTGTAGAT |
| 790 | GAATTTCTACTCGTGGGTAGAT |
| 791 | CAATTTCTACTGAGATGTAGAT |

| | |
|---|---|
| 792 | GAATTTCTACTACCGTGTAGAT |
| 793 | CAATTTCTACTCATGGTAGAT |
| 794 | CAATTTCTACTAAAGGTAGAT |
| 795 | GAATTTCTACTCTCATGTAGAT |
| 796 | CAATTTCTACTATCCGTAGAT |
| 797 | CAATTTCTCCTTATGTGGAGAT |
| 798 | CAATTTCTACTGAGCGTAGAT |
| 799 | CAATTTCTACTGTTGGTAGAT |
| 800 | CAATTTCTACTAGGTGTAGAT |
| 801 | CAATTTCTACTAGCAGGTAGAT |
| 802 | GAATTAGCGATAAGTTCGCTT |
| 803 | AAATTTCTACTCAGCAGTAGAT |
| 804 | CAATTTCTACTATCCGGTAGAT |
| 805 | GAATTTCTACTATTGTAGAT |
| 806 | CAATTTCTACTGTGGCGTAGAT |
| 807 | GAATTTCTACTATCGAGTAGAT |
| 808 | CAATTTCTACTCTCTAGTAGAT |
| 809 | CAATTTCTACTTAGGTGTAGAT |
| 810 | CAATTCCTCCTAAGTGGAGGT |
| 811 | CAATTTCTACTACCTGTAGAT |
| 812 | CAATTTCTACTTTAGCGTAGAT |
| 813 | AAATTTCTACCCGAGGTAGAT |
| 814 | GAATTTCTACTGACCCGTAGAT |
| 815 | GAATTTCTACTACAGGTAGAT |
| 816 | GAATTTCTACTTAGTGTAGAT |
| 817 | GAATTTCTACTCGTACGTAGAT |
| 818 | CAATTTCTACTTCGGGTAGAT |
| 819 | AAATTTCTACTACGCGTAGAT |
| 820 | CAATTTCTACCACTAGTAGAT |
| 821 | AAATTTCTCCTACGTGGAGAT |
| 822 | GAATTTCTACTGTTTTGTAGAT |
| 823 | CAATTTCTACTTCGTGGTAGAT |
| 824 | GAATTTCTACTGCGTGGTAGAT |
| 825 | GAATTTCTACTTCAAGGTAGAT |
| 826 | AAATTTCTACTTGTCAGTAGAT |
| 827 | GAATTTCTACTACAACGTAGAT |
| 828 | GAATTTCTACTTGCTCGTAGAT |
| 829 | GAATTTCTACTCTTCAGTAGAT |
| 830 | AAATTTTGACTAAGTGTCGAT |
| 831 | GAATTTGCACTAAGTGTGTGT |
| 832 | CAATTTCTCCTATTCCGGAGAT |
| 833 | CAATTTCTACTATCTGTAGAT |
| 834 | AAATTTCTACTACGGGTAGAT |
| 835 | CAATTTCTACTAGGCAGTAGAT |
| 836 | CAATTTCTACTTTCTTGTAGAT |
| 837 | CAATTTCTACTACGAAGTAGAT |
| 838 | GAATTTCTACTAATTGTAGAT |
| 839 | GAATTTCTACTCGCCAGTAGAT |
| 840 | CAATTTCTACTTTCCCGTAGAT |
| 841 | GAATTTCTCCGTTTCAGGAGAT |
| 842 | AAATTTCTACTCCGCGTAGAT |
| 843 | CAATTTCTACTGAAGTGTAGAT |
| 844 | CAATTTCTACTAACACGTAGAT |
| 845 | GAATTTCTCCTACCTTGGAGAT |
| 846 | GAATTTCTACTTGTGTAGAT |
| 847 | GAATTTCTACTTCTAAGTAGAT |
| 848 | AAATTTCTCCTGTTGGAGAT |
| 849 | CAATTTCTCCTATTTCGGAGAT |
| 850 | CAATTTCTACTACAGGTAGAT |
| 851 | CAATTTCTACTAGCGGGTAGAT |
| 852 | CAATTCTCCTAGTAGGAGAT |
| 853 | CAATTTCTACTCCCGGGTAGAT |
| 854 | GAATTTCTACTGCAGTGTAGAT |
| 855 | AAATTTCTCCTATGTGGAGAT |
| 856 | GAATTTCTACTGGAGTGTAGAT |
| 857 | GAATTTCTACTATTTTGTAGAT |
| 858 | GAATTTCTACTCCTCTGTAGAT |
| 859 | CAATTTCTACTATGGTGTAGAT |
| 860 | AAATTTCTACTTATGCGTAGAT |
| 861 | CAATTTCTCCTACAGGAGAT |
| 862 | AAATTTCTACTTGAGTAGAT |
| 863 | CAATTTCTACTGCAGGTAGAT |
| 864 | CAATTTCTACTGGGGTAGAT |
| 865 | GAATTTCTACTGTCAAGTAGAT |
| 866 | CAATTTCTACTACGAGTAGAT |
| 867 | GAATTTCTCCTGGTGTGGAGAT |
| 868 | CAATTTGTGATAAGTTCGCGT |
| 869 | AAATTTCTACTTTCCCGTAGAT |
| 870 | CAATTTCTACTAAGTAGTAGAT |
| 871 | AAATTTCTACTACAGGTAGAT |
| 872 | CAATTTCTACTGAACTGTAGAT |

-continued

| | |
|---|---|
| 873 | CAATTTCTACTGACTGTAGAT |
| 874 | GAATTTCTACTAATCAGTAGAT |
| 875 | CAATTTCTACTCCACTGTAGAT |
| 876 | GAATTAAGGTTCTTGTCTTT |
| 877 | GAATTTCTACTCCCCGGTAGAT |
| 878 | GAATTTCTACTGGAACGTAGAT |
| 879 | CAATTTCTACTGATGCGTAGAT |
| 880 | AAATTTCTACCAGTCGTAGAT |
| 881 | GAATTTCTACTCCTCGTAGAT |
| 882 | CAATTTCTACTGAGTTGTAGAT |
| 883 | CAATTTCTACTAGGCTGTAGAT |
| 884 | GAATTTCTACTTCACGGTAGAT |
| 885 | AAATTTCTACTATAAGGTAGAT |
| 886 | CAATTTCTACTAGGAGTAGAT |
| 887 | AAATTGTCGGTAAGTCCGGCT |
| 888 | CAATTTCTACTCCTTAGTAGAT |
| 889 | CAATTTCTACTCCAGGTAGAT |
| 890 | CAATTTCTACTGGGTGTAGAT |
| 891 | GAATTTCTACTGAAGTAGAT |
| 892 | GAATTTCTACTCGCACGTAGAT |
| 893 | AAATTTCTACTGCGTAGTAGAT |
| 894 | CAATTTCTACTCAGGTGTAGAT |
| 895 | CAATTTCTCCTACGTGGAGAT |
| 896 | CAATTTCTACTATACTGTAGAT |
| 897 | GAATTTCTACTCAGGCGTAGAT |
| 898 | AAATTTCTACTGCCGTAGAT |
| 899 | AAATTTCTACTCCGAAGTAGAT |
| 900 | CAATTTCTCCTATCGCGGAGAT |
| 901 | GAATTTCTACTGCTGGGTAGAT |
| 902 | CAATTTCTACTTGGCGTAGAT |
| 903 | GAATTTCTACTCCTAGGTAGAT |
| 904 | AAATTTCGACTAAGTGTTGAT |
| 905 | CAATTTCTACTCCCTTGTAGAT |
| 906 | CAATTTCTACTGATTAGTAGAT |
| 907 | CAATTTCTACTCTGTAGTAGAT |
| 908 | CAATTTCTACTCTTATGTAGAT |
| 909 | GAATTTCTACTGCAGAGTAGAT |
| 910 | CAATTTCACCTAAGTGGTGAT |
| 911 | AAATTGTACGTCTTTGTGCT |
| 912 | GAATTTCTACTCGAACGTAGAT |

-continued

| | |
|---|---|
| 913 | CAATTTCTACTCCCCCGTAGAT |
| 914 | AAATTTCTACTGCCCAGTAGAT |
| 915 | CAATTTCTCCTACACGGAGAT |
| 916 | CAATTTCTCCTAATGCGGAGAT |
| 917 | CAATTTCTACTGTCCAGTAGAT |
| 918 | CAATTTCTACTAATCGTAGAT |
| 919 | CAATTTCTACTATGCTGTAGAT |
| 920 | AAATTTCTACCGTTACGTAGAT |
| 921 | CAATTTCTACTTAGCTGTAGAT |
| 922 | CAATTTCTACTGTCCTGTAGAT |
| 923 | CAATTTCTCCTACCTTGGAGAT |
| 924 | CAATTTCTACCAACTTGTAGAT |
| 925 | AAATTTCTCCTAGACGGAGAT |
| 926 | GAATTTCTACTCGTGTAGAT |
| 927 | CAATTTCTACCATTTGTAGAT |
| 928 | GAATTTCTACTATCGTGTAGAT |
| 929 | CAATTTCTACTTCCACGTAGAT |
| 930 | AAATTTCTCCTAAGGGGAGAT |
| 931 | CAATTTCTACTAAAACGTAGAT |
| 932 | CAATTTCTACTATCGTGTAGAT |
| 933 | GAATTCCTCCTCTTGGAGGT |
| 934 | CAATTTCTACTAATGGGTAGAT |
| 935 | AAATTTCTACTTCCCGTAGAT |
| 936 | CAATTTCTACTATGAGGTAGAT |
| 937 | CAATTCCTTGTCTTCGGGGT |
| 938 | CAATTTCTACTAGATGTAGAT |
| 939 | CAATTTCTACTTTTGAGTAGAT |
| 940 | GAATTTCTACTCAGTGTAGAT |
| 941 | GAATTTCTACTAAAGGGTAGAT |
| 942 | CAATTTCTACTACCACGTAGAT |
| 943 | CAATTTCTACTATGTTGTAGAT |
| 944 | CAATTTCTACTATTCTGTAGAT |
| 945 | CAATTTCTACTGTATCGTAGAT |
| 946 | AAATTTCTACTGCTCGTAGAT |
| 947 | CAATTTCTACTTTGACGTAGAT |
| 948 | GAATTTCTCCTAAATTGGAGAT |
| 949 | GAATTTCTACTCGGGTAGAT |
| 950 | CAATTTCTCCTATCTGGAGAT |
| 951 | GAATTTCTACTATCTAGTAGAT |
| 952 | CAATTTCTCCTACGATGGAGAT |
| 953 | CAATTTCTACTTGGTGGTAGAT |

| | |
|---|---|
| 954 | CAATTTCTACCTATGCGTAGAT |
| 955 | CAATTTCTACTGCGATGTAGAT |
| 956 | CAATTTCTACTTTGAAGTAGAT |
| 957 | CAATTTCTACTCATGCGTAGAT |
| 958 | CAATTTCTACCTTTTGGTAGAT |
| 959 | CAATTTCTACTAATCGGTAGAT |
| 960 | GAATTTCTACTACGCGGTAGAT |
| 961 | CAATTTCTACTCCTTTGTAGAT |
| 962 | CAATTCCTGTTCTTGTGGGT |
| 963 | AAATTTCTACTTTGTGGTAGAT |
| 964 | CAATTTCTACTGTTGTGTAGAT |
| 965 | CAATTTCTACTGACTGGTAGAT |
| 966 | GAATTTCTACTCTTGTGTAGAT |
| 967 | CAATTTCTACTTTGATGTAGAT |
| 968 | GAATTTCTACTGATCAGTAGAT |
| 969 | CAATTTCTACTTACAGTAGAT |
| 970 | GAATTTCTACTGCTTTGTAGAT |
| 971 | GAATTTCTACTTCCCTGTAGAT |
| 972 | CAATTTCTACTGTTTCGTAGAT |
| 973 | CAATTTCTACTTCGCAGTAGAT |
| 974 | GAATTCCGCCTAAGTGGCGGT |
| 975 | GAATTTCTACTGGGGTAGAT |
| 976 | CAATTTCTCCTAAGTGGAGAT |
| 977 | CAATTTCTACTCAGGTAGAT |
| 978 | GAATTTCTACAACATCGTAGAT |
| 979 | CAATTTCTCCTAGGAGGAGAT |
| 980 | CAATTTTGACTAAGTGTCGAT |
| 981 | CAATTTCTCCTACATCGGAGAT |
| 982 | CAATTTCTACTTGACGTAGAT |
| 983 | CAATTTCTCCTAGTGGAGAT |
| 984 | GAATTTCTACTGGGACGTAGAT |
| 985 | GAATTTCTACTTGGTGTAGAT |
| 986 | CAATTTCTACTATTCGGTAGAT |
| 987 | AAATTTCTACTCTTGCGTAGAT |
| 988 | AAATTTCTACTCTGGAGTAGAT |
| 989 | GAATTTCTACTCTGGTGTAGAT |
| 990 | GAATTTCTACTGACGTGTAGAT |
| 991 | AAATTTCTACTAGAGCGTAGAT |
| 992 | CAATTTCTCCTATCCGGAGAT |
| 993 | CAATTTCTCCTACGAGGAGAT |
| 994 | CAATTTCTACTACACTGTAGAT |
| 995 | GAATTTCTACTCTGCCGTAGAT |
| 996 | CAATTTCTACTGCAGCGTAGAT |
| 997 | CAATTTCTACTAGCAAGTAGAT |
| 998 | GAATTTCTACTGTCGTAGAT |
| 999 | CAATTTCTCCTATCAGGAGAT |
| 1000 | GAATTTCTACTCAATTGTAGAT |
| 1001 | CAATTTCTCCTAAGGAGGAGAT |
| 1002 | CAATTTCTACTCTCGAGTAGAT |
| 1003 | GAATTTCTACTGCTTGTAGAT |
| 1004 | CAATTTCTACTTGTTGGTAGAT |
| 1005 | CAATTTCTACTTAGGTAGAT |
| 1006 | CAATTTCTACTTCGCCGTAGAT |
| 1007 | CAATTTCTACTACTTTGTAGAT |
| 1008 | GAATTTCTACTTTTCGGTAGAT |
| 1009 | CAATTTCTACTACATAGTAGAT |
| 1010 | CAATTTCTACTAGTGGTAGAT |
| 1011 | CAATTTCTACTCACTAGTAGAT |
| 1012 | CAATTTCTACTTTAGTAGAT |
| 1013 | CAATTTCTTCTAAGTGAAGAT |
| 1014 | CAATTTCTACTCGAGTAGAT |
| 1015 | CAATTTCTACTTGGCAGTAGAT |
| 1016 | GAATTTCTACTGCCATGTAGAT |
| 1017 | CAATTTCTACTACTTCGTAGAT |
| 1018 | AAATTTCTACTCAGTCGTAGAT |
| 1019 | CAATTTCTCCTGTGAGGAGAT |
| 1020 | CAATTTCTACTGTGTGTAGAT |
| 1021 | CAATTTCTACTTCTGGTAGAT |
| 1022 | CAATTTCTACTACCCGGTAGAT |
| 1023 | CAATTTCTACTCGTGCGTAGAT |
| 1024 | CAATTTCTACTGGTGTAGAT |
| 1025 | CAATTAGCGGTCTTTTGCTT |
| 1026 | GAATTTCTACTTGGCGTAGAT |
| 1027 | CAATTTCTGCTAAGTGTAGAT |
| 1028 | GAATTTCTACTCTCGTGTAGAT |
| 1029 | CAATTTCTCCTAACAGGAGAT |
| 1030 | AAATTTCTACTGTGTGGTAGAT |
| 1031 | AAATTTCTACTAGCGAGTAGAT |
| 1032 | CAATTTCTACTATGCAGTAGAT |
| 1033 | CAATTTCTACTAAGGGGTAGAT |
| 1034 | CAATTTCTACTGCAGAGTAGAT |

| | |
|---|---|
| 1035 | GAATTTCTACTTAGTTGTAGAT |
| 1036 | CAATTTCTACTTACCGTAGAT |
| 1037 | CAATTTCTCCTACTGGGAGAT |
| 1038 | GAATTTCTACGAACTAGTAGAT |
| 1039 | CAATTTCTACTACAGTGTAGAT |
| 1040 | CAATTTCTACTGCTGTAGAT |
| 1041 | CAATTTCTACTACTGTAGAT |
| 1042 | CAATTTCTACTTAGAAGTAGAT |
| 1043 | AAATTTCTACTCAAGTGTAGAT |
| 1044 | CAATTTCTACTTTGGCGTAGAT |
| 1045 | AAATTTCTACTTGTGAGTAGAT |
| 1046 | GAATTTCTACTCCTACGTAGAT |
| 1047 | GAATTTCTACGCATGGTAGAT |
| 1048 | CAATTTCTCCTTCGTGGAGAT |
| 1049 | GAATTTCTCCTAAATGGAGAT |
| 1050 | GAATTTCTCCTACCGTGGAGAT |
| 1051 | CAATTTCTCCTGTTGTGGAGAT |
| 1052 | CAATTTCTCCTAGCAGGAGAT |
| 1053 | AAATTTCTACTGGCGAGTAGAT |
| 1054 | CAATTTCTACTGGATAGTAGAT |
| 1055 | CAATTTCTACTCTCTTGTAGAT |
| 1056 | CAATTTCTACTTAGTAGTAGAT |
| 1057 | CAATTTCTACTTCCGCGTAGAT |
| 1058 | CAATTTCTCCTACAAGGAGAT |
| 1059 | CAATTTCTACTTGTAGGTAGAT |
| 1060 | GAATTTCTACTGGGCTGTAGAT |
| 1061 | CAATTTCTACTCGTTCGTAGAT |
| 1062 | GAATTTCTACTACCCGTAGAT |
| 1063 | CAATTTCTACTAGCATGTAGAT |
| 1064 | CAATTTACCTTAAGTAGGTGT |
| 1065 | CAATTTCTACTCCGTGTAGAT |
| 1066 | CAATTCTGTTTCTTAACG GT |
| 1067 | GAATTTCTACGAGTAGTAGAT |
| 1068 | CAATTTCTACTAGTAGTAGAT |
| 1069 | CAATTTCTACTAACGCGTAGAT |
| 1070 | CAATTTCTACTGTCATGTAGAT |
| 1071 | CAATTTCTACTACACGTAGAT |
| 1072 | CAATTTCTACTATCGGTAGAT |
| 1073 | CAATTTCTACTGCTGTAGAT |
| 1074 | CAATTTCTACCTCTTGTAGAT |
| 1075 | CAATTTCTACTGCGACGTAGAT |
| 1076 | GAATTTCTACTAGGCTGTAGAT |
| 1077 | AAATTTCTACTAAACGTAGAT |
| 1078 | GAATTTCTCCTAGGGTGGAGAT |
| 1079 | CAATTTCTACTCTACCGTAGAT |
| 1080 | CAATTTCTACTTTCGTAGAT |
| 1081 | CAATTTCTACTCTCAGGTAGAT |
| 1082 | CAATTTCTACTGCGCTGTAGAT |
| 1083 | GAATTTCTACTCACGGGTAGAT |
| 1084 | CAATTTCTACTTAGGCGTAGAT |
| 1085 | CAATTTCTACCAGTTGTAGAT |
| 1086 | GAATTTCTACTATCGGGTAGAT |
| 1087 | CAATTTCTACTCCCGTAGAT |
| 1088 | CAATTTCTACTACGCAGTAGAT |
| 1089 | CAATTTCTACTTCATGTAGAT |
| 1090 | CAATTTCTCCTATAGTGGAGAT |
| 1091 | CAATTTCTCCTAGCCTGGAGAT |
| 1092 | GAATTTCTACTCATCCGTAGAT |
| 1093 | CAATTTCTACTCCCAAGTAGAT |
| 1094 | CAATTTCTCCTATCGGGGAGAT |
| 1095 | CAATTATGCGTCTTTGTGTT |
| 1096 | CAATTTCTACTCGTCCGTAGAT |
| 1097 | CAATTTCTACTCCTCGTAGAT |
| 1098 | CAATTTCTACTCCATTGTAGAT |
| 1099 | CAATTTCTACTCACGTAGAT |
| 1100 | CAATTTCTACTTATTCGTAGAT |
| 1101 | CAATTTCTACTTCTGAGTAGAT |
| 1102 | CAATTTCTCCTTAGCGGAGAT |
| 1103 | CAATTTCTACTGTTTGTAGAT |
| 1104 | CAATTTCTACTTATAGTAGAT |
| 1105 | AAATTTCTACTGCGTCGTAGAT |
| 1106 | CAATTTCTCCTACTTGGAGAT |
| 1107 | GAATTTCTCCTCTCTGGAGAT |
| 1108 | CAATTTCTACTCGTAAGTAGAT |
| 1109 | GAATTTCTACTTGGCGGTAGAT |
| 1110 | CAATTTCTACTGCCTTGTAGAT |
| 1111 | AAATTTCTCCTACCTGGAGAT |
| 1112 | AAATTTCTACTGCAAGTAGAT |
| 1113 | CAATTTCTACTGGGACGTAGAT |
| 1114 | CAATTTCTACTACAACGTAGAT |
| 1115 | CAATTTCTACTGCAGTGTAGAT |

-continued

| | |
|---|---|
| 1116 | CAATTTCTACTCCATCGTAGAT |
| 1117 | CAATTTCTACTGAAGGTAGAT |
| 1118 | CAATTTCTACTGTAGAGTAGAT |
| 1119 | AAATTTCTACTCACACGTAGAT |
| 1120 | CAATTTCTACTAGTCGTAGAT |
| 1121 | CAATTTCTCCTAAGGCGGAGAT |
| 1122 | GAATTTCTACTGCTCGTAGAT |
| 1123 | GAATTTCTACCAGTTGTAGAT |
| 1124 | CAATTTCTCCTATCGTGGAGAT |
| 1125 | CAATTTCTACTCTCGGTAGAT |
| 1126 | CAATTTCTCCTAAGACGGAGAT |
| 1127 | GAATTTCTCCTCGGTGGAGAT |
| 1128 | CAATTTCTACTTATGCGTAGAT |
| 1129 | CAATTTTGCCTAAGTGGCGAT |
| 1130 | CAATTTCTACGCAAAAGTAGAT |
| 1131 | CAATTTCTACTTGAAGGTAGAT |
| 1132 | CAATTTCTACTTGGTGTAGAT |
| 1133 | GAATTTCTACTGGAAGTAGAT |
| 1134 | CAATTTCTACTACCTTGTAGAT |
| 1135 | GAATTTCTACACCCTAGTAGAT |
| 1136 | GAATTTCTCCTTGTCGGGAGAT |
| 1137 | CAATTGGAGGTAAGTCCTCCT |
| 1138 | AAATTTCTACGCCGTGGTAGAT |
| 1139 | AAATTTCTACTTACTGGTAGAT |
| 1140 | CAATTTCTCCTGTTTGGAGAT |
| 1141 | CAATTTCTCCTAGGCGGAGAT |
| 1142 | AAATTTCTACTGATGGGTAGAT |
| 1143 | CAATTCCTCCTCTTGGAGGT |
| 1144 | CAATTTCTCCTAGCGAGGAGAT |
| 1145 | AAATTTCTACTGGCCGTAGAT |
| 1146 | CAATTTATGATAAGTTCGTAT |
| 1147 | GAATTTCTCCTACGGCGGAGAT |
| 1148 | AAATTTCTCCTGACGTGGAGAT |
| 1149 | CAATTTCTACTGACAAGTAGAT |
| 1150 | CAATTTGTCTTCTTAGGTGT |

| SEQ ID NO: | gRNA Sequence |
|---|---|
| 1151 | AAATTGTGCGTAAGTTGCGTT |
| 1152 | GAATTTCTACTTCGCGTAGAT |
| 1153 | CAATTTCTACTGGTAAGTAGAT |
| 1154 | CAATTTCTACTTGCAGTAGAT |

-continued

| | |
|---|---|
| 1155 | CAATTTCTACTTGCAAGTAGAT |
| 1156 | CAATTTCTACTGGAACGTAGAT |
| 1157 | CAATTTCTACTCCTTGGTAGAT |
| 1158 | CAATTTCTACGCACCCGTAGAT |
| 1159 | CAATTTCTACTGGATTGTAGAT |
| 1160 | GAATTTCTACTTCTCGGTAGAT |
| 1161 | CAATTTCTACTGTACGTAGAT |
| 1162 | CAATTTCTACTCTACTGTAGAT |
| 1163 | GAATTTCTACTCCACAGTAGAT |
| 1164 | CAATTTCTACTGAGAGGTAGAT |
| 1165 | CAATTTCTACTATAGGTAGAT |
| 1166 | CAATTGTGTATCTTTATGCT |
| 1167 | CAATTTCTACTCGAGAGTAGAT |
| 1168 | CAATTTCTACTGGCAGTAGAT |
| 1169 | CAATTTCTACTTACCCGTAGAT |
| 1170 | AAATTTCTACTCAAGGGTAGAT |
| 1171 | CAATTTCTACTCAAGGGTAGAT |
| 1172 | CAATTTCTACTTCTAGGTAGAT |
| 1173 | CAATTTCTACCAATTGTAGAT |
| 1174 | CAATTTCTACTCTCATGTAGAT |
| 1175 | AAATTTCTACTCAATGGTAGAT |
| 1176 | CAATTTCTACTGTGACGTAGAT |
| 1177 | CAATTTCTCCTACTGAGGAGAT |
| 1178 | CAATTTCTACTAAGGTAGAT |
| 1179 | CAATTTCTACTGCAAGGTAGAT |
| 1180 | CAATTATTCGTCTTTGAATT |
| 1181 | CAATTTCTACTACTCCGTAGAT |
| 1182 | CAATTTCTCCTAAGCTGGAGAT |
| 1183 | CAATTTCTACTTGATCGTAGAT |
| 1184 | GAATTTCTACTCTGTCGTAGAT |
| 1185 | CAATTTCTACTCCAGCGTAGAT |
| 1186 | GAATTTCTACGTAGGCGTAGAT |
| 1187 | CAATTTCTACTTCGAGGTAGAT |
| 1188 | GAATTTCTACTTCGGTGTAGAT |
| 1189 | CAATTTCTACTCCCGCGTAGAT |
| 1190 | CAATTTCTACTACTTGGTAGAT |
| 1191 | AAATTGCGTGTAAGTTACGCT |
| 1192 | AAATTGCGACTAAGTGTTGCT |
| 1193 | GAATTTCTACTCTCTGTAGAT |
| 1194 | CAATTTGCATTCTTGTGCAT |
| 1195 | CAATTTCTACCAACGGTAGAT |

-continued

| | |
|---|---|
| 1196 | GAATTTCTACTACGTGGTAGAT |
| 1197 | CAATTTCTACTAGCGCGTAGAT |
| 1198 | CAATTTCTACTGTGCCGTAGAT |
| 1199 | AAATTTCTCCACTAGTGGAGAT |
| 1200 | GAATTTCTACGGCAAGTAGAT |
| 1201 | AAATTTCTACCCTGATGTAGAT |
| 1202 | AAATTTCTCCTCGGTGGAGAT |
| 1203 | GAATTTCTACTGTTGGGTAGAT |
| 1204 | CAATTTCTACTGAGTGTAGAT |
| 1205 | GAATTTCTACTTTTGTGTAGAT |
| 1206 | GAATTTCTCCTACATCGGAGAT |
| 1207 | CAATTCCTTATAAGTTGAGGT |
| 1208 | CAATTGGACGTAAGTTGTCTT |
| 1209 | GAATTTCTACTTCCCAGTAGAT |
| 1210 | CAATTTCTACTGACCGTAGAT |
| 1211 | CAATTTCTACTCGGAGTAGAT |
| 1212 | AAATTTCTACTGCGGTAGAT |
| 1213 | CAATTTCTCCTATTCTGGAGAT |
| 1214 | CAATTTCTACTCCGTGGTAGAT |
| 1215 | GAATTTCTACAATCCGTAGAT |
| 1216 | CAATTTCTACTTCTGTAGAT |
| 1217 | GAATTTCTACTCTGCGGTAGAT |
| 1218 | GAATTTCTCCTCCGTGGAGAT |
| 1219 | GAATTTCTCCTATGGGGAGAT |
| 1220 | CAATTAGTTGTAAGTCAGTTT |
| 1221 | GAATTTCTACTCCGATGTAGAT |
| 1222 | CAATTTCTACTCTGCGGTAGAT |
| 1223 | CAATTTCTACACGCTGTAGAT |
| 1224 | GAATTTCTACCTCCCGTAGAT |
| 1225 | AAATTTCTACTCGAGGGTAGAT |
| 1226 | GAATTGGCTTTAAGTAGGTCT |
| 1227 | CAATTGCTAGTCTTTTGGTT |
| 1228 | GAATTTCTACTGCGGAGTAGAT |
| 1229 | CAATTTCTACTCATCTGTAGAT |
| 1230 | CAATTTCTACTGCAGTAGAT |
| 1231 | GAATTTCTCCTATTTCGGAGAT |
| 1232 | GAATTTCTACTGCGGGGTAGAT |
| 1233 | CAATTTCTACTAAAGGGTAGAT |
| 1234 | CAATTTCTACTCTCCAGTAGAT |
| 1235 | GAATTTCTACCATTTCGGAGAT |
| 1236 | GAATTTCTCCTGCGAGGAGAT |
| 1237 | CAATTTCTACTACCGTAGAT |
| 1238 | CAATTTCTACTTCCATGTAGAT |
| 1239 | CAATTTCTACTTCCCCGTAGAT |
| 1240 | CAATTGACTGTAAGTTAGTTT |
| 1241 | AAATTTCTACGGAAATGTAGAT |
| 1242 | CAATTTCTACAACATGGTAGAT |
| 1243 | CAATTTCTACTGGAGTAGAT |
| 1244 | GAATTTCTCCTACGCTGGAGAT |
| 1245 | GAATTTCTACTACAAGTAGAT |
| 1246 | CAATTTCTACTCTAGGTAGAT |
| 1247 | GAATTTCTACTCATAGGTAGAT |
| 1248 | GAATTTCTACTGATAGGTAGAT |
| 1249 | CAATTTCTACCTCAGGTAGAT |
| 1250 | CAATTTCTACTCTAGCGTAGAT |
| 1251 | CAATTTCTACTCGAAGTAGAT |
| 1252 | AAATTTCTCCTACTGCGGAGAT |
| 1253 | CAATTTCTACTCTTAAGTAGAT |
| 1254 | CAATTTCTACTTTAGGGTAGAT |
| 1255 | CAATTTCTACTCCACGGTAGAT |
| 1256 | CAATTTCTACTGGTTGTAGAT |
| 1257 | CAATTTCTACTGACATGTAGAT |
| 1258 | CAATTTCTACTTTGAGTAGAT |
| 1259 | CAATTTCTACTTGAGTAGAT |
| 1260 | CAATTTCTCCTTTGAGGAGAT |
| 1261 | CAATTTCTACTCCGTTGTAGAT |
| 1262 | GAATTGGTGTAAGTTGCCAT |
| 1263 | CAATTTCTACTAGAGGTAGAT |
| 1264 | CAATTTCTACTGATAGGTAGAT |
| 1265 | CAATTTCTACTTCATCGTAGAT |
| 1266 | GAATTTCTACTGGTGTAGAT |
| 1267 | CAATTTCTACTGCCGGGTAGAT |
| 1268 | GAATTTCTACGCATTAGTAGAT |
| 1269 | CAATTTCTCCCAGCCGGGAGAT |
| 1270 | CAATTTCTACTCAATGGTAGAT |
| 1271 | CAATTTCTCCTAATTCGGAGAT |
| 1272 | CAATTTCTACTAGTATGTAGAT |
| 1273 | GAATTTCTACTCGCGCGTAGAT |
| 1274 | CAATTTCTACAGTAAGTAGAT |
| 1275 | CAATTTCTACTGAGCTGTAGAT |
| 1276 | AAATTTGACCTAAGTGGTCGT |

-continued

| | |
|---|---|
| 1277 | CAATTGTACTTAAGTAGTATT |
| 1278 | CAATTTCTACTAGCCCGTAGAT |
| 1279 | CAATTTCTACTCGCTCGTAGAT |
| 1280 | GAATTTCTACTGGATGTAGAT |
| 1281 | CAATTTCTACTCGGTGGTAGAT |
| 1282 | GAATTTGTCGTCTTCGACGT |
| 1283 | GAATTTCTACTCCCACGTAGAT |
| 1284 | GAATTTCTCCTAGCGCGGAGAT |
| 1285 | GAATTTCTACTGGTAGGTAGAT |
| 1286 | GAATTTCTACTAGTGCGTAGAT |
| 1287 | CAATTTCTACTCCTCAGTAGAT |
| 1288 | GAATTTCTACTCCATGTAGAT |
| 1289 | GAATTGCCTATAAGTTAGGCT |
| 1290 | CAATTTCTACTGGGCTGTAGAT |
| 1291 | CAATTAGTGATCTTTTGTTT |
| 1292 | CAATTTCTCCTATGCGGAGAT |
| 1293 | CAATTTTAGGTCTTCTTAGT |
| 1294 | CAATTTCTACTGGTGTGTAGAT |
| 263 | CAATTTGTGATCTTTCGTAT |
| 1295 | CAATTTCTACTCCTCGGTAGAT |
| 1296 | CAATTTCTACTCCTACGTAGAT |
| 1297 | CAATTTCTACTTTGTCGTAGAT |
| 1298 | GAATTTCTACTTGGTCGTAGAT |
| 1299 | GAATTTCTCCGTAAGAGGAGAT |
| 1300 | CAATTGTGCTTCTTAGTACT |
| 1301 | AAATTTCTACTCTGGCGTAGAT |
| 1302 | CAATTTCTCCTAGTGCGGAGAT |
| 1303 | GAATTTCTACTTAACCGTAGAT |
| 1304 | CAATTTCTACTGACGTGTAGAT |
| 1305 | CAATTGGGCGTCTTCGTCCT |
| 1306 | CAATTTCTACTCGTTGTAGAT |
| 1307 | CAATTTCTACCATTAGTAGAT |
| 1308 | CAATTTCTACCACTTGTAGAT |
| 1309 | CAATTTCTACTAGCGGTAGAT |
| 1310 | CAATTTCTACTATAACGTAGAT |
| 1311 | CAATTCCGCTTCTTAGTGGT |
| 1312 | CAATTTCTACTCGGACGTAGAT |
| 1313 | CAATTTCTACTATGAAGTAGAT |
| 1314 | CAATTTAAGCTCTTGTTTGT |
| 1315 | AAATTTCTCCCTTGCGGGAGAT |
| 1316 | GAATTTCTCCTCCTAGGAGAT |
| 1317 | GAATTTCTACAGTGGCGTAGAT |
| 1318 | CAATTTCTACTCCAGAGTAGAT |
| 1319 | GAATTTCTACTCGGTGGTAGAT |
| 1320 | CAATTTCTACTTCGTTGTAGAT |
| 1321 | CAATTTCTACTAACCAGTAGAT |
| 1322 | CAATTTCTACTCCCTGGTAGAT |
| 1323 | CAATTTCTCCTGAAGGGAGAT |
| 1324 | CAATTTCTACTACACGGTAGAT |
| 1325 | CAATTTCTACTCCTCTGTAGAT |
| 1326 | AAATTTCTACCGCAATGTAGAT |
| 1327 | CAATTTCTACTTCACTGTAGAT |
| 1328 | CAATTTCTACTTGCCGTAGAT |
| 1329 | CAATTTCTACTGTATTGTAGAT |
| 1330 | CAATTTCTACTCAGTGTAGAT |
| 1331 | CAATTTCTACTAATTAGTAGAT |
| 1332 | CAATTTCTACTTAGTCGTAGAT |
| 1333 | GAATTG CTCATCTTTGGGCT |
| 1334 | CAATTTCTACATAGGAGTAGAT |
| 1335 | GAATTTCTACAATAGGGTAGAT |
| 1336 | CAATTTCTACTACTGTGTAGAT |
| 1337 | GAATTTCTACTAAGCGGTAGAT |
| 1338 | CAATTTCTACTCACAGTAGAT |
| 1339 | AAATTTCTACTTTGAGGTAGAT |
| 1340 | CAATTTCTCCTACTGGGAGAT |
| 1341 | GAATTTCTACTGACCGTAGAT |
| 1342 | CAATTTCTACTTTAAGTAGAT |
| 1343 | CAATTTCTACTATTAGGTAGAT |
| 1344 | CAATTTCTACTAAAGTAGAT |
| 1345 | CAATTTCTACTTTGGTAGAT |
| 1346 | CAATTTCTACTAAAAGGTAGAT |
| 1347 | AAATTGCGCGTAAGTTGTGTT |
| 1348 | CAATTTCTACTTGTCAGTAGAT |
| 1349 | CAATTTCTACTGCCTCGTAGAT |
| 1350 | CAATTTCTACTAACAGGTAGAT |
| 1351 | CAATTTCTACTAGGTCGTAGAT |
| 1352 | CAATTTCTACTTCTCGGTAGAT |
| 1353 | CAATTTCTCCTAAGGGGAGAT |
| 1354 | GAATTTCTACCGATCGGTAGAT |
| 1355 | CAATTTCTCCTAGGTGGAGAT |
| 1356 | CAATTTCTACTCTAGAGTAGAT |

| | |
|---|---|
| 1357 | GAATTTCTACATACGTAGAT |
| 1358 | CAATTTCTACTCCCAGGTAGAT |
| 1359 | CAATTTCTACTGCCTGTAGAT |
| 1360 | GAATTTCTCCTACACTGGAGAT |
| 1361 | CAATTCTGTTTCTTAACAGT |
| 1362 | CAATTTCTACTTCGAGTAGAT |
| 1363 | CAATTTCTCCTACCTCGGAGAT |
| 1364 | CAATTGGTGCTAAGTGTGCTT |
| 1365 | CAATTTCTCCCGAAGGAGAT |
| 1366 | CAATTTCTACTGATGGGTAGAT |
| 1367 | CAATTTCTACTCGTACGTAGAT |
| 1368 | AAATTTCTACCAACATGTAGAT |
| 1369 | CAATTTCTACTGAGTCGTAGAT |
| 1370 | CAATTTCTACTACATCGTAGAT |
| 1371 | CAATTTCTACTTCCGAGTAGAT |
| 1372 | GAATTTCTACTCCCGTAGAT |
| 1373 | CAATTTCTACCAGTGGTAGAT |
| 1374 | CAATTTCTACTGCGCCGTAGAT |
| 1375 | GAATTTCTCCTTCAGGAGAT |
| 1376 | CAATTTCTACTTTATGTAGAT |
| 1377 | GAATTTCTACTCCGGTAGAT |
| 1378 | GAATTTCTACTCGCCGGTAGAT |
| 1379 | CAATTTCTACTGGGAGTAGAT |
| 1380 | GAATTTCTACACTCGAGTAGAT |
| 1381 | CAATTGGCAATCTTTTGCTT |
| 1382 | CAATTTCTACTAAGTTGTAGAT |
| 1383 | CAATTTCTCCTTCTGTGGAGAT |
| 1384 | CAATTTCTACTCTACGTAGAT |
| 1385 | GAATTTCTACTGCAGCGTAGAT |
| 1386 | AAATTTCTACCACGCGTAGAT |
| 1387 | AAATTTCTACCGCCTTGTAGAT |
| 1388 | GAATTTCTACGTCCGTGTAGAT |
| 1389 | GAATTTCTACTCTTGGTAGAT |
| 1390 | CAATTTCTACTTACGGTAGAT |
| 1391 | GAATTTCTACCATTGCGTAGAT |
| 1392 | GAATTTCTCCTACCATGGAGAT |
| 1393 | GAATTTCTACTGCAACGTAGAT |
| 1394 | CAATTTCTACTAAGGCGTAGAT |
| 1395 | CAATTTCTCCTATGTGGAGAT |
| 1396 | GAATTTCTACTTCAGCGTAGAT |
| 1397 | CAATTTCTACTTTTCGTAGAT |
| 1398 | CAATTTCGCCTAAGTGGCGAT |
| 1399 | CAATTTCTACTTGTATGTAGAT |
| 1400 | CAATTTCTACTATTCGTAGAT |
| 1401 | CAATTTCTACTGAGCCGTAGAT |
| 1402 | CAATTTCTCCTAAACTGGAGAT |
| 1403 | CAATTTCTCCAAGGCAGGAGAT |
| 1404 | AAATTTCTCCTACGTAGGAGAT |
| 1405 | CAATTTCTACTGCGAGTAGAT |
| 1406 | CAATTCCTAATAAGTTTAGGT |
| 1407 | GAATTCGTGTTCTTATGTGT |
| 1408 | AAATTTCTACGTTGCTGTAGAT |
| 1409 | CAATTTCTACCTCTCGTAGAT |
| 1410 | CAATTGAGTTTCTTAGTTCT |
| 1411 | CAATTTCTCCTAGCGGGAGAT |
| 1412 | CAATTTCTACTTTGAGGTAGAT |
| 1413 | GAATTTCTACTATTGAGTAGAT |
| 1414 | CAATTTCTACTTCAAGGTAGAT |
| 1415 | CAATTTCTACTGAGGAGTAGAT |
| 1416 | CAATTTCTACTGGAGGGTAGAT |
| 1417 | CAATTTCTACTTGGGTGTAGAT |
| 1418 | CAATTTCTACTGTTACGTAGAT |
| 1419 | AAATTTCTACCTCCAGTAGAT |
| 1420 | CAATTGGGACTAAGTGTTTTT |
| 1421 | CAATTTCTCCTTCGAGGAGAT |
| 1422 | CAATTTCTACTGGCCTGTAGAT |
| 1423 | CAATTTCTACGATTCAGTAGAT |
| 1424 | CAATTTCTACAATGCGTAGAT |
| 1425 | CAATTTCGCATCTTTGCGGT |
| 1426 | CAATTTCTCCGTCGTGGGAGAT |
| 1427 | CAATTTCTACTTTCCAGTAGAT |
| 1428 | CAATTTCTACTGATCCGTAGAT |
| 1429 | CAATTTCTACTACGGAGTAGAT |
| 1430 | AAATTTCTACCGCTTGTAGAT |
| 1431 | GAATTTCTACTGTGAGGTAGAT |
| 1432 | CAATTTCTCCTTTTGTGGAGAT |
| 1433 | GAATTTCTACTACGGTAGAT |
| 1434 | GAATTTCTACTGTGTCGTAGAT |
| 1435 | CAATTTCTCCTAGTTCGGAGAT |
| 1436 | CAATTTCTACTCCTGTGTAGAT |
| 1437 | GAATTTCTACTTGAACGTAGAT |

| | |
|---|---|
| 1438 | CAATTGATGATCTTTCATCT |
| 1439 | CAATTTCTACTGGTACGTAGAT |
| 1440 | AAATTTCTACTCATCCGTAGAT |
| 1441 | CAATTTCTGCTAAGTGCAGAT |
| 1442 | CAATTCAGGTTCTTATTTGT |
| 1443 | GAATTTCTACTACGCAGTAGAT |
| 1444 | GAATTGCGTTTCTTGGCGCT |
| 1445 | CAATTTCTCCTATTTTGGAGAT |
| 1446 | GAATTTCTACGCACAGGTAGAT |
| 1447 | CAATTTCTACTGAAGCGTAGAT |
| 1448 | GAATTTCTACTAACACGTAGAT |
| 1449 | CAATTAGGTATCTTTACCTT |
| 1450 | CAATTGGGTGTAAGTTGCCTT |
| 1451 | CAATTTCTACTGCAGGGTAGAT |
| 1452 | CAATTTCTACTCGCGCGTAGAT |
| 1453 | GAATTTCTACTGGATGGTAGAT |
| 1454 | CAATTCCATGTAAGTTATGGT |
| 1455 | CAATTTCTACTCCTGTAGAT |
| 1456 | CAATTTCTACTATTGTGTAGAT |
| 1457 | CAATTTCGGGTAAGTTTCGGT |
| 1458 | CAATTTCTACTTCAGTGTAGAT |
| 1459 | CAATTTCTACTCTGGGTAGAT |
| 1460 | CAATTTCTACTACTCAGTAGAT |
| 1461 | CAATTTCTACCTCATGTAGAT |
| 1462 | CAATTTCTACTGGTGAGTAGAT |
| 1463 | CAATTTCTACTGTCTGGTAGAT |
| 1464 | CAATTTCTACTCTGTGTAGAT |
| 1465 | CAATTTCTACTCAGTTGTAGAT |
| 1466 | CAATTTCCGTTCTTGCGGAT |
| 1467 | CAATTTCTACTGTAGCGTAGAT |
| 1468 | AAATTTCTACTCTACGTAGAT |
| 1469 | GAATTTCTCCTATATGGAGAT |
| 1470 | CAATTTCTACTGGCGGGTAGAT |
| 1471 | AAATTTCTACTCACCTGTAGAT |
| 1472 | CAATTTCTACTTTCGTGTAGAT |
| 1473 | CAATTTCTACTACAAGGTAGAT |
| 1474 | CAATTACGTGTCTTTGTGTT |
| 1475 | GAATTTCTACTCCAACGTAGAT |
| 1476 | GAATTTCTACTATGAGGTAGAT |
| 1477 | GAATTTCTCCTACGAGGAGAT |
| 1478 | CAATTGAGTTTCTTGATTCT |
| 1479 | CAATTTCTACTCTGGTAGAT |
| 1480 | CAATTTCTACAACCGCGTAGAT |
| 1481 | GAATTTCTACTTGTCGTAGAT |
| 1482 | CAATTGATTATAAGTTAGTCT |
| 80 | CAATTTCTCCTCTTGGAGAT |
| 1483 | CAATTTCTACTCTGACGTAGAT |
| 1484 | CAATTTCTACTGATTCGTAGAT |
| 1485 | CAATTTCTACTCGTTAGTAGAT |
| 1486 | CAATTCGGATTAAGTGTCCGT |
| 1487 | AAATTATGTGTCTTCACGTT |
| 1488 | GAATTTCTACTGTCCGGTAGAT |
| 1489 | GAATTTCTACTTTCCCGTAGAT |
| 1490 | CAATTGTTTGTCTTCGAACT |
| 1491 | AAATTTCTACATAATGTAGAT |
| 1492 | CAATTTCTCCTACTCGGAGAT |
| 1493 | CAATTTCTCCTAAAAGGAGAT |
| 1494 | GAATTTCTACTGACGCGTAGAT |
| 1495 | GAATTTCTACCATCAGTAGAT |
| 1496 | GAATTTCTACTCATTCGTAGAT |
| 1497 | CAATTTCTCCTAAGCGGAGAT |
| 1498 | CAATTTCTACTCTTAGTAGAT |
| 1499 | CAATTTCTCCTAACGTGGAGAT |
| 1500 | CAATTTCTACTCACTCGTAGAT |
| 1501 | GAATTTCTCCTGTCCTGGAGAT |
| 1502 | CAATTTCTACCAACATGTAGAT |
| 1503 | CAATTGTGTGTAAGTCGTGCT |
| 1504 | GAATTTCTACTCAATGTAGAT |
| 1505 | CAATTTCTACTACGGTAGAT |
| 1506 | GAATTTCTACTGAGGTAGAT |
| 1507 | GAATTGGGAGTCTTCTCCCT |
| 1508 | CAATTTCTCCTAGGCTGGAGAT |
| 1509 | CAATTAGTTTCTTGACTGT |
| 1510 | CAATTTCTCCTATTCGGAGAT |
| 1511 | AAATTTGACGTCTTCGTTGT |
| 1512 | CAATTTCTCCTATTGGGAGAT |
| 1513 | CAATTTCTACTTGACTGTAGAT |
| 1514 | GAATTTCTACTCGTTAGTAGAT |
| 1515 | CAATTTCTACTTTACGGTAGAT |
| 1516 | CAATTGTGTGTAAGTCACACT |
| 1517 | CAATTTCTACTTTCGGGTAGAT |

| | |
|---|---|
| 1518 | CAATTTCTACTAGCTCGTAGAT |
| 1519 | CAATTTCTACTTACTGTAGAT |
| 1520 | CAATTTCTACTCGCTGTAGAT |
| 1521 | CAATTGGATCTCTTGATCTT |
| 1522 | CAATTTCTACGGAAGTGTAGAT |
| 1523 | AAATTTCTCCTATTGGGAGAT |
| 1524 | CAATTTCTACTCAGCAGTAGAT |
| 1525 | CAATTTCTACTCATAGTAGAT |
| 1526 | CAATTTCTACAGACCTGTAGAT |
| 1527 | CAATTTCTACTGACGGTAGAT |
| 1528 | CAATTTCTACTGACCAGTAGAT |
| 1529 | CAATTTCTACTCGTGTAGAT |
| 1530 | CAATTTCTACTCAGAAGTAGAT |
| 1531 | CAATTTCTACTATCATGTAGAT |
| 1532 | CAATTTCTACCTAATCGTAGAT |
| 1533 | CAATTTCTACGAACCTGTAGAT |
| 1534 | GAATTTCTACTGCCCCGTAGAT |
| 1535 | CAATTTCTACTCAACAGTAGAT |
| 1536 | CAATTTCTCCTACGGGAGAT |
| 1537 | CAATTTCTACTGTTCGGTAGAT |
| 1538 | AAATTTCTCCTACAAGGAGAT |
| 1539 | GAATTTCTACTCTCCTGTAGAT |
| 1540 | CAATTTCTACTCTCGTGTAGAT |
| 1541 | GAATTTCTCCCCGAGGGAGAT |
| 1542 | CAATTTCTCCTCGGCGGAGAT |
| 1543 | GAATTTCTACTGCCCGGTAGAT |
| 1544 | GAATTTCTACTGCGCGGTAGAT |
| 1545 | CAATTGAGGTTAAGTGTTTCT |
| 1546 | CAATTTCTACTTCGTCGTAGAT |
| 1547 | CAATTAATTGTAAGTCGATTT |
| 1548 | AAATTTCTCCACGCAGGAGAT |
| 1549 | GAATTTCTACTCCTAGTAGAT |
| 1550 | CAATTTCTCCTACCCGGGAGAT |
| 1551 | GAATTTCTACCTACTGTAGAT |
| 1552 | CAATTTCTCCTACTTCGGAGAT |
| 1553 | CAATTTCTACTGACCCGTAGAT |
| 1554 | CAATTTCTACAGCAGAGTAGAT |
| 1555 | GAATTTCTACCACAGAGTAGAT |
| 1556 | CAATTTCTACCATGGCGTAGAT |
| 1557 | GAATTTCTACTATGGTAGAT |
| 1558 | GAATTCGACTTAAGTGGTCGT |
| 1559 | GAATTGCGGTTCTTGTCGCT |
| 1560 | CAATTTCTACTACAGAGTAGAT |
| 1561 | GAATTTCTCCTAGGGAGGAGAT |
| 1562 | GAATTGTCGTTCTTGTGGCT |
| 1563 | CAATTTCTACTTTATGGTAGAT |
| 1564 | CAATTGTGGTTCTTATTATT |
| 1565 | GAATTTCTACTAGCTGGTAGAT |
| 1566 | AAATTGGGCGTCTTCGTCTT |
| 1567 | CAATTTCTACTATCCTGTAGAT |
| 1568 | CAATTTCTACACTTCGTAGAT |
| 1569 | CAATTTCTACAATTGGGTAGAT |
| 1570 | CAATTTCTACTGAGGGTAGAT |
| 1571 | CAATTAGGTCTAAGTGGCCTT |
| 1572 | CAATTTCTACCAGGTGTAGAT |
| 1573 | GAATTTCTACAAAGCGGTAGAT |
| 1574 | CAATTCATGTTAAGTGCGTGT |
| 1575 | GAATTTCTACAAGTGTGTAGAT |
| 1576 | CAATTTCTACCTACAGTAGAT |
| 1577 | CAATTTCTCCGGAGAAGGAGAT |
| 1578 | CAATTTCTACTAGTTCGTAGAT |
| 1579 | GAATTACCTGTCTTCGGGTT |
| 1580 | CAATTATTTGTAAGTCGGATT |
| 1581 | GAATTTCTACTATAGCGTAGAT |
| 1582 | GAATTTCTCCTAACCTGGAGAT |
| 1583 | GAATTTCTACTACTCGGTAGAT |
| 1584 | CAATTTCTACTCACAGGTAGAT |
| 1585 | CAATTTCTACTATTGTAGAT |
| 1586 | CAATTTCTACTCTTCGGTAGAT |
| 1587 | CAATTTCTACTCACATGTAGAT |
| 1588 | CAATTTCTACTAAAAGTAGAT |
| 1589 | CAATTTCTACTCAGCCGTAGAT |
| 1590 | GAATTTCTCCTAATTGGAGAT |
| 1591 | CAATTTCTCCTATTAGGAGAT |
| 1592 | GAATTTCTACCCATCGTAGAT |
| 531 | CAATTGGTGTTAAGTGTACTT |
| 1593 | CAATTTCTACAACAGGTAGAT |
| 1594 | CAATTACGTCTCTTGACGTT |
| 1595 | CAATTTCTACCGCGGCGTAGAT |
| 1596 | GAATTTGCGATAAGTTTGTGT |
| 1597 | CAATTATTCGTAAGTTGAGTT |

| | |
|---|---|
| 1598 | CAATTTCTACATGGTGTAGAT |
| 1599 | GAATTTCTACCGCACGTAGAT |
| 1600 | CAATTTCTACTGGCTGTAGAT |
| 1601 | AAATTTCTCCTAAGTTGGAGAT |
| 1602 | CAATTGTACATCTTTGTATT |
| 1603 | CAATTTTCGTAAGTTGGGAT |
| 1604 | CAATTGGCTGTAAGTTGGCTT |
| 1605 | CAATTTCTACCGTTCGTAGAT |
| 1606 | CAATTGTGGATAAGTTTCGTT |
| 1607 | CAATTGTTGATAAGTTCAACT |
| 1608 | CAATTTCTACTCACAAGTAGAT |
| 1609 | CAATTTCTACCCAAGGTAGAT |
| 1610 | GAATTTCTCCATGAAGGGAGAT |
| 1611 | CAATTTCTACTCTAGTGTAGAT |
| 1612 | CAATTTTTGCTCTTGCAAAT |
| 1613 | CAATTAAGGCTCTTGCCTTT |
| 1614 | CAATTCTGTGTCTTTGTAGT |
| 1615 | CAATTTCTACTTATGTGTAGAT |
| 1616 | GAATTTCTCCACTCGGGAGAT |
| 1617 | CAATTTCTCCTGTTGGAGAT |
| 1618 | CAATTTCTACGATTTGGTAGAT |
| 1619 | CAATTTCTCCTTCGCGGAGAT |
| 1620 | AAATTTCTACCATCTTGTAGAT |
| 1621 | CAATTCCGCCTCTTGGCGGT |
| 1622 | CAATTTCTCCTAGGTTGGAGAT |
| 1623 | CAATTGTTTTTAAGTGAAGCT |
| 1624 | CAATTTCTACTGTCAGTAGAT |
| 1625 | CAATTTCTCCTACCAGGAGAT |
| 1626 | GAATTTCTACTTCCACGTAGAT |
| 1627 | GAATTTCTCCTTTGTGGAGAT |
| 1628 | CAATTTCTACTCATGTAGAT |
| 1629 | GAATTTCTACCCGGGCGTAGAT |
| 1630 | CAATTCGAACTAAGTGTTTGT |
| 1631 | CAATTTCTACTACCTAGTAGAT |
| 1632 | CAATTTCTACTGGCTCGTAGAT |
| 1633 | GAATTTCTACAAAGTTGTAGAT |
| 1634 | GAATTTCTACAGAGCAGTAGAT |
| 1635 | GAATTTCTACTGGCCGGTAGAT |
| 1636 | CAATTAGTGCTCTTGCGTTT |
| 1637 | GAATTTCTACTCCCGGTAGAT |
| 1638 | CAATTTCTACTAGAAAGTAGAT |
| 1639 | CAATTTCTACTGCAAGTAGAT |
| 1640 | CAATTTCTACGCTACGTAGAT |
| 1641 | CAATTTTCGATCTTTCGAGT |
| 1642 | GAATTTCTCCTTGTGTGGAGAT |
| 1643 | GAATTTCTACTTGTCTGTAGAT |
| 1644 | CAATTTCTACCATAAGTAGAT |
| 1645 | AAATTTCTCCTAAGAGGAGAT |
| 1646 | CAATTTCTACTGATGTAGAT |
| 1647 | CAATTTCTACATAATGGTAGAT |
| 1648 | CAATTTCTACTGCGCGGTAGAT |
| 1649 | GAATTTCTACCGTCCGTAGAT |
| 1650 | CAATTTCTACTACTAGTAGAT |
| 1651 | CAATTTCTACTACTTGTAGAT |
| 1652 | CAATTTCTACTGTACCGTAGAT |
| 1653 | CAATTTCTCCCGAAGTGGAGAT |
| 1654 | CAATTTTCAGTCTTCTGGAT |
| 1655 | AAATTTCTACTAAGTGTGGAT |
| 1656 | CAATTCTCCTTTCCGGAGAT |
| 1657 | CAATTGTTTATCTTTGGGCT |
| 1658 | GAATTTCTACACAACGTAGAT |
| 1659 | CAATTTAGTGTAAGTTGTTAT |
| 1660 | CAATTGCTAATCTTTTGGTT |
| 1661 | CAATTTCTACTGTCTAGTAGAT |
| 1662 | GAATTTCTACTATACGTAGAT |
| 1663 | CAATTTCTACGCCTAGGTAGAT |
| 1664 | CAATTTCTCCTTGTGCGGAGAT |
| 1665 | CAATTTCTACGCCGCGTAGAT |
| 1666 | CAATTTCTACGCCGTGTAGAT |
| 1667 | GAATTTCTACCCTGATGTAGAT |
| 1668 | CAATTTCTACTATGTCGTAGAT |
| 1669 | CAATTTCTACTTAGATGTAGAT |
| 1670 | CAATTTCTACTGCCGTAGAT |
| 1671 | CAATTGTTTATCTTTAGGCT |
| 1672 | CAATTGCCCATAAGTTGGGTT |
| 1673 | CAATTTTCGCTAAGTGCGGGT |
| 1674 | GAATTTCTACTCTGTGTAGAT |
| 1675 | CAATTTCTACTAGCCGTAGAT |
| 1676 | CAATTCCCGATCTTTCGGGT |
| 1677 | GAATTCGGTCTAAGTGGCCGT |
| 1678 | CAATTTCTACTGTAAGTAGAT |

-continued

| SEQ ID NO | gRNA Sequence |
|---|---|
| 1679 | CAATTTCTACTGTAGGTAGAT |
| 1680 | CAATTTCTACTTGTGTGTAGAT |
| 1681 | GAATTTCTCCTCGAATGGAGAT |
| 1682 | GAATTTCTACATGCCAGTAGAT |
| 1683 | CAATTTCTACCCTGTGGTAGAT |
| 1684 | CAATTTCTACTGCTCAGTAGAT |
| 1685 | AAATTTGCTGTAAGTCGGCGT |
| 1686 | CAATTTCTACTCCTGGTAGAT |
| 1687 | AAATTTCTACGCGTTGGTAGAT |
| 1688 | CAATTTCTACTCCCACGTAGAT |
| 1689 | CAATTCGCCTTCTTGGGCGT |
| 1690 | GAATTTCTACTCCCTAGTAGAT |
| 1691 | GAATTGCCGTTAAGTGCGGCT |
| 1692 | CAATTTTCCTTCTTAGGGGT |
| 1693 | CAATTCTGCGTCTTTGTGGT |
| 1694 | CAATTTCTACTAGGGAGTAGAT |
| 1695 | CAATTGGGTGTAAGTTATCTT |
| 1696 | CAATTTCTACTCTCCTGTAGAT |
| 1697 | GAATTGGTCTTCTTGGATCT |
| 1698 | CAATTTCTACTCGTTGGTAGAT |
| 1699 | CAATTTCTCCTTTGCGGAGAT |
| 1700 | CAATTTCTACTCCCCGGTAGAT |
| 1701 | CAATTGTAATTAAGTATTACT |
| 1702 | CAATTTCTACTCTTCCGTAGAT |
| 1703 | GAATTTGGCGTAAGTCGCCAT |
| 1704 | CAATTTCTACTCCAAGGTAGAT |
| 1705 | CAATTAGTCTTCTTGGATTT |
| 1706 | CAATTTCTACACTCGTGTAGAT |
| 1707 | GAATTTCTACTATGGCGTAGAT |
| 1708 | CAATTTCTCCTGGCATGGAGAT |
| 1709 | CAATTTCTCCACAACGGGAGAT |
| 1710 | CAATTTCTCCTCAAGCGGAGAT |
| 1711 | CAATTTCTCCTATAAGGAGAT |
| 1712 | CAATTTCTACTCGGGCGTAGAT |
| 1713 | CAATTGGCAGTAAGTTTGTCT |
| 1714 | CAATTTCTACTTATATGTAGAT |
| 1715 | CAATTTCTCCTTCCGTGGAGAT |
| 1716 | CAATTTCTACTCTCTCGTAGAT |
| 1717 | GAATTTCTCCACAGAAGGAGAT |
| 1718 | CAATTTCTACTGCAAAGTAGAT |
| 1719 | GAATTTCTCCTAGCGTGGAGAT |
| 1720 | CAATTTCTACTGCTGCGTAGAT |
| 1721 | CAATTTCTACTCGCAGTAGAT |
| 1722 | CAATTTCTACAGGTGGTAGAT |
| 1723 | CAATTTCTCCTATCCTGGAGAT |
| 1724 | CAATTTCTACTCGTGTGTAGAT |
| 1725 | CAATTTCTACTGAGGTAGAT |
| 1726 | GAATTTCTACCTCGTGTAGAT |
| 1727 | GAATTTCTACCCCTGGGTAGAT |
| 1728 | CAATTTCTACTTTTGGTAGAT |
| 1729 | GAATTGCTCGTCTTCGGGCT |

TABLE 4

WT_as provides identified gRNA sequences that bind AsCas12a (wild type) protein.

| SEQ ID NO | gRNA Sequence |
|---|---|
| 1730 | GAATTTCTACTGTACTGTAGAT |
| 1731 | AAATTTCTACTACCACGTAGAT |
| 1732 | GAATTTCTACTCTTGTAGAT |
| 1733 | CAATTTCTACTAGAAGTAGAT |
| 1734 | AAATTTCTACTCTCGTAGAT |
| 1735 | CAATTTCTACTAGAGTAGAT |
| 1736 | GAATTTCTACTACGGAGTAGAT |
| 1737 | GAATTTCTACTAGATCGTAGAT |
| 1738 | GAATTTTCGTTCTTACGGAT |
| 1739 | CAATTCACTGTAAGTTGGTGT |
| 77 | CAATTTCTACTCTTGTAGAT |
| 1740 | GAATTTCTACTAGTGTAGAT |
| 1741 | GAATTTCTACTTATACGTAGAT |
| 1742 | GAATTTCTACTTACAGTAGAT |
| 1743 | AAATTTCTCCATCCCGGAGAT |
| 1744 | CAATTAGTATTCTTATACTT |
| 1745 | CAATTTCTCCTATTGGAGAT |
| 1746 | GAATTTCTACTAATAAGTAGAT |
| 93 | AAATTCGATCTAAGTGATCGT |
| 1747 | GAATTAGTGGTCTTCCGCTT |
| 1748 | GAATTTCTACTTCCATGTAGAT |
| 1749 | GAATTTCTACTGTAGCGTAGAT |
| 1750 | AAATTGTCTGTCTTCAGGTT |
| 1751 | GAATTTCTACTTCCTGTAGAT |
| 1021 | CAATTTCTACTTTAGTAGAT |

TABLE 4-continued

WT_as provides identified gRNA sequences that bind AsCas12a (wild type) protein.

| | |
|---|---|
| 1752 | GAATTTCTACTGCTTCGTAGAT |
| 1753 | AAATTTCTACTGCCACGTAGAT |
| 1754 | GAATTTCTCCTATTGGAGAT |
| 1755 | CAATTATTTCTAAGTGGGGTT |
| 1756 | CAATTTCTACTTATCGTAGAT |
| 1757 | GAATTCTGTGTAAGTTGTGGT |
| 1758 | CAATTTCTACTACATGTAGAT |
| 666 | GAATTTCTACTCTCGTAGAT |
| 582 | GAATTTCTACTTTAGTAGAT |
| 80 | CAATTTCTCCTCTTGGAGAT |
| 677 | CAATTTCTACTCTAGTAGAT |
| 1759 | GAATTTCTACTGTAATGTAGAT |
| 1760 | CAATTTCTACTATCGTAGAT |
| 1585 | CAATTTCTACTATTGTAGAT |
| 1761 | GAATTTCTACTGGTACGTAGAT |
| 1762 | CAATTGAGACTAAGTGTTTTT |
| 1763 | AAATTTCTACTTGCAGTAGAT |
| 1345 | CAATTTCTACTTTGGTAGAT |
| 1455 | CAATTTCTACTCCTGTAGAT |
| 1764 | CAATTTCTACTAATGTAGAT |
| 1765 | GAATTTCTACTGACAGTAGAT |
| 684 | GAATTTCTACTACTGAGTAGAT |
| 674 | CAATTTCTACTGTGGTAGAT |
| 1766 | AAATTTCTACTAAAGTAGAT |
| 1767 | AAATTTCTACTGAATGTAGAT |
| 1768 | CAATTTCTACTGTAGTAGAT |
| 1769 | CAATTTCTCCTATCGGAGAT |
| 1770 | CAATTTCTACTCAAGTAGAT |
| 1546 | CAATTTCTACTTCGTCGTAGAT |
| 1771 | CAATTTCTACTAAACGTAGAT |
| 1772 | GAATTGTACCTAAGTGGTACT |
| 1773 | CAATTTCTACTTTCGTAGAT |
| 1774 | AAATTTCTCCTGTCGGAGAT |
| 1775 | CAATTTCTACTCATCCGTAGAT |
| 1776 | GAATTTCTACTGTTATGTAGAT |
| 1777 | CAATTTCTACTACTCCGTAGAT |
| 1778 | AAATTTCTACTAGTTGTAGAT |
| 1779 | CAATTTCTACTCCAAGTAGAT |
| 1780 | GAATTTCTACTGATCCGTAGAT |
| 1781 | CAATTTAGGATAAGTTTCTGT |
| 1782 | GAATTGTGTGTCTTTACACT |
| 1783 | CAATTGCAAGTAAGTTTTGCT |
| 1784 | CAATTTCTACTCTCGTAGAT |
| 1785 | GAATTTCTACTGATACGTAGAT |
| 1786 | GAATTTCTACTGAATCGTAGAT |
| 1787 | AAATTGGGCATCTTTGCTCT |
| 1788 | GAATTTCTACTTGCGTGTAGAT |
| 929 | CAATTTCTACTTCCACGTAGAT |
| 1789 | GAATTTCTACGTCAGCGTAGAT |
| 1790 | CAATTGAGGTTAAGTACCTTT |
| 1791 | GAATTTCTACTCTAGTAGAT |
| 1792 | AAATTTCTACTTGCATGTAGAT |
| 1793 | GAATTTCTACTACGTGTAGAT |
| 1794 | AAATTTCTCCTGCTAGGAGAT |
| 784 | CAATTTCTACTCTATCGTAGAT |
| 1795 | CAATTGGCTATCTTTGGCTT |
| 1796 | AAATTTCTACTTACTTGTAGAT |
| 1797 | GAATTTCTACTAACATGTAGAT |
| 1798 | GAATTTCTACTCCCAGTAGAT |
| 1799 | GAATTTCTACTGTGCGTAGAT |
| 1800 | CAATTTCTACTGTCTGTAGAT |
| 1801 | AAATTTCTACTCATACGTAGAT |
| 1802 | CAATTTCTACTTTTCCGTAGAT |
| 1803 | GAATTTCTACTACACTGTAGAT |
| 1273 | GAATTTCTACTCGCGCGTAGAT |
| 843 | CAATTTCTACTGAAGTGTAGAT |
| 1804 | GAATTTCTACTTGAGGTAGAT |
| 1481 | GAATTTCTACTTGTCGTAGAT |
| 1805 | GAATTGGGGGTAAGTCTTCCT |
| 1806 | CAATTTCTACTGTCGTAGAT |
| 1807 | CAATTTGCTGTCTTTGGCAT |
| 1808 | AAATTTCTACAGCCCCGTAGAT |
| 1809 | GAATTTCTACTAGCTGTAGAT |
| 1810 | CAATTTCTACAGTTAGTAGAT |
| 1811 | CAATTTCTACTAACTGTAGAT |
| 1812 | CAATTGGGTTTCTTGATCTT |
| 1813 | GAATTTCTCCTGGGGGAGAT |

TABLE 4-continued

WT_as provides identified gRNA sequences that bind AsCas12a (wild type) protein.

| | |
|---|---|
| 1814 | GAATTTCTACTGTATTGTAGAT |
| 1815 | GAATTTCTACTTGCGGTAGAT |
| 1529 | CAATTTCTACTCGTGTAGAT |
| 1816 | GAATTTCTACTAAAGTAGAT |
| 1817 | GAATTTCTCCGTGGCTGGAGAT |
| 964 | CAATTTCTACTGTTGTAGAT |
| 1818 | GAATTTCTCCTATCGGAGAT |
| 1819 | CAATTTCTACTTTCATGTAGAT |
| 1820 | AAATTTCTACTCGCGTAGAT |
| 1821 | CAATTTCTACAGAAAGTAGAT |
| 1822 | GAATTTCTCCCGTACAGGAGAT |
| 1823 | AAATTTCTACTGAGGTAGAT |
| 1824 | AAATTTCTACTCACGTAGAT |
| 1825 | CAATTCTTCCTCTTGGGAGT |
| 1826 | GAATTTCTACTCAAGTAGAT |
| 763 | CAATTTCTACTATGGTAGAT |
| 1827 | GAATTTCTCCGCCGAGGAGAT |
| 1828 | CAATTTCTACTAACCTGTAGAT |
| 1829 | CAATTTACGCTCTTGTGTGT |
| 598 | AAATTTCTACTAGGCGTAGAT |
| 1830 | AAATTTCTACTAGCGTAGAT |
| 1831 | AAATTTCTACTTATACGTAGAT |
| 1832 | CAATTTCTACCACAGTAGAT |
| 1833 | CAATTTCTCCTCTAGGAGAT |
| 1489 | GAATTTCTACTTTCCCGTAGAT |
| 848 | AAATTTCTCCTGTTGGAGAT |
| 1834 | CAATTTCTACTATATTGTAGAT |
| 1835 | GAATTTCTACTATTGCGTAGAT |
| 1836 | GAATTTCTACTTATCCGTAGAT |
| 1837 | CAATTGTGGGTCTTTTCATT |
| 1243 | CAATTTCTACTGGAGTAGAT |
| 1838 | AAATTTCTACTCTTTAGTAGAT |
| 1839 | GAATTTCTACTCAGCGTAGAT |
| 1840 | GAATTTCTCCGTCGATGGAGAT |
| 1841 | GAATTTCTCCCCGCTTGGAGAT |
| 1842 | CAATTTCTACTTATACGTAGAT |
| 1843 | AAATTTCTACTGTGTAGAT |
| 1844 | AAATTTCTACTTATGGTAGAT |
| 1845 | GAATTTCTACTAATACGTAGAT |
| 1846 | CAATTTCTACATAGTCGTAGAT |
| 1847 | CAATTTCTACTATCGCGTAGAT |
| 1848 | CAATTGGTTCTCTTGAATCT |
| 1849 | CAATTTCTCCCACGCTGGAGAT |
| 1850 | GAATTTCTACTATCTTGTAGAT |
| 1851 | CAATTTCTACTTCCTCGTAGAT |
| 1852 | CAATTTCTACTATAGTAGAT |
| 1376 | CAATTTCTACTTTATGTAGAT |
| 1853 | CAATTTCTACCGCACGTAGAT |
| 1854 | CAATTTCTCCTCTGGGAGAT |
| 1855 | CAATTGTGCGTAAGTCGCGCT |
| 1503 | CAATTGTGTGTAAGTCGTGCT |
| 1856 | CAATTTCTACACCCATGTAGAT |
| 1857 | CAATTGTCCTTCTTGGGGCT |
| 1858 | CAATTTCTACAACCTGTAGAT |
| 1859 | GAATTTCTACTGTTGTAGAT |
| 1860 | CAATTCTCCTGTAGGAGAT |
| 1861 | AAATTTCTACTCCCAGTAGAT |
| 1862 | CAATTCTCCCTACGGGAGAT |
| 1863 | GAATTTCTACCCTACTGTAGAT |
| 1864 | CAATTGGTGGTCTTCCGTCT |
| 1865 | AAATTTCTACCCGATCGTAGAT |
| 1866 | CAATTTCTCCTCTAGGGGAGAT |
| 1867 | AAATTTCTACTTTTGGTAGAT |
| 1868 | AAATTTCTACAGACCGTAGAT |
| 1869 | GAATTTCTACTGACGTAGAT |
| 1870 | AAATTTCTCCTCACGTGGAGAT |
| 1871 | CAATTTCTCCGTAGGGGGAGAT |
| 1872 | GAATTTCTACTTGACCGTAGAT |
| 1873 | GAATTTCTACTGGTAGTAGAT |
| 1874 | GAATTTCTACTATCCTGTAGAT |
| 1875 | CAATTTCTCCATCGTGGAGAT |
| 1876 | GAATTTCTACTGACACGTAGAT |
| 1877 | CAATTTCTACACGACGTAGAT |
| 1878 | AAATTTCTACTGGTTTGTAGAT |
| 1005 | CAATTTCTACTTAGGTAGAT |
| 1879 | AAATTTCTACTTCCACGTAGAT |
| 1880 | CAATTGCTGCTCTTGTGGTT |

TABLE 4-continued

WT_as provides identified gRNA sequences that bind AsCas12a (wild type) protein.

| | |
|---|---|
| 1881 | GAATTTCTACTCATGTAGAT |
| 1882 | AAATTTCTACTAGAATGTAGAT |
| 1883 | GAATTTCTACACAGCGTAGAT |
| 1884 | GAATTTCTACTATGCGTAGAT |
| 1885 | GAATTTCTACTAAGGGTAGAT |
| 1886 | CAATTATCGCTCTTGTGGTT |
| 1638 | CAATTTCTACTAGAAAGTAGAT |
| 1887 | CAATTGCCTGTAAGTTGGGCT |
| 1721 | CAATTTCTACTCGCAGTAGAT |
| 1888 | GAATTTCTACTGTCTCGTAGAT |
| 1889 | GAATTTCTCCCTCAAGGAGAT |
| 1890 | GAATTTGGCATCTTTGCCGT |
| 1891 | CAATTTCTACATAATGTAGAT |
| 1892 | GAATTTCTACTGTGGTGTAGAT |
| 1893 | GAATTTCTACTCTTTCGTAGAT |
| 1894 | GAATTTCTACTATTCGTAGAT |
| 1895 | AAATTTCTACTAATACGTAGAT |
| 1896 | GAATTCCTGTTCTTGCAGGT |
| 1400 | CAATTTCTACTATTCGTAGAT |
| 777 | GAATTTCTACTCCTGCGTAGAT |
| 1897 | CAATTTCTACCCACCTGTAGAT |
| 1898 | GAATTTCTACTTGCATGTAGAT |
| 1899 | GAATTTCTCCATGGCGGGAGAT |
| 1900 | CAATTGAGGCTAAGTGCCTCT |
| 1901 | AAATTTCTCCACAGCGGAGAT |
| 1902 | GAATTTCTACTGTCCCGTAGAT |
| 1903 | AAATTTCTACCCGTACGTAGAT |
| 1904 | CAATTTCTACTAACGAGTAGAT |
| 708 | CAATTTCTACTAATTGTAGAT |
| 1905 | CAATTCTGTTTAAGTGATAGT |
| 1906 | GAATTGTGTGTCTTTGTACT |
| 1907 | GAATTCGTGGTCTTCCGTGT |
| 1908 | GAATTTCTCCCGCCAGGAGAT |
| 1909 | AAATTTCTCCGCTGCTGGAGAT |
| 1910 | CAATTTCTCCCTCAGGGAGAT |
| 1911 | GAATTTCTACTGTCATGTAGAT |
| 1237 | CAATTTCTACTACCGTAGAT |
| 1912 | GAATTTCTACTGCCGTAGAT |
| 1166 | CAATTGTGTATCTTTATGCT |
| 1702 | CAATTTCTACTCTTCCGTAGAT |
| 1913 | GAATTTACCCTCTTGGGTGT |
| 1279 | CAATTTCTACTCGCTCGTAGAT |
| 1914 | GAATTTCTCCGACCCCGGAGAT |
| 1915 | GAATTTCTACCAAAAGGTAGAT |
| 1916 | AAATTTCTACTCTAGTAGAT |
| 1099 | CAATTTCTACTCACGTAGAT |
| 783 | CAATTTCTACTCCGGCGTAGAT |
| 1439 | CAATTTCTACTGGTACGTAGAT |
| 1917 | GAATTTCTACTTCTAGTAGAT |
| 1918 | AAATTCGTACTAAGTGTACGT |
| 1919 | GAATTGCGGATCTTTCTGTT |
| 1920 | CAATTTCTACTGGCCGTAGAT |
| 1921 | CAATTGTTCTCTTGAGCGT |
| 1922 | GAATTTCTACTCGTCGTAGAT |
| 1923 | GAATTTCTACCGAATAGTAGAT |
| 1924 | GAATTTCTACTATGGGTAGAT |
| 1925 | GAATTTCTACTTCGTTGTAGAT |
| 596 | GAATTTCTACTATCATGTAGAT |
| 1926 | GAATTTCTACTGCTCCGTAGAT |
| 1927 | GAATTGTCAGTCTTTTGGCT |
| 1928 | GAATTTCTCCTCGGCCGGAGAT |
| 1929 | GAATTTCTCCCCGGGAGGAGAT |
| 1534 | GAATTTCTACTGCCCCGTAGAT |
| 1930 | CAATTTCTACTTCCCGTAGAT |
| 1931 | CAATTTCTACCATCTGTAGAT |
| 1932 | AAATTTCTACTGGCACGTAGAT |
| 1933 | CAATTTCTACTGGTTCGTAGAT |
| 1934 | CAATTGAGTGTAAGTTACTCT |
| 1935 | CAATTTCTACTTTGTTGTAGAT |
| 1936 | CAATTAGTGGTCTTTCATTT |
| 1937 | AAATTTCTCCCCTCGCGGAGAT |
| 735 | GAATTTCTACTTTAACGTAGAT |
| 1938 | CAATTTCTACTTCCTGTAGAT |
| 1939 | GAATTTCTCCGAGTCGGAGAT |
| 1940 | CAATTTCTACTGGACGTAGAT |
| 1941 | GAATTTCTACTTGTTTGTAGAT |
| 1464 | CAATTTCTACTCTGTGTAGAT |

TABLE 4-continued

WT_as provides identified gRNA sequences that bind AsCas12a (wild type) protein.

| | |
|---|---|
| 1942 | GAATTTCTACTAGTTAGTAGAT |
| 1943 | GAATTTCTACTACGGCGTAGAT |
| 1944 | GAATTTCTCCATAGCGGGAGAT |
| 1945 | CAATTGCTTTTAAGTAAAGCT |
| 1946 | CAATTTCTCCTAACGGAGAT |
| 1947 | GAATTTTAGGTCTTCCTAGT |
| 1948 | CAATTTCTCCATAAGTGGAGAT |
| 1092 | GAATTTCTACTCATCCGTAGAT |
| 1949 | CAATTTCTACTAAGCCGTAGAT |
| 1189 | CAATTTCTACTCCCGCGTAGAT |
| 1950 | CAATTTCTACTGAACCGTAGAT |
| 1951 | AAATTTCTCCCATCGGGAGAT |
| 1952 | CAATTTGGGCTAAGTGTTCGT |
| 1953 | GAATTTCTCCGAACAGGAGAT |
| 1954 | GAATTTCTCCACGTCGGAGAT |
| 1955 | CAATTTCTCCAAGCACGGAGAT |
| 1956 | CAATTTCTCCGCACGGGAGAT |
| 1957 | CAATTTCTCCAAAGGAGGAGAT |
| 1114 | CAATTTCTACTACAACGTAGAT |
| 1958 | CAATTAGTGGTCTTCCGCTT |
| 1959 | AAATTTCTACTCATTCGTAGAT |
| 1960 | CAATTTCTACACACTGTAGAT |
| 1961 | GAATTTCTCCTATGGCGGAGAT |
| 1962 | GAATTTCTCCAACACGGAGAT |
| 1963 | CAATTCCTACTCTTGTGGGT |
| 1964 | AAATTTCTACTCGCTCGTAGAT |
| 1965 | AAATTTCTACTCAGAAGTAGAT |
| 1966 | GAATTTCTACTGGATAGTAGAT |
| 1967 | GAATTTCTACTCGCGTAGAT |
| 1968 | CAATTTCTACTAACTTGTAGAT |
| 1969 | GAATTTCTCCTCGTGGGAGAT |
| 1970 | CAATTTCTACTAATGCGTAGAT |
| 1971 | CAATTGTCCTTAAGTGGGCT |
| 1972 | CAATTTCTACTTCTGCGTAGAT |
| 1973 | GAATTTCTACGGTATAGTAGAT |
| 1479 | CAATTTCTACTCTGGTAGAT |
| 1974 | GAATTTCTACTACAATGTAGAT |
| 1975 | GAATTGTCTATCTTTGGACT |
| 1976 | GAATTTCTCCCTGCCCGGAGAT |
| 1977 | CAATTTCTACAGCTGGTAGAT |
| 1978 | AAATTTCTACTGACAGTAGAT |
| 875 | CAATTTCTACTCCACTGTAGAT |
| 1979 | CAATTTCTCCCACCGGAGAT |
| 1980 | CAATTAATCGTCTTCGATTT |
| 1981 | CAATTTCTACTGCTCCGTAGAT |
| 1982 | CAATTTCTCCAAGCCCGGAGAT |
| 1983 | CAATTTGTGCTAAGTGCGCGT |
| 1984 | AAATTTCTACTGCCTGTAGAT |
| 1985 | AAATTTCTCCAGCGGAGGAGAT |
| 1986 | GAATTTCTACTCCCCCGTAGAT |
| 1987 | GAATTTCTCCACCGTCGGAGAT |
| 1988 | AAATTTCTCCTGAAGGAGAT |
| 1989 | GAATTTCTACTTGGCCGTAGAT |
| 701 | AAATTTCTCCTATGGGAGAT |
| 1990 | CAATTTCTACCAGTAGTAGAT |
| 1991 | CAATTGGGACTCTTGTCCTT |
| 1992 | GAATTTCTACTTAAGTAGAT |
| 1993 | GAATTTCTACTTTGGTAGAT |
| 1994 | CAATTCAGCGTCTTTGTTGT |
| 1995 | CAATTGTTGATCTTTTGATT |
| 1996 | GAATTTCTACTAATGAGTAGAT |
| 1997 | AAATTTCTACTACCGGTAGAT |
| 1998 | AAATTTCTACTCAGCGTAGAT |
| 1999 | GAATTTCTACTTCCGGTAGAT |
| 2000 | AAATTTCTCCTGCTTCGGAGAT |
| 2001 | CAATTTCTCCCGGATGGAGAT |
| 2002 | GAATTTCTACTAGCGGTAGAT |
| 2003 | CAATTAGGGCTCTTGTCCTT |
| 2004 | AAATTTCTCCGCGAGGGAGAT |
| 2005 | CAATTTCTACTCTTACGTAGAT |
| 2006 | CAATTTCTCCCTCGCGGAGAT |
| 2007 | CAATTTCTCCGGTCACGGAGAT |
| 2008 | CAATTTCTCCGCAACGGGAGAT |
| 2009 | GAATTTCTCCGACGCGGAGAT |
| 2010 | CAATTACGGTTAAGTACCGTT |
| 2011 | CAATTTCTACCTAGTAGTAGAT |
| 2012 | CAATTTCTCCGCCGCGGAGAT |

TABLE 4-continued

WT_as provides identified gRNA sequences that bind AsCas12a (wild type) protein.

| SEQ ID NO: | gRNA sequence |
|---|---|
| 2013 | GAATTTCTACCAGACGGTAGAT |
| 2014 | CAATTTCTCCAACAAAGGAGAT |
| 2015 | CAATTTCTACTTAAGTAGAT |
| 2016 | AAATTTCTACGCGGAGTAGAT |
| 2017 | CAATTTCTACTATTTTGTAGAT |
| 2018 | GAATTTCTACCCCCCAGTAGAT |
| 2019 | GAATTTCTACTACACCGTAGAT |
| 2020 | GAATTTCTCCCCCCCCGGAGAT |
| 2021 | CAATTGAGTTTAAGTGGTTTT |
| 2022 | GAATTTCTCCGTCGTGGGAGAT |
| 2023 | CAATTTCTACTCTGCGTAGAT |
| 2024 | GAATTTCTACTCCAGGTAGAT |
| 2025 | CAATTTCTCCATCGGGGAGAT |
| 2026 | GAATTTCTCCTACTGGAGAT |
| 2027 | AAATTTCTACCAAGGAGTAGAT |
| 2028 | GAATTTCTACTGCACCGTAGAT |
| 2029 | CAATTTCTCCCTGGCTGGAGAT |
| 2030 | CAATTTTCGCTAAGTGCGGAT |

| SEQ ID NO: | gRNA sequence |
|---|---|
| 2031 | CAATTTCTACTATTGGTAGAT |
| 2032 | CAATTTCTACTACACCGTAGAT |
| 581 | GAATTTCTACTCGGCGTAGAT |
| 2033 | CAATTTCTCCCAAATGGGAGAT |
| 2034 | AAATTTCTCCCACTAGGAGAT |
| 2035 | CAATTTCTACTACATTGTAGAT |
| 2036 | GAATTTCTACTAGTAAGTAGAT |
| 2037 | CAATTTCTACTGCCCGTAGAT |
| 2038 | GAATTTCTACCAAATGTAGAT |
| 2039 | GAATTTCTACTGAGTCGTAGAT |
| 2040 | CAATTTCTACTGCGTCGTAGAT |
| 2041 | AAATTTCTACTCCCATGTAGAT |
| 2042 | GAATTTCTACAAGATAGTAGAT |
| 2043 | GAATTTCTCCCCCTGGAGAT |
| 2044 | CAATTTCTACGGCCGTAGAT |
| 2045 | CAATTTTTTGTCTTCAGGAT |
| 2046 | CAATTTCTACTCCCGGTAGAT |
| 2047 | CAATTTCTCCCAACGGAGAT |
| 2048 | CAATTTCTACTTTCTCGTAGAT |
| 2049 | CAATTTCTACGCCTGAGTAGAT |
| 2050 | CAATTGTGTATCTTTGTACT |
| 2051 | CAATTTCTACTAACGTGTAGAT |
| 2052 | AAATTTCTCCGCCGTGGAGAT |
| 2053 | AAATTTCTACTCCGTGTAGAT |
| 2054 | GAATTTCTACTCTGAAGTAGAT |
| 2055 | GAATTTCTCCTAATGGAGAT |
| 2056 | CAATTTCTACTAATTCGTAGAT |
| 2057 | GAATTTCTACTTGCGTAGAT |
| 2058 | CAATTTCTACCCCGAGTAGAT |
| 2059 | GAATTTCTACTTCCTCGTAGAT |
| 1161 | CAATTTCTACTGTACGTAGAT |
| 2060 | GAATTTCTACTTGTGGTAGAT |
| 1680 | CAATTTCTACTTGTGTGTAGAT |
| 2061 | GAATTTCTACTTGCCGGTAGAT |
| 2062 | GAATTTCTCCTAACGGAGAT |
| 2063 | CAATTTCTCCAGTGGGAGAT |
| 2064 | CAATTGCTCGTCTTTGAGTT |
| 2065 | CAATTGGCTATCTTTGGCCT |
| 2066 | CAATTTCTCCCGCTGGGAGAT |
| 2067 | CAATTTCTACTTGTACGTAGAT |
| 2068 | CAATTTCTACACTCTGTAGAT |
| 2069 | CAATTTCTACACGTCGTAGAT |
| 1152 | GAATTTCTACTTCGCGTAGAT |
| 1183 | CAATTTCTACTTGATCGTAGAT |
| 2070 | GAATTTCTCCTGTTGCGGAGAT |
| 2071 | CAATTTCTACTTGTCTGTAGAT |
| 584 | GAATTTCTACTTAGGTAGAT |
| 2072 | AAATTTCTCCCGCGTCGGAGAT |
| 2073 | GAATTTCTCCTGGAGGAGAT |
| 761 | CAATTTCTACTAAGAGTAGAT |
| 1447 | CAATTTCTACTGAAGCGTAGAT |
| 2074 | GAATTTCTACTCGATGTAGAT |
| 2075 | GAATTTCTACTGCATAGTAGAT |
| 2076 | GAATTTCTACTTCGAAGTAGAT |
| 2077 | GAATTTCTACTCGCAGTAGAT |
| 2078 | CAATTTCTCCGGAGCGGGAGAT |
| 2079 | CAATTTCTCCCACGATGGAGAT |
| 2080 | GAATTTCTCCCGCTCGGGAGAT |

TABLE 4-continued

WT_as provides identified gRNA sequences that bind AsCas12a (wild type) protein.

| | |
|---|---|
| 2081 | CAATTTAGCGTCTTTGTTGT |
| 2082 | CAATTGCGTGTCTTTGCGCT |
| 2083 | CAATTAACGCTCTTGCGTTT |
| 2084 | GAATTTCTACTAACTGGTAGAT |
| 2085 | CAATTTACCCTCTTGGGTGT |
| 2086 | CAATTTCTCCCGCCTGGAGAT |
| 1728 | CAATTTCTACTTTTGGTAGAT |
| 586 | GAATTTCTACTAGTGTGTAGAT |
| 2087 | GAATTTCTACTGGGAGTAGAT |
| 2088 | CAATTCTGAATCTTTTCGGT |
| 2089 | CAATTTCTCCCGCGCTGGAGAT |
| 2090 | CAATTTCTACATAGTGTAGAT |
| 2091 | CAATTTCTACTAGACCGTAGAT |
| 2092 | CAATTTCTACTCGACGTAGAT |
| 2093 | AAATTTCTACTTACTCGTAGAT |
| 2094 | GAATTTCTACCGTACGTAGAT |
| 2095 | GAATTTCTACTGCGCGTAGAT |
| 2096 | CAATTTCTCCACAAGGGAGAT |
| 2097 | GAATTTCTACGGTCGTAGAT |
| 2098 | CAATTACCGCTCTTGTGGTT |
| 1382 | CAATTTCTACTAAGTTGTAGAT |
| 2099 | CAATTCGTGTTCTTACATGT |
| 2100 | CAATTTCTACTTGTCCGTAGAT |
| 2101 | GAATTTCTACGGTCGCGTAGAT |
| 2102 | AAATTTCTACTGTGATGTAGAT |
| 2103 | CAATTTCTCCGTTAGCGGAGAT |
| 2104 | CAATTTCTACTTGTAGTAGAT |
| 2105 | GAATTTCTACTTTCGCGTAGAT |
| 2106 | GAATTTCTACTTCAGTGTAGAT |
| 2107 | AAATTTCTACTCAGATGTAGAT |
| 2108 | AAATTTCTCCCCTGGGAGAT |
| 2109 | CAATTTCTCCGCCCAGGAGAT |
| 2110 | AAATTTCTACCAGTTAGTAGAT |
| 2111 | CAATTCAGGTTCTTACCTGT |
| 2112 | CAATTTCTACGGGAGCGTAGAT |
| 2113 | GAATTTCTACTCTCACGTAGAT |
| 2114 | CAATTTCTACCTCCAAGTAGAT |
| 1305 | CAATTGGGCGTCTTCGTCCT |
| 2115 | CAATTCTTAGTCTTTTGGGT |
| 2116 | GAATTTCTCCGCGCGTGGAGAT |
| 2117 | CAATTCGGTTTAAGTGATTGT |
| 2118 | AAATTGGCTATCTTTGGCTT |
| 2119 | CAATTTCTCCAACGTGGAGAT |
| 2120 | GAATTTCTACTACGTTGTAGAT |
| 2121 | CAATTTCTACTGGCGTAGAT |
| 2122 | AAATTTCTACTTGTGTAGAT |
| 687 | AAATTTCTACCACTTGTAGAT |
| 2123 | GAATTTCTCCCGCAGCGGAGAT |
| 2124 | GAATTTCTCCCCCTGGGGAGAT |
| 2125 | CAATTTCTCCTGTACAGGAGAT |
| 2126 | GAATTTCTACTAGTCCGTAGAT |
| 2127 | AAATTTCTACTCACTGTAGAT |
| 2128 | AAATTTCTCCGATGACGGAGAT |
| 2129 | GAATTTCTACTATTTAGTAGAT |
| 805 | GAATTTCTACTATTGTAGAT |
| 2130 | CAATTTCTCCTGCTACGGAGAT |
| 2131 | CAATTTCTACGTCCGCGTAGAT |
| 2132 | CAATTTCTACTAGACTGTAGAT |
| 1020 | CAATTTCTACTGTGTGTAGAT |
| 2133 | CAATTTCTACTCTAATGTAGAT |
| 2134 | CAATTAGCAGTCTTCTGCTT |
| 2135 | CAATTTCTCCCAGTGAGGAGAT |
| 2136 | CAATTGCTCTTCTTAGGGCT |
| 1506 | GAATTTCTACTGAGGTAGAT |
| 1068 | CAATTTCTACTAGTAGTAGAT |
| 2137 | CAATTTCTACTCAGAGTAGAT |
| 2138 | CAATTTCTACTGTGAGTAGAT |
| 2139 | AAATTTCTACTCATGTAGAT |
| 2140 | CAATTTCTACCCTACGTAGAT |
| 2141 | CAATTGGTTGTCTTCGGCTT |
| 2142 | CAATTCTTGTTCTTGCGAGT |
| 2143 | GAATTTCTACTTTCGTAGAT |
| 2144 | GAATTTCTACTTCAGGTAGAT |
| 1026 | GAATTTCTACTTGGCGTAGAT |
| 2145 | GAATTTCTACTTTGACGTAGAT |
| 2146 | GAATTTCTCCACTTCGGGAGAT |
| 758 | CAATTTCTACTCACCGTAGAT |

TABLE 4-continued

WT_as provides identified gRNA sequences that bind AsCas12a (wild type) protein.

| | |
|---|---|
| 2147 | AAATTTCTACGAGCCGTAGAT |
| 2148 | AAATTGGTTGTCTTCGGCTT |
| 2149 | GAATTTCTACCCGCAGTAGAT |
| 2150 | CAATTTTGAATCTTTTCAGT |
| 2151 | GAATTTCTACTGCCTGTAGAT |
| 2152 | CAATTTCGCGTCTTCGTGGT |
| 998 | GAATTTCTACTGTCGTAGAT |
| 2153 | GAATTTCTACTTATCGTAGAT |
| 2154 | GAATTTGTTCTCTTGAGCGT |
| 2155 | GAATTTCTCCGAGAACGGAGAT |
| 2156 | CAATTTCTACCCTACGGTAGAT |
| 2157 | GAATTTCTCCTACGCCGGAGAT |
| 2158 | CAATTTCTACAGATTAGTAGAT |
| 789 | CAATTTCTACTAATGTGTAGAT |
| 2159 | CAATTTCTACTCCTGCGTAGAT |
| 2160 | GAATTTCTACCAATTAGTAGAT |
| 2161 | CAATTTCTCCTGCGGGGAGAT |
| 2162 | CAATTTCTACCTCTCTGTAGAT |
| 2163 | GAATTTCTACTTACTAGTAGAT |
| 2164 | CAATTTCTACCCCTGCGTAGAT |
| 2165 | CAATTTCTCCTCGAACGGAGAT |
| 2166 | CAATTTCTACGAAAGTGTAGAT |
| 2167 | CAATTAGTGCTCTTGCATTT |
| 2168 | AAATTTCTACCCACTCGTAGAT |
| 2169 | CAATTTCTCCATCCGAGGAGAT |
| 2170 | GAATTGCTGCTCTTGCGGCT |
| 741 | GAATTTCTACTCTTACGTAGAT |
| 2171 | CAATTTCTCCGTAACGGAGAT |
| 1105 | AAATTTCTACTGCGTCGTAGAT |
| 2172 | GAATTTCTCCCCACTTGGAGAT |
| 2173 | GAATTTCTACTGTGAGTAGAT |
| 2174 | CAATTTCTACTGCACGTAGAT |
| 2175 | CAATTAATGATCTTTCGTTT |
| 2176 | CAATTACTAGTAAGTCTGGTT |
| 2177 | CAATTTCTACCTGTGTAGAT |
| 2178 | CAATTACGTGTAAGTCGCGTT |
| 2179 | CAATTTCTCCTACCGGGAGAT |
| 2180 | CAATTTCTACACTCGCGTAGAT |
| 882 | CAATTTCTACTGAGTTGTAGAT |
| 2181 | GAATTTCTACTTGAGTAGAT |
| 2182 | GAATTTCTACTCAGCCGTAGAT |
| 2183 | CAATTTCTACTCCATGTAGAT |
| 2184 | CAATTTCTCCAGGAAGGAGAT |
| 2185 | CAATTGTTTGTAAGTCGAACT |
| 1178 | CAATTTCTACTAAGGTAGAT |
| 2186 | CAATTTCTACGGGAAGTAGAT |
| 2187 | CAATTTCTACAACGGTAGAT |
| 2188 | GAATTTCTCCGCGCCGGAGAT |
| 2189 | GAATTTCTACCCGACCGTAGAT |
| 1075 | CAATTTCTACTGCGACGTAGAT |
| 2190 | CAATTTCTACTGTTCGTAGAT |
| 2191 | CAATTTCTACTTAACGTAGAT |
| 2192 | GAATTTCTCCATATGGGAGAT |
| 2193 | GAATTTCTCCCTAGCGGGAGAT |
| 2194 | CAATTTCTACGACTCAGTAGAT |
| 2195 | CAATTTCTCCAGCATAGGAGAT |
| 2196 | GAATTTCTCCGCGAATGGAGAT |
| 2197 | GAATTTCTACGTCGCAGTAGAT |
| 1017 | CAATTTCTACTACTTCGTAGAT |
| 2198 | CAATTTCTACCAGCTAGTAGAT |
| 2199 | CAATTTCTACTGTTCTGTAGAT |
| 2200 | CAATTTCTCCTGAGTTGGAGAT |
| 2201 | GAATTTCTACGTACGAGTAGAT |
| 2202 | CAATTTAGGTTAAGTGCTTAT |
| 2203 | GAATTTCTACCAATAAGTAGAT |
| 2204 | AAATTTCTACCATCGTAGAT |
| 2205 | GAATTTCTCCTGAAGCGGAGAT |
| 2206 | GAATTTCTACAGGCGAGTAGAT |
| 2207 | CAATTTCTACTGGTCTGTAGAT |
| 2208 | CAATTTCTACTAAAGCGTAGAT |
| 2209 | CAATTTCTACCAGCGTGTAGAT |
| 2210 | CAATTGTGTTTAAGTGGCACT |
| 2211 | CAATTTCTCCTGCCAGGGAGAT |
| 2212 | GAATTTCTACTGCACGTAGAT |
| 2213 | AAATTTCTACTCGCAGTAGAT |
| 2214 | CAATTGTTAGTAAGTCTAGCT |
| 2215 | AAATTTCTACTGCGACGTAGAT |

TABLE 4-continued

WT_as provides identified gRNA sequences that bind AsCas12a (wild type) protein.

| | |
|---|---|
| 1649 | GAATTTCTACCGTCCGTAGAT |
| 2216 | GAATTTCTACTCACATGTAGAT |
| 2217 | CAATTTCTACCGGTGCGTAGAT |
| 2218 | GAATTTCTACGAGCTGGTAGAT |
| 2219 | CAATTTCTACTAACATGTAGAT |
| 2220 | GAATTTCTACTGGGGCGTAGAT |
| 942 | CAATTTCTACTACCACGTAGAT |
| 2221 | CAATTTATGGTCTTCTGTAT |
| 886 | CAATTTCTACTAGGAGTAGAT |
| 1341 | GAATTTCTACTGACCGTAGAT |
| 2222 | CAATTTCTCCCACCCTGGAGAT |
| 818 | CAATTTCTACTTCGGGTAGAT |
| 2223 | CAATTTCTCCCAGATCGGAGAT |
| 2224 | GAATTTCTCCCAGATGGAGAT |
| 2225 | CAATTTCTACTATCCCGTAGAT |
| 871 | AAATTTCTACTACAGGTAGAT |
| 2226 | GAATTTCTACTTCGATGTAGAT |
| 719 | GAATTTCTACTTGAGTGTAGAT |
| 2227 | CAATTTCTACTTAGCCGTAGAT |
| 1500 | CAATTTCTACTCACTCGTAGAT |
| 2228 | CAATTTCTCCTGTCGGAGAT |
| 2229 | CAATTTCTACAACAAAGTAGAT |
| 2230 | GAATTTCTACTCCCTCGTAGAT |
| 2231 | GAATTTCTACTCGCCTGTAGAT |
| 2232 | CAATTTTTGCTAAGTGTAGGT |
| 2233 | AAATTTCTCCGAACCAGGAGAT |
| 2234 | CAATTTCTCCCACAATGGAGAT |
| 2235 | CAATTCTGAATCTTTTCAGT |
| 2236 | CAATTTCTACTTGCCTGTAGAT |
| 2237 | CAATTGTGTGTCTTCGTACT |
| 2238 | AAATTTCTACTCACTCGTAGAT |
| 2239 | CAATTTCTACAATGTGTAGAT |
| 2240 | GAATTTCTCCGAACGAGGAGAT |
| 2241 | CAATTTCTACTCATTAGTAGAT |
| 1465 | CAATTTCTACTCAGTTGTAGAT |
| 2242 | CAATTTCTACAAGTGCGTAGAT |
| 2243 | CAATTGGCGTTAAGTACGTCT |
| 2244 | CAATTTCTACAGGTCGTAGAT |
| 2245 | GAATTTCTACTTGCACGTAGAT |
| 2246 | GAATTTCTACTGGCGCGTAGAT |
| 2247 | CAATTTCTACCTCCTCGTAGAT |
| 2248 | AAATTTCTCCCCCCGGGGAGAT |
| 2249 | CAATTTCTACCGATGTAGAT |
| 1700 | CAATTTCTACTCCCCGGTAGAT |
| 2250 | GAATTTCTACTGAGTGTAGAT |
| 2251 | GAATTTCTCCAAAGGGGGAGAT |
| 402 | GAATTCCTGCTCTTGTAGGT |
| 2252 | CAATTTCTACTTTATCGTAGAT |
| 2253 | CAATTTCTACGACTACGTAGAT |
| 2254 | CAATTTCTCCCCCAACGGAGAT |
| 2255 | GAATTTCTACAGGAGTAGAT |
| 2256 | CAATTTCTCCCCCTGGAGAT |
| 2257 | CAATTTCGTTTCTTGGCGGT |
| 2258 | CAATTTCTCCCTTTGGAGAT |
| 2259 | CAATTTCTACTTGCACGTAGAT |
| 1459 | CAATTTCTACTCTGGGTAGAT |
| 2260 | CAATTTCTACTTGGACGTAGAT |
| 2261 | AAATTTCTACAAGTCGTAGAT |
| 2262 | CAATTGTTGGTAAGTTTGATT |
| 2263 | CAATTTCTACTTCTTTGTAGAT |
| 2264 | GAATTTCTACTCATGTGTAGAT |
| 2265 | CAATTTCTCCTAGAGGAGAT |
| 2266 | GAATTTCTCCTGGCAAGGAGAT |
| 2267 | GAATTTCTACTCCATCGTAGAT |
| 2268 | AAATTTCTACCCCATGTAGAT |
| 2269 | CAATTTCTCCGGTCAAGGAGAT |
| 2270 | GAATTTCTCCCTCAGCGGAGAT |
| 2271 | GAATTTCTCCCTCGAAGGAGAT |
| 2272 | GAATTTCTACTACATGGTAGAT |
| 2273 | CAATTTCTACCAACGAGTAGAT |
| 2274 | GAATTTCTACTTTCAAGTAGAT |
| 1003 | GAATTTCTACTGCTTGTAGAT |
| 2275 | GAATTTCTACTGCCGCGTAGAT |
| 2276 | GAATTTCTACTAGTTGGTAGAT |
| 2277 | CAATTTCTACACATATGTAGAT |
| 2278 | CAATTTCTACCTGTCGTAGAT |
| 2279 | CAATTTGCGGTCTTTCGTGT |

TABLE 4-continued

WT_as provides identified gRNA sequences that bind AsCas12a (wild type) protein.

| SEQ ID NO | gRNA Sequence |
|---|---|
| 2280 | CAATTTCTACTAATTGTAGAT |
| 2281 | GAATTTCTACTAATGGTAGAT |
| 2282 | CAATTTCTACTTAAGCGTAGAT |
| 2283 | CAATTGGGATTCTTGTCCCT |
| 2284 | CAATTTCTACTTCTCCGTAGAT |
| 2285 | CAATTTCTCCCCCGACGGAGAT |
| 2286 | CAATTTCTCCTACTGGAGAT |
| 812 | CAATTTCTACTTTAGCGTAGAT |
| 2287 | CAATTTGTTCTCTTGGGTGT |
| 2288 | AAATTTCTCCGCTGACGGAGAT |
| 2289 | GAATTTCTACGACGTCGTAGAT |
| 1009 | CAATTTCTACTACATAGTAGAT |
| 1209 | GAATTTCTACTTCCCAGTAGAT |
| 2290 | CAATTGGAGGTCTTCTTTCT |
| 947 | CAATTTCTACTTTGACGTAGAT |
| 2291 | GAATTTCTACTTTTATGTAGAT |
| 2292 | CAATTTCTCCTGCACCGGAGAT |
| 2293 | GAATTTCTACCCTTATGTAGAT |
| 2294 | CAATTTCTACTATATCGTAGAT |
| 2295 | GAATTTCTACTCCACCGTAGAT |
| 2296 | CAATTTCTACTCATTGTAGAT |
| 2297 | CAATTGATGATCTTTTATTT |
| 2298 | CAATTTCTCCGTCGCCGGAGAT |
| 2299 | GAATTGTGGGTAAGTCCTATT |
| 786 | CAATTTCTACTAGTGTGTAGAT |
| 2300 | CAATTGTCTATCTTTGGACT |
| 2301 | CAATTTCTCCCTGTCGGAGAT |
| 2302 | GAATTCGTCCTCTTGGGCGT |
| 1351 | CAATTTCTACTAGGTCGTAGAT |
| 2303 | CAATTTCTACTAATGGTAGAT |
| 2304 | CAATTGGGGATCTTTTCCTT |
| 2305 | CAATTTCTACTGCTTGTAGAT |
| 2306 | CAATTTCTACAAAAGTAGAT |
| 2307 | GAATTTCTCCTGCACGGAGAT |
| 2308 | GAATTTCTACTCCATAGTAGAT |
| 1061 | CAATTTCTACTCGTTCGTAGAT |
| 2309 | CAATTTCTACCACTGGTAGAT |
| 2310 | CAATTTCTCCTCCTCTGGAGAT |
| 2311 | CAATTTCTCCTCTCGGAGAT |
| 2312 | GAATTTCTCCCAGCGGGAGAT |
| 1367 | CAATTTCTACTCGTACGTAGAT |
| 2313 | GAATTTCTACTAGGAGTAGAT |
| 2314 | CAATTTCTCCCTCAGCGGAGAT |
| 2315 | CAATTTCTCCCCTACCGGAGAT |
| 2316 | GAATTTCTACTCGTAAGTAGAT |
| 2317 | CAATTTATGGTAAGTCTATGT |
| 1165 | CAATTTCTACTATAGGTAGAT |
| 2318 | GAATTTCGCGTCTTCGTGGT |
| 2319 | GAATTTCTACTAATGTGTAGAT |
| 2320 | CAATTTCTCCCCTCTCGGAGAT |
| 2321 | CAATTTCTCCGGACTGGAGAT |
| 2322 | CAATTTCTACCTGGAAGTAGAT |
| 2323 | CAATTTCTCCCCGTTCGGAGAT |
| 2324 | CAATTGTTACTCTTGTGGTT |
| 2325 | CAATTTCTCCCCACCCGGAGAT |
| 2326 | AAATTGTGTTTAAGTGACACT |
| 2327 | CAATTTGGCTTCTTGGTTAT |
| 2328 | GAATTGGGCATCTTTGCTCT |
| 2329 | GAATTTCTACTTCGTGTAGAT |
| 2330 | GAATTGTGTTTAAGTGGCACT |
| 645 | CAATTTCTACTGGTGCGTAGAT |

TABLE 5

WT_1b provides identified gRNA sequences that bind LbCas12a protein.

| SEQ ID NO | gRNA Sequence | SEQ ID NO | gRNA Sequence |
|---|---|---|---|
| 575 | CAATTTCTACTAAGTGTAGAT | 2667 | CAATTTCTACTGTGCAGTAGAT |
| 2331 | AAATTTCTACTAGAGGGTAGAT | 796 | CAATTTCTACTATCCGTAGAT |
| 807 | GAATTTCTACTATCGAGTAGAT | 2668 | CAATTTCTACTCCCGTGTAGAT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 2332 | GAATTTCTACTTCCTTGTAGAT | 2669 | CAATTTCTACTTCGCGTAGAT |
| 1793 | GAATTTCTACTACGTGTAGAT | 2670 | CAATTTCTCCTACGCGGAGAT |
| 2333 | GAATTTCTACTAAGAGTAGAT | 1355 | CAATTTCTCCTAGGTGGAGAT |
| 1441 | CAATTTCTGCTAAGTGCAGAT | 906 | CAATTTCTACTGATTAGTAGAT |
| 648 | CAATTTCTACTATGCGTAGAT | 2671 | CAATTTCTACTAGCTGTAGAT |
| 650 | GAATTTCTACTAAGTGTAGAT | 2672 | GAATTTCTACCTACTTGTAGAT |
| 705 | GAATTTCTACTAGGTGTAGAT | 1611 | CAATTTCTACTCTAGTGTAGAT |
| 2334 | GAATTTCTACTATGAGTAGAT | 2673 | AAATTTCTACGTTACGGTAGAT |
| 704 | CAATTTCTACTATGTGTAGAT | 2674 | GAATTTCTACTGATTCGTAGAT |
| 1884 | GAATTTCTACTATGCGTAGAT | 1465 | CAATTTCTACTCAGTTGTAGAT |
| 2335 | GAATTTCTACTATGTGTAGAT | 2675 | CAATTTCTACTTGCCGGTAGAT |
| 673 | CAATTTCTACTATGAGTAGAT | 1040 | CAATTTCTACTGCTGTGTAGAT |
| 775 | GAATTTCTACTAAGCGTAGAT | 2676 | GAATTTCTCCTACGGGGAGAT |
| 2336 | AAATTTCTACTTGGCGTAGAT | 2677 | GAATTTCTACTTGGAGGTAGAT |
| 2337 | AAATTTCTACTAAGTGTAGAT | 2678 | GAATTTCTACTGCGGTGTAGAT |
| 2338 | GAATTTCTACTACGGGGTAGAT | 2679 | CAATTTCTAATAAGTTTAGAT |
| 1518 | CAATTTCTACTAGCTCGTAGAT | 2680 | AAATTTCTACACGAGTGTAGAT |
| 2339 | AAATTTCTACTATGGTAGAT | 2681 | CAATTCGTTGTAAGTTAACGT |
| 2340 | CAATTTCTACTAAGCGTAGAT | 1401 | CAATTTCTACTGAGCCGTAGAT |
| 2341 | GAATTTCTACTAACGAGTAGAT | 150 | CAATTGGGTGTCTTCATTCT |
| 731 | GAATTTCTACTACGAGTAGAT | 851 | CAATTTCTACTAGCGGGTAGAT |
| 2342 | CAATTTCTACTATTATGTAGAT | 1510 | CAATTTCTCCTATTCGGAGAT |
| 2343 | AAATTTCTACTAAAGTGTAGAT | 2682 | AAATTTCTACTGTTGAGTAGAT |
| 866 | CAATTTCTACTACGAGTAGAT | 2683 | CAATTTCTACTCGTATGTAGAT |
| 610 | CAATTTCTACTTCACGTAGAT | 2684 | CAATTTCTACTTCCTGGTAGAT |
| 2344 | AAATTTCTACTAGTAGTAGAT | 2685 | AAATTTCTACTACACGGTAGAT |
| 662 | CAATTTCTACTACGTGTAGAT | 2324 | CAATTGTTACTCTTGTGGTT |
| 1834 | CAATTTCTACTATATTGTAGAT | 2686 | CAATTTCTACTTAAGAGTAGAT |
| 620 | AAATTTCTACTAATGGGTAGAT | 2687 | CAATTATGTTTAAGTAACGTT |
| 2345 | GAATTTCTACTCTTCGTAGAT | 1397 | CAATTTCTACTTTTCGTAGAT |
| 2346 | AAATTTCTCCTACGGGGAGAT | 1026 | GAATTTCTACTTGGCGTAGAT |
| 2347 | AAATTTCTACTTTGTGTAGAT | 2688 | GAATTTCTCCTACAGCGGAGAT |
| 890 | CAATTTCTACTGGGTGTAGAT | 2689 | CAATTTCTACTGGCGGTAGAT |
| 2348 | AAATTTCTACTTCTGCGTAGAT | 2690 | GAATTTCTACTATGCGGTAGAT |
| 2349 | GAATTTCTACTCAGGGTAGAT | 2691 | CAATTTCTACTGGGATGTAGAT |
| 2350 | AAATTTCTACTATGTGTAGAT | 2692 | CAATTTCTACTCTCAAGTAGAT |
| 800 | CAATTTCTACTAGGTGTAGAT | 2019 | GAATTTCTACTACACCGTAGAT |
| 2351 | CAATTTCTACTGACGGGTAGAT | 2693 | CAATTACGGTTAAGTGTCGTT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 2352 | AAATTTCTACTAAGGCGTAGAT | 2694 | CAATTTCTACTTACGTGTAGAT |
| 2041 | AAATTTCTACTCCCATGTAGAT | 2695 | CAATTGCTGGTAAGTCTAGCT |
| 718 | CAATTTCTACTACGCGTAGAT | 2696 | CAATTGGCGCTAAGTGCGCCT |
| 2353 | GAATTTCTACTCGTCCGTAGAT | 1041 | CAATTTCTACTACTGTAGAT |
| 2354 | AAATTTCTACTAACGTGTAGAT | 2163 | GAATTTCTACTTACTAGTAGAT |
| 909 | GAATTTCTACTGCAGAGTAGAT | 1247 | GAATTTCTACTCATAGGTAGAT |
| 1998 | AAATTTCTACTCAGCGTAGAT | 2697 | CAATTTCTACTTCTCAGTAGAT |
| 608 | CAATTTCTACTAGGCGTAGAT | 2698 | CAATTTCTACTAGTAAGTAGAT |
| 2355 | AAATTTCTACTTATCGTAGAT | 2699 | CAATTTCTACTAGCCTGTAGAT |
| 2356 | GAATTTCTACTCCCGGGTAGAT | 2700 | CAATTTCTCCGAATCGGGAGAT |
| 2357 | AAATTTCTACTAGGTGTAGAT | 2701 | GAATTTCTACTGGCGTAGAT |
| 956 | CAATTTCTACTTTGAAGTAGAT | 2702 | CAATTGTTCGTCTTCGAGTT |
| 1266 | GAATTTCTACTGGTGTAGAT | 2703 | CAATTTCTACTGGATGTAGAT |
| 1754 | GAATTTCTCCTATTGGAGAT | 2704 | CAATTTCTACTAAAGAGTAGAT |
| 2358 | GAATTTCTACTTAGCCGTAGAT | 2705 | GAATTGGTCATCTTTGGTCT |
| 2359 | CAATTTCTACTAGAGAGTAGAT | 2706 | CAATTTCTACTCCTTGTAGAT |
| 2360 | GAATTTCTACTACTTCGTAGAT | 2707 | GAATTTCTACTTGCTGTAGAT |
| 2361 | AAATTTCTCCTGGGTGGAGAT | 1230 | CAATTTCTACTGCAGTAGAT |
| 819 | AAATTTCTACTACGCGTAGAT | 2708 | GAATTTCTACTGCATGTAGAT |
| 2362 | AAATTTCTACTTCCAGGTAGAT | 2709 | CAATTTCTACTTCGCTGTAGAT |
| 2363 | AAATTTCTACTTCGGTGTAGAT | 2710 | CAATTTCTACTATGGCGTAGAT |
| 2364 | AAATTTCTACTGACCGTAGAT | 2711 | CAATTTCTACTCAGGAGTAGAT |
| 2365 | GAATTTCTACTAAGCAGTAGAT | 2712 | GAATTTCTACAACGGTGTAGAT |
| 2366 | GAATTTCTCCTAAGGGGAGAT | 2713 | CAATTCGCTGTCTTCAGCGT |
| 1943 | GAATTTCTACTACGGCGTAGAT | 2714 | GAATTTCTACTGTTACGTAGAT |
| 886 | CAATTTCTACTAGGAGTAGAT | 2305 | CAATTTCTACTGCTTGTAGAT |
| 2367 | CAATTTTAGTTAAGTATTAAT | 2715 | CAATTGTGCGTAAGTTGCGTT |
| 2368 | GAATTTCTACTATTTCGTAGAT | 2716 | CAATTGTTGATAAGTTTGACT |
| 598 | AAATTTCTACTAGGCGTAGAT | 1060 | GAATTTCTACTGGGCTGTAGAT |
| 2369 | GAATTTCTACTAAATTGTAGAT | 2717 | GAATTTCTACTCCTAAGTAGAT |
| 2313 | GAATTTCTACTAGGAGTAGAT | 2718 | CAATTTCTACATTTAGTAGAT |
| 1721 | CAATTTCTACTCGCAGTAGAT | 2719 | CAATTCGTCGTCTTCGACGT |
| 2370 | GAATTTCTACTCATTAGTAGAT | 2720 | CAATTGGTTATCTTTGATCT |
| 750 | CAATTTCTCCTAAGGGGAGAT | 1492 | CAATTTCTCCTACTCGGAGAT |
| 679 | AAATTTCTACTGGCAGTAGAT | 1838 | AAATTTCTACTCTTTAGTAGAT |
| 941 | GAATTTCTACTAAAGGGTAGAT | 2721 | GAATTTCTACTATGTTGTAGAT |
| 2371 | GAATTTCTACTGAAGTGTAGAT | 1525 | CAATTTCTACTCATAGTAGAT |
| 2372 | GAATTTCTACTCAAGTGTAGAT | 2722 | CAATTTCTACTTACAGGTAGAT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 2373 | AAATTTCTACTAAAGGGTAGAT | 2723 | CAATTCATCTTCTTAGGTGT |
| 2374 | AAATTTCTACTATTAGTAGAT | 1668 | CAATTTCTACTATGTCGTAGAT |
| 2375 | GAATTTCTACTCGGGGTAGAT | 2724 | GAATTTCTACTCCTGGTAGAT |
| 2376 | AAATTTCTACTTGCCGTAGAT | 2725 | CAATTTCTACTACAGGGTAGAT |
| 761 | CAATTTCTACTAAGAGTAGAT | 2726 | CAATTTCTCCGGTTAGGAGAT |
| 1252 | AAATTTCTCCTACTGCGGAGAT | 2727 | GAATTCGTCGTCTTTGATGT |
| 772 | CAATTTCTACTACGGGTAGAT | 2728 | CAATTTCTACTACCCTGTAGAT |
| 2377 | AAATTCTCGTTAAGTGTGGGT | 2729 | CAATTGGCGGTCTTCCGTCT |
| 2378 | GAATTTCTACTCTACGTAGAT | 2730 | GAATTTCTACTCGCTTGTAGAT |
| 854 | GAATTTCTACTGCAGTGTAGAT | 2731 | GAATTACTCGTCTTCGAGTT |
| 2379 | AAATTTCTCCTATAGCGGAGAT | 2732 | CAATTTCTACTAAGATGTAGAT |
| 2380 | AAATTCGTGGTCTTCCACGT | 2733 | CAATTTCTACTGTCTCGTAGAT |
| 794 | CAATTTCTACTAAAGGTAGAT | 885 | AAATTTCTACTATAAGGTAGAT |
| 2381 | AAATTTCTACTTCAAGTAGAT | 2734 | AAATTTCTACTTAAGCGTAGAT |
| 586 | GAATTTCTACTAGTGTGTAGAT | 2735 | CAATTTCTACTAGTCAGTAGAT |
| 603 | GAATTTCTACTACAGTGTAGAT | 2736 | CAATTGGTTCTCTTGGACTT |
| 896 | CAATTTCTACTATACTGTAGAT | 1080 | CAATTTCTACTTTCCGTAGAT |
| 2382 | CAATTTCTACTTAGTGTAGAT | 2737 | CAATTATACTTCTTAGTGTT |
| 1193 | GAATTTCTACTCTCTGTAGAT | 1414 | CAATTTCTACTTCAAGGTAGAT |
| 1847 | CAATTTCTACTATCGCGTAGAT | 2738 | CAATTTCTACTGTGCGTAGAT |
| 2028 | GAATTTCTACTGCACCGTAGAT | 1382 | CAATTTCTACTAAGTTGTAGAT |
| 2383 | GAATTTCTACTCCTTAGTAGAT | 2739 | GAATTTCTACTATGGTGTAGAT |
| 2384 | AAATTTCTACTGAAGTGTAGAT | 999 | CAATTTCTCCTATCAGGAGAT |
| 932 | CAATTTCTACTATCGTGTAGAT | 2740 | CAATTGCTTGTCTTTGGGCT |
| 1814 | GAATTTCTACTGTATTGTAGAT | 2741 | CAATTTCTACTAGCGTAGAT |
| 2385 | CAATTTCTACTTGGGAGTAGAT | 940 | GAATTTCTACTCAGTGTAGAT |
| 744 | AAATTTCTACTAAGCGTAGAT | 2742 | GAATTGGTGGTCTTTCGCCT |
| 1039 | CAATTTCTACTACAGTGTAGAT | 2743 | CAATTGGGGTTCTTATCTCT |
| 2386 | CAATTTCTACTCATATGTAGAT | 2744 | AAATTTCTACTAGGGGTAGAT |
| 2387 | AAATTTCTACTGTGTCGTAGAT | 2745 | CAATTTCTACTACGTTGTAGAT |
| 2388 | CAATTTCTACACGAATGTAGAT | 1090 | CAATTTCTCCTATAGTGGAGAT |
| 2389 | CAATTTCTCCTACTGTGGAGAT | 2746 | CAATTTCTACTCTTGAGTAGAT |
| 2390 | CAATTTCTACTAGTGAGTAGAT | 2747 | CAATTTCTACGTTGGTGTAGAT |
| 2391 | AAATTTCTACTTACGCGTAGAT | 2748 | GAATTTCTACTTCATGTAGAT |
| 2392 | GAATTTCTACCATCTGTAGAT | 1531 | CAATTTCTACTATCATGTAGAT |
| 1885 | GAATTTCTACTAAGGGTAGAT | 2749 | CAATTGTTTTTCTTGGAGTT |
| 786 | CAATTTCTACTAGTGTGTAGAT | 2750 | CAATTTCTACTTCAACGTAGAT |
| 2393 | GAATTTCTACTTTTGTAGAT | 2216 | GAATTTCTACTCACATGTAGAT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 2394 | GAATTTCTCCTATTTGGAGAT | 2751 | GAATTTCTACTCAATCGTAGAT |
| 2395 | CAATTTTTACTAAGTGTAGGT | 2752 | GAATTTCTACTACTCTGTAGAT |
| 1643 | GAATTTCTACTTGTCTGTAGAT | 1204 | CAATTTCTACTGAGTGTAGAT |
| 2396 | GAATTTCTACTAAACAGTAGAT | 1745 | CAATTTCTCCTATTGGAGAT |
| 2397 | GAATTTCTACTCTTCTGTAGAT | 1294 | CAATTTCTACTGGTGTGTAGAT |
| 1154 | CAATTTCTACTTGCAGTAGAT | 1949 | CAATTTCTACTAAGCCGTAGAT |
| 2398 | AAATTTCTACTAGTCGTAGAT | 2753 | GAATTTCTACTAGAGTGTAGAT |
| 2399 | GAATTTCTACTTACCTGTAGAT | 2754 | AAATTTCTCCCCGAGCGGAGAT |
| 2400 | CAATTGGGTTTCTTGACCCT | 743 | CAATTTCTACTAAGGAGTAGAT |
| 2401 | AAATTTCTCCTAAGTGGAGAT | 1280 | GAATTTCTACTGGATGTAGAT |
| 2051 | CAATTTCTACTAACGTGTAGAT | 2755 | GAATTTCTCCTGGGCGGAGAT |
| 2220 | GAATTTCTACTGGGGCGTAGAT | 2756 | GAATTACGCTTAAGTGGCGTT |
| 2402 | GAATTTCTCCTACGTGGAGAT | 2757 | CAATTTCTACTTCGGCGTAGAT |
| 971 | GAATTTCTACTTCCCTGTAGAT | 2758 | CAATTTCTACTTATGGGTAGAT |
| 2403 | GAATTTCTACTACGGGTAGAT | 2759 | CAATTTCTACTGTCCGTAGAT |
| 619 | GAATTTCTACTAGCGAGTAGAT | 2760 | CAATTGGGTTTCTTGGCTTT |
| 976 | CAATTTCTCCTAAGTGGAGAT | 1062 | GAATTTCTACTACCCGTAGAT |
| 2404 | GAATTTCTACTAGGATGTAGAT | 1297 | CAATTTCTACTTTGTCGTAGAT |
| 1585 | CAATTTCTACTATTGTAGAT | 2761 | CAATTGGTGTTCTTGTATTT |
| 2405 | AAATTGGTGTTCTTGTGCTT | 2762 | CAATTTCTACTCCAGTAGAT |
| 664 | CAATTTCTACTATGGGTAGAT | 2763 | CAATTACGTTTAAGTGGCGTT |
| 2406 | GAATTTCTACTATATCGTAGAT | 2764 | AAATTTCTACTTCGCGTAGAT |
| 2407 | CAATTTCTACTTCCAAGTAGAT | 2765 | CAATTTCTACTTACCTGTAGAT |
| 2408 | AAATTTCTACTGGGCCGTAGAT | 2190 | CAATTTCTACTGTTCGTAGAT |
| 2409 | CAATTTCTCCTAGCTGGAGAT | 666 | GAATTTCTACTCTCGTAGAT |
| 1456 | CAATTTCTACTATTGTGTAGAT | 2766 | CAATTTCTACTGCTCGTAGAT |
| 2410 | GAATTTCTACTGCGAGTAGAT | 2767 | CAATTTCTACTTACGGGTAGAT |
| 2411 | CAATTTCTCGTAAGTCGAGAT | 2768 | CAATTTCTACTTTCGAGTAGAT |
| 2412 | GAATTTCTACTCGCGTGTAGAT | 2769 | CAATTGGTATTCTTGTACCT |
| 2413 | CAATTTCTACTCAAACGTAGAT | 2770 | CAATTCACGTTCTTATGTGT |
| 2414 | AAATTTCTACTATTTGTAGAT | 2771 | GAATTCCCTCTCTTGGGGGT |
| 740 | CAATTTCTACTATTGAGTAGAT | 2772 | CAATTTCTACTAACCGTAGAT |
| 2415 | GAATTTCTACTGCTTAGTAGAT | 2773 | CAATTTCTCCCTCTACGGAGAT |
| 2416 | CAATTTCTACTAGAGTGTAGAT | 2774 | GAATTTCTCCCGTCTGGGAGAT |
| 2417 | AAATTTCTACTTACGAGTAGAT | 2775 | GAATTTCTACAGCCCGGTAGAT |
| 1434 | GAATTTCTACTGTGTCGTAGAT | 2776 | GAATTTCTACTAATGGGTAGAT |
| 2418 | GAATTTCTACTACAGCGTAGAT | 2777 | GAATTTCTACTTCGGTAGAT |
| 1799 | GAATTTCTACTGTGCGTAGAT | 2778 | CAATTTCTACTGGGCAGTAGAT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 1968 | CAATTTCTACTAACTTGTAGAT | 2779 | CAATTACTCCTAAGTGGGGTT |
| 2419 | GAATTTCTACTTCGAGTAGAT | 1329 | CAATTTCTACTGTATTGTAGAT |
| 2420 | AAATTTCTACTCGGTGTAGAT | 985 | GAATTTCTACTTGGTGTAGAT |
| 2421 | AAATTTCTACTCTAAGTAGAT | 2780 | CAATTTCTACTGTTCAGTAGAT |
| 2422 | CAATTTCTACTCGGTTGTAGAT | 2781 | CAATTGCGTGTCTTTGTGCT |
| 2423 | GAATTTCTACTCATGGTAGAT | 2782 | GAATTTCTACCGGTCGGTAGAT |
| 2424 | AAATTTCTACTAACGCGTAGAT | 2783 | CAATTGGTTCTAAGTGGGTTT |
| 2425 | GAATTTCTACTCCAGAGTAGAT | 2159 | CAATTTCTACTCCTGCGTAGAT |
| 2426 | GAATTTCTACTAGCTTGTAGAT | 2059 | GAATTTCTACTTCCTCGTAGAT |
| 2427 | CAATTTCTACTTCAAGTAGAT | 645 | CAATTTCTACTGGTGCGTAGAT |
| 2428 | AAATTTCTACTCCATCGTAGAT | 2784 | AAATTTCTACCTGTCGTAGAT |
| 2429 | GAATTTCTGCTAAGTGCAGAT | 2785 | CAATTTCTACTACCGGTAGAT |
| 2430 | GAATTTCTACTAGCGTGTAGAT | 2786 | CAATTTCTACTCGTCGTAGAT |
| 2431 | AAATTTCTACTCCGGCGTAGAT | 778 | CAATTTCTACTAGGTGGTAGAT |
| 2432 | CAATTTCTACTAGCGAGTAGAT | 2286 | CAATTTCTCCTACTGGAGAT |
| 2433 | GAATTTCTACTGATGGGTAGAT | 2787 | CAATTTATCTTCTTGGATAT |
| 2434 | GAATTTCTACTTTGTTGTAGAT | 2788 | CAATTCCGACTAAGTGTCGGT |
| 2435 | CAATTTCTACTATCGGGTAGAT | 2789 | GAATTTCTACTCGTGGTAGAT |
| 700 | GAATTTCTACTGCCGTGTAGAT | 2790 | AAATTTCTCCTAAATGGAGAT |
| 2436 | AAATTTCTACTACTCGTAGAT | 2791 | CAATTATTATTAAGTGTGGTT |
| 634 | CAATTTCTACTGGAGCGTAGAT | 2792 | GAATTCCAGGTCTTCCTGGT |
| 1389 | GAATTTCTACTCTTGGTAGAT | 2793 | GAATTTCTACCTGTTGGTAGAT |
| 1310 | CAATTTCTACTATAACGTAGAT | 85 | CAATTCCTACTCTTGTAGGT |
| 882 | CAATTTCTACTGAGTTGTAGAT | 1631 | CAATTTCTACTACCTAGTAGAT |
| 712 | GAATTTCTACTGTTGAGTAGAT | 2794 | CAATTTCTACTGTTCCGTAGAT |
| 2437 | GAATTTCTACTAGAACGTAGAT | 386 | CAATTACGGGTCTTCCTGTT |
| 1736 | GAATTTCTACTACGGAGTAGAT | 2795 | CAATTACCATTAAGTATGGTT |
| 2438 | GAATTTCTACTACCGTAGAT | 2796 | CAATTTCTACTTGCGGTAGAT |
| 2439 | CAATTTCTACTAGCAGTAGAT | 2797 | GAATTTCTACTGTCGGTAGAT |
| 2440 | GAATTTCTACTGTCCGTAGAT | 779 | CAATTTCTCCTACATGGAGAT |
| 2441 | CAATTTTTACTAAGTGTAAAT | 2798 | CAATTTCTACTTGGATGTAGAT |
| 597 | GAATTTCTACTAACGTGTAGAT | 2799 | GAATTTCTACTAGTTTGTAGAT |
| 2442 | GAATTTCTACTGTAAGTAGAT | 2800 | CAATTTCTACTGGGCGTAGAT |
| 789 | CAATTTCTACTAATGTGTAGAT | 2801 | GAATTCGAGCTAAGTGTTTGT |
| 1197 | CAATTTCTACTAGCGCGTAGAT | 2802 | GAATTTCGCCTAAGTGGCGAT |
| 2443 | GAATTTCTACTCACGAGTAGAT | 2803 | GAATTGCGTCTAAGTGGTGTT |
| 2444 | GAATTTCTACTCAAGCGTAGAT | 1418 | CAATTTCTACTGTTACGTAGAT |
| 2445 | GAATTTCTACAGGTTGGTAGAT | 2804 | CAATTTCTACTTAGAGTAGAT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 2446 | GAATTTCTACTGACCAGTAGAT | 2805 | CAATTTCTCCTGAGTGGAGAT |
| 2447 | GAATTTCTACTTCCGGGTAGAT | 2806 | AAATTTCTACTCTAGCGTAGAT |
| 2448 | CAATTTCTACTACTCGTAGAT | 1071 | CAATTTCTACTACACGTAGAT |
| 1588 | CAATTTCTACTAAAAGTAGAT | 2807 | CAATTTCTACTGGAGAGTAGAT |
| 1893 | GAATTTCTACTCTTTCGTAGAT | 810 | CAATTCCTCCTAAGTGGAGGT |
| 2449 | GAATTGGTTATCTTTGATCT | 1155 | CAATTTCTACTTGCAAGTAGAT |
| 822 | GAATTTCTACTGTTTTGTAGAT | 2808 | AAATTCGTCGTCTTCGGCGT |
| 2208 | CAATTTCTACTAAAGCGTAGAT | 2809 | CAATTTCTCCTAGGGGAGAT |
| 2450 | GAATTTCTACTTCGGCGTAGAT | 2810 | GAATTTCTACTCCCTTGTAGAT |
| 2451 | GAATTTAGGTTAAGTGTTTAT | 2811 | CAATTGGTTCTCTTGGGCTT |
| 1876 | GAATTTCTACTGACACGTAGAT | 2812 | CAATTCCGCATCTTTGCGGT |
| 2452 | CAATTTCTACTTAATGTAGAT | 2813 | CAATTTCTACATGCTGTAGAT |
| 1916 | AAATTTCTACTCTAGTAGAT | 2814 | CAATTGTTCTTAAGTAGAACT |
| 2453 | AAATTTCTACTCGTGCGTAGAT | 2815 | CAATTTTGCATCTTTGTGAT |
| 1714 | CAATTTCTACTTATATGTAGAT | 2132 | CAATTTCTACTAGACTGTAGAT |
| 2454 | CAATTTCTCCTATGGGAGAT | 1429 | CAATTTCTACTACGGAGTAGAT |
| 1072 | CAATTTCTACTATCGGTAGAT | 2816 | CAATTTCTCCTCATAAGGAGAT |
| 623 | AAATTTCTACTCCTGTAGAT | 2054 | GAATTTCTACTCTGAAGTAGAT |
| 2455 | CAATTTCTACTTTGTGTAGAT | 2817 | CAATTTCTACTACCCGTAGAT |
| 2456 | CAATTTCTACTAAATAGTAGAT | 1455 | CAATTTCTACTCCTGTAGAT |
| 2457 | AAATTTCTACTCCCGTAGAT | 2818 | GAATTCGCATTAAGTGTGTGT |
| 2458 | CAATTTCTACTAACAAGTAGAT | 1779 | CAATTTCTACTCCAAGTAGAT |
| 2459 | GAATTTCTACTACCAAGTAGAT | 2819 | AAATTCGTGTTCTTACGCGT |
| 1581 | GAATTTCTACTATAGCGTAGAT | 1488 | GAATTTCTACTGTCCGGTAGAT |
| 1970 | CAATTTCTACTAATGCGTAGAT | 2820 | CAATTTCTACTCGAGCGTAGAT |
| 2460 | AAATTTCTACTCCACGTAGAT | 2821 | CAATTACGACTAAGTGTTGTT |
| 2461 | GAATTTCTACTGTTCAGTAGAT | 2822 | CAATTTCTCCTATGGAGGAGAT |
| 2462 | CAATTTCTACTTTGGAGTAGAT | 1133 | GAATTTCTACTGGAAGTAGAT |
| 746 | CAATTTCTACTGTGGTGTAGAT | 2823 | CAATTTAACGTAAGTCGTTGT |
| 735 | GAATTTCTACTTTAACGTAGAT | 2824 | GAATTTCTACATTCCAGTAGAT |
| 2463 | GAATTTCTACTGATTGTAGAT | 2825 | CAATTTCTACTACGACGTAGAT |
| 902 | CAATTTCTACTTGGCGTAGAT | 2826 | CAATTTCTACTCAGACGTAGAT |
| 2464 | AAATTTCTACTACACAGTAGAT | 2827 | GAATTTCTACTCTACTGTAGAT |
| 986 | CAATTTCTACTATTCGGTAGAT | 2828 | CAATTTCTACTCTCCCGTAGAT |
| 2173 | GAATTTCTACTGTGAGTAGAT | 2829 | CAATTGGATTTAAGTGGTCCT |
| 2465 | AAATTTCTACTTGCGGTAGAT | 2830 | AAATTTCTACTGGACTGTAGAT |
| 1342 | CAATTTCTACTTTAAGTAGAT | 2831 | CAATTGCACGTCTTCGTGCT |
| 2466 | GAATTTCTACTGTCGAGTAGAT | 2832 | CAATTGATGCTAAGTGCATCT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 2467 | AAATTTCTACTTGATGTAGAT | 1261 | CAATTTCTACTCCGTTGTAGAT |
| 2468 | GAATTTCTACTAACAGGTAGAT | 2833 | CAATTCGCTGTCTTCGGTGT |
| 2469 | CAATTTCTACTTAAATGTAGAT | 2834 | CAATTTCTACTACGTCGTAGAT |
| 2470 | CAATTTTGCTAAGTGCAGGT | 2835 | CAATTTCTCCGGCAGGGAGAT |
| 2471 | CAATTTCTTCTAAGTGAAGGT | 2836 | CAATTTCTCCACGCGGAGAT |
| 2472 | CAATTTCTACTTGTTTGTAGAT | 2837 | GAATTGACGCTCTTGCGTTT |
| 1443 | GAATTTCTACTACGCAGTAGAT | 2838 | CAATTACTCTTCTTGGGGTT |
| 812 | CAATTTCTACTTTAGCGTAGAT | 2839 | CAATTTCTACTACCGGGTAGAT |
| 640 | GAATTTCTACTTACTGGTAGAT | 2840 | CAATTTCTACTCATCAGTAGAT |
| 1529 | CAATTTCTACTCGTGTAGAT | 2841 | GAATTTCTCCTACTTTGGAGAT |
| 2473 | AAATTTCTACTTAATTGTAGAT | 2842 | GAATTTCTCCCACCTAGGAGAT |
| 2474 | GAATTCCTCGTAAGTCGAGGT | 2843 | GAATTTCTACTGAGAGTAGAT |
| 2475 | GAATTTCTACTGGTGGGTAGAT | 2844 | GAATTTCTACGTCTCGTAGAT |
| 2295 | GAATTTCTACTCCACCGTAGAT | 2845 | AAATTGCGTCTAAGTGGCGTT |
| 2476 | AAATTTCTACTAACCGTAGAT | 2846 | CAATTTCTACGCGAAGTAGAT |
| 2106 | GAATTTCTACTTCAGTGTAGAT | 2847 | CAATTGCAGGTAAGTCTTGTT |
| 2477 | AAATTGGCACTAAGTGTGTTT | 2848 | GAATTTCTACTCCCCTGTAGAT |
| 2478 | GAATTTCTACTTTAGTGTAGAT | 2849 | CAATTTCTACTTCCGGGTAGAT |
| 2479 | GAATTTCTACTAATGTAGAT | 1489 | GAATTTCTACTTTCCCGTAGAT |
| 1707 | GAATTTCTACTATGGCGTAGAT | 2850 | GAATTTCTACTCCACTGTAGAT |
| 2480 | GAATTTCTACTCCATTGTAGAT | 2851 | CAATTGCGAGTAAGTCTTGTT |
| 1028 | GAATTTCTACTCTCGTGTAGAT | 2852 | CAATTGTGTTTCTTGACACT |
| 2481 | CAATTTCTACTACTCTGTAGAT | 2853 | CAATTTCTACGCCCGGTAGAT |
| 1237 | CAATTTCTACTACCGTAGAT | 2854 | GAATTTCTACTCCCTGTAGAT |
| 2482 | GAATTTCTACTCACTGTAGAT | 2855 | CAATTTCTACTTGTGAGTAGAT |
| 2483 | AAATTTCTACTCGTGAGTAGAT | 2856 | CAATTTCTACTGGCGTGTAGAT |
| 1283 | GAATTTCTACTCCCACGTAGAT | 2857 | CAATTGCCGGTAAGTCCGGTT |
| 2484 | CAATTTCTACTATGGAGTAGAT | 998 | GAATTTCTACTGTCGTAGAT |
| 1132 | CAATTTCTACTTGGTGTAGAT | 2858 | GAATTGCTGCTCTTGTGGCT |
| 617 | GAATTTCTACTAGGCGTAGAT | 2859 | CAATTTCTCCTAAAGCGGAGAT |
| 2485 | AAATTTCTACTGGGAGTAGAT | 2860 | CAATTTCTACTACCGTGTAGAT |
| 2486 | CAATTTCTACTTTTTCGTAGAT | 1853 | CAATTTCTACCGCACGTAGAT |
| 2487 | GAATTTCTACTGATCGTAGAT | 1221 | GAATTTCTACTCCGATGTAGAT |
| 2488 | CAATTTCTACTGATTTGTAGAT | 2861 | CAATTTCTCCTATGTTGGAGAT |
| 2489 | CAATTTCTACTAGAATGTAGAT | 2862 | GAATTTCTACTTGTGGGTAGAT |
| 1211 | CAATTTCTACTCGGAGTAGAT | 2863 | CAATTGCTGTTAAGTGCGGCT |
| 2490 | CAATTTCTACTACAGCGTAGAT | 1479 | CAATTTCTACTCTGGTAGAT |
| 1773 | CAATTTCTACTTTCGTAGAT | 846 | GAATTTCTACTTGTGTAGAT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 1398 | CAATTTCGCCTAAGTGGCGAT | 2864 | GAATTGGTGGTCTTCCACTT |
| 674 | CAATTTCTACTGTGGTAGAT | 2865 | CAATTTCTCCTGCGTGGAGAT |
| 970 | GAATTTCTACTGCTTTGTAGAT | 2866 | CAATTTCGGGTCTTTCTGGT |
| 2491 | CAATTTCTACTACAAGTAGAT | 2867 | CAATTTCTACTGCCACGTAGAT |
| 2492 | GAATTTCTCCTAAGTGGAGAT | 2868 | CAATTTCTACTAGACGGTAGAT |
| 2493 | GAATTTCTACTACTGCGTAGAT | 2869 | CAATTTCTACTCTCCGTAGAT |
| 1160 | GAATTTCTACTTCTCGGTAGAT | 1356 | CAATTTCTACTCTAGAGTAGAT |
| 1306 | CAATTTCTACTCGTTGTAGAT | 602 | CAATTTCTACTATGGGGTAGAT |
| 2494 | CAATTTCTACTATCTAGTAGAT | 2870 | AAATTTCTACTACTGGTAGAT |
| 821 | AAATTTCTCCTACGTGGAGAT | 2871 | AAATTTCTACTTGAGCGTAGAT |
| 2087 | GAATTTCTACTGGGAGTAGAT | 2872 | CAATTGTTGCTCTTGCGGTT |
| 2495 | GAATTTCTACTTCGAGGTAGAT | 2873 | CAATTAGTCTTAAGTAGGTTT |
| 2496 | CAATTTCTACTTCTTGTAGAT | 784 | CAATTTCTACTCTATCGTAGAT |
| 2091 | CAATTTCTACTAGACCGTAGAT | 2874 | CAATTTCTACTTCTGGGTAGAT |
| 993 | CAATTTCTCCTACGAGGAGAT | 1070 | CAATTTCTACTGTCATGTAGAT |
| 2497 | CAATTTCTACTGTGATGTAGAT | 1366 | CAATTTCTACTGATGGGTAGAT |
| 2498 | CAATTTCTACTAGCGTGTAGAT | 1127 | GAATTTCTCCTCGGTGGAGAT |
| 2499 | AAATTTCTACTACATGTAGAT | 2875 | GAATTTCTACCAACGGTAGAT |
| 2500 | GAATTTCTACTGGTGAGTAGAT | 2308 | GAATTTCTACTCCATAGTAGAT |
| 2501 | GAATTTCTACTACCCTGTAGAT | 2876 | CAATTGGTTATAAGTTAATCT |
| 2502 | CAATTTCTACTCAATGTAGAT | 1406 | CAATTCCTAATAAGTTTAGGT |
| 2503 | GAATTTCTCCTATTAGGAGAT | 2877 | GAATTTCTACTCTATCGTAGAT |
| 1806 | CAATTTCTACTGTCGTAGAT | 950 | CAATTTCTCCTATCTGGAGAT |
| 929 | CAATTTCTACTTCCACGTAGAT | 2878 | CAATTACTGATCTTTCGGTT |
| 1079 | CAATTTCTACTCTACCGTAGAT | 919 | CAATTTCTACTATGCTGTAGAT |
| 638 | AAATTTCTACTTGCCTGTAGAT | 2879 | CAATTTCTCCTACGGTGGAGAT |
| 945 | CAATTTCTACTGTATCGTAGAT | 2880 | GAATTTCTACTACCGCGTAGAT |
| 2504 | AAATTTCTACTTTCGGTAGAT | 2881 | CAATTTCTACTCTGATGTAGAT |
| 2505 | CAATTTCGACTAAGTGTCGAT | 2882 | CAATTTCTACTGTGGGTAGAT |
| 2506 | CAATTTCTCCTACTGCGGAGAT | 2883 | GAATTTCTCCAGCCCAGGAGAT |
| 994 | CAATTTCTACTACACTGTAGAT | 2884 | CAATTTCTACTTTTATGTAGAT |
| 1788 | GAATTTCTACTTGCGTGTAGAT | 2885 | CAATTTGTGTCTTCGCGGT |
| 2507 | AAATTTCTCCTGGATGGGAGAT | 2886 | GAATTTCTACTAGCGTAGAT |
| 684 | GAATTTCTACTACTGAGTAGAT | 2887 | CAATTTCCATAAGTTGGAGT |
| 2508 | CAATTTCTACTATCGAGTAGAT | 837 | CAATTTCTACTACGAAGTAGAT |
| 1185 | CAATTTCTACTCCAGCGTAGAT | 1020 | CAATTTCTACTGTGTGTAGAT |
| 2509 | CAATTTCTACTCTGGTGTAGAT | 2888 | CAATTTCTACTTAGTGGTAGAT |
| 2510 | GAATTTCTACTCCTGTAGAT | 2889 | GAATTTCTACCGTAGAGTAGAT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 2511 | CAATTTCTCCTAGTGAGGAGAT | 2890 | CAATTGATGATCTTTCATTT |
| 2512 | CAATTTCTACTTCAAAGTAGAT | 2891 | CAATTGCGTCTCTTGACGTT |
| 641 | GAATTTCTACTACGCGTAGAT | 2892 | CAATTGGTGGTCTTCCACTT |
| 1852 | CAATTTCTACTATAGTAGAT | 2893 | CAATTTCTACTGAATGTAGAT |
| 2513 | CAATTTCTACTAGAGCGTAGAT | 2894 | CAATTTCTACTGTTGTAGAT |
| 2514 | GAATTTCTACTGTGTGTAGAT | 2895 | AAATTTCTACTCATAGTAGAT |
| 1328 | CAATTTCTACTTGCCGTAGAT | 294 | CAATTTTACGTCTTCGTGAT |
| 2515 | CAATTTCTACTTTGTAGTAGAT | 2896 | CAATTGGTCTTCTTAGATTT |
| 2516 | CAATTTCTACTTCAGAGTAGAT | 1651 | CAATTTCTACTACTTGTAGAT |
| 2517 | GAATTTCTACTAGCATGTAGAT | 1699 | CAATTTCTCCTTTGCGGAGAT |
| 1959 | AAATTTCTACTCATTCGTAGAT | 2897 | GAATTTCTCCCACCTGGAGAT |
| 2518 | CAATTTCTCCTATTGCGGAGAT | 2898 | CAATTTCTACTAGTTTGTAGAT |
| 589 | CAATTTCTACTACCGAGTAGAT | 2899 | CAATTCAGTGTCTTTGCTGT |
| 2519 | AAATTTCTACTGTACGTAGAT | 2900 | GAATTTCTCCTCCCGAGGAGAT |
| 2520 | AAATTTCTACTCGCATGTAGAT | 2901 | CAATTACGGCTAAGTGTCGTT |
| 2521 | CAATTTCTACTAAGGGTAGAT | 844 | CAATTTCTACTAACACGTAGAT |
| 1016 | GAATTTCTACTGCCATGTAGAT | 2902 | CAATTTCTACTCCCCGTAGAT |
| 2522 | CAATTTCTACCGGACGTAGAT | 2903 | CAATTCTGTCTAAGTGGTAGT |
| 790 | GAATTTCTACTCGTGGGTAGAT | 2904 | CAATTGTTATTAAGTGTAACT |
| 2523 | GAATTTCTACTTCTTCGTAGAT | 2905 | GAATTTCTCCAGAGTAGGAGAT |
| 2524 | GAATTTCTACTCCGTGTAGAT | 655 | CAATTTCTACTAGCTTGTAGAT |
| 1419 | AAATTTCTACCTCCAGTAGAT | 2906 | GAATTTCTACTGCGGTAGAT |
| 1178 | CAATTTCTACTAAGGTAGAT | 2907 | GAATTTCTCCCAGATGGGAGAT |
| 2525 | CAATTTCTACTAGTTGTAGAT | 2908 | CAATTGTGCTTCTTGGCGCT |
| 2526 | GAATTTCTACTAACTTGTAGAT | 2909 | CAATTACTAGTCTTTTGGTT |
| 1740 | GAATTTCTACTAGTGTAGAT | 2910 | CAATTTCTACTCGGGGTAGAT |
| 2527 | GAATTTCTACTACTGTGTAGAT | 2911 | CAATTTCTACTGAGCAGTAGAT |
| 2528 | AAATTTCTACTGAACGTAGAT | 2912 | GAATTGCGCTTAAGTAGTGCT |
| 2529 | CAATTTCTCCTGGGTGGAGAT | 2913 | CAATTGGCGTTCTTGCGTCT |
| 2530 | GAATTTCTACTCGACGTAGAT | 2914 | CAATTTCTACTTGCCAGTAGAT |
| 2531 | GAATTTCTACTCGCATGTAGAT | 2915 | CAATTACCAGTAAGTTTGGTT |
| 979 | CAATTTCTCCTAGGAGGAGAT | 804 | CAATTTCTACTATCCGGTAGAT |
| 2532 | CAATTTCTACTCGTAGTAGAT | 2916 | CAATTTAGGTTAAGTGCTTGT |
| 859 | CAATTTCTACTATGGTGTAGAT | 2917 | CAATTGGTGATAAGTTTACCT |
| 973 | CAATTTCTACTTCGCAGTAGAT | 2918 | CAATTTCTACTTTACTGTAGAT |
| 2105 | GAATTTCTACTTTCGCGTAGAT | 2919 | CAATTACTGGTCTTTTGGTT |
| 2533 | GAATTTCTCCTACGCGGAGAT | 2920 | CAATTTCTCATAAGTTGGGGT |
| 2534 | CAATTTCTACAATCGGTAGAT | 2921 | CAATTTCTACTTTGCCGTAGAT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 891 | GAATTTCTACTGAAGTAGAT | 2922 | CAATTTCTACTACGGTGTAGAT |
| 2535 | CAATTTCTACTAAGTGTGGAT | 1279 | CAATTTCTACTCGCTCGTAGAT |
| 2536 | GAATTTCTACTTTCTAGTAGAT | 2923 | CAATTACCGATCTTTCGGTT |
| 2537 | AAATTTCTACTTGTGGTAGAT | 2924 | CAATTGAGCCTAAGTGGCTCT |
| 2538 | CAATTCTACTACTGAGTAGAT | 2925 | CAATTTGGGGTCTTCTTCAT |
| 2539 | CAATTTCTACTTAAGGTAGAT | 2926 | CAATTTCTACTGACTCGTAGAT |
| 2540 | GAATTTCTCCTAGGCGGAGAT | 2927 | CAATTCATGATCTTTTATGT |
| 2541 | CAATTTCTACTACGAGGTAGAT | 2928 | GAATTTCTACTGTAACGTAGAT |
| 2542 | CAATTCTGGGTAAGTCTTGGT | 1473 | CAATTTCTACTACAAGGTAGAT |
| 2543 | GAATTTCTACTTTAAGGTAGAT | 2929 | GAATTGCTGTTCTTACGGCT |
| 2544 | GAATTGACAGTCTTCTGTCT | 2930 | CAATTTCTCCCAATAGGAGAT |
| 2545 | GAATTTCTACTGGTCCGTAGAT | 2931 | CAATTCTACGTCTTCGTAGT |
| 659 | CAATTTCTACTAGGGGTAGAT | 2932 | CAATTGTTCTTCTTGGAATT |
| 2546 | CAATTTCTACTGTTAAGTAGAT | 2933 | GAATTTCTCCTAGTGAGGAGAT |
| 2547 | CAATTTCTACTACGCTGTAGAT | 2934 | GAATTTCTACTGGAATGTAGAT |
| 2548 | CAATTTCTACTTCGTGTAGAT | 2935 | CAATTTCTACATATCTGTAGAT |
| 1926 | GAATTTCTACTGCTCCGTAGAT | 2936 | CAATTGAAGTTCTTACTTCT |
| 2199 | CAATTTCTACTGTTCTGTAGAT | 2937 | GAATTTCTACTGAACGTAGAT |
| 1174 | CAATTTCTACTCTCATGTAGAT | 2938 | CAATTTCTACTTCCGTAGAT |
| 2549 | AAATTTCTACTCGATTGTAGAT | 2939 | CAATTTCTCCAGGAAAGGAGAT |
| 2550 | CAATTTCTACTTCTTAGTAGAT | 2940 | CAATTGACGTTCTTACGTCT |
| 2551 | AAATTTCTACTTCGTGTAGAT | 947 | CAATTTCTACTTTGACGTAGAT |
| 2552 | CAATTATGGCTCTTGTCGTT | 2941 | AAATTCGCGTTCTTACGCGT |
| 2553 | AAATTTCTACTTGTTAGTAGAT | 2942 | CAATTCACTCTCTTGGGTGT |
| 1519 | CAATTTCTACTTACTGTAGAT | 2943 | GAATTTCTCCTACTGCGGAGAT |
| 2554 | AAATTTCTACTGTCCGTAGAT | 2944 | GAATTTCTACTTAGCTGTAGAT |
| 2555 | CAATTTCTACTAATCTGTAGAT | 2945 | CAATTGGGCTTAAGTGGCCTT |
| 2556 | AAATTTCTACTACAAGGTAGAT | 2946 | CAATTTCGCCTAAGTGGTGAT |
| 1967 | GAATTTCTACTCGCGTAGAT | 2947 | GAATTTCTACTAGTCGGTAGAT |
| 1499 | CAATTTCTCCTAACGTGGAGAT | 2948 | GAATTACGTGTAAGTCACGTT |
| 1826 | GAATTTCTACTCAAGTAGAT | 2949 | CAATTTCTACTGAGGCGTAGAT |
| 1560 | CAATTTCTACTACAGAGTAGAT | 1042 | CAATTTCTACTTAGAAGTAGAT |
| 1771 | CAATTTCTACTAAACGTAGAT | 241 | CAATTGGTCGTCTTTGATTT |
| 2557 | AAATTTCTCCTAGGAGGAGAT | 1061 | CAATTTCTACTCGTTCGTAGAT |
| 2558 | GAATTTCTACTCAGGTAGAT | 2950 | CAATTCCCTGTAAGTCGGGGT |
| 2559 | CAATTTCTACTCGGCCGTAGAT | 2951 | AAATTTCTCCTTGGCGGAGAT |
| 2560 | CAATTTCTACTTATCCGTAGAT | 2952 | CAATTTCTCCGCTCCGGAGAT |
| 2561 | AAATTTCGCCTAAGTGGCGAT | 2953 | CAATTGTTTGTCTTCAAATT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 2562 | AAATTTCTACTCGTGGTAGAT | 2954 | CAATTCCGAGTAAGTCTCGGT |
| 1073 | CAATTTCTACTGCTGTAGAT | 2955 | CAATTTATGTTCTTGTATAT |
| 1646 | CAATTTCTACTGATGTAGAT | 2264 | GAATTTCTACTCATGTGTAGAT |
| 2563 | CAATTTCTCCTTTGTGGAGAT | 2956 | CAATTCTCTCTCTTGAGAGT |
| 2564 | CAATTTCTACAAACTGTAGAT | 2957 | CAATTCTGGGTAAGTCTTAGT |
| 2565 | GAATTTCTCCTAGATGGAGAT | 1720 | CAATTTCTACTGCTGCGTAGAT |
| 2566 | CAATTTCTCCTAAGGTGGAGAT | 2958 | CAATTAGGAGTAAGTCTCCTT |
| 748 | CAATTTCTACTGTTGGGTAGAT | 2959 | GAATTGTTGATAAGTTTGGCT |
| 2567 | CAATTTCTACTTTTCAGTAGAT | 2960 | CAATTTCTACCTTCAGTAGAT |
| 2246 | GAATTTCTACTGGCGCGTAGAT | 2961 | CAATTGCGGTTCTTGTCGTT |
| 2568 | GAATTTCTACATCTGTAGAT | 2962 | GAATTTCTACCTTACGTAGAT |
| 2031 | CAATTTCTACTATTGGTAGAT | 2963 | GAATTTCTCCTCTGTGGAGAT |
| 2569 | AAATTTCTACTGTCTGTAGAT | 2964 | CAATTGGGCGTAAGTTGCTTT |
| 2570 | GAATTTCTACTTTCCGTAGAT | 2965 | CAATTTCTACCTTCCGGTAGAT |
| 2571 | AAATTTCTACTGTAAGTAGAT | 2966 | GAATTTGTGTTCTTACGTGT |
| 2572 | GAATTTCTACTGGTAAGTAGAT | 2967 | GAATTTCTACGGACTGTAGAT |
| 2573 | CAATTGGGTCTCTTGGCCTT | 2968 | CAATTTCTACTCACTGTAGAT |
| 2574 | AAATTCGACTTAAGTGGTCGT | 2969 | CAATTTCTACAGAATCGTAGAT |
| 2575 | GAATTTCTCCTGCGTGGAGAT | 2970 | CAATTAGTTCTCTTGGATTT |
| 2576 | CAATTAGCGCTCTTGTGTTT | 2971 | GAATTGGCTGTAAGTTGGTCT |
| 2577 | GAATTTCTACTAAGGAGTAGAT | 2972 | CAATTTCTACTGCAATGTAGAT |
| 2578 | CAATTTCTACTGTGTCGTAGAT | 1220 | CAATTAGTTGTAAGTCAGTTT |
| 2579 | CAATTTCTACTACAGTAGAT | 913 | CAATTTCTACTCCCCCGTAGAT |
| 574 | CAATTTCTACTTTGCGTAGAT | 2973 | CAATTTCTACCACACGTAGAT |
| 2580 | GAATTTCTCCTATGCGGAGAT | 2974 | CAATTTCTACTGAAATGTAGAT |
| 1989 | GAATTTCTACTTGGCCGTAGAT | 2975 | CAATTTCTCCTACCTGGAGAT |
| 2581 | AAATTTCTACTCCCCTGTAGAT | 2976 | CAATTGGTCTTAAGTGGGTCT |
| 2582 | CAATTTCTACTTTTTTGTAGAT | 2977 | CAATTTCTACCGATGGTAGAT |
| 2583 | GAATTTCTACTTCTTAGTAGAT | 2978 | GAATTTCTCCTATGGAGGAGAT |
| 1098 | CAATTTCTACTCCATTGTAGAT | 2979 | CAATTATGGTTCTTGTCATT |
| 2584 | GAATTTCTACTCGTGCGTAGAT | 2980 | CAATTTTAGCTCTTGTTGAT |
| 1804 | GAATTTCTACTTGAGGTAGAT | 1671 | CAATTGTTTATCTTTAGGCT |
| 2585 | AAATTTCTCCTAGGTGGAGAT | 2981 | CAATTTCTACTCTCGGGTAGAT |
| 686 | CAATTTCTACTTCTCTGTAGAT | 2982 | CAATTGGTCTTCTTAGGCCT |
| 1320 | CAATTTCTACTTCGTTGTAGAT | 2983 | AAATTTCTACTTACGGGTAGAT |
| 2586 | GAATTTCTACTGTACGTAGAT | 2984 | GAATTGCTGCTCTTGCAGTT |
| 1050 | GAATTTCTCCTACCGTGGAGAT | 2985 | CAATTGCCGCTAAGTGCGGCT |
| 2587 | CAATTGTGTGTAAGTTACGCT | 2986 | CAATTGGTTTTAAGTGGGTTT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 2588 | GAATTTCTCCTAGTGCGGAGAT | 2987 | CAATTGCGGCTCTTGTTGCT |
| 930 | AAATTTCTCCTAAGGGGAGAT | 2988 | CAATTTCTGATAAGTTCAGAT |
| 918 | CAATTTCTACTAATCGTAGAT | 2989 | AAATTTCTACTACCATGTAGAT |
| 2589 | CAATTTCTACTTGTGTAGAT | 915 | CAATTTCTCCTACACGGAGAT |
| 2590 | CAATTTCTACTTTCTGTAGAT | 964 | CAATTTCTACTGTTGTGTAGAT |
| 1161 | CAATTTCTACTGTACGTAGAT | 1343 | CAATTTCTACTATTAGGTAGAT |
| 2591 | CAATTCGAATTCTTATTCGT | 2990 | CAATTTCTACACCGGTGTAGAT |
| 2592 | CAATTTCTACTATTAAGTAGAT | 2991 | CAATTTCTACTCAATAGTAGAT |
| 2593 | GAATTTCTACTGATTAGTAGAT | 2992 | CAATTTCAGTTAAGTGTTGAT |
| 656 | CAATTTCTACTGACAGTAGAT | 2993 | CAATTAATGTTCTTATGTTT |
| 2594 | GAATTTCTACTAGGGCGTAGAT | 2994 | CAATTGGTTTTCTTAAGCCT |
| 2595 | GAATTCGGGGTAAGTCTCTGT | 2995 | CAATTGACTTTCTTAAGTCT |
| 2596 | CAATTTCTACTTGATTGTAGAT | 2996 | CAATTAGTGGTAAGTCCACTT |
| 2077 | GAATTTCTACTCGCAGTAGAT | 2997 | CAATTCCCTCTCTTGGGGGT |
| 2597 | CAATTTCTACTTCGGAGTAGAT | 2998 | CAATTTCTACTTATGAGTAGAT |
| 847 | GAATTTCTACTTCTAAGTAGAT | 2999 | GAATTTCTACCACTTGTAGAT |
| 2598 | GAATTTCTACTGGTTCGTAGAT | 1162 | CAATTTCTACTCTACTGTAGAT |
| 2599 | GAATTGGTTCTAAGTGAGCCT | 3000 | CAATTTCTACTCACGCGTAGAT |
| 2600 | AAATTGTGGGTAAGTCTCGTT | 1001 | CAATTTCTCCTAAGGAGGAGAT |
| 1828 | CAATTTCTACTAACCTGTAGAT | 3001 | CAATTCTAAGTAAGTCTTGGT |
| 1632 | CAATTTCTACTGGCTCGTAGAT | 3002 | CAATTTCTACCTCCCGTAGAT |
| 2601 | AAATTTCTCCTAAGAGGGAGAT | 3003 | CAATTCGGGTTAAGTACTTGT |
| 2602 | AAATTTCTCCTATGCGGAGAT | 3004 | GAATTTCTCCATCCCGGGAGAT |
| 2603 | GAATTTCTACTACCGAGTAGAT | 3005 | CAATTTCTACTACATGGTAGAT |
| 2604 | CAATTTCTACTGATAAGTAGAT | 3006 | CAATTGCGAGTAAGTTTCGTT |
| 2605 | CAATTTCTACTGTATGTAGAT | 3007 | CAATTGGTTTTCTTGAGTTT |
| 1246 | CAATTTCTACTCTAGGTAGAT | 681 | CAATTTCTACTGAAAGTAGAT |
| 2606 | AAATTTCTCCTAATGAGGAGAT | 3008 | CAATTTCTACTCGATGTAGAT |
| 2607 | GAATTTCTACTGTCTTGTAGAT | 3009 | CAATTTCTACTAGGCCGTAGAT |
| 2608 | GAATTTCTACTATCGCGTAGAT | 3010 | CAATTTCTACTTACATGTAGAT |
| 596 | GAATTTCTACTATCATGTAGAT | 3011 | GAATTTCTACTGCGTGTAGAT |
| 1099 | CAATTTCTACTCACGTAGAT | 3012 | CAATTTCTCCTACGGCGGAGAT |
| 1798 | GAATTTCTACTCCCAGTAGAT | 861 | CAATTTCTCCTACAGGAGAT |
| 2609 | GAATTTCTACTTGGATGTAGAT | 741 | GAATTTCTACTCTTACGTAGAT |
| 2282 | CAATTTCTACTTAAGCGTAGAT | 3013 | CAATTTGCCTTAAGTAGGCAT |
| 1537 | CAATTTCTACTGTTCGGTAGAT | 1177 | CAATTTCTCCTACTGAGGAGAT |
| 2610 | GAATTTCTACACTCCAGTAGAT | 3014 | CAATTTCTACTTCCTAGTAGAT |
| 2611 | CAATTTCTACTTTAAGGTAGAT | 3015 | AAATTTCTACACGTACGTAGAT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 2612 | GAATTGGGTGTCTTCATTCT | 3016 | CAATTGCTCTTCTTAGAGCT |
| 2613 | CAATTTCTACTTTCGGTAGAT | 3017 | AAATTTCTACGCACCGTAGAT |
| 2614 | CAATTTCTCCTACCGAGGAGAT | 2226 | GAATTTCTACTTCGATGTAGAT |
| 2231 | GAATTTCTACTCGCCTGTAGAT | 3018 | CAATTATTTGTCTTCGGATT |
| 2615 | GAATTTCTACTATCGGTAGAT | 1405 | CAATTTCTACTGCGAGTAGAT |
| 2616 | AAATTCCTACTAAGTGTGGGT | 1124 | CAATTTCTCCTATCGTGGAGAT |
| 1626 | GAATTTCTACTTCCACGTAGAT | 3019 | GAATTGGTCGTAAGTCGATTT |
| 668 | CAATTTCTACTTTAGTGTAGAT | 3020 | CAATTTCTACTGCCGGTAGAT |
| 1325 | CAATTTCTACTCCTCTGTAGAT | 3021 | GAATTTCTACTGCTTGGTAGAT |
| 2617 | GAATTTCTACCACAAGTAGAT | 3022 | GAATTTCTACGATCCCGTAGAT |
| 682 | GAATTTCTCCTATCGCGGAGAT | 3023 | CAATTTCTACTGTCAGGTAGAT |
| 2618 | CAATTTCTACTGCCATGTAGAT | 3024 | CAATTTCTACTACTGCGTAGAT |
| 2619 | GAATTTCTACTTGTGAGTAGAT | 3025 | GAATTCGCGTTCTTACGCGT |
| 2620 | CAATTTCTACTCTGGAGTAGAT | 3026 | CAATTTGACGTCTTCGTTGT |
| 2621 | CAATTTCTCCTAGAGAGGAGAT | 3027 | CAATTTTGTTTAAGTGACGAT |
| 2622 | CAATTTCTACTGGGGTAGAT | 3028 | CAATTCATATTAAGTGTGTGT |
| 2623 | CAATTTCTACTCTTCTGTAGAT | 1815 | GAATTTCTACTTGCGGTAGAT |
| 2624 | GAATTTCTACTCCGACGTAGAT | 3029 | CAATTTCTACTATATGTAGAT |
| 2625 | GAATTGGTGGTCTTCTATTT | 3030 | GAATTTCTACTTGCAGTAGAT |
| 2626 | GAATTTCTACCCTCTGTAGAT | 579 | GAATTTCTACTTAGAGTAGAT |
| 2627 | GAATTTCTACTTGAAGGTAGAT | 2138 | CAATTTCTACTGTGAGTAGAT |
| 2329 | GAATTTCTACTTCGTGTAGAT | 3031 | CAATTATACGTCTTTGTGTT |
| 2628 | AAATTTCTACTCCTTGGTAGAT | 3032 | CAATTAGTTGTAAGTTGACTT |
| 2629 | CAATTTCTACTTGGAGTAGAT | 3033 | GAATTGTGGCTCTTGCCGTT |
| 2630 | GAATTTCTACAATACGGTAGAT | 3034 | AAATTTCTACTAACCCGTAGAT |
| 799 | CAATTTCTACTGTTGGTAGAT | 3035 | AAATTTCTACTTCGAAGTAGAT |
| 2631 | CAATTGTGCATCTTTGTGCT | 3036 | GAATTTCTACTAACCGTAGAT |
| 2632 | CAATTTAGCATAAGTTGCTAT | 1686 | CAATTTCTACTCCTGGTAGAT |
| 1352 | CAATTTCTACTTCTCGGTAGAT | 3037 | GAATTTCTACTTAGGAGTAGAT |
| 2633 | AAATTTCTCCTCACGCGGAGAT | 3038 | AAATTCGCGTTCTTACGTGT |
| 2634 | AAATTGGCGCTAAGTGCGCTT | 3039 | GAATTTCTACCCTTAGTAGAT |
| 2635 | CAATTTCTACTGCGTGTAGAT | 3040 | CAATTGTCTTTCTTGAGATT |
| 2636 | CAATTTCTACTGCATTGTAGAT | 3041 | CAATTTCTACGAGACTGTAGAT |
| 907 | CAATTTCTACTCTGTAGTAGAT | 3042 | CAATTATCCTTCTTGGGGTT |
| 2637 | AAATTGACACTAAGTGTGTCT | 3043 | CAATTTCTACTCAGGGTAGAT |
| 2638 | CAATTTCTACTCATTCGTAGAT | 3044 | GAATTTCTCCTGGGTGGAGAT |
| 1006 | CAATTTCTACTTCGCCGTAGAT | 3045 | CAATTTCTACTGCTTCGTAGAT |
| 888 | CAATTTCTACTCCTTAGTAGAT | 3046 | GAATTTGGGGTAAGTTCCCGT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 2639 | CAATTAGCTTTCTTAAGTTT | 1912 | GAATTTCTACTGCCGTAGAT |
| 1110 | CAATTTCTACTGCCTTGTAGAT | 3047 | CAATTCCTATTAAGTGTGGGT |
| 2640 | AAATTTCTCCTACGCTGGAGAT | 3048 | CAATTTAGGCTCTTGTCTAT |
| 435 | CAATTCCGCGTCTTTGTGGT | 3049 | CAATTAGGCATCTTTGTTTT |
| 2641 | CAATTTCTACTTTCACGTAGAT | 3050 | CAATTCGGACTAAGTGTCCGT |
| 908 | CAATTTCTACTCTTATGTAGAT | 3051 | AAATTTCTCCACAATGGGAGAT |
| 858 | GAATTTCTACTCCTCTGTAGAT | 2227 | CAATTTCTACTTAGCCGTAGAT |
| 2642 | AAATTTCTACTACGTTGTAGAT | 176 | CAATTGTGCGTAAGTTGCGCT |
| 1069 | CAATTTCTACTAACGCGTAGAT | 3052 | CAATTCCCGTCTTCGGGGT |
| 2643 | GAATTGTGTATCTTTGTGCT | 3053 | CAATTTCTACAATATGTAGAT |
| 921 | CAATTTCTACTTAGCTGTAGAT | 3054 | CAATTTCTACTGGAAGTAGAT |
| 2644 | AAATTTCTACTAGTGCGTAGAT | 1330 | CAATTTCTACTCAGTGTAGAT |
| 905 | CAATTTCTACTCCCTTGTAGAT | 1260 | CAATTTCTCCTTTGAGGAGAT |
| 2645 | CAATTTCTACTCTTTGTAGAT | 3055 | CAATTTCTACTTACTAGTAGAT |
| 2646 | CAATTTGTGTTCTTGTACGT | 3056 | CAATTAGCTTTAAGTGAGTTT |
| 2647 | CAATTTCTACTGCCGTGTAGAT | 3057 | GAATTCGTCTTCTTGGGCGT |
| 2648 | CAATTTCTACTTTATAGTAGAT | 3058 | CAATTACAAGTAAGTCTTGTT |
| 2649 | CAATTTCTACTGCACTGTAGAT | 3059 | CAATTTTGGTCTTTCGGGT |
| 1767 | AAATTTCTACTGAATGTAGAT | 3060 | GAATTTCTACACCCTGTAGAT |
| 2650 | GAATTTCTACTTACAGGTAGAT | 3061 | CAATTTCTACTGCGGTAGAT |
| 2651 | GAATTAGGTCTAAGTGGCTTT | 3062 | CAATTGTGACTAAGTGTTATT |
| 2652 | CAATTTCTACTAACGTAGAT | 3063 | GAATTGCCTGTAAGTCAGGTT |
| 2653 | GAATTTCTACTCGTTGGTAGAT | 3064 | CAATTTCTACACTCATGTAGAT |
| 2654 | CAATTCTGATTCTTGTCGGT | 3065 | CAATTTCTACTGTCTTGTAGAT |
| 2655 | CAATTTCTACTCCGGTGTAGAT | 3066 | CAATTCACTCTCTTGAGTGT |
| 763 | CAATTTCTACTATGGTAGAT | 3067 | GAATTGGTGTTCTTGCGCCT |
| 898 | AAATTTCTACTGCCGTAGAT | 3068 | CAATTTCTACTGATGTGTAGAT |
| 2656 | CAATTTCTACTCCCTCGTAGAT | 3069 | GAATTTCTACTATTAGTAGAT |
| 1348 | CAATTTCTACTTGTCAGTAGAT | 3070 | CAATTAGGTTAAGTGTCTGT |
| 1400 | CAATTTCTACTATTCGTAGAT | 3071 | GAATTTCTACGACTTGTAGAT |
| 1005 | CAATTTCTACTTAGGTAGAT | 3072 | CAATTACTTGTAAGTTGAGTT |
| 1716 | CAATTTCTACTCTCTCGTAGAT | 3073 | CAATTTCTACTCCCAGTAGAT |
| 2037 | CAATTTCTACTGCCCGTAGAT | 3074 | GAATTCACTGTCTTCGGTGT |
| 2657 | CAATTTCTACTAGTGCGTAGAT | 3075 | GAATTTCTCCTAACTGGAGAT |
| 2658 | CAATTGCTCGTCTTCGAGCT | 1851 | CAATTTCTACTTCCTCGTAGAT |
| 2659 | CAATTTCTACATCACCGTAGAT | 3076 | AAATTCTGTGTAAGTCATGGT |
| 2660 | AAATTTCTACTTCAAGGTAGAT | 2036 | GAATTTCTACTAGTAAGTAGAT |
| 2661 | CAATTTCTACTATGTGGTAGAT | 3077 | CAATTTCTACTGGCGCGTAGAT |

TABLE 5-continued

WT_1b provides identified gRNA sequences that bind LbCas12a protein.

| SEQ ID NO | gRNA Sequence | SEQ ID NO | gRNA Sequence |
|---|---|---|---|
| 2662 | GAATTTCTACTCGTAGTAGAT | 3078 | CAATTAGTCGTCTTCGATTT |
| 2663 | CAATTTCTACTCTCACGTAGAT | 3079 | GAATTTCTACTATGTGGTAGAT |
| 806 | CAATTTCTACTGTGGCGTAGAT | 2048 | CAATTTCTACTTTCTCGTAGAT |
| 2664 | CAATTTCTACTTACGAGTAGAT | 3080 | GAATTTCTACTGCTGTAGAT |
| 1034 | CAATTTCTACTGCAGAGTAGAT | 3081 | CAATTTCTACTTTTACGTAGAT |
| 2665 | GAATTTCTACTATCCGTAGAT | 3082 | CAATTTATGGTCTTCCATAT |
| 2666 | GAATTTCTACTACACGTAGAT | 3083 | CAATTTCTACTAGACGTAGAT |
| 637 | CAATTTCTACTATTTGTAGAT | 3084 | CAATTTTTTCTAAGTGAGGGT |
|  |  | 1032 | CAATTTCTACTATGCAGTAGAT |
|  |  | 3085 | GAATTTCTCCGCAATGGGAGAT |
|  |  | 3086 | CAATTTGTGCTAAGTGTGTGT |
|  |  | 3087 | CAATTCGCTCTCTTGAGTGT |

TABLE 6

En_as Consensus Sequences that bind enAsCas12a protein.
These gRNA consensus sequences are SEQ ID NO: 3088-3107

| SEQ ID NO | CONSENSUS SEQUENCE | SEQ ID NO: | CONSENSUS SEQUENCE |
|---|---|---|---|
| 3088 | CAATTYYKKYTCTTGWNGGT | 3098 | CAATTBGYGYTCTTRYGYDT |
| 3089 | CAATTRYRYGTAAGTYGBGYT | 3099 | CAATTGGHYBTCTTBGDYYT |
| 3090 | CAATTGKYKYTAAGTGYGKYT | 3100 | CAATTGYGBYTAAGTGNYGYT |
| 3091 | CAATTRYKGBTCTTBYDGYT | 3101 | MAATTGYGYCTCTTGRYGYT |
| 3092 | VAATTCGKYBTAAGTNGNYGT | 3102 | CAATTYGNYSTCTTBGKYGT |
| 3093 | CAATTDCYYKTCTTDGRGHT | 3103 | CAATTRGRBYTAAGTGDYCYT |
| 3094 | CAATTKGKGKTCTTKYBYYT | 3104 | CAATTYYGYGTCTTYRYGGT |
| 3095 | CAATTRGKGGTAAGTCCNYYT | 3105 | CAATTYGYGBTAAGTRYGYGT |
| 3096 | CAATTYCBGGTAAGTYYSGGT | 3016 | CAATTRYGYGTCTTYGYGYT |
| 3097 | GAATTGTNYGTCTTCGNGCT | 3107 | CAATTYYKRYTAAGTGYYGGT |

TABLE 7

RR_1b Consensus Sequences that bind LbCas12a(RR) protein.
These gRNA sequences are SEQ ID NO: 3108-3156.

| SEQ ID NO | CONSENSUS SEQUENCE | SEQ ID NO | CONSENSUS SEQUENCE |
|---|---|---|---|
| 3108 | RAATTTCTACTARGYGTAGAT | 3133 | CAATTTCTACTRYYYGTAGAT |
| 3109 | RAATTTCTACTRGYGYGTAGAT | 3134 | CAATTTCTACTMRAGRGTAGAT |
| 3110 | GAATTTCTACTRYYGRGTAGAT | 3135 | RAATTTCTCCTADRKYGGAGAT |
| 3111 | GAATTTCTACTDYYYGTAGAT | 3136 | CAATTTCTACTYDGGYGTAGAT |
| 3112 | RAATTTCTACTRCWWGTAGAT | 3137 | CAATTTCTCCTANGWGGAGAT |
| 3113 | RAATTTCTACTRYRRYGTAGAT | 3138 | CAATTTCTACTRHYRGTAGAT |

TABLE 7-continued

RR_1b Consensus Sequences that bind LbCas12a(RR) protein.
These gRNA sequences are SEQ ID NO: 3108-3156.

| SEQ ID NO | CONSENSUS SEQUENCE | SEQ ID NO | CONSENSUS SEQUENCE |
|---|---|---|---|
| 3114 | GAATTTCTACTYYDRYGTAGAT | 3139 | CAATTTCTACTWCRDRGTAGAT |
| 3115 | GAATTTCTACTRRNCDGTAGAT | 3140 | CAATTTCTACTGYRGYGTAGAT |
| 3116 | GAATTTCTACTBBBGTAGAT | 3141 | CAATTTCTACTRRYRGGTAGAT |
| 3117 | GAATTTCTACTRGYHGTAGAT | 3142 | RAATTTCTACTMYRYGTAGAT |
| 3118 | GAATTTCTACTYRHHCGTAGAT | 3143 | GAATTTCTCCTAYVYHGGAGAT |
| 3119 | GAATTTCTACTCDYYRGTAGAT | 3144 | CAATTTCTACTYRGYRGTAGAT |
| 3120 | RAATTTCTCCTANYGYGGAGAT | 3145 | CAATTTCTACTRHDGTAGAT |
| 3121 | CAATTTCTACTRRGWGTAGAT | 3146 | CAATTTCTACTYYDGGTAGAT |
| 3122 | GAATTTCTACTDYGYGGTAGAT | 3147 | VAATTRKNKRTAAGTYMSSYT |
| 3123 | RAATTTCTCCTAHGHGGAGAT | 3148 | CAATTTCTACTCCYMRGTAGAT |
| 3124 | CAATTTCTACTHYYYYGTAGAT | 3149 | CAATTTCTACTCRYHCGTAGAT |
| 3125 | CAATTTCTACTWCYRHGTAGAT | 3150 | CAATTCTCCTABBYYGGAGAT |
| 3126 | CAATTTCTACTYCRYYGTAGAT | 3151 | CAATTTCTACTRRCYYGTAGAT |
| 3127 | CAATTTCTCCTANBGNGGAGAT | 3152 | GAATTTCTACYYYYNGTAGAT |
| 3128 | CAATTTCTACTRDRYYGTAGAT | 3153 | CAATTTCTACTHRYNGTAGAT |
| 3129 | CAATTTCTACTYYRYGTAGAT | 3154 | CAATTTCYMHTCTTGKRGRT |
| 3130 | CAATTTCTACTRYRRGTAGAT | 3155 | CAATTTCTACTYGYWRGTAGAT |
| 3131 | CAATTTCTACTRRYRYGTAGAT | 3156 | SAATTGKKYRTCTTYDNVYT |
| 3132 | CAATTTCTCCTAYYWGGAGAT | | |

TABLE 8

WT_as Consensus Sequences that bind AsCas12a (wild type) protein.
These gRNA are SEQ ID NO: 3157-3184.

| SEQ ID NO | CONSENSUS SEQUENCE | SEQ ID NO | CONSENSUS SEQUENCED |
|---|---|---|---|
| 3157 | GAATTTCTACTRYMYYGTAGAT | 3171 | GAATTTCTCCVYDSCNGGAGAT |
| 3158 | SAATTTCTACTYWHGTAGAT | 3172 | CAATTTCTACTRRRWGTAGAT |
| 3159 | CAATTYRKKBTAAGTKNDYGT | 3173 | SAATTKBGYRTCTTYGYDST |
| 3160 | SAATTTCTACTRHNGTAGAT | 3174 | MAATTTCTACWCVRYGTAGAT |
| 3161 | RAATTTCTCCNHVBVGGAGAT | 3175 | CAATTTCTACTBNYRYGTAGAT |
| 3162 | SAATTTCTCCTMHHGGAGAT | 3176 | CAATTTCTACTYNYYYGTAGAT |
| 3163 | GAATTTCTACTDVVVGTAGAT | 3177 | CAATTGHKKKTAAGTNBBDYT |
| 3164 | GAATTTCTACTRYRGYGTAGAT | 3178 | CAATTTCTCCDDWRNNGGAGAT |
| 3165 | MAATTGKYYRTCTTYGGSYT | 3179 | CAATTRRYGRTCTTYYRYBT |
| 3166 | RAATTTCTACTYDCRYGTAGAT | 3180 | CAATTTCTACTDHRYYGTAGAT |
| 3167 | CAATTTCTACHRYYYGTAGAT | 3181 | CAATTDGKNYTCTTGDVYKT |
| 3168 | GAATTTCTACTRRWWHGTAGAT | 3182 | CAATTYYGRRTCTTNYYRGT |

TABLE 8-continued

WT_as Consensus Sequences that bind AsCas12a (wild type) protein.
These gRNA are SEQ ID NO: 3157-3184.

| SEQ ID NO | CONSENSUS SEQUENCE | SEQ ID NO | CONSENSUS SEQUENCED |
|---|---|---|---|
| 3169 | GAATTTCTACTCNHYCGTAGAT | 3183 | GAATTTCTMCKYYGWHGKAGAT |
| 3170 | CAATTTCTCCNHMRKGGAGAT | 3184 | CAATTTCTCCCMSRMYGGAGAT |

TABLE 9

WT_1b Consensus sequences that bind LbCas12a protein.
These gRNA sequences are SEQ ID NO: 3185-3225.

| SEQ ID NO | CONSENSUS SEQUENCE | SEQ ID NO: | CONSENSUS SEQUENCE |
|---|---|---|---|
| 3185 | RAATTTCTACTRRGYGTAGAT | 3206 | RAATTTCTCCTARGTGGAGAT |
| 3186 | RAATTTCTACTDYRYGTAGAT | 3207 | CAATTTCTACTWWYGRGTAGAT |
| 3187 | GAATTTCTACTHCRGYGTAGAT | 3208 | CAATTTCTACTRYDRYGTAGAT |
| 3188 | CAATTTCTACTRGCDGTAGAT | 3209 | CAATTTCTACTDRYYGTAGAT |
| 3189 | GAATTTCTACTRKDYYGTAGAT | 3210 | CAATTTCTACTYDYYGTAGAT |
| 3190 | GAATTTCTACTRHYGMGTAGAT | 3211 | CAATTTCTACTRYBGTAGAT |
| 3191 | GAATTTCTACTHRYKRGTAGAT | 3212 | CAATTTCTACTRDRYHGTAGAT |
| 3192 | CAATTTCTACTRRGWGTAGAT | 3213 | CAATTTCTACTWYRRRGTAGAT |
| 3193 | RAATTTCTACTDYYYGTAGAT | 3214 | CAATTTCTCCTAHSHGGAGAT |
| 3194 | RAATTTCTACTHRRGYGTAGAT | 3215 | CAATTTCTCCTAYKGWGGAGAT |
| 3195 | RAATTTCTACTYCNRRGTAGAT | 3216 | CAATTTCTACTWYYYRGTAGAT |
| 3196 | GAATTTCTACTYCYYYGTAGAT | 3217 | CAATTTCTACTYYGYYGTAGAT |
| 3197 | CAATTTCTACTRYDYGTAGAT | 3218 | CAATTTCTACTYYYWYGTAGAT |
| 3198 | GAATTTCTACTVBBGTAGAT | 3219 | MAATTGGYGCTAAGTGYRCCT |
| 3199 | CAATTTCTACTWRWRWGTAGAT | 3220 | CAATTNCYNGTAAGTCKRGKT |
| 3200 | GAATTTCTACTRHDYRGTAGAT | 3221 | RAATTTCTCCWRVNBRGGAGAT |
| 3201 | CAATTTCTACTARYGYGTAGAT | 3222 | CAATTNCRCGTCTTCGWGBT |
| 3202 | GAATTTCTACTYDYRGTAGAT | 3223 | CAATTNDGYYTAAGTGGCBNT |
| 3203 | GAATTTCTCCTAYBYGGAGAT | 3224 | SAATTSRYGKTCTTMCRYBT |
| 3204 | CAATTTCTACTHYHGGTAGAT | 3225 | CAATTSDKYYTCTTGRSBBT |
| 3205 | GAATTTCTCCTAYYGYGGAGAT | | |

TABLE 10 provides consensus sequences for identified gRNA molecules that bind enAsCas12a protein.

| SEQ ID NO | Consensus Sequence |
|---|---|
| 3226 | CAATTANDYSTAAGTBSKDTT |
| 3227 | CAATTBKKSWTAAGTWSBBKT |
| 3228 | CAATTSVBSYTCTTGKSBST |
| 3229 | CAATTDSKWSTCTTSWBSBT |
| 3230 | CAATTWBBSBTCTTBSNKWT |
| 3231 | CAATTBSSWSTAAGTSWBSBT |
| 3232 | CAATTSKKYSTCTTSGWBST |

TABLE 10-continued provides consensus sequences for identified gRNA molecules that bind enAsCas12a protein.

| SEQ ID NO | Consensus Sequence |
|---|---|
| 3233 | CAATTSSYKWTCTTWBSYST |
| 3234 | CAATTKKKGBTAAGTSYSSST |
| 3235 | CAATTSYDYSTAAGTSGHKST |

TABLE 11 provides consensus sequences for identified gRNA molecules that bind AsCas12a (wild type) protein.

| SEQ ID NO | Consensus Sequence |
|---|---|
| 3236 | SAATTTCTACTVWHGTAGAT |
| 3237 | AAATTTCTACTSVBWYGTAGAT |
| 3238 | SAATTTCTACTVSBWGTAGAT |
| 3239 | SAATTTCTACTSHHBYGTAGAT |
| 3240 | SAATTTCTACTSWSHGTAGAT |
| 3241 | CAATTKDKKKTAAGTSBBDST |
| 3242 | CAATTGKBWDTCTTKKSSYT |
| 3243 | SAATTTCTCCTMHHGGAGAT |
| 3244 | SAATTTCTACTWWBDHGTAGAT |
| 3245 | SAATTTCTCCVHMVVGGAGAT |
| 3246 | SAATTTCTACTHBWSGTAGAT |
| 3247 | CAATTBWBBVTCTTKKBWST |
| 3248 | SAATTTCTACTWSWHYGTAGAT |
| 3249 | SAATTNSKSSTCTTSBDBKT |
| 3250 | SAATTTCTCCBNBVVBGGAGAT |

TABLE 12 provides consensus sequences for identified gRNA molecules that bind LbCas12a protein.

| SEQ ID NO: | Consensus Sequences |
|---|---|
| 3251 | AAATTTCTACTDNNHGTAGAT |
| 3252 | SAATTTCTACTAWSBGTAGAT |
| 3253 | SAATTTCTACTASWGHGTAGAT |
| 3254 | SAATTTCTACTBSSHGTAGAT |
| 3255 | SAATTTCTACTABYGTAGAT |
| 3256 | SAATTTCTACTWBBWBGTAGAT |
| 3257 | SAATTTCTACTWHSGHGTAGAT |
| 3258 | SAATTTCTACTSBWSNGTAGAT |
| 3259 | SAATTTCTACTGHMGTAGAT |
| 3260 | SAATTTCTACTNHSGTAGAT |

TABLE 12-continued provides consensus sequences for identified gRNA molecules that bind LbCas12a protein.

| SEQ ID NO: | Consensus Sequences |
|---|---|
| 3261 | SAATTTCTACTSWBWHGTAGAT |
| 3262 | SAATTTCTACTVBWHGTAGAT |
| 3263 | SAATTKCKSCTAWGTGGMGMT |
| 3264 | CAATTBSWSGTCTTSSWBNT |
| 3265 | SAATTSVYKYTCTTRSGYST |

TABLE 13 provides consensus sequences for identified gRNA molecules that bind LbCas12a(RR) protein.

| SEQ ID NO | Consensus Sequence |
|---|---|
| 3266 | SAATTTCTMCTAWSHGKAGAT |
| 3267 | VAATTTCTMCTASKHGKAGAT |
| 3268 | SAATTTCTACTVHWSBGTAGAT |
| 3269 | MAATTBCTCCTMTTGGAGRT |
| 3270 | SAATTTCTACTHSWWNGTAGAT |
| 3271 | SAATTTCTACTVBSSNGTAGAT |
| 3272 | SAATTTCTACTVWSWHGTAGAT |
| 3273 | SAATTTCTACTVHSGTAGAT |
| 3274 | SAATTTCTACTBBWGTAGAT |
| 3275 | SAATTTCTCCTAHBKYGGAGAT |
| 3276 | SAATTTCTACTSBBWGTAGAT |
| 3277 | CAATTTCTACTHRWSGTAGAT |
| 3278 | VAATTSSNBSTAAGTKSNSST |
| 3279 | CAATTBSSVWTCTTKBSSST |
| 3280 | CAATTGTTSDTCTTKGAAYT |

In some embodiments of the invention, gRNAs described herein are used to develop virus-resistant cells. gRNAs of the invention, as provided herein can be used reliably cut one or more target genetic elements in cells and subjects. The methods may include constructing a minimally repetitive array of sequence variants capable of directing one or more RNA-guided nucleases to cut the one or more sequences present within one or more target genetic elements. In some embodiments of the invention, one or more target genetic elements are one or more genes of a target organism. It is possible using methods and/or compositions of the invention to encode one or more minimally repetitive arrays within the genome of an organism. In certain embodiments, the cutting of the one or more genes at more than one sequence per gene reduces the likelihood that a mutant gene in the population is not cut. In some embodiments, the cutting of the one or more genes at the one or more target sequences increases a frequency of an occurrence of an engineered construct within a population of the relevant organism. Methods and compositions of the invention can be used to target viruses. For example in some embodiments of the invention, a target sequence corresponds to a viral sequence, and cutting the one or more viral target sequences can be used to confer resistance to the virus. In a non-limiting example, an array that results in cutting one or more viral target sequences can be integrated into the genome of a subject and the presence of the array results in resistance of the subject to the virus. Some embodiments of the invention include targeting a targeted virus at more than one sequence, which reduces the likelihood that a mutant virus is not cut.

Some embodiments of a multiplex nucleic acid targeting system of the invention are CRISPR-based nucleic acid targeting systems. CRISPR-based systems used in systems and methods of the invention may be DNA targeting CRISPR systems that utilize enzymes, such as Cas9 and Cas12a (formerly Cpf1). In addition, methods and systems of the invention may be used in RNA targeting CRISPR systems. RNA targeting CRISPR systems may utilize RNA targeting enzymes such as, but not limited to Cas13. Additional non-limiting examples of Cas13 enzymes that may be used in methods and systems of the invention are: Cas13a (formerly C2c2), Cas13b, Cas13c, and Cas13d. Nucleic acid targeting systems and methods of the invention permit certain nucleic acid sequences to be introduced into cells, cells lines, and organisms where they are directed to and modify one or more gene sequences. One or more of the gene sequences may be preselected gene sequences. Previous RNA-guided nucleic acid targeting elements based on the CRISPR/Cas9 nuclease have been used to introduce many types of genetic modifications into cells and organisms, including but not limited to preselected gene modifications. Methods, systems, and components of the invention can be used to increase efficacy and efficiency of nucleic acid targeting from that of previously known CRISPR methods and systems.

Designing and preparing multiplex nucleic acid targeting systems and components thereof, may include one or more of the preselection of one or more target nucleic acid sequences, which also may be referred to herein as "target genes" and/or "target genetic elements." Additional aspects of the invention comprise methods that can be used to design, identify and utilize a plurality of functional nucleic acid molecules (a non-limiting example of which is a functional gRNA molecule) that are capable of targeting one or more RNA-guided nucleic acid binding proteins such that the RNA-guided nucleic acid binding proteins bind an independently preselected nucleic acid sequence. Certain embodiments of the invention may also include selection and use of one or more detectable labels, such as fluorescent detectable labels, etc., which may be used in certain embodiments of the invention as activity reporter molecules.

CRISPR-Based Methods and Systems

Screening methods and systems of the invention and multiplex nucleic acid targeting methods and systems of the invention can be used in systems such as, but not limited to CRISPR systems. Examples of CRISPR systems in which methods and systems, and arrays of the invention may be used are CRISPR systems that utilize DNA-targeting enzymes such as Cas9 and Cas12a (previously referred to as Cpf1), and RNA-targeting Cas13 enzymes, including but not limited to: Cas13a (formerly C2c2), Cas13b, Cas13c, and Cas13d. The screening methods and systems and the multiplex nucleic acid targeting systems of the invention may comprise one or more of: guide RNAs, protein-assisted RNA cleavage/processing molecules, RNA-guided DNA-binding protein, guided DNA-binding protein endonucleases, expression cassettes, vectors, promoters, target genetic elements (e.g., target genes), etc. (see for example: Esvelt et al., Nat Methods. 2013 November; 10(11):1116-21. doi: 10.1038/nmeth.2681. Epub 2013 Sep. 29; Zetsche, B., et al., Nat Biotechnol. 2017 January; 35(1):31-34 doi: 10.1038/nbt.3737. Epub 2016 Dec. 5; Mali, P, et al., Nat Methods. 2013 October; 10(10):957-63. doi: 10.1038/nmeth.2649; and Abudayyeh, 0.0, et al. Nature Volume 550, pages 280-284 (12 Oct. 2017); the content of each of which is incorporated by reference herein in its entirety.) Certain methods for preparing and using components of a multiplex nucleic acid targeting system are known and routinely used in the art. Certain some art-known methods can be used in conjunction with methods of the invention for identifying, generating, and using improved sequences corresponding to protein-assisted RNA cleavage/processing, a non-limiting example of which are gRNA scaffold molecules as described herein. In certain embodiments of the invention methods and components of the invention can be used in systems such as, but not limited to: multiplex nucleic acid targeting systems, CRISPR-based systems, etc.

Certain embodiments of components, methods, screening methods, minimally repetitive arrays, gRNAs, sequences corresponding to protein-assisted RNA cleavage/processing, and systems of the invention can be used with CRISPR-based methods, systems, and technologies. Details of CRISPR systems such as, but not limited to, CRISPR-Cas systems and examples of their use are known in the art, see for example: Deltcheva, E. et al. Nature 471, 602-607 (2011); Gasiunas, G., et al., PNAS USA 109, E2579-2586 (2012); Jinek, M. et al. Science 337, 816-821 (2012); Sapranauskas, R. et al. Nucleic acids research 39, 9275-9282 (2011); Bhaya, D., et al., Annual review of genetics 45, 273-297 (2011); and H. Deveau et al., Journal of Bacteriology 190, 1390 (February, 2008), the content of each of which is incorporated by reference herein in its entirety.

Three classes of CRISPR systems are generally known and are referred to as Type I, Type II or Type III. According to one aspect of the invention, methods to identify and/or generate sequences corresponding to protein-assisted RNA cleavage/processing, methods to identify and/or generate gRNAs and gRNA arrays may be used in one or more of the three classes of CRISPR systems, as well in other suitable systems. Type I, II, and III CRISPR systems and their components are well known in the art. See for example, K. S. Makarova et al., Nature Reviews Microbiology 9, 467 (June, 2011); P. Horvath & R. Barrangou, Science 327, 167 (Jan. 8, 2010); H. Deveau et al., Journal of Bacteriology 190, 1390 (February, 2008); J. R. van der Ploeg, Microbiology 155, 1966 (June, 2009), the contents of each of which is incorporated by reference herein in its entirety. Bioinformatic analyses have generated extensive databases of CRISPR loci in a variety of bacteria and methods, systems, arrays, and compositions of the invention may be used in conjunction with existing and generated databases of CRISPR loci. See for example: M. Rho, et al., PLoS genetics 8, e1002441 (2012) and D. T. Pride et al., Genome Research 21, 126 (January, 2011) each of which is incorporated by reference herein in its entirety. A recently designated Type V system is similar in many aspects to Type II systems and may include a multiplex nucleic acid targeting method or system of the invention. (see for example, B. Zetsche et al., 2015, Cell 163, 1-13; T. Yamano et al., 2016, Cell, April 21 doi:10.1016/j.cell.2016.04.003; D. Dong et al., 2016, Nature, 20 April, doi:10.1038/nature17944; I. Fonfara et al., 2016, Nature, 20 April, doi:10.1038/nature17945). It will be understood that references herein to "Cas9", the RNA-guided DNA-binding protein nuclease of Type II CRISPR systems, can be replaced by "Cpf1", the RNA-guided DNA-binding protein nuclease of Type V systems or other suitable nucleic acid guided nucleic acid binding proteins. It will be understood, that certain embodiments of components, arrays, gRNAs, and systems of the invention may be used in systems utilizing targeted one or more DNA-binding nucleases rather than RNA-guided DNA-binding nucleases. For example, see Gao, F., et al., Nature Biotech online publication, May 2, 2016: doi:10.1038/nbt.3547, the content of which is incorporated herein by reference.

System Components

Aspects of the invention include methods of preparing sequences corresponding to protein-assisted RNA cleavage/processing, gRNAs, gRNA arrays, etc. that can be used in multiplex nucleic acid targeting systems. Multiplex nucleic acid targeting systems, which may be CRISPR-based systems, may be present in cells, cell lines, and/or organisms. Multiplex nucleic acid targeting system components delivered into a cell or organism can be designed, in part, using embodiments of methods of the invention. Design methods of the invention are directed to multiplex nucleic acid targeting systems comprising components that can be separately encoded as nucleic acid sequences that are delivered into the a cell or organism. Non-limiting examples of components that may be included in a multiplex nucleic acid targeting system of the invention include one or more of: guide RNAs, functional sequences corresponding to protein-assisted RNA cleavage/processing, guided DNA binding proteins, nucleic acid-guided DNA binding proteins, RNA-guided DNA binding proteins, DNA-guided DNA binding proteins, promoter/enhancer/3'UTR sequences, housekeeping gene sequences, promoter sequences, predetermined target genes, RNA molecules, DNA molecules, target genetic elements, target genes, reporter proteins and their encoding nucleic acid molecules, detectable labels and sequences encoding detectable labels, such as but not limited to fluorescent labels.

Identification and screening systems and methods of that can be utilized in a multiplex nucleic acid targeting method and/or system of the invention may, in some embodiments include identifying a target gene in the genome of a host cell or organism in which a multiplex nucleic acid targeting system will be delivered. As used herein the term "host" or "target" when used in reference to a cell, cell line, organism, or a system for multiplexing, means a cell, cell line, organism, or system, respectively that includes components for a multiplex nucleic acid targeting system of the invention. In some embodiments of the invention, a host cell is a germline cell. Some components included in embodiments of methods and systems of the invention may be "preselected" (used interchangeably herein with the term "selected")" and/or "independently selected" or "independently preselected" in reference to genes, nucleic acids, targets, etc. For example, the terms selected and preselected used in reference to a target gene, means that the target gene was chosen as a target gene. Similarly, a preselected or selected nucleic acid sequence is one that is chosen for use in a method or system of the invention. The term "independently" as used herein in reference to a component, means a component may be chosen independent of others. For example an independently preselected or independently selected nucleic acid sequence is a nucleic acid sequence that is chosen that may be the same or different than one or more other nucleic acid sequences chosen.

Sequence Variants

Components of a system of the invention may include sequences described herein, and/or may also include functional variants of such sequences. A variant polypeptide may include deletions, point mutations, truncations, amino acid substitutions and/or additions of amino acids or non-amino acid moieties, as compared to its parent polypeptide. Modifications of a polypeptide of the invention may be made by modification of the nucleic acid sequence that encodes the polypeptide. The terms "protein" and "polypeptide" are used interchangeably herein as are the terms "polynucleotide" and "nucleic acid" molecule. A nucleic acid molecule may comprise genetic material including, but not limited to: RNA, DNA, mRNA, cDNA, etc. As used herein with respect to polypeptides, proteins, or fragments thereof, and polynucleotides that encode such polypeptides the term "exogenous" means the one that has been introduced into a cell, cell line, organism, or organism strain and not naturally present in the wild-type background of the cell or organism strain.

In certain embodiments of the invention, a polypeptide or nucleic acid variant may be a polypeptide or nucleic acid, respectively that is modified from its "parent" polypeptide or nucleic acid sequence. Variant polypeptides and nucleic acids can be tested for one or more activities (e.g., delivery to a target gene, modulating transcription of a target gene, etc.) to determine which variants are possess desired functionality for use in a method or system of the invention.

The skilled artisan will also realize that conservative amino acid substitutions may be made in a polypeptide, for example in a Cas9 polypeptide, to design and construct a functional variant useful in a method or system of the invention. As used herein the term "functional variant" used in relation to polypeptides is a variant that retains a functional capability of the parent polypeptide. As used herein, a "conservative amino acid substitution" refers to an amino acid substitution that does not alter the relative charge or size characteristics of the polypeptide in which the amino acid substitution is made. Conservative substitutions of amino acids may, in some embodiments of the invention, include substitutions made amongst amino acids within the following groups: (a) M, I, L, V; (b) F, Y, W; (c) K, R, H; (d) A, G; (e) S, T; (f) Q, N; and (g) E, D. Polypeptide variants can be prepared according to methods for altering polypeptide sequence and known to one of ordinary skill in the art such. Non-limiting examples of functional variants of polypeptides for use daisy chain gene drives of the invention are functional variants of a Cas9 polypeptide, functional variants of a Cas protein, functional variants of a Cas12a protein, functional variants of reporter proteins, functional variants of a nuclease protein, etc.

As used herein the term "variant" in reference to a polynucleotide or polypeptide sequence refers to a change of 1, 2, 3, 4, 5, 6, 7, 8, 9, 10, or more nucleic acids or amino acids, respectively, in the sequence as compared to the corresponding parent sequence. For example, though not intended to be limiting, an amino acid sequence of variant reporter protein may be identical to that of its parent reporter protein sequence except that 1, 2, 3, 4, 5, 6, 7, 8, 9, 10, or more amino acid substitutions, deletions, insertions, or combinations thereof, may be present, thus making it a variant of the parent reporter protein. In another non-limiting example, the amino acid sequence of a variant Cas9 nuclease polypeptide may be identical to that of its parent Cas9 nuclease except that it has 1, 2, 3, 4, 5, 6, 7, 8, 9, 10, or more amino acid substitutions, deletions, insertions, or combinations thereof, and thus is a variant of the parent Cas9 nuclease. Certain methods of the invention for designing and constructing methods and systems of the invention include methods to prepare functional variants of components used in embodiments of screening systems and assay methods of the invention and genome-editing systems and methods of the invention. Methods provided herein, and other art-known methods can be used to prepare candidate component sequences that can be tested for function and to determine whether they retain sufficient activity for use in a system of method of the invention.

Methods of the invention provide means to test for activity and function of variant sequences and to determine whether a variant is a functional variant and is suitable for inclusion in a screening method and/or a multiplex method and/or system of the invention. Suitability can, in some aspects of methods of the invention, be based on one or more characteristics such as: expression; cell localization; gene-cutting activity, efficacy in modulating activity of a target gene, etc. Functional variant polypeptides and functional variant polynucleotides that may be used in methods and systems of the invention may be amino acid and nucleic acid sequences that have at least 80%, 81%, 82%, 83%, 84%, 85%, 86%, 87%, 88%, 89%, 90%, 91%, 92%, 93%, 94%, 95%, 96%, 97%, 98%, or 99% identity to their parent amino acid or nucleic acid sequence, respectively.

Art-known methods can be used to assess relative sequence identity between two amino acid or nucleic acid sequences. For example, two sequences may be aligned for optimal comparison purposes, and the amino acid residues or nucleic acids at corresponding positions can be compared. When a position in one sequence is occupied by the same amino acid residue, or nucleic acid as the corresponding position in the other sequence, then the molecules have identity/similarity at that position. The percent identity or percent similarity between the two sequences is a function of the number of identical positions shared by the sequences (i.e., % identity or % similarity=number of identical positions/total number of positions×100). Such an alignment can be performed using any one of a number of well-known computer algorithms designed and used in the art for such a purpose. It will be understood that a variant polypeptide or polynucleotide sequence may be shorter or longer than their parent polypeptide and polynucleotide sequence, respectively. The term "identity" as used herein in reference to comparisons between sequences may also be referred to as "homology".

Preparation and Delivery

Components included in embodiments of methods and systems of the invention may be delivered into a cell using standard molecular biology techniques. In certain aspects of the invention, vectors are used to deliver components into a cell for use in a function screening system or method; a processing screening system or method; and a multiplex nucleic acid targeting system or method of the invention For example, in an embodiment of a function-screening system of the invention, a vector may be used to deliver into a cell a sequencing encoding one or more of: a nucleic acid sequence encoding a protein capable of binding a promoter sequence that is capable of driving expression of a reporter protein; a nucleic acid sequence encoding a Cas protein capable of binding a promoter sequence that is capable of driving expression of a reporter protein; a nucleic acid sequence encoding a Cas12a protein capable of binding a promoter sequence that is capable of driving expression of a reporter protein; a Cas12a ortholog capable of binding a promoter sequence that is capable of driving expression of a reporter protein; a nucleic acid molecule comprising the promoter sequence and the sequence encoding the reporter protein; and one or a plurality of nucleic acid molecule fragments, wherein the binding of one the nucleic acid molecule fragments to a Cas protein (non-limiting examples of which are: a Cas protein, a Cas12a protein, a Cas12a protein, AsCas12A (wild type), LbCas12a, LbCas12a(RR), and enAsCas12a) produces a riboprotein complex. As used herein, the term "vector" used in reference to delivery of components of a system of the invention and/or components used in a method of the invention refers to a polynucleotide molecule capable of transporting between different genetic environments another nucleic acid to which it has been operatively linked. One type of vector is an episome, i.e., a nucleic acid molecule capable of extra-chromosomal replication. Some useful vectors are those capable of autonomous replication and/or expression of nucleic acids to which they are linked. Vectors capable of directing the expression of genes to which they are operatively linked may be referred to herein as "expression vectors". Other useful vectors, include, but are not limited to viruses such as lentiviruses, retroviruses, adenoviruses, and phages. Vectors useful in some methods of the invention can genetically insert one or more of components into a dividing or a non-dividing cell and can insert one or more components as described herein into an in vivo or in vitro cell.

Vectors useful in methods of the invention may include sequences including, but not limited to one or more promoter sequences, enhancer sequences, 3' untranslated region (3'UTR) sequences, guide nucleic acid sequences, gRNA sequences, gRNA arrays, DNA binding protein encoding sequences, reporter proteins and their encoding nucleic acid molecules, detectable label encoding sequences, etc. Methods of the invention can be used to design and construct vectors comprising components suitable for inclusion in an embodiment of a system of method of the invention, including screening methods and systems, and multiplex nucleic acid targeting methods and systems. Expression vectors and methods of their use are well known in the art.

Promoters that may be used in methods and vectors of the invention include, but are not limited to, cell-specific promoters or general promoters. Methods for selecting and using cell-specific promoters and general promoters are well known in the art. In some embodiments of screening methods and systems of the invention, a promoter is a constitutive promoter.

Synthesis of RNA sequences and/or DNA sequences for use in a method or system of the invention can be done using art-known methods or the sequences can be obtained from commercial entities familiar with relevant arts, such as, but not limited to: Integrated DNA Technologies gBlocks (Integrated DNA Technologies, Coralville, Iowa) and ThermoFisher GeneArt Strings (Thermo Fisher Scientific).

Cells and Organisms

One or more methods and systems of the invention for identifying and screening gRNA scaffolds and using selected identified gRNA scaffolds in multiplex nucleic acid targeting systems and methods, can be carried out in a host cell or organism. A host cell or organism is one to which components of a method or system of the invention are delivered and in which a method of the invention is then carried out. In some aspects of the invention a host cell is outside an organism. In some embodiments a host cell is in an organism. Systems of the invention may be delivered into cells and organisms at various developmental stages of the cells and organisms, respectively. Non-limiting examples of stages of cells to which components of a system of the invention may be delivered or included are: embryonic cells, germline cells, gametes, cells that can give rise to a gamete, zygotes, pre-meiotic cells, post-meiotic cells, fully-differentiated cells, and mature cells. Cells at these stages may be isolated cells, cells in cell lines, cells in cell, tissue, or organ culture, cells that are within an organism. In certain embodiments of the invention, components of a system of the invention, or for use in a method of the invention are delivered into a cell and the cell is delivered into an organism.

Components and systems of the invention may be delivered to and included in cells of various organisms. In some aspects of the invention, a cell or organism is a vertebrate or an invertebrate cell or organism. In certain aspects of the invention, a cell or organism is a eukaryotic or prokaryotic cell or organism. Non-limiting examples of organisms in which a system of the invention can be delivered and/or utilized are: insects, fish, reptiles, amphibians, mammals, (horses, mice, non-human primates, humans, dogs, cats, etc.) birds, protozoa, annelids, mollusks, echinoderms, flatworms, coelenterates, and arthropods, including arachnids, crustaceans, insects, and myriapods. IN some aspects of the invention, methods and systems described herein can be used in human health-care practice as well as in veterinary practice.

In some aspects of the invention an organism selected for inclusion of a system or method of the invention is selected because of a population of the organism that is of interest to modify in a manner to benefit or otherwise change the organism. For example, though not meant to be limiting, multiplex nucleic acid targeting methods of the invention can be used in a mammal in order to confer resistance to a virus to that animal. As a non-limiting example, if it is of interest to protect against a viral infection in a pig, one or more methods of the invention can be used to generate and deliver components comprising a gRNA scaffold array of the invention and a suitable multiplex nucleic acid targeting system into the pig and used to increase immunity of the pig to the virus. In certain aspects of the invention, an organism species to which a multiplex nucleic acid targeting system or method may be delivered to, or included in, is a species that serves as a vector for disease affecting humans, animals, or plants. In certain aspects of the invention, targeting many different sequences throughout the viral genome prevents the virus from evolving to evade the defense by requiring it to acquire so many mutations at once, in a manner analogous to the way that "cocktail" therapies including multiple inhibitory small molecules inhibit the evolution of resistant pathogens.

Design, Construction, and Use

It is possible to use embodiments of multiplex nucleic acid targeting systems and methods of the invention in combination with known CRISPR-based technology. Use of methods, systems, and identified compounds of the invention permits targeting a plurality of preselected nucleic acid sequences in cells and organisms by using a gRNA array of the invention. Methods, systems, and identified gRNA scaffolds of the invention can be used to attain numerous different goals, non-limiting examples of which are: to address biological questions, to protect organisms from viral infections and other diseases, and to identify one or more sets of set of variants with differing activities for tunable gene repression in organisms, including but not limited to bacteria.

The following examples are provided to illustrate specific instances of the practice of the present invention and are not intended to limit the scope of the invention. As will be apparent to one of ordinary skill in the art, the present invention will find application in a variety of compositions and methods.

EXAMPLES

Example 1

Design of DNA Binding Circuit Systems and Library Construction

A DNA binding circuit system uses a nuclease-dead Cas enzyme and a gRNA to target a constitutive promoter driving a reporter, with the goal of identification of functional gRNA scaffolds. The DNA binding circuit described herein uses dLbCas12a to target a constitutive bacterial promoter driving a red fluorescent protein. DNA binding resulting in reduced fluorescent signal is a proxy for target cleavage by an equivalent nuclease-active enzyme. Expression of dLbCas12a and guide RNA can be independently controlled by the small molecules anhydrotetracycline and vanillic acid.

Materials and Methods
Design of DNA Binding Circuit

A DNA binding circuit system uses a nuclease-dead Cas enzyme and a gRNA to target a constitutive promoter driving a reporter, with the goal of identification of functional gRNA scaffolds. The DNA binding circuit described herein uses dLbCas12a to target a constitutive bacterial promoter driving a red fluorescent protein. All components of the circuit are encoded on a single plasmid, which includes 1) a bacterial origin of replication, 2) constitutively expressed repressor proteins that repress promoters in the absence of either aTc (Tet Repressor [TetR]) or Vanillic Acid (Van Repressor [VanR]), 3) a promoter driving gRNA which contains Van Operator sites that are bound by VanR in the absence of vanillic acid—in the presence of vanillic acid the promoter drives expression of gRNA, 4) a promoter driving dLbCas12a(RR) which contains Tet Operator sites that are bound by TetR in the absence of a tetracycline analogue such as aTc—in the presence of aTc the promoter drives expression of dLbCas12a(RR), 5) a strong constitutive promoter driving a red fluorescent protein, 6) a gRNA sequence driven by the VanA promoter in (3) whose spacer sequence is complementary to part of the promoter sequence in (5).

DNA binding resulting in reduced fluorescent signal is a proxy for target cleavage by an equivalent nuclease-active enzyme. Expression of dLbCas12a and guide RNA can be independently controlled by the small molecules anhydrotetracycline and vanillic acid.

Optimization of Screen

Optimal expression levels to maximize the signal resulting from RFP expression are determined by inducing with various concentrations of each small molecule and measuring the difference in fluorescence between cells in which the guide RNA matches the RFP promoter and negative control cells in which the guide RNA does not match the RFP promoter. The induction condition for which the fold difference in RFP signal is greatest is used for subsequent assays.

Optimal induction of gRNA and dLbCas12a(RR) expression was determined using a circuit encoding a gRNA with the WT scaffold. Both inducers, aTc and VanA, were titrated against one another and the RFP signal was measured by flow cytometry for each condition. Mean/median fluorescence was compared to two types of controls: 1) a circuit expressing a gRNA with a random scaffold (non-functional) and 2) a cell population expressing no fluorescent protein. Optimal inducer concentrations were chosen based on the condition that gave us the largest fold difference between the circuit encoding WT gRNA and the circuit encoding random scaffold gRNA while allowing the cells to maintain a growth rate >~70% of that of cells where dLbCas12a(RR) and gRNA were not induced (grown without aTc and without VanA).

Design of Insert Library

In some experiments, a wild-type LbCas12a gRNA scaffold was 21 nt long and formed a characteristic hairpin with a 5-basepair stem and a 5-nucleotide loop. Variants of the WT LbCas12a gRNA scaffold were designed with either single-site degeneracy (1 nt different than WT), pairwise degeneracy (2 nt different than WT), or "fully" degenerate (4, 5, and 6-nt loops with the wild type stem or with 1 of 3 mutant stems). Library sequences were ordered from a commercial supplier and amplified via microarray synthesis. Libraries were ordered from a commercial synthesizer and one library was ordered as individual oligos with site-specific degeneracies. For a second library the synthesizer used microarray synthesis. In both cases, the synthesized library was synthesized oligo library by PCR.

Generate Plasmid Library

The amplified insert library was cloned into the scaffold expression vector using the Golden Gate cloning system and transformed into E. coli.

Binding Circuit Experiments

Figure 3A:
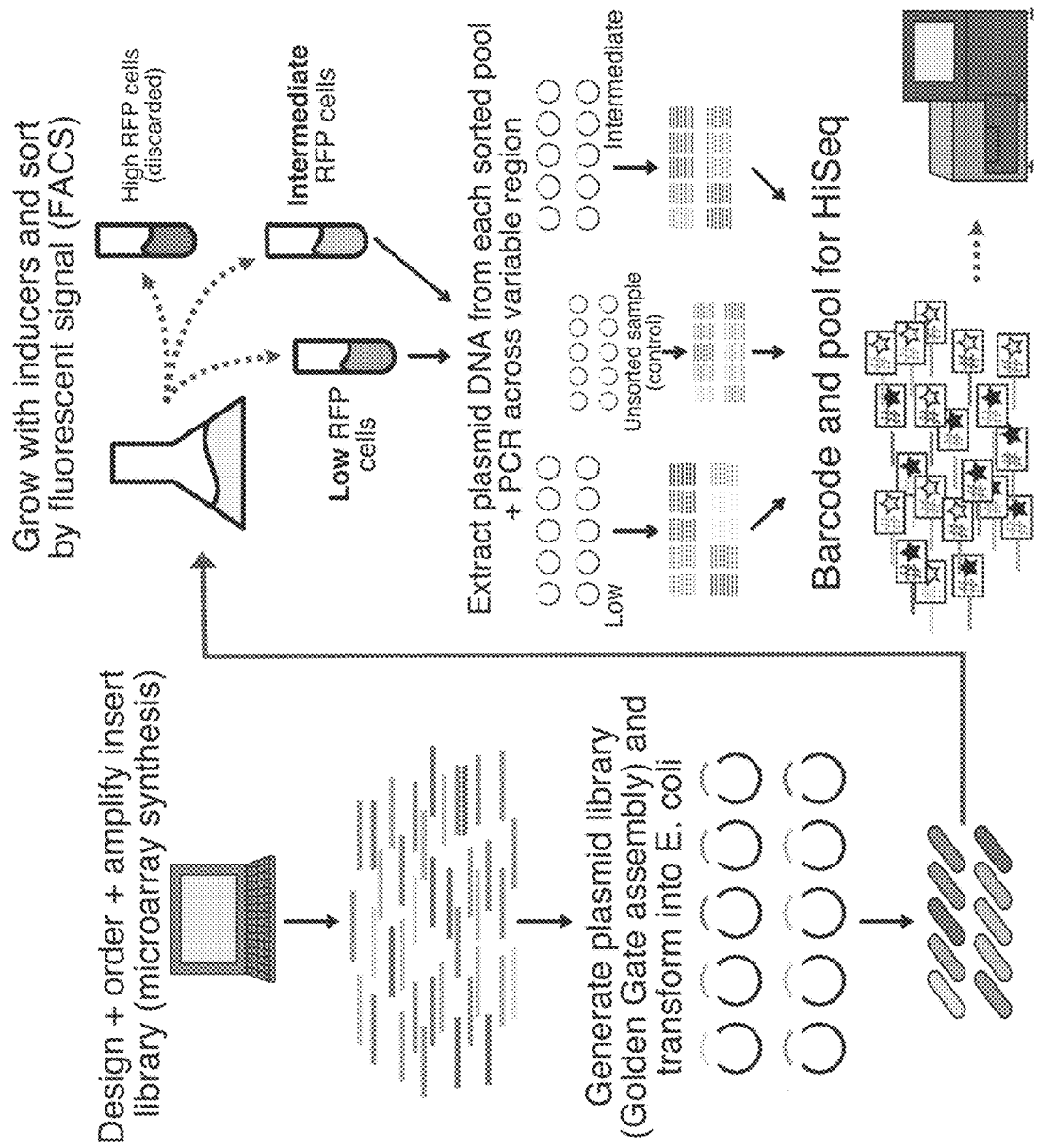
FIG. 3A-B presents a schematic diagram of the DNA binding circuit system screening workflow (FIG. 3A) and a graph of a FACS analysis of an RR dLbCas12a scaffold library grown with and without inducers (FIG. 3B). The graph in FIG. 3B illustrates that the pool of cells with high RFP expression (High RFP) is discarded because high RFP expression following induction can be difficult to distinguish from background fluorescence. RFP is red fluorescent protein.
Figure 3B:
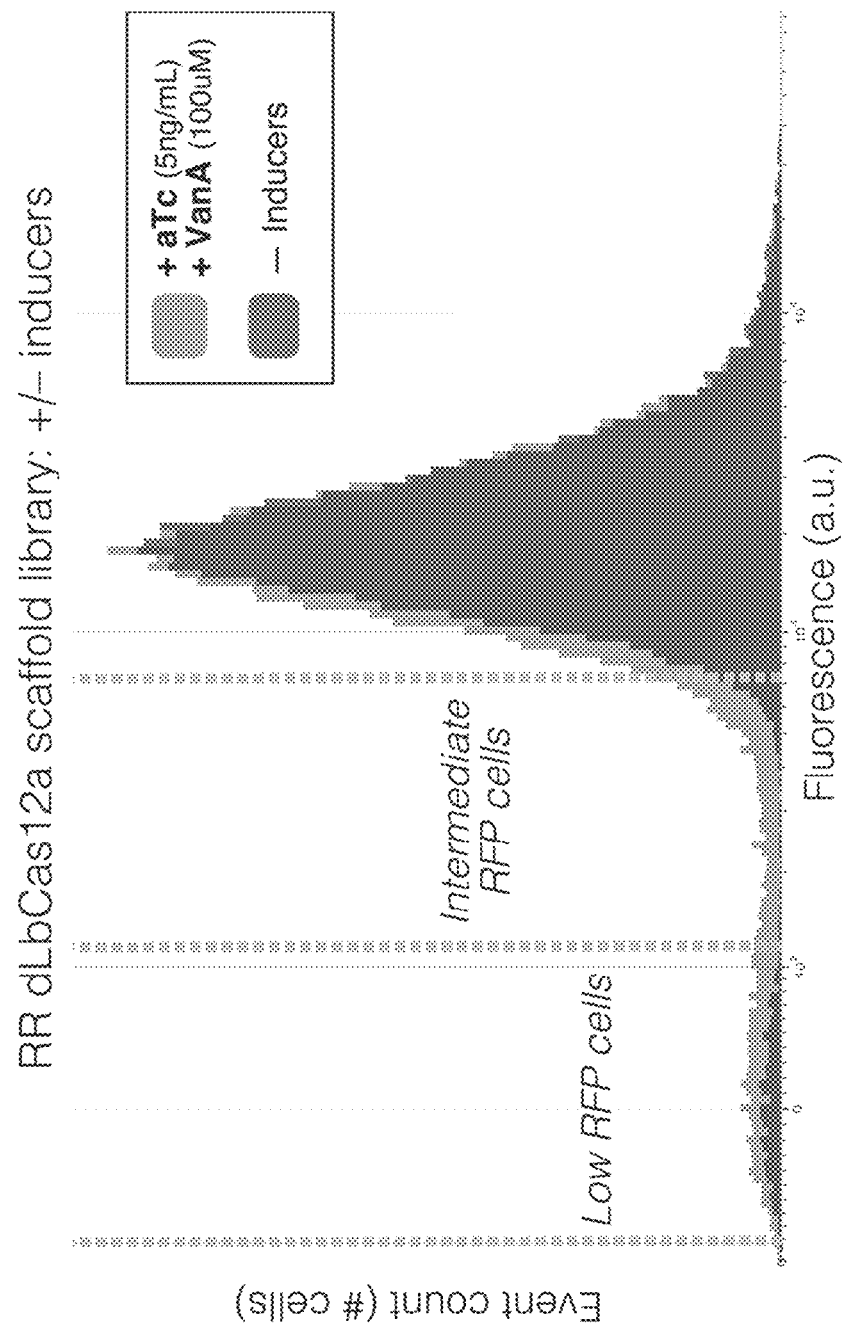

The cultures were grown with the appropriate inducers (vanillic acid and aTc), and were sorted into 3 pools—High, Intermediate, and Low—according to the intensity of their respective fluorescent signal using FACS. The pool of High RFP cells was discarded; unsorted cells from each culture were pooled into the unsorted sample control (FIG. 3A-B).

Extraction, Processing, and Sequencing Analysis

Plasmid DNA was extracted from the Intermediate, Low, and unsorted sample control pools and the region containing the variant scaffold sequence insert was amplified. Amplification products were barcoded and pooled for HiSeq analysis.

Data Analysis

To analyze scaffold performance relative to site-specific degeneracy, enrichment scores for each unique scaffold sequence were calculated based on the fractional number of HiSeq reads for that variant in the FACS-sorted RFP Low or Intermediate pools compared to the reads from the same sample before sorting. Enrichment scores were calculated as follows:

$$\frac{\text{\# reads of variant } X \text{ in sorted pool}}{\text{Total \# reads in sorted pool}} - \frac{\text{\# reads of variant } X \text{ in unsorted sample}}{\text{total \# reads in unsorted sample}} \quad \text{Equation 1}$$

Figure 4A:
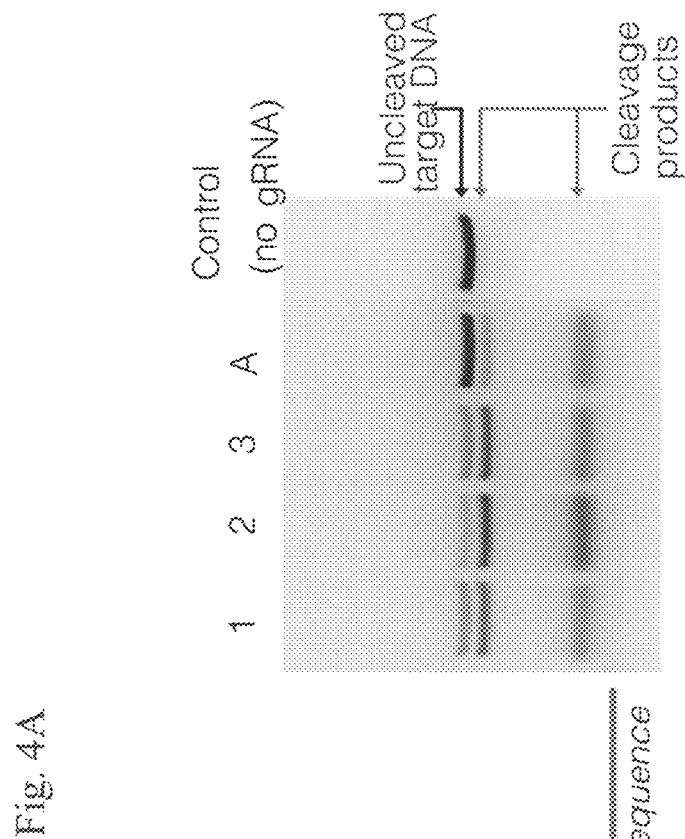
Figure 4A:
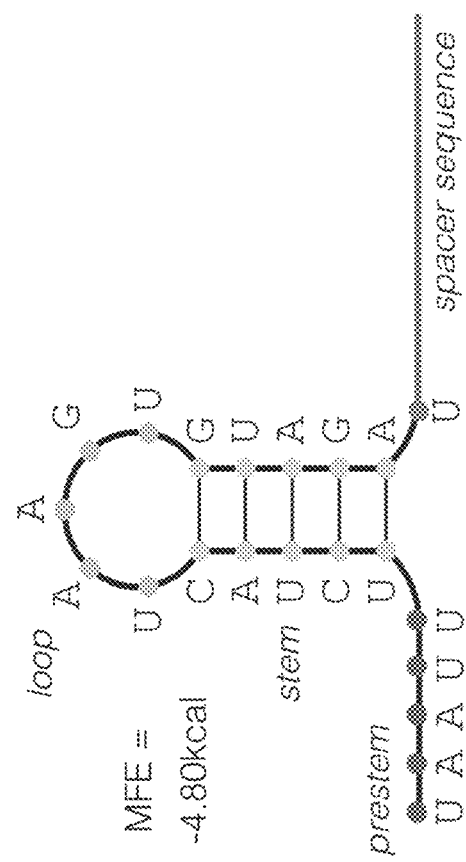

Additional assays were performed including in vitro DNA cleavage assays, which were done to confirm the selected variant scaffolds' efficacy in the presence of a functional LbCas12a nuclease (FIG. 4A).

Results and Discussion

Induction of variant gRNA scaffolds and dLbCas12a led to a substantial decrease in RFP signal (FIG. 2B-C), illustrating that CRISPR-based gene circuits can enable functional screens of gRNA efficiency and efficacy based on a measurable output.

Experiments using in vitro DNA cleavage assays confirmed that DNA binding screens enriched for highly active scaffolds (FIG. 4A). The scaffold variants in lanes 1, 2, and 3 were the most highly enriched gRNA scaffolds across 5 replicates in a DNA binding screen with the broad-specificity PAM mutant of LbCas12a (RR LbCas12a; Gao et al., 2017). Scaffold A was a very minorly enriched scaffold variant with the same loop as Scaffold 1 and showed notably lower activity in DNA cleavage assays.

The wild-type LbCas12a gRNA scaffold forms a characteristic hairpin with a 5-basepair stem and a 5-nt loop. Analysis of site-specific degeneracy revealed regions of the scaffold that are more and less permissive to mutation and pointed to key characteristics in determining scaffold function. Enrichment scores for variants with single-site degeneracy revealed that the loop is especially permissive to variation, except at the 1st position, which must be a U (FIG. 4B).

As shown in FIG. 4C, screening variants with pairwise degeneracy in the stem revealed that the wild-type UAUAC stem is highly enriched as expected. Variants with pairwise degeneracy in the stem showed strong enrichment for base pairing. The 1st and 3rd pairs of the stem tolerated U-G wobble pairing. Interestingly, C-G and G-C pairs at the 4th position were enriched over the wildtype A-U pair.

Figure 4D:
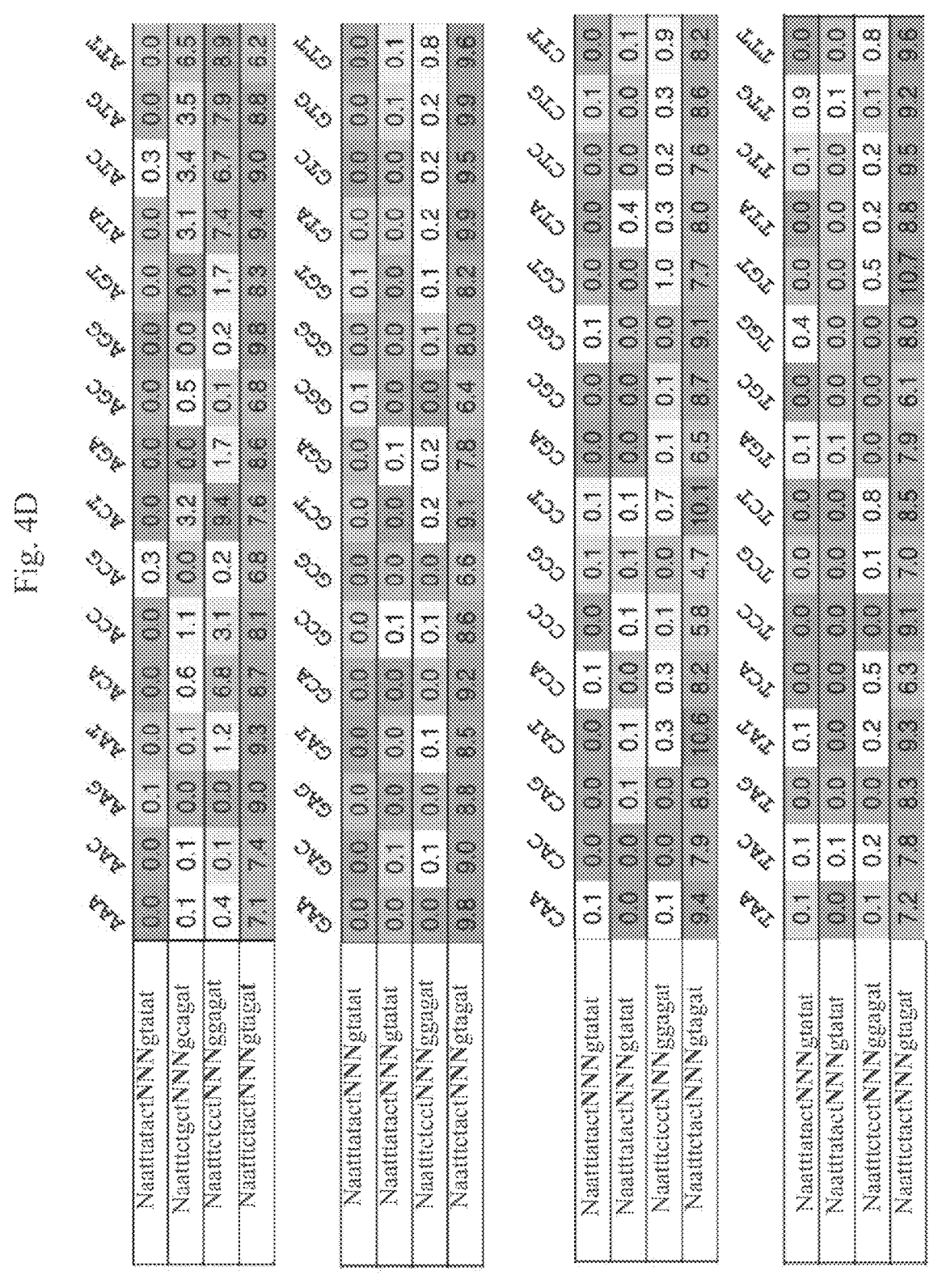

The library included fully degenerate 4, 5, and 6-nt loops. These loops were paired with 3 mutant stems proven to be active for DNA cleavage in vitro. Mean enrichment scores across 4-nucleotide loops beginning with U revealed the wild-type stem to be highly active with many UNNN loop variations, whereas mutant stems were constrained in the loops they tolerate: the UCUCC and UCUGC stem mutants showed the highest activity primarily with UAUN and UACH loops (FIG. 4D). The DNA sequences encoding functional RNA guides identified through the DNA-binding system are listed in FIG. 4E.

Binding circuit system experiments as described in Example 1 were successfully performed using four different endonucleases and a library of sequences encoding gRNA scaffolds: WT LbCas12a, RR LbCas12a, WT AsCas12a, and enAsCas12a. The procedures described in Example 1 and results shown in FIGS. 2B-C and FIGS. 4A-E are representative of binding circuit system operation and output using each of the four endonucleases.

Example 2

Guide RNA Processing Circuit Design

Figure 5A:
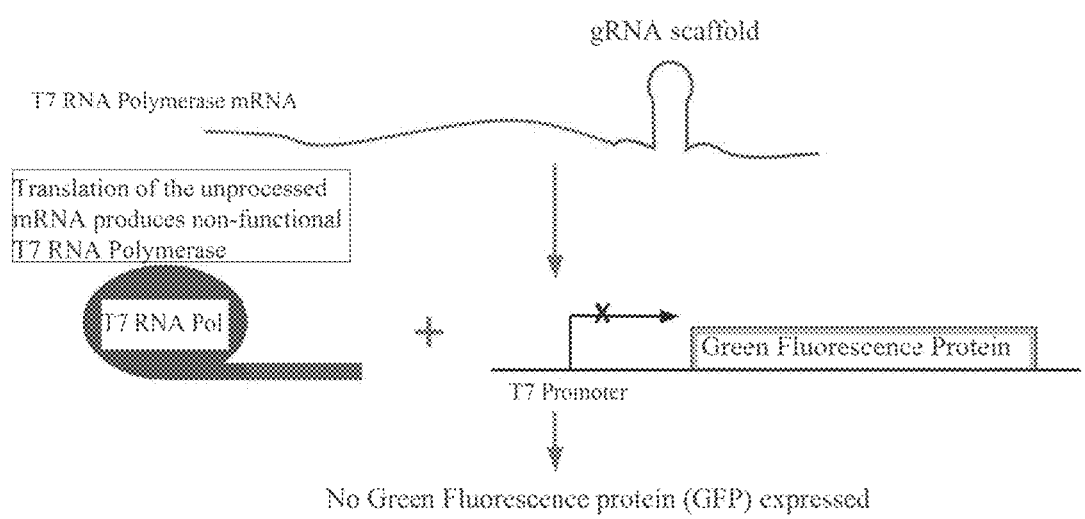
FIG. 5A-C presents schematic diagrams and a graph of the results of a gRNA processing circuit designed to exploit the fact that T7 RNA Polymerase does not tolerate C-terminal extensions. The schematics of FIG. 5A-B illustrate that an mRNA containing both the T7 mRNA sequence and a gRNA scaffold sequence at its 3' end (T7-gRNA mRNA) must be processed by Cas12a in order to produce a functional T7 RNAP, which in turn drives GFP expression. Translation in the absence of gRNA processing results in a non-functional T7 polymerase and no GFP signal.
Figure 5A:
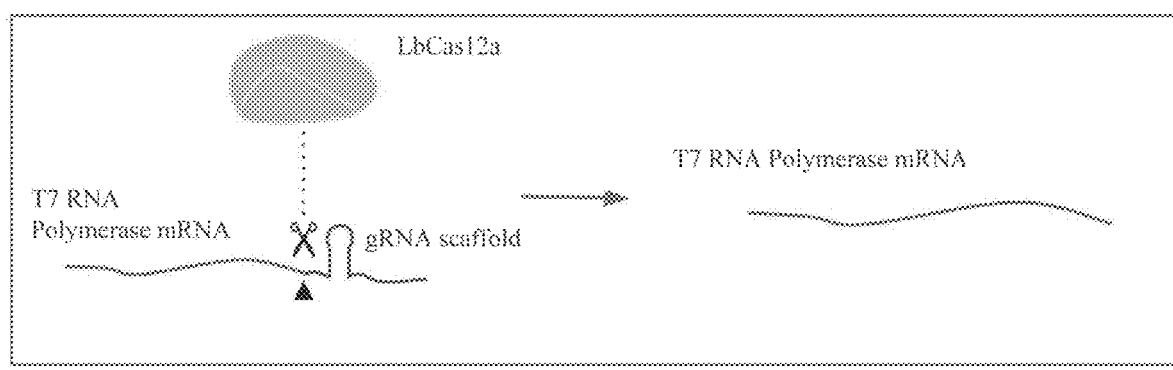
Figure 5B:
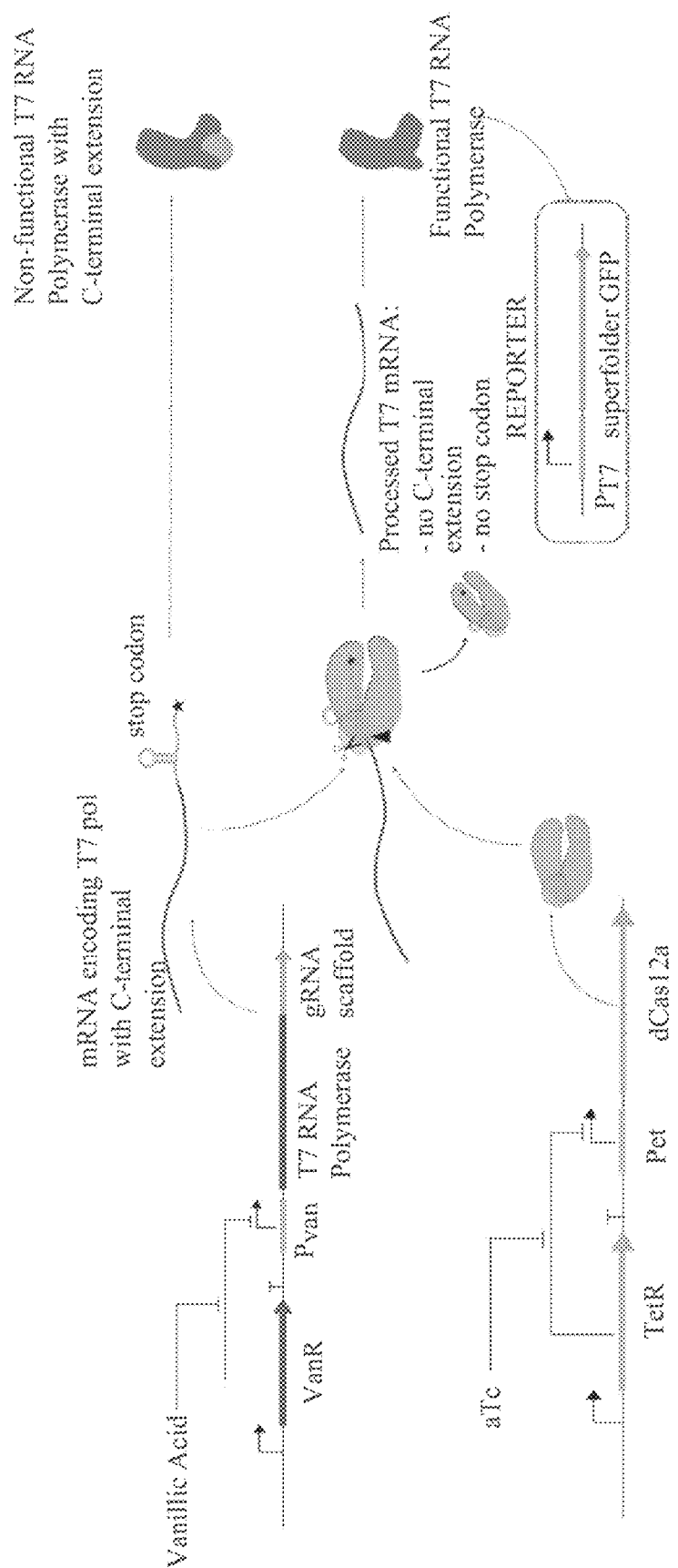

An in vitro RNA processing assay was utilized to assess function of identified gRNA molecules. This gRNA Processing Circuit relies on the fact that T7 RNA Polymerase does not tolerate C-terminal extensions. T7 mRNA with a gRNA scaffold at the 3' end (T7-gRNA) must be processed by Cas12a in order to produce a functional T7 RNAP, which in turn drives GFP expression (FIG. 5B).

Materials and Methods

Figure 6A:
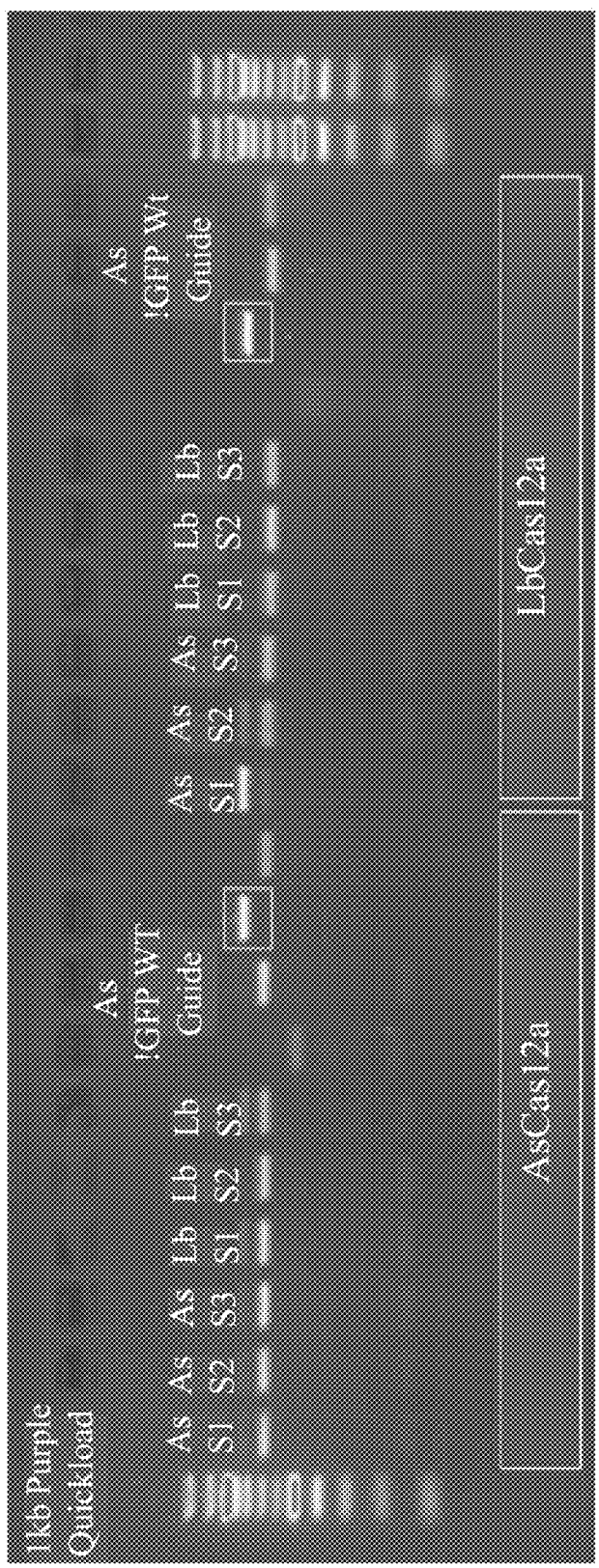
FIG. 6A-B presents photomicrographic images of a DNA cleavage gel (FIG. 6A) and an RNA cleavage gel (FIG. 6B). The DNA cleavage gel shown in FIG. 6A depicts the cleavage of DNA targets after incubation with a riboprotein complex comprising AsCas12a or LbCas12a protein and a gRNA scaffold containing either As or Lb loop sequences. The RNA cleavage gel in FIG. 6B shows the results of target processing by various variant gRNA scaffolds after incubation with AsCas12a or LbCas12a protein. MR020: WT AsCas12a Prelim and Repeat, !YFP3; MR022: WT LbCas12a Prelim and Repeat, !YFP3; and MR024: Nupack Optimized WT LbCas12a Prelim and Repeat, !YFP3.
Figure 6B:
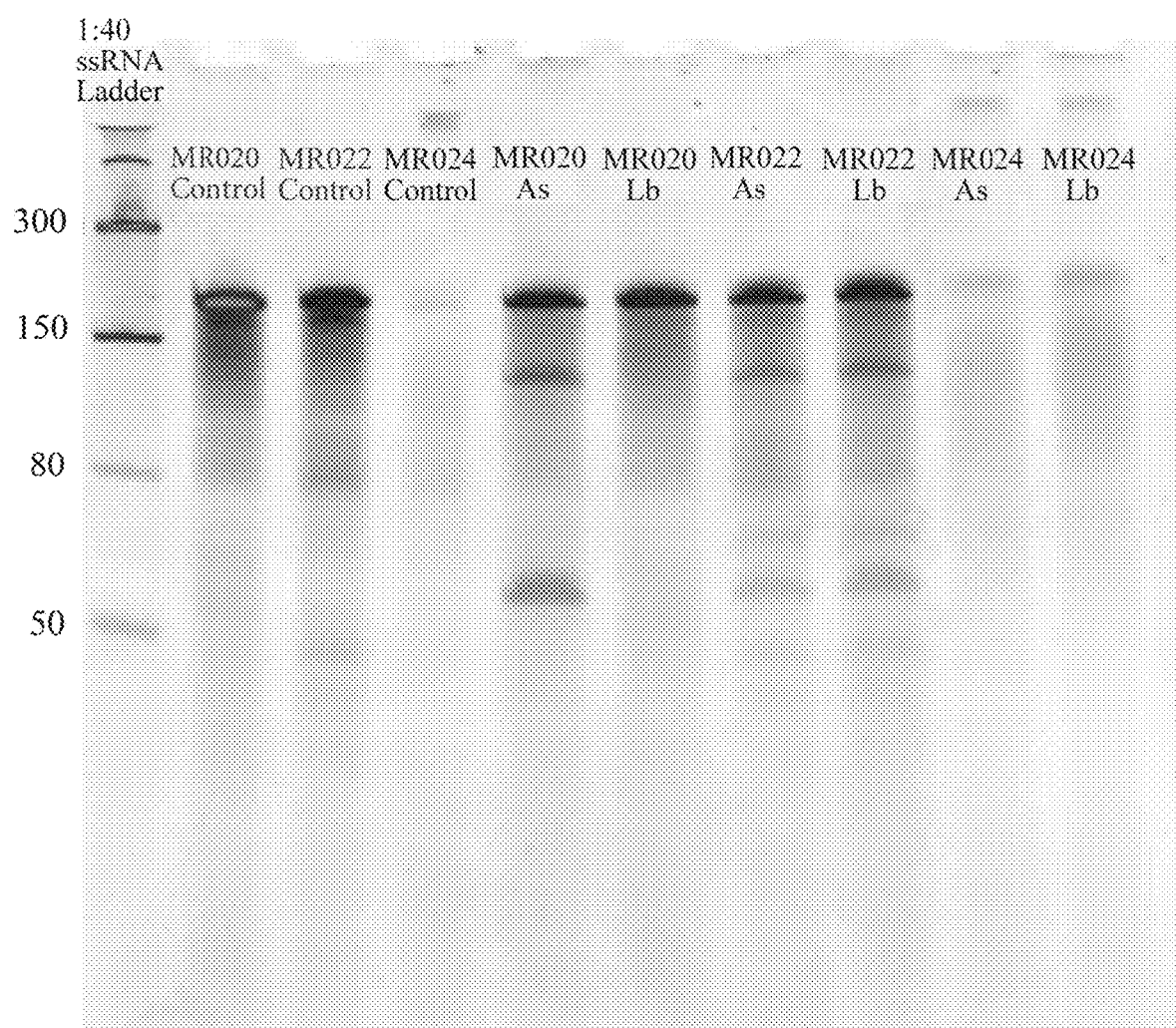

Most materials and methods were similar to those used in Example 1, with several exceptions. The measurable output of a functional variant gRNA scaffold was increased fluorescence due to the production of functional polymerase. An RNA processing assay was also used to confirm identified functional variants (FIG. 6B, FIG. 8B).

Results and Discussion

Figure 5C:
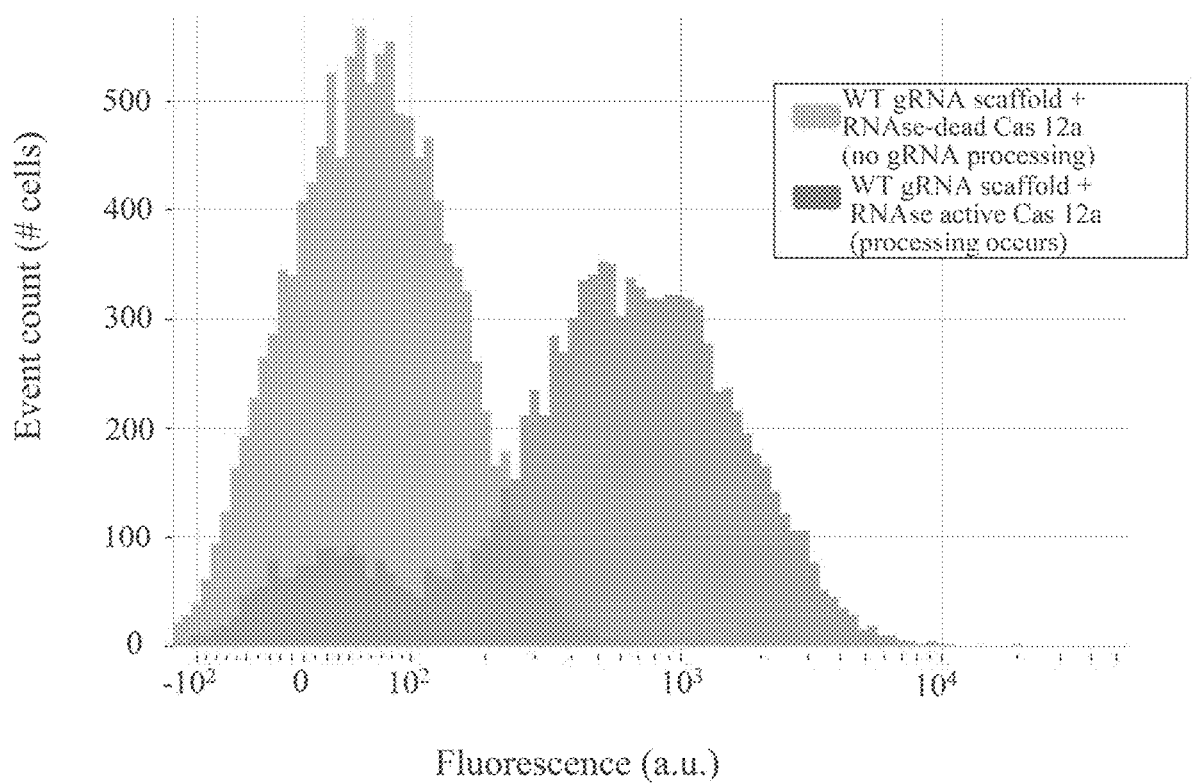
Figure 8C:
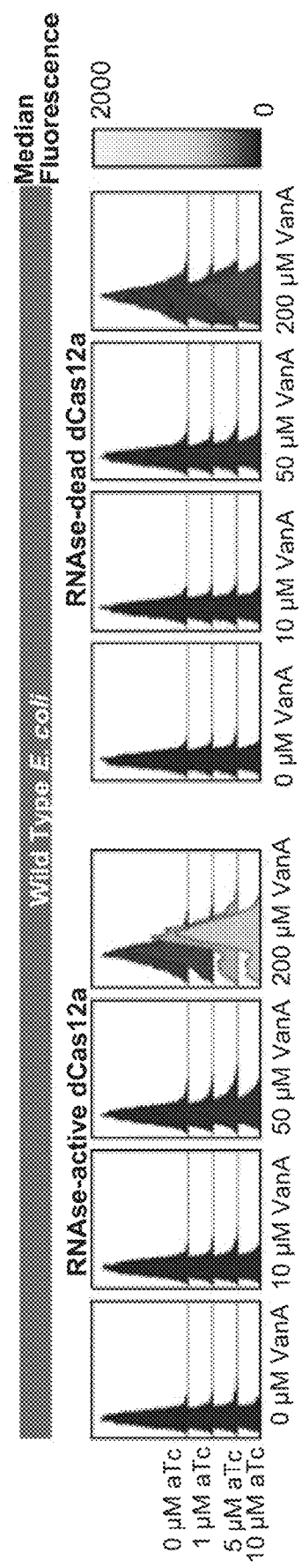
Figure 8D:
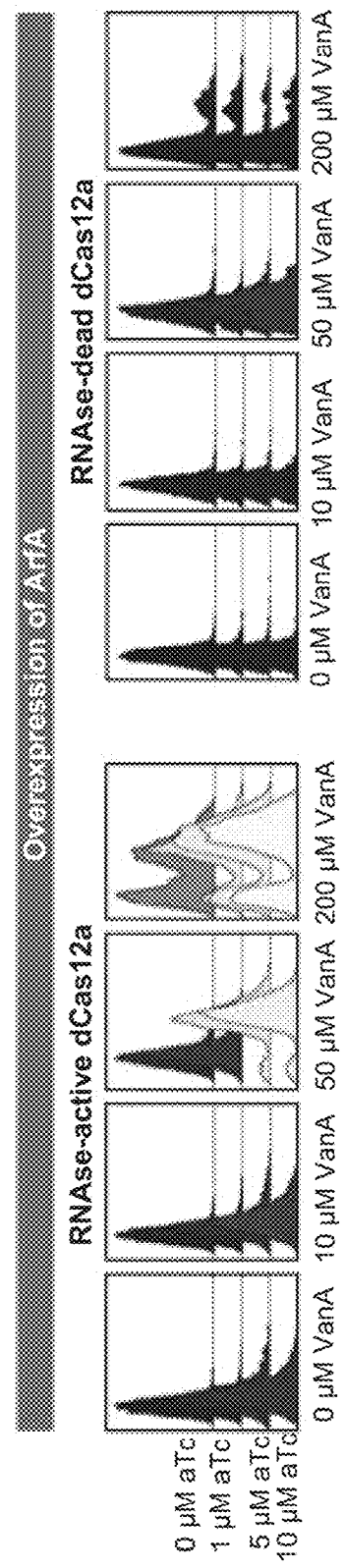

Translation in the absence of successful gRNA processing resulted in a non-functional T7 polymerase and no GFP signal (FIG. 5C). In contrast, successful gRNA processing results in functional T7 polymerase and a GFP signal (FIG. 8C). To increase the amount of functional T7 RNA polymerase produced by successful processing, the release factor ArfA was required to liberate translated polypeptides from a truncated mRNA lacking a stop codon was overexpressed (FIG. 8D). Certain top-performing gRNA scaffolds for enAsCas12a are shown in Table 2; for LbCas12a(RR) shown in Table 3; for WT AsCas12a shown in Table 4, and for WT LbCas12a shown in Table 5. These gRNA scaffolds were top performers because they had activity in both the assay described in Example 1 and in the RNA processing assay described in Example 2. Consensus sequences for the gRNA scaffolds are shown inTtables 6-13.

Example 3

Using CRISPR-Based Genetic Circuits to Develop Virus-Resistant Cell Lines or Organisms.

An application of CRISPR-based genetic circuits for screening gRNA scaffold permutations and driving robust multiplex targeting is described. The benefit of a high level of multiplexing is that targeted viruses must acquire mutations at every sequence effectively targeted for cutting by the nuclease to become immune, which becomes exponentially more difficult with the number of targeted sites.

Materials and Methods

Target Virus Identification

One or more target viruses are identified based on the environmental and economic impact on a host species of interest. For the swine industry, the two most economically important viruses are African Swine Fever Virus (ASFV) and Suid alphaherpesvirus 1(SuHV1).

Identification of Viral Target Site(s)

Available sequence data are used to identify conserved and functionally important sequences within the target virus(es). Viral genomes can be accessed through public NCBI databases. For ASFV, the NCBI genome database contains 37 complete genome assemblies from different ASFV strains. Viral genomes can be analyzed with multiple genome alignment tools such as MAFFT (Katoh and Standley 2013), and predictive software is used to identify target sites within conserved sequences with few off-targets and optimal secondary structures. (Examples of multiple sequence alignment software packages can be found at //en.wikipedia.org/wiki/List_of_sequence_alignment_software; example prediction software for Cas12a activity are CINDEL at//big.hanyang.ac.kr/cindel and CRISPR-DT at bioinfolab.miamioh.edu/CRISPR-DT) These target sites and guide RNAs can be tested through cell-free (in vitro) DNA cleavage and RNA processing assays (as performed in Examples 1-2) to validate the guides, as shown in FIGS. 6A-B. The number of guides expressed per virus targeted may vary based on a variety of factors, including but not limited to cell type, tissue type, virus type, and the target sequences within the virus. Computational modeling with Nupack (California Institute of Technology, Pasadena, CA, see nupak.org) or similar software may be used to balance rates of gRNA processing, target DNA cleavage, and the evolutionary stability of the guides.

A locus of insertion is identified that permits expression in all tissues infected by the target virus. Transgenes have been successfully expressed in pigs using the Rosa26 locus, which has been widely used in murine models of gene editing. Because ASFV infects macrophages and monocytes in the pig, it is studied in those cell lines (Sanchez et al. 2017, Kong et al. 2014, Li et al. 2014).

Promoters corresponding to high levels of expression in all tissues are identified, ideally in the desired locus of insertion. For example, the EF1a promoter is used for nuclease expression. This promoter has been previously used for ubiquitous transgene expression in the Rosa26 locus of pigs (Kong et al. 2014). Alternatively, the native ROSA26 expression is used for the nuclease, in which case EF1a is used for expression of a guide RNA array, or vice versa.

Determine Identity and Intracellular Location of Nuclease to be Used for Viral Targeting An appropriate CRISPR nuclease is chosen based on the form of the virus. For example, ASFV is targeted with Cas12a because the ASFV genome is comprised of dsDNA; however certain riboviruses are targeted with RNA-guided RNA-targeting enzyme such as Cas13d. The appropriate CRISPR nuclease must also be expressed in and/or directed to appropriate intracellular locations for targeting the virus of interest—either nuclear or cytoplasmic or both. ASFV is preferably targeted in the cytoplasm because that is where it is primarily found. CRISPR nuclease expression cassettes are preferably designed using a strong promoter found in the relevant tissue type.

Guide RNA Array Design

Figure 7A:
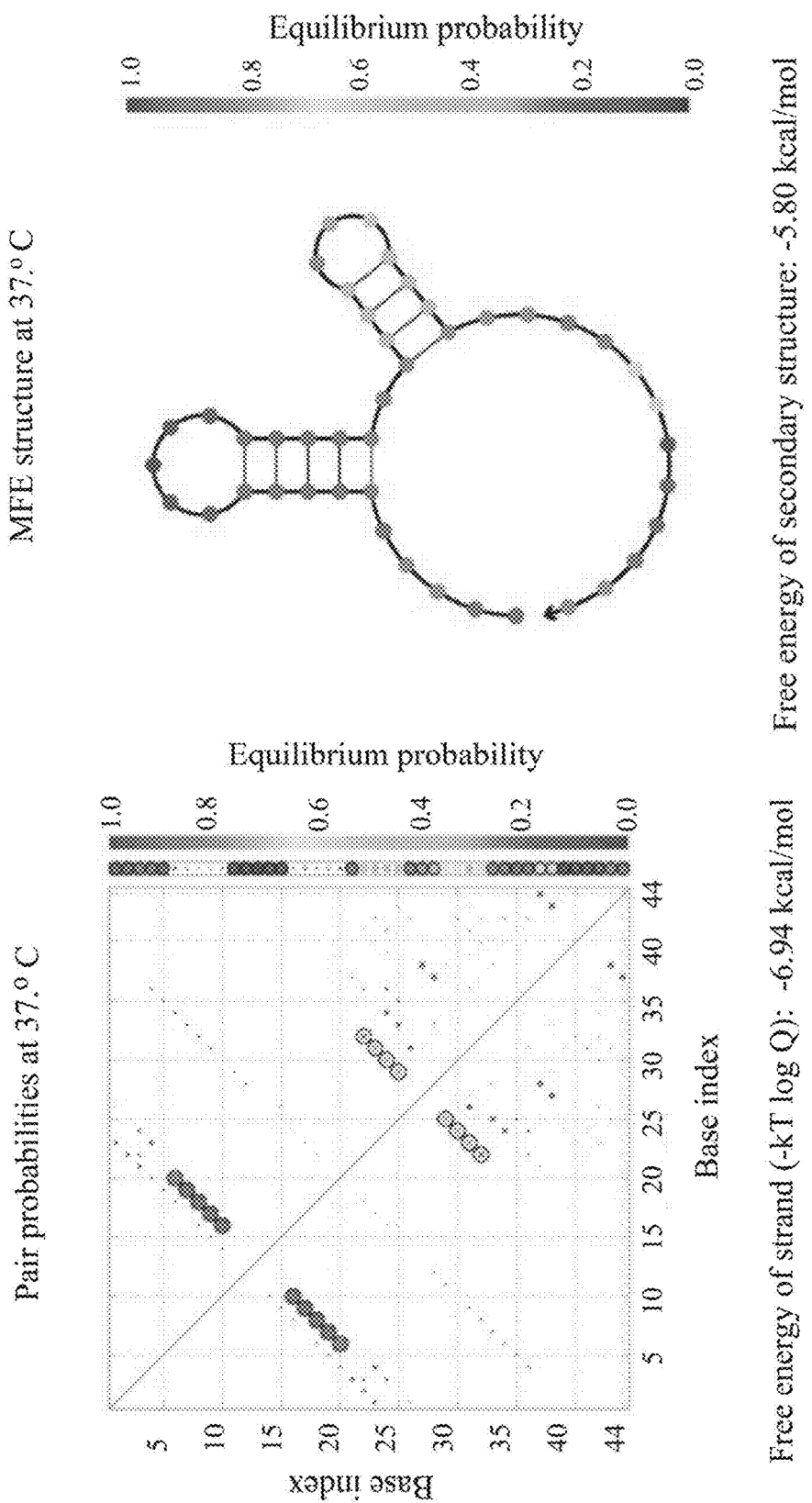

The secondary structure of the guide RNA array is carefully optimized. Repeats are paired with spacers such that secondary structure interactions between the repeat and spacer are minimized (FIGS. 7A-B) in order to promote processing of the RNA array and the formation of the guide-nuclease complex.

The maximum number of guides that can be expressed from each promoter is experimentally determined using a VPR transcriptional activation via fluorescent reporter assay. Alternatively, a series of active Pol III promoters is used to express smaller arrays (e.g., 5 guides). For ASFV, arrays of 5 guides are built, each under the U6 and 7SK promoters for small RNA expression (Chen et al. 2012). These smaller arrays are compared against an array of 10 guides under the EF1a promoter (Petkov, Hyttel, and Niemann 2013). DNA constructs for nuclease expression and RNA guide array are assembled using common DNA synthesis and cloning techniques.

Generation of Cell Lines

The nuclease and guide constructs are integrated into the cell lines or tissue through insertion at the relevant locus or through preliminary insertion through lentiviral integration. These cell lines are validated through the use of assays such as western blot, fluorescence cytometry, and qPCR. For ASFV and SuHV1, the following cell lines are generated through Cas9 knock-in at the Rosa26 locus in PAM or WSL cells (Sanchez et al. 2017).

Cell line 1: pU6 and p7SK each drive 5 guides against ASFV
Cell line 2: EF1a drives 10 guides against ASFV
Cell line 3: pU6 and p7SK each drive 5 guides against SuHV1
Cell line 4: EF1a drives 10 guides against SuHV1

Viral Challenge Experiments

The cell line is challenged with the relevant virus and the effect of the engineered defense system is evaluated through plaque assays and/or challenging the cell lines with a recombinant (fluorescent protein tagged) version of the virus. For ASFV, the cell lines are evaluated by blinded testing at a BL4 facility.

Results and Discussion

Functional Cas12a gRNA scaffolds with limited homology enable synthesis of large guide arrays for expanded multiplexed targeting. Limiting internal homology also enhances the stability of large arrays in vivo, due to reduced risk of homologous recombination both within and between guide arrays. The generational stability of large arrays is a particular concern in gene drive contexts, where maintaining the fidelity of CRISPR components encoded at multiple sites in the genome is critical for propagation of the drive.

Example 4

Validating Viral Spacer Targeting Efficiency with Diverse Cas12a Repeats in Mammalian Cells.

Figure 9A:
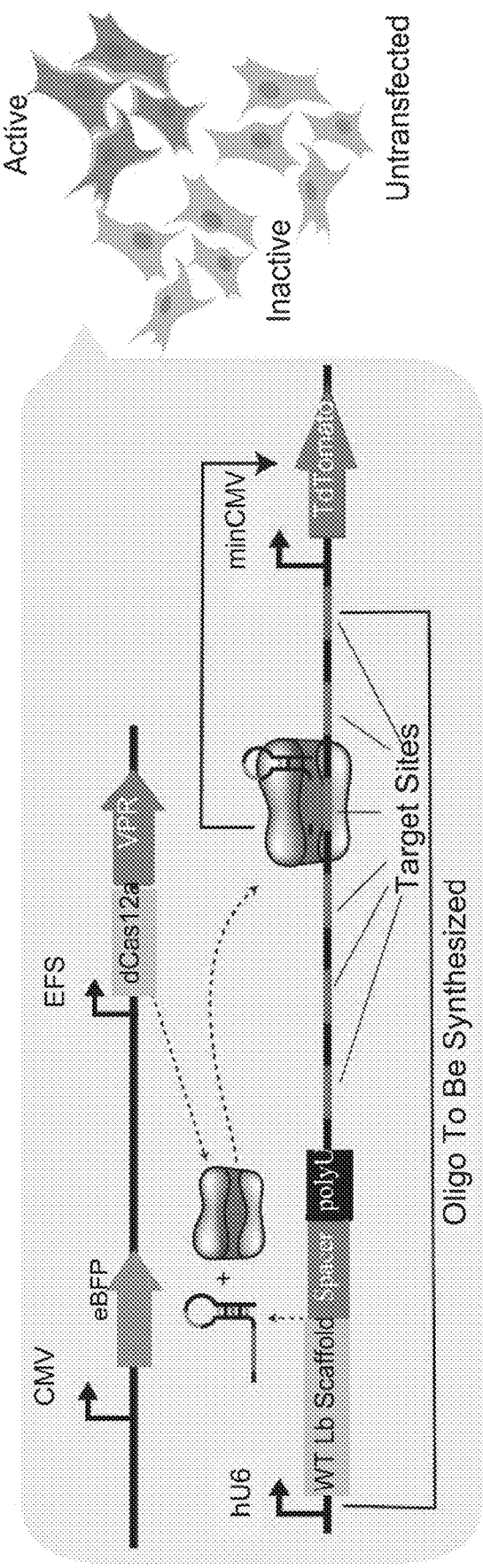
FIG. 9A-B presents a schematic diagram and photomicrographs from a mammalian assay to validate viral spacer targeting efficiency with diverse Cas12a repeats.

To test functionality in mammalian cells with different spacers in order to quantify the impact of secondary structure on DNA targeting efficiency, a transcriptional activation assay was designed based on dCas12a-VPR to test top scaffold variants paired with diverse spacers in 293T cells (FIG. 9A). The goal was to improve the combined VPR reporter construct by examining several variables: the optimal number of binding sites, spacing between binding sites, and the distance between binding sites and the reporter gene.

This assay is important because although many CRISPR knockout screens exist for the human genome and that of other model species, there is no known assay that will enable high-throughput testing of viral CRISPR targeting sequences through an activation screen. This feature is crucial for viruses that are difficult or dangerous to work with, because it permits obtaining an optimal targeting sequence for a virus prior to viral infection screens.

A VPR reporter with 7 TetO targeting sites upstream of the TdTomato gene was used as a positive control. The positive control VPR reporter was co-transfected with a plasmid containing a wild-type scaffold and the TetO spacer driven by a U6 guide. A randomly generated "scaffold" followed by the TetO spacer was used as a negative control.

Optimal binding site number was tested using 1, 2, or 3 binding sites. Spacing between binding sites was tested by placing the binding sites either 0 bp apart or 30 bp apart. Distance between binding sites and the reporter gene was tested by placing the minCMV promoter either 100 or 200 bp upstream of the TdTomato cassette. It was observed that increasing the number of binding sites boosted expression of TdTomato, and that binding sites needed to be spaced apart for optimal signal, possibly due to steric hindrance when multiple Cas12a-VPR constructs bound adjacent targeting sites.

Figure 9B:
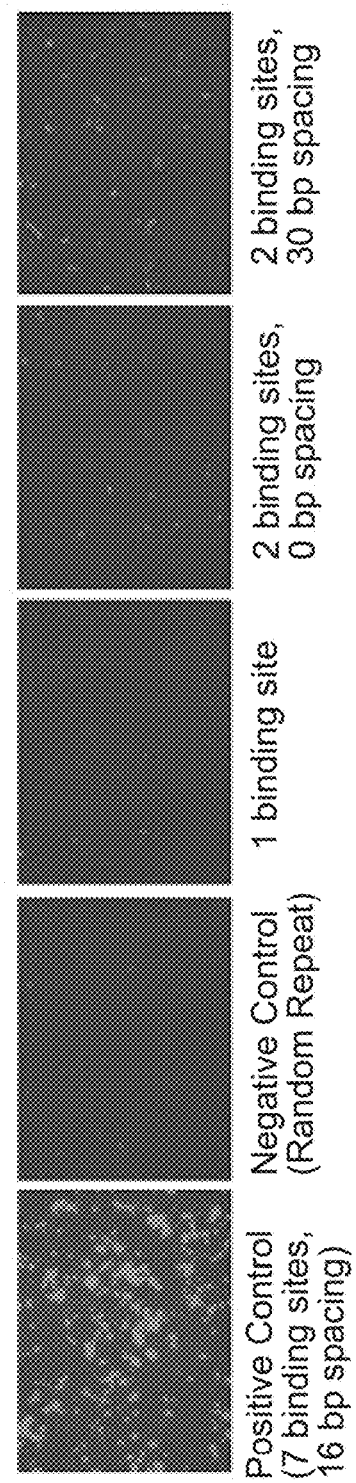

A final plasmid for screening target/crRNA scaffold variant pairs was then designed with six binding sites separated by 16 bp of random sequence, which is the maximum number of sites that fit into a 300 bp oligo (FIG. 9B). This assay also allows testing the efficiency of binding to viral target sequences without the need for viral infection in cell culture conditions. By transfecting a library of possible viral spacer sequences, the best targets for engineering a virus-resistant mammalian cell line can be identified.

Example 5

Figure 10:
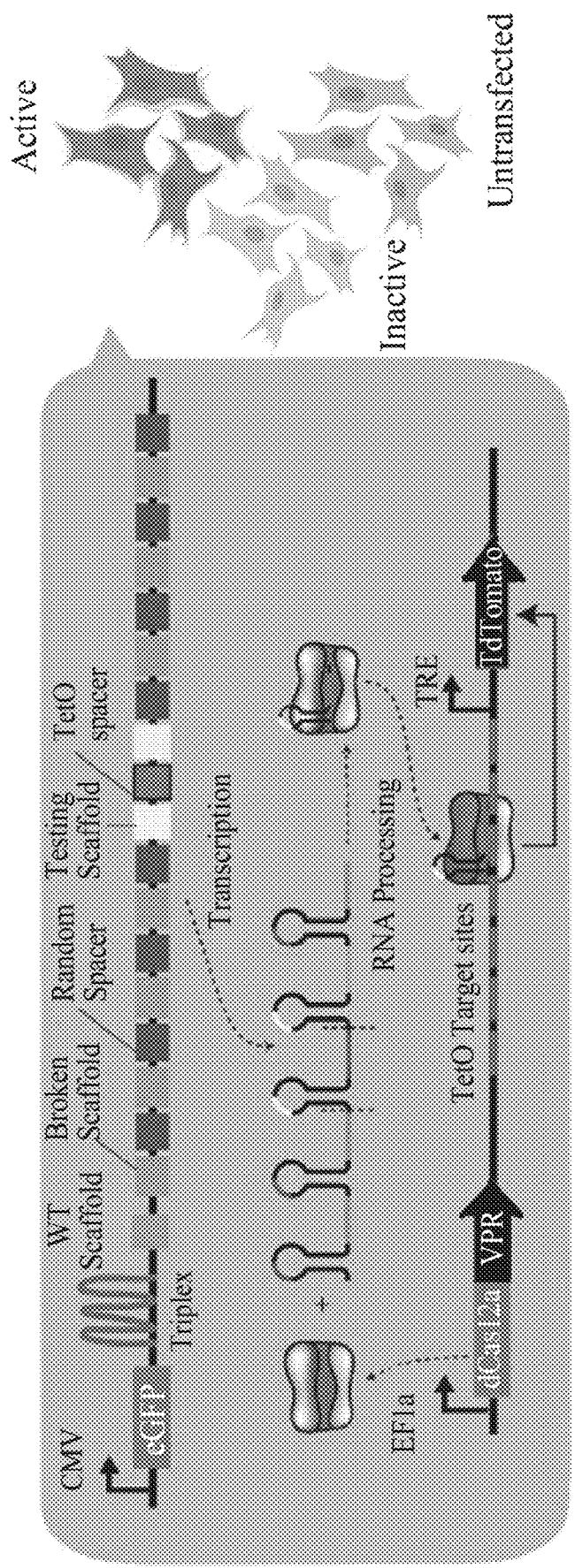
FIG. 10 presents a schematic diagram of a mammalian "broken array" circuit design. The "broken array" circuit assay was designed to validate dual DNA binding and RNA processing.

Mammalian "Broken Array" to Validate Dual DNA Binding and RNA Processing.
Mammalian "Broken" Array Circuit Design To verify that the top variant crRNA scaffolds function within arrays by being processed into individual guides, a "broken array" assay was designed (FIG. 10, FIG. 11A) in which a ten-member array made of non-processing variants that still bind DNA (as determined by the in vitro processing assay and DNA binding and RNA processing screens in Examples 1-2) and random spacer sequences were cloned into the 3' UTR of the EGFP gene expressed from the strong CMV promoter. To confirm array expression and functionality, a triplex sequence allowing continued translation of EGFP after Cas12a processing was included upstream of the scaffold array. Golden Gate sites in the middle of the array allow a crRNA scaffold variant to be cloned into the array to either side of a TetO spacer that directs dCas12a-VPR to activate a TdTomato reporter. Non-processing scaffolds will be trapped and fail to activate TdTomato; scaffolds that cannot mediate DNA-binding will also yield no signal. Processing at both copies of the crRNA scaffold being tested will excise the functional TetO-targeting crRNA unit in between. If the test scaffold can also mediate DNA-binding, it will yield TdTomato fluorescence.

Figure 11A:
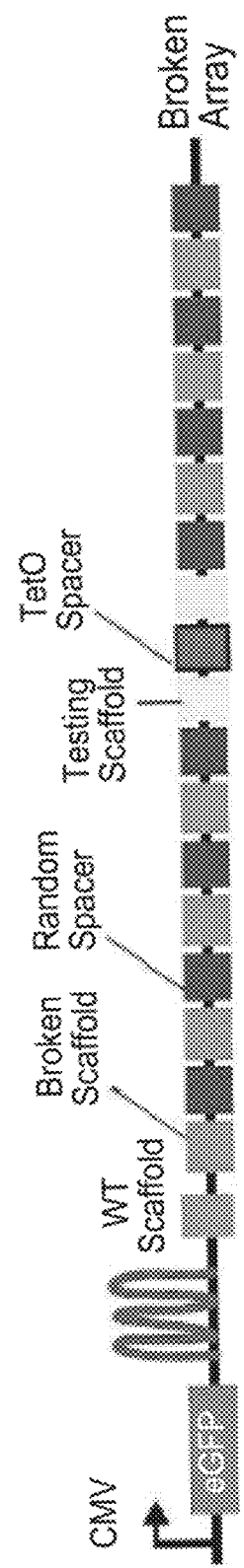
FIG. 11A-C presents a schematic, graph and photomicrographs from a "broken" array circuit assay.
Figure 11B:
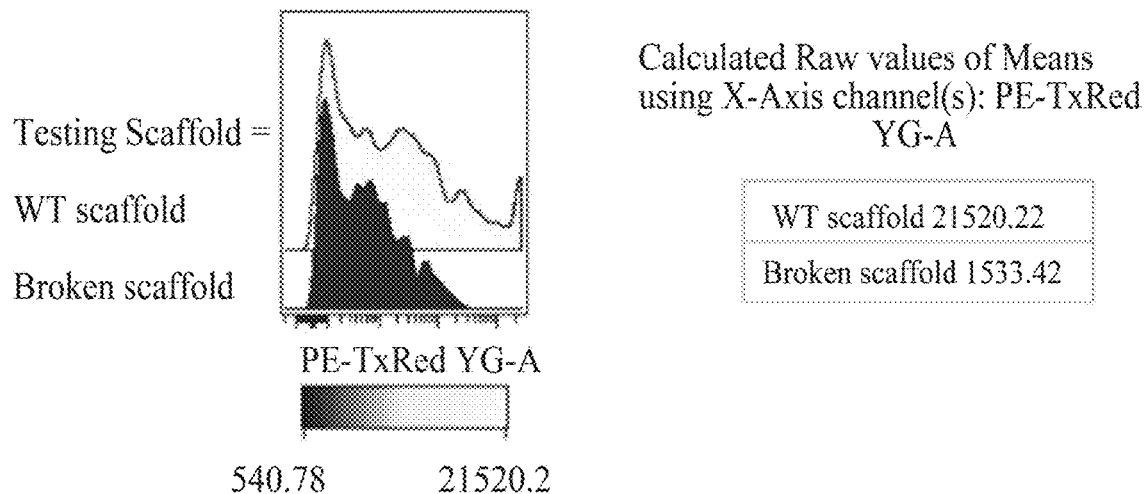
Figure 11C:
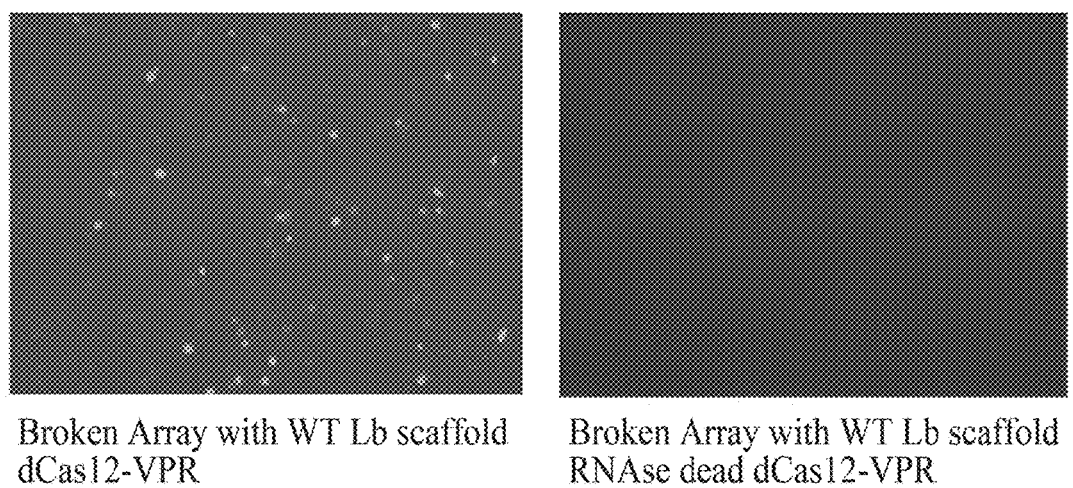

This assay, which requires both DNA-binding and processing in mammalian cells, is used to validate the top mutant scaffolds enriched in both the bacterial DNA binding and RNA processing screens. A pool of top scaffold sequences (approximately 200) have been pulled from the bacterial DNA binding and RNA processing library screens to test in the broken array assay. Results of the "broken" assay will confirm the results of the prior bacterial library screens in a mammalian context. FIG. 11A-C provides overview of Broken array assay. FIG. 11A shows the "Broken" array circuit design; FIG. 11B shows results of fluorescent cytometry analysis of broken array containing either a wild-type scaffold flanking the TetO spacer or a broken (non-RNA-processing) scaffold variant; and FIG. 11C shows fluorescent microscopy images of HEK293T cells co-transfected with a TetO VPR Reporter construct, a broken array construct containing the wild-type scaffold flanking the TetO spacer, and either a RNase-active or RNase-inactive dLbCas12a-VPR.

This assay is used to assess the top scaffolds, which are cloned into the plasmid and transfected into HEK293T cells in 96-well plate format prior to evaluation by flow cytometry. The wild-type scaffold serves as a positive control; a random scaffold and a random spacer serve as negative controls. It is identified that all transfected cells express GFP, but TdTomato expression is only detected in those with variants that can both be processed and direct DNA binding.
Results A 10-member array was built of crRNA scaffolds that can mediate DNA binding but not RNA processing with a TdTomato activating spacer in the center. This array failed to activate transcription of the TdTomato reporter upon co-transfection with dLbCas12a-VPR into HEK293 cells (FIG. 11A). In contrast, a construct expressing the wild-type crRNA scaffold flanking the activating spacer exhibited fluorescence activation, as seen by flow cytometry analysis (FIG. 11B). This result is consistent with the hypothesis that positioning an otherwise active crRNA that cannot be processed in the context of a similarly non-processing array greatly impairs activity, presumably due to secondary structure or interference by competing Cas12a-crRNA units in the same transcript.

Placing the non-processing but DNA-binding scaffold on its own downstream of a U6 promoter led to transcriptional activation of TdTomato, demonstrating that the broken array assay yields positive results only for scaffolds that combine RNA-processing and DNA-binding activity. To confirm these results, the assay was repeated with the wild-type scaffold and an RNase-dead version of dCas12a-VPR (FIG. 11B), which failed to process and therefore activate transcription (FIG. 11C). These results validate the ability of the broken array assay to identify crRNA scaffolds capable of mediating both RNA-processing and DNA-binding in mammalian cells.

CERTAIN REFERENCES

Chen Shi-Jin, Fan Jing, Jiang Qin-Yang, Lan Gan-Qiu, Guo Xiao-Ping, and Guo Ya-Fen. 2012. "[Cloning and functional verification of U6 and 7SK promoter of small RNA from Bama mini-pig in Guangxi]." *Yi chuan=Hereditas/Zhongguo yi chuan xue hui bian ji* 34 (4): 445-53.

Freitas, Ferdinando B., Goncalo Frouco, Carlos Martins, and Fernando Ferreira. 2018. "African Swine Fever Virus Encodes for an E2-Ubiquitin Conjugating Enzyme That Is Mono- and Di-Ubiquitinated and Required for Viral Replication Cycle." *Scientific Reports* 8 (1): 3471.

Freitas, Ferdinando B., Goncalo Frouco, Carlos Martins, Alexandre Leitão, and Fernando Ferreira. 2016. "In Vitro Inhibition of African Swine Fever Virus-Topoisomerase II Disrupts Viral Replication." *Antiviral Research* 134 (October): 34-41.

Gao, Linyi, et al. "Engineered Cpf1 variants with altered PAM specificities." *Nature Biotechnology* 35.8 (2017): 789.

Katoh, Kazutaka, and Daron M. Standley. 2013. "MAFFT Multiple Sequence Alignment Software Version 7: Improvements in Performance and Usability." *Molecular Biology and Evolution* 30(4): 772-80.

Keita, Djénéba, Livio Heath, and Emmanuel Albina. 2010. "Control of African Swine Fever Virus Replication by Small Interfering RNA Targeting the A151R and VP72 Genes." *Antiviral Therapy* 15 (5): 727-36.

Kong, Qingran, Tang Hai, Jing Ma, Tianqing Huang, Dandan Jiang, Bingteng Xie, Meiling Wu, et al. 2014. "Rosa26 Locus Supports Tissue-Specific Promoter Driving Transgene Expression Specifically in Pig." *PloS One* 9 (9): e107945.

Li, Ping, Christopher Burlak, Jose Estrada, Peter J. Cowan, and A. Joseph Tector. 2014. "Identification and Cloning of the Porcine ROSA26 Promoter and Its Role in Transgenesis." *Transplantation Technology* 2 (1): 1.

Petkov, Stoyan, Poul Hyttel, and Heiner Niemann. 2013. "The Choice of Expression Vector Promoter Is an Important Factor in the Reprogramming of Porcine Fibroblasts into Induced Pluripotent Cells." *Cellular Reprogramming* 15 (1): 1-8.

Sánchez, Elena G., Elena Riera, Marisa Nogal, Carmina Gallardo, Paloma Fernández, Raquel Bello-Morales, José Antonio López-Guerrero, Carol G. Chitko-McKown, Jürgen A. Richt, and Yolanda Revilla. 2017. "Phenotyping and Susceptibility of Established Porcine Cells Lines to African Swine Fever Virus Infection and Viral Production." *Scientific Reports* 7 (1): 10369.

Statement for all Examples

Means for designing constructing, integrating, and implementing such systems of the invention as well as preparing organism strains and releasing organisms of such strains, etc. that include such systems of the invention is carried out using the teaching presented herein, and in certain instances in conjunction with methods, components, and/or elements known in the art.

EQUIVALENTS

Although several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications cited or referred to in this application are incorporated herein in their entirety herein by reference.

SEQUENCE LISTING

The patent contains a lengthy sequence listing. A copy of the sequence listing is available in electronic form from the USPTO web site (https://seqdata.uspto.gov/docdetail?docId=US12460201B2). An electronic copy of the sequence listing will also be available from the USPTO upon request and payment of the fee set forth in 37 CFR 1.19(b)(3).

What is claimed is:

1. A function/processing-screening function screening method for identifying one or a plurality of guide RNA (gRNA) molecules that are DNA-binding/RNA-processing gRNA molecules, the method comprising:
   (a) contacting (i) a first Cas protein that binds a promoter sequence that drives expression of a first reporter protein; (ii) a first nucleic acid molecule comprising the promoter sequence and a sequence encoding the first reporter protein; and (iii) one or a plurality of test nucleic acid molecule fragments, wherein the binding of one of the test nucleic acid molecule fragments to the first Cas protein produces a riboprotein complex that binds the promoter sequence, wherein the binding of the riboprotein complex to the promoter sequence alters expression of the first reporter protein, wherein the altering is either a reduction or an increase in expression of the first reporter protein, and wherein the altered expression of the first reporter protein identifies the test nucleic acid molecule fragment as a DNA-binding gRNA molecule;
   (b) contacting (i) a second Cas protein; (ii) a second nucleic acid molecule encoding a second reporter protein; and (iii) an mRNA molecule comprising an RNA polymerase (RNAP) sequence and the sequence of one of the identified DNA-binding gRNA molecules positioned past the 3' end of the RNAP sequence, wherein:
      if the second Cas protein processes the identified DNA-binding gRNA molecule in the mRNA molecule comprising the RNA polymerase (RNAP) sequence, translation of the RNAP mRNA sequence produces a functional RNAP that drives expression of the second reporter protein, and
      if the second Cas protein does not process the identified DNA-binding gRNA molecule in the mRNA molecule comprising the RNA polymerase (RNAP) sequence, translation of the RNAP mRNA sequence produces an RNAP that does not drive expression of the second reporter protein,
   (c) assessing expression of the second reporter protein, wherein the presence of the expressed second reporter protein determines that the identified DNA-binding gRNA molecule is a DNA-binding/RNA-processing gRNA molecule and the absence of the expressed second reporter protein determines that the identified DNA-binding gRNA molecule is not an RNA-processing gRNA molecule; and
   (d) optionally, repeating steps (a)-(c) for an additional one or more of the test nucleic acid molecule fragments.

2. The function/processing-screening method of claim 1, wherein the promoter sequence is a constitutive promoter sequence.

3. The function/processing-screening method of claim 1, wherein one or both of the first and second reporter proteins comprises a fluorescent protein.

4. The function/processing-screening method of claim 1, wherein one or both of the first and second Cas proteins is a Cas12a protein, and optionally is one of: AsCas12a (wild type), LbCas12a, LbCas12a (RR), and enAsCas12a.

5. The function/processing-screening method of claim 1, wherein the first Cas protein, the nucleic acid molecule comprising the promoter sequence and the sequence encoding the first reporter protein, and the one or a plurality of test nucleic acid molecule fragments are in a cell, and the first Cas protein is expressed in the cell, and optionally, a nucleic acid sequence encoding the first Cas protein is delivered to the cell in a vector.

6. The function/processing-screening method of claim 5, wherein the cell is a bacterial cell.

7. The function/processing-screening method of claim 5, wherein the cell is a eukaryotic cell.

8. The function/processing-screening method of claim 1, further comprising,
   (i) repeating step (a) for an additional one or more of the test nucleic acid molecule fragments, and identifying a plurality of DNA-binding gRNA molecules;
   (ii) sorting the identified plurality of DNA-binding gRNA molecules based on a level of the altered expression of the first reporter protein by the identified DNA-binding gRNA molecules; and
   iii) identifying the sorted DNA-binding gRNA molecules with:
      (A) higher levels of reduction of the first reporter protein expression compared to the sorted DNA-binding gRNA molecules with lower levels of reduction of the first reporter protein expression; or
      (B) higher levels of increase of the first reporter protein expression compared to the sorted DNA-binding gRNA molecules with lower levels of increase of the first reporter protein expression.

9. The function/processing-screening method of claim 1, further comprising preparing a gRNA scaffold array comprising:
   a plurality of units, wherein a unit comprises
      (i) the gRNA molecule determined to be a DNA-binding/RNA-processing gRNA molecule and
      (ii) an independently selected spacer sequence, or
      (iii) the gRNA molecule determined to be a DNA-binding gRNA molecule that is not an RNA-processing gRNA molecule and
      (iv) an independently selected spacer sequence.

10. The function/processing-screening method of claim 9, wherein the prepared array of the gRNA scaffold molecules comprises one or more of a unit comprising: one of the identified gRNA molecules and an independently selected spacer sequence and wherein the spacer sequences binds an independently selected nucleic acid sequence.

11. The function/processing-screening method of claim 10, wherein the prepared gRNA scaffold array comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or more of the units, wherein the gRNA molecules of the units are independently selected and the spacer sequences of the units are independently selected.

12. The function/processing-screening method of claim 9, wherein the prepared gRNA scaffold array comprises a plurality of the prepared gRNA scaffold molecules comprising the gRNA molecules determined to be DNA-binding/RNA-processing gRNA molecule.

13. The function/processing-screening method of claim 9, wherein the prepared gRNA scaffold array comprises a plurality of the prepared gRNA scaffold molecules comprising the gRNA molecules identified as DNA-binding gRNA molecules that are not RNA-processing gRNA molecules.

14. The function/processing-screening method of claim 1, wherein:
   step (b) comprises contacting (i) the second Cas protein; (ii) the second nucleic acid molecule encoding the second reporter protein; (iii) an mRNA molecule comprising an RNAP sequence and the sequence of one of the DNA-binding gRNA molecules identified in (a) positioned past the 3' end of the RNAP sequence; and (iv) a plurality of mRNA molecules each comprising the RNAP sequence and the sequence of one of a plurality of DNA-binding gRNA molecules that are not RNA-processing gRNA molecules and that are positioned past the 3' end of the RNAP sequence, wherein the presence of RNA-processing identifies the DNA-binding gRNA molecule identified in (a) as a DNA-binding/RNA-processing gRNA molecule.

* * * * *

UNITED STATES PATENT AND TRADEMARK OFFICE
CERTIFICATE OF CORRECTION

PATENT NO. : 12,460,201 B2
APPLICATION NO. : 16/931389
DATED : November 4, 2025
INVENTOR(S) : Mariah Avila et al.

Page 1 of 1

It is certified that error appears in the above-identified patent and that said Letters Patent is hereby corrected as shown below:

In the Claims

In Claim 1, Line 1, please delete "function screening".

In Claim 12, Line 52, please replace "molecule" with "molecules".

Signed and Sealed this
Twenty-third Day of December, 2025

John A. Squires
*Director of the United States Patent and Trademark Office*